US012670859B2

(12) United States Patent
Ishii et al.

(10) Patent No.: US 12,670,859 B2
(45) Date of Patent: Jun. 30, 2026

(54) DISPLAY DEVICE

(71) Applicant: Magnolia White Corporation, Tokyo (JP)

(72) Inventors: Tatsuya Ishii, Tokyo (JP); Masanobu Ikeda, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 0 days.

(21) Appl. No.: 19/081,642

(22) Filed: Mar. 17, 2025

(65) Prior Publication Data

US 2025/0316232 A1 Oct. 9, 2025

(30) Foreign Application Priority Data

Apr. 8, 2024 (JP) ................................ 2024-062122

(51) Int. Cl.
*G09G 3/3233* (2016.01)

(52) U.S. Cl.
CPC ..... *G09G 3/3233* (2013.01); *G09G 2300/043* (2013.01); *G09G 2300/0819* (2013.01); *G09G 2310/08* (2013.01); *G09G 2330/021* (2013.01)

(58) Field of Classification Search
CPC ...... G09G 3/32–3291; G09G 2300/0421–043; G09G 2300/0809; G09G 2300/0819; G09G 2300/0842; G09G 2300/0861; G09G 2310/06;

(Continued)

(56) References Cited

U.S. PATENT DOCUMENTS

| | | | | |
|---|---|---|---|---|
| 9,460,653 B2 * | 10/2016 | Han | ..................... | G09G 3/3648 |
| 2004/0207615 A1 * | 10/2004 | Yumoto | ............... | G09G 3/3241 345/211 |

(Continued)

FOREIGN PATENT DOCUMENTS

| | | | | |
|---|---|---|---|---|
| CN | 114097022 A | * | 2/2022 | ............... G09G 3/36 |
| CN | 114664263 A | * | 6/2022 | ........... G09G 3/3406 |

(Continued)

OTHER PUBLICATIONS

English translation of CN-114097022-A (Year: 2022).*

(Continued)

*Primary Examiner* — Nathan Danielsen
(74) *Attorney, Agent, or Firm* — K&L Gates LLP

(57) ABSTRACT

A display device includes a first transistor whose switching is controlled by a first control signal and connected between an image data signal line to which a data voltage is supplied and a first node, a third transistor whose switching is controlled by the first control signal and connected between the first node and a second node, a second transistor having a gate electrode connected to the second node and connected between a power line to which a constant voltage is supplied and the third node, a fourth transistor whose switching is controlled by the first control signal and connected between a reference voltage power line to which a reference voltage is supplied and the second node, and a fifth transistor whose switching is controlled by a second control signal and connected between an initialization voltage power line to which an initialization voltage is supplied and the third node.

20 Claims, 58 Drawing Sheets

(58) Field of Classification Search
CPC ....... G09G 2310/08; G09G 2320/0233; G09G 2320/0242; G09G 2320/04; G09G 2330/021
See application file for complete search history.

(56) References Cited

U.S. PATENT DOCUMENTS

| | | | | |
|---|---|---|---|---|
| 2014/0168190 | A1* | 6/2014 | Kwak | G09G 3/3233 345/212 |
| 2018/0226023 | A1* | 8/2018 | Park | G09G 3/3258 |
| 2021/0201780 | A1* | 7/2021 | Xu | G09G 3/006 |

FOREIGN PATENT DOCUMENTS

| | | | | | |
|---|---|---|---|---|---|
| JP | 2011-164133 | A | | 8/2011 | |
| KR | 20190035265 | A | * | 4/2019 | G09G 3/3233 |
| TW | 201447850 | A | * | 12/2014 | G09G 3/003 |

OTHER PUBLICATIONS

English translation of KR-20190035265-A (Year: 2019).*
English translation of TW-201447850 (Year: 2014).*
English translation of CN-114664263-A (Year: 2022).*

* cited by examiner

VINI2-Vne=VTH, VTHEL>Vne

⇔

VTHEL>VINI2-VTH

⇔

VINI2<VTHEL+VTH

VINI2-Vnen=VTHP, VTHEL<Vnen
⇔
VTHEL<VINI2-VTHP
⇔
VINI2>VTHEL+VTHP

DISPLAY DEVICE

CROSS-REFERENCE TO RELATED APPLICATIONS

This application claims the benefit of priority to Japanese Patent Application No. 2024-062122 filed on Apr. 8, 2024, the entire contents of which are incorporated herein by reference.

FIELD

An embodiment of the present invention relates to a display device.

BACKGROUND

In recent years, a self-luminous display device has been implemented in a TV, a smart phone, a digital signage (electronic signboard, electronic advertising board, and the like), and has become widespread. For example, the self-luminous display device includes a plurality of pixels and a control circuit for driving the plurality of pixels. For example, each of the plurality of pixels includes a plurality of transistors, a capacitive element, and a light-emitting element. The light-emitting element is an element emitting light in a self-luminous manner, and is, for example, a light-emitting diode (LED), a minute light-emitting diode (micro-LED), or an organic electroluminescence (Electro Luminescence: EL) element. In the self-luminous display device, a control circuit supplies a voltage to each of the plurality of pixels, so that a current corresponding to the supplied voltage flows to the light-emitting element included in each of the plurality of pixels. Each of the light-emitting elements emits light with a luminance corresponding to the current flowing through the light-emitting element, and a pixel including the light-emitting element can display an image with a gradation corresponding to the luminance.

For example, an EL display device has been disclosed which is capable of performing an appropriate threshold-correcting operation by reducing a drain current of a drive transistor by paying attention to a convolution of a pulse-waveform in order to increase the luminance of the EL element during a lighting period with respect to the problem of increased power consumption and circuit size.

SUMMARY

A display device includes a first transistor, the switching of which is controlled by a first control signal, electrically connected between an image data signal line to which a data voltage is supplied and a first node, a third transistor, the switching of which is controlled by the first control signal, electrically connected between the first node and a second node, a second transistor, a gate electrode of which is electrically connected to the second node, electrically connected between a power line to which a constant voltage is supplied and a third node, a fourth transistor, the switching of which is controlled by the first control signal, electrically connected between a reference voltage power line to which a reference voltage is supplied and the second node, a fifth transistor, the switching of which is controlled by a second control signal different from the first control signal, electrically connected between an initialization voltage power line to which an initialization voltage is supplied and the third node, a light-emitting element electrically connected to the third node, and a capacitive element electrically connected between the first node and the third node.

A display device includes a first transistor, the switching of which is controlled by a first control signal, electrically connected between an image data signal line to which a data voltage is supplied and a first node, a third transistor, the switching of which is controlled by the first control signal, electrically connected between the first node and a third node, a second transistor, a gate electrode of which is electrically connected to a second node, electrically connected between the third node and a fourth node, a fourth transistor, the switching of which is controlled by the first control signal, electrically connected between the third node and a third control signal line to which a first initialization voltage and a second initialization voltage different from the first initialization voltage are supplied, a fifth transistor, the switching of which is controlled by a second control signal different from the first control signal, electrically connected between a third control signal line and the fourth node, a sixth transistor, the switching of which is controlled by the first control signal, electrically connected between the second node and the fourth node, a seventh transistor, the switching of which is controlled by the first control signal, electrically connected between a voltage line to which a constant voltage is supplied and the fourth node, a light-emitting element electrically connected to the third node, and a capacitive element electrically connected between the first node and the second node.

DESCRIPTION OF EMBODIMENTS

Figure 1:
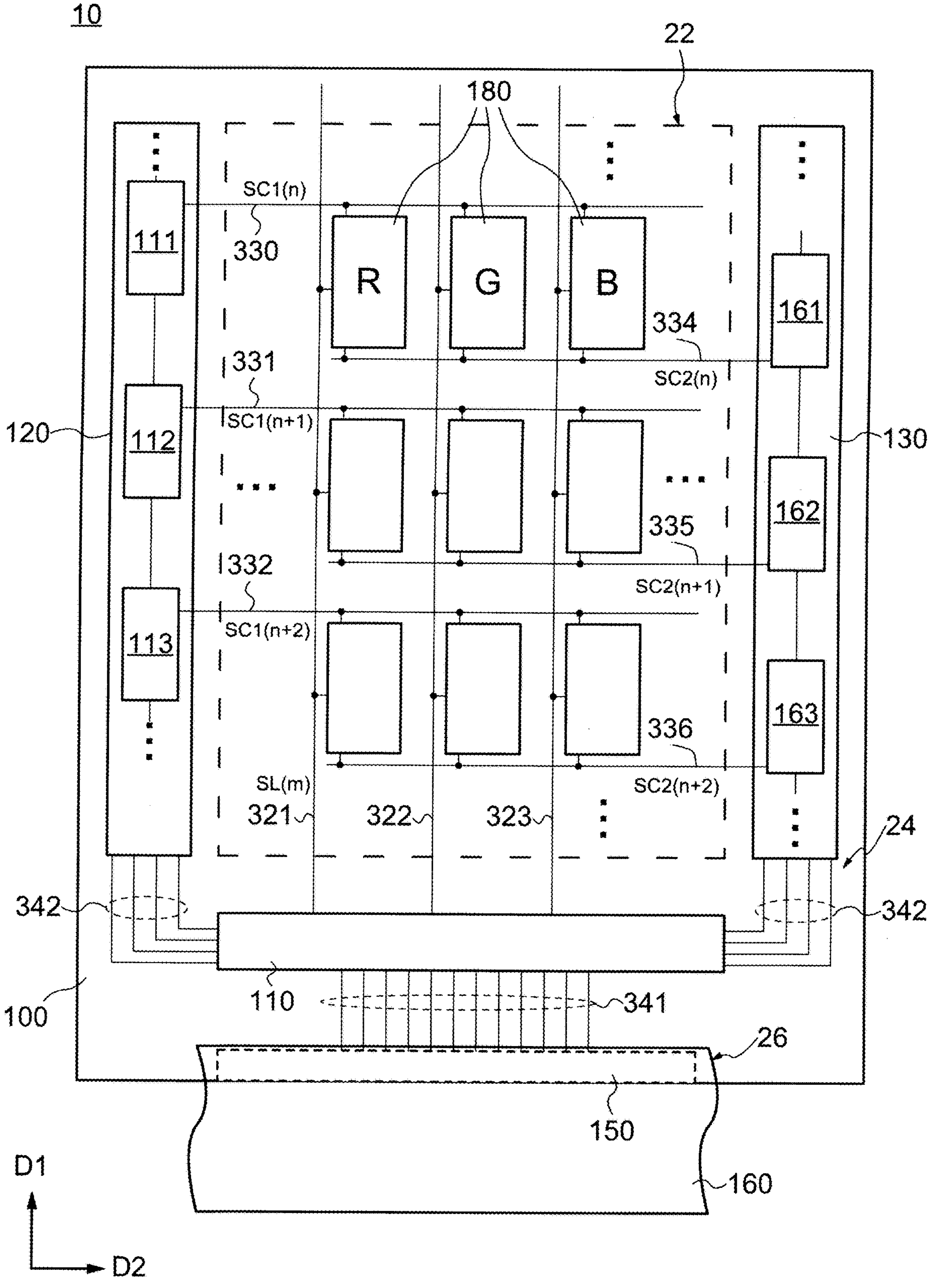
FIG. 1 is a schematic diagram showing a configuration of a self-luminous display device according to the first embodiment of the present invention.

Hereinafter, an example of a display device that can reduce power consumption according to each embodiment of the present invention will be described with reference to the drawings and the like. However, the present invention can be implemented in many different aspects, and should not be construed as being limited to the description of the embodiments exemplified below. Furthermore, in the drawings, the widths, thicknesses, shapes, configurations, and the like of the respective portions may be schematically represented in comparison with the actual embodiments for clarity of the description, but the drawings are merely examples, and do not limit the interpretation of the present invention. In addition, the terms “first” and “second” appended to each element are convenience signs used to distinguish each element, and do not have any further meaning unless otherwise specified.

In the present specification, the phrase "a includes A, B, or C," "a includes any of A, B, and C," "α includes one selected from a group consisting of A, B, and C," and the like does not exclude cases where a includes a plurality of combinations of A to C unless otherwise indicated. Furthermore, these expressions do not exclude the case where a includes other elements.

For example, a display device according to an embodiment of the present invention is a display device using an EL element as a self-luminous light-emitting element. For example, the display device using the EL element may be referred to as a self-luminous display device, an EL display device, or the like. For example, the display device using the EL element is called the self-luminous display device.

1. First Embodiment

[1-1. Overview of Display Device 10]

An overview of a display device 10 according to the first embodiment will be described with reference to FIG. 1. FIG. 1 is a schematic diagram showing a configuration of the display device 10. A configuration of the display device 10 shown in FIG. 1 is an example, and the configuration of the display device 10 is not limited to the configuration shown in FIG. 1.

The display device 10 includes an array substrate 100, a flexible printed circuit board 160 (FPC 160), and an IC chip 110. In addition, the display device 10 includes a display region 22 provided on the array substrate 100, a peripheral region 24 surrounding the display region 22, and a terminal region 26.

In the display region 22, a plurality of pixels 180 is arranged in a matrix along a first direction D1 (column direction) and a second direction D2 (row direction) intersecting the first direction D1. The pixel 180 is the smallest unit constituting a part of an image to be displayed on the display region 22. For example, each of the plurality of pixels 180 may correspond to a sub-pixel R, a sub-pixel G, and a sub-pixel B. One pixel may be formed by three sub-pixels. The arrangement of the pixel 180 is not limited, and the arrangement of the plurality of pixels 180 is, for example, a stripe arrangement. The arrangement of the display device 10 may be a delta arrangement, a pentile arrangement, or the like.

The sub-pixel R, the sub-pixel G, and the sub-pixel B are configured to display images of different colors. For example, each of the sub-pixel R, the sub-pixel G, and the sub-pixel B may include the light-emitting element including a light-emitting layer emitting the three primary colors of red, green, and blue. An arbitrary voltage or current is supplied to each of the three sub-pixels, and the display device 10 can display an image.

The IC chip 110, a first scan driver 120 and a second scan driver 130 are provided in the peripheral region 24. The IC chip 110 is connected to a terminal section 150 using a connection wiring 341. Each of the first scan driver 120 and the second scan driver 130 is connected to the IC chip 110 using a connection wiring 342. The peripheral region 24 may be referred to as a frame region. The connection wiring 341 may be referred to alone as the connection wiring 341, and the bundle of a plurality of connection wirings 341 may be referred to as the connection wiring 341. Similar to the connection wiring 341, the connection wiring 342 may be referred to alone as the connection wiring 342, and the bundle of the plurality of connection wirings 342 may be referred to as the connection wiring 342.

The terminal section 150 and the FPC 160 electrically connected to the terminal section 150 are provided in the terminal region 26. The terminal region 26 is a region opposite the region where the display region 22 is provided in the peripheral region 24 in the first direction D1.

The FPC 160 is connected to an external device (not shown) on the outer side of the display device 10. Therefore, the display device 10 is connected to the external device via the FPC 160 and the terminal section 150 connected to the FPC. A control signal and a voltage are transmitted from the external device to the display device 10 via the FPC 160 and the terminal section 150 connected to the FPC. The display device 10 drives each pixel 180 provided in the display device 10 using the control signal and a voltage received from the external device. As a result, the display device 10 can display an image in the display region 22.

The IC chip 110 supplies signals, voltages, and the like for driving each pixel 180 to the first scan driver 120, the second scan driver 130, and each pixel 180 (a pixel circuit 181) via the FPC 160, the terminal section 150, and the connection wiring 341.

In the present specification and the drawings, each of the IC chip 110, the first scan driver 120, the second scan driver 130, and the IC chip 110 may be referred to alone as the control circuit, and a group of circuits including a part or all of the IC chip 110, the first scan driver 120, the second scan driver 130, and the IC chip 110 may be referred to as the control circuit.

[1-2. Configuration of IC Chip 110]

An overview of the IC chip 110 will be described with reference to FIG. 1. The IC chip 110 is provided at a position adjacent to the display region 22 in the first direction D1. Image data signal lines 321, 322, and 323 extend from the IC chip 110 in the first direction D1 and are connected to the plurality of pixels 180 arranged in the first direction D1.

For example, the IC chip 110 includes a plurality of selection circuits (not shown). For example, each of the plurality of selection circuits is a switch controlled based on an ON signal and an OFF signal supplied to a selection signal. The selection circuit is selected by the ON signal provided to the selection signal and provides an image data signal SL(m) including a data signal VDATA to the image data signal line 321 and the pixel 180 electrically connected to the image data signal line 321. The selection signal and the image data signal SL(m) are transmitted from the external device to the IC chip 110 via the FPC 160 and the terminal section 150 connected to the FPC.

For example, the ON signal is a signal including a voltage that conducts the selection circuit (switch), and the OFF signal is a signal including a voltage that cuts off the selection circuit (switch). In the present invention, the ON signal may be a high-level voltage (potential) (high, High, HI), the OFF signal may be a low-level voltage (potential) (low, Low, LO), the ON signal may be a low-level voltage (potential) (low, Low, LO), and the OFF signal may be a high-level voltage (potential) (high, High, HI). The high-level voltage is greater (higher) than the low-level voltage. For example, in the display device according to the embodiment of the present specification, the ON signal is the high-level voltage, and the OFF signal is the low-level voltage.

[1-3. Configuration of First Scan Driver 120]

An overview of the first scan driver 120 will be described with reference to FIG. 1. The first scan driver 120 is provided at a position adjacent to the display region 22 in the second direction D2. First scan signal lines 330, 331, and 332 extend from the first scan driver 120 in the second direction D2 and are connected to the plurality of pixels 180 arranged in the second direction D2. For example, the first scan driver 120 is a so-called gate driver.

The first scan driver 120 includes a plurality of shift registers (e.g., shift registers 111, 112, and 113). For example, based on the control signal such as a clock signal and a start pulse supplied from the IC chip 110, the shift registers 111, 112, and 113 have the role of sequentially supplying a first scan signal having different timings (e.g., a first scan signal SC1(*n*), a first scan signal SC1(*n*+1), a first scan signal SC1(*n*+2), etc.) to each of the first scan signal lines 330, 331, and 332, and driving the pixel 180 (the pixel circuit 181) which is electrically connected to each of the first scan signal lines. The first scan signal SC1(*n*) may be referred to as a first control signal. For example, the first scan signal and the first scan signal line are so-called scan signals and scan signal lines.

For example, the shift register 111 is electrically connected to the shift register 112 and the shift register 112 is electrically connected to the shift register 113. The shift register 111 is electrically connected to the first scan signal line 330 and supplies, for example, the first scan signal SC1(*n*) to the first scan signal line 330. Similar to the shift register 111, the shift register 112 is electrically connected to the first scan signal line 331 and provides, for example, the first scan signal SC1(*n*+1) to the first scan signal line 331, the shift register 113 is electrically connected to the first scan signal line 332, and provides, for example, the first scan signal SC1(*n*+2) to the first scan signal line 332. The first scan signal SC1(*n*+1) includes a pulse width equivalent to the first scan signal SC1(*n*), and is a signal in which the first scan signal SC1(*n*) is shifted. Similar to the first scan signal SC1(*n*+1), the first scan signal SC1(*n*+2) includes the pulse width equivalent to the first scan signal SC1(*n*+1), and is a signal in which the first scan signal SC1(*n*+1) is shifted.

[1-4. Configuration of Second Scan Driver 130]

An overview of the second scan driver 130 will be described with reference to FIG. 1. The second scan driver 130 is provided adjacent to the display region 22 in the second direction D2 and opposite to a position where the first scan driver 120 is arranged with respect to the display region 22. Second scan signal lines 334, 335, and 336 extend from the second scan driver 130 in the second direction D2 and are connected to the plurality of pixels 180 (pixel circuit 181) arranged in the second direction D2.

Similar to the first scan driver 120, the second scan driver 130 includes a plurality of shift registers (e.g., shift registers 161, 162, and 163). For example, based on the clock signal and the control signal such as the start pulse supplied from the IC chip 110, the shift registers 161, 162, and 163 have the role of sequentially supplying a second scan signal having different timings (e.g., a second scan signal SC2(*n*), a second scan signal SC2(*n*+1), a second scan signal SC2 (*n*+2), etc.) to each of the second scan signal lines 334, 335, and 336, and driving the pixel 180 (the pixel circuit 181) which is electrically connected to each of the second scan signal lines. The second scan signal SC2(*n*) may be referred to as a second control signal.

For example, the shift register 161 is electrically connected to the shift register 162 and the shift register 162 is electrically connected to the shift register 163. The shift register 161 is electrically connected to the second scan signal line 334 and provides, for example, the second scan signal SC2(*n*) to the second scan signal line 334. Similar to the shift register 161, the shift register 162 is electrically connected to the second scan signal line 335 and provides, for example, the second scan signal SC2(*n*+1) to the second scan signal line 335, the shift register 163 is electrically connected to the second scan signal line 336, and provides, for example, the second scan signal SC2(*n*+2) to the second scan signal line 336. The pulse width of the second scan signal SC2(*n*+1) is the same as that of the second scan signal SC2(*n*), and the second scan signal SC2(*n*+1) is a signal in which the second scan signal SC2(*n*) is shifted. Similarly, the pulse width of the second scan signal SC2(*n*+2) is the same as that of the second scan signal SC2(*n*+1), and the second scan signal SC2(*n*+2) is a signal in which the second scan signal SC2(*n*+2) is shifted.

[1-5. Configuration of Pixel 180]

Figure 2:
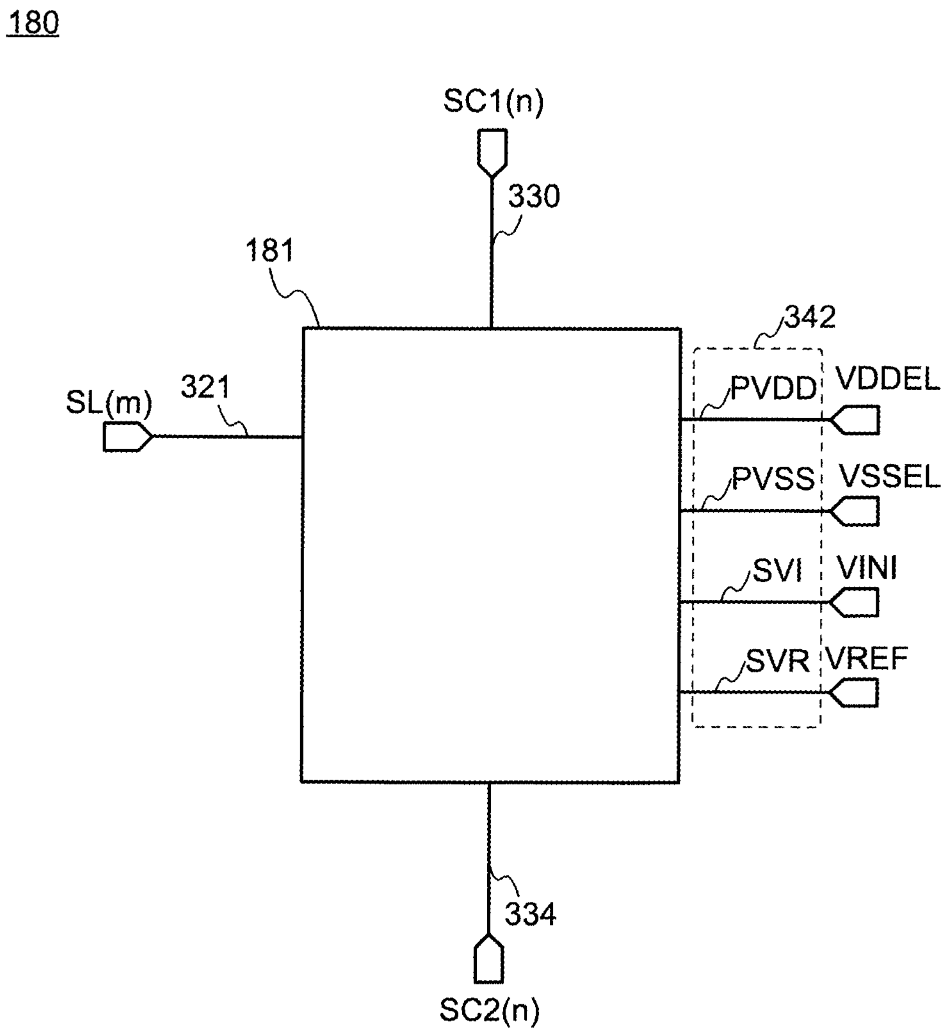
FIG. 2 is a schematic diagram showing an input signal to a pixel circuit according to the first embodiment of the present invention.
Figure 3:
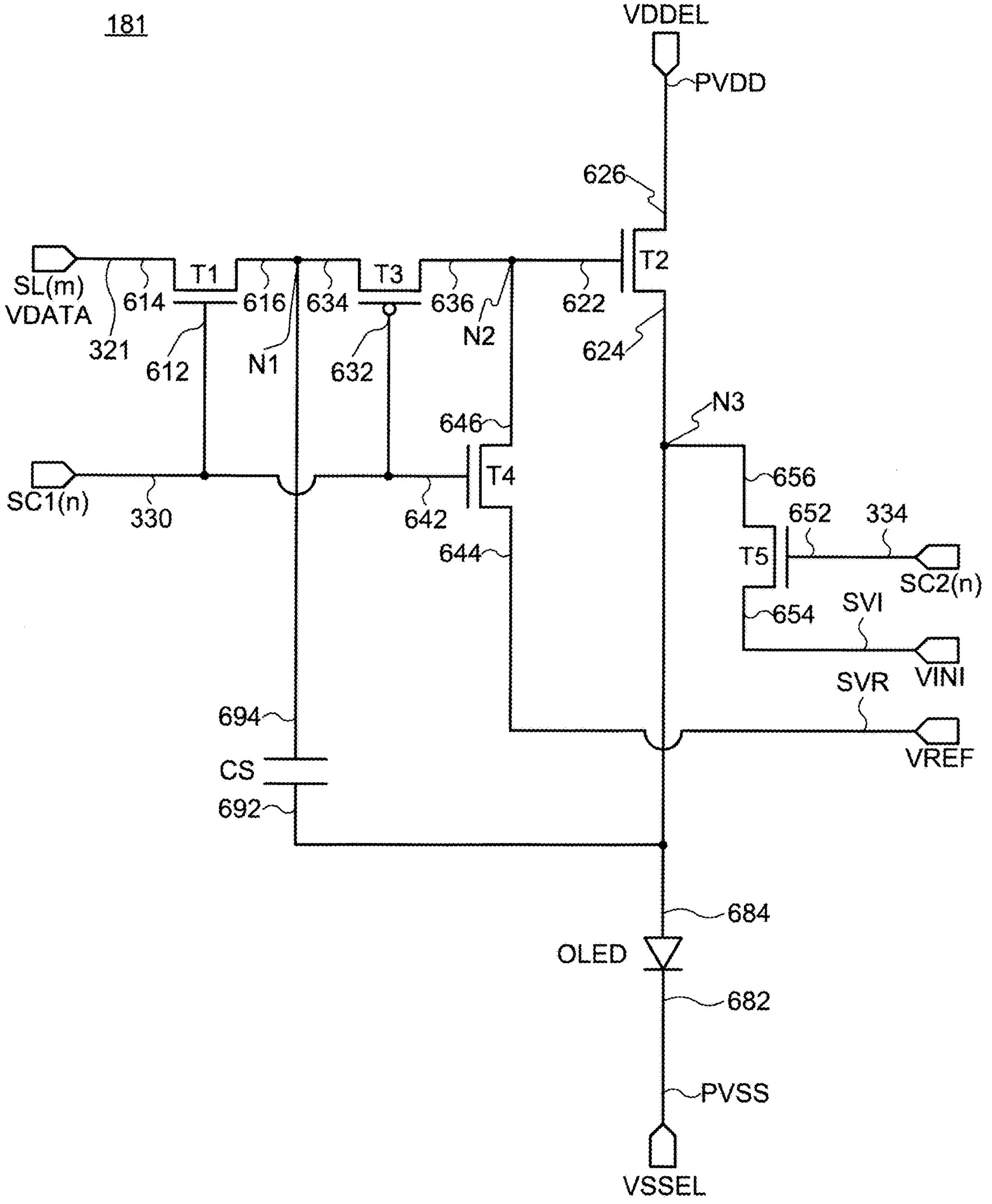
FIG. 3 is a circuit diagram showing a configuration of a pixel circuit according to the first embodiment of the present invention.

An overview of the pixel 180 and the pixel circuit 181 will be described with reference to FIG. 1 to FIG. 3. FIG. 2 is a schematic diagram showing an input signal to the pixel circuit 181 included in the pixel 180. FIG. 3 is a circuit diagram showing a configuration of the pixel circuit 181. As an example, FIG. 2 and FIG. 3 show the configuration of the pixel circuit 181 of the pixel 180 shown in FIG. 1. The configuration of the pixel 180 and the pixel circuit 181 is not limited to the configuration shown in FIG. 1 to FIG. 3. Configurations that are the same as or similar to those in FIG. 1 will be described as necessary.

The pixel circuit 181 is a circuit for driving the pixel 180. The pixel circuits of the sub-pixel R, the sub-pixel G, and the sub-pixel B included in the pixel 180 are similar to those of the pixel circuit 181, but the colors emitted by a light-emitting element OLED are different. In the following description, the light-emitting element OLED emitting red light will be described as an example.

As shown in FIG. 2, the first scan signal SC1(*n*), the image data signal SL(m), the second scan signal SC2(*n*), a reference voltage VREF, and an initialization voltage VINI are supplied to the pixel circuit 181. In addition, a drive voltage VDDEL and a reference voltage VSSEL are supplied to the pixel circuit 181 as a power supply for driving the pixel 180. For example, the reference voltage VREF, the initialization voltage VINI, the drive voltage VDDEL, and the reference voltage VSSEL may be constant voltages, and may be variable voltages that fluctuate depending on the timing of each signal.

The reference voltage VREF is supplied to a reference voltage power line SVR, the initialization voltage VINI is supplied to an initialization voltage power line SVI, the drive voltage VDDEL is supplied to a drive power line PVDD, and the reference voltage VSSEL is supplied to a reference voltage line PVSS. For example, each of the reference voltage power line SVR, the initialization voltage power line SVI, the drive power line PVDD, and the reference voltage line PVSS is electrically connected to the different connection wirings 342. In addition, for example, the reference voltage power line SVR, the initialization voltage power line SVI, the drive power line PVDD, and the reference voltage line PVSS may each be different connection wirings 342.

For example, the reference voltage VREF, the initialization voltage VINI, the drive voltage VDDEL, and the reference voltage VSSEL are supplied from the external device to the IC chip 110 via the FPC 160, the terminal section 150, and the connection wiring 341. In addition, for example, the reference voltage VREF, the initialization voltage VINI, the drive voltage VDDEL, and the reference voltage VSSEL are supplied from the IC chip 110 to the plurality of pixels 180 (pixel circuits 181) via the connection wiring 342, the reference voltage power line SVR, the initialization voltage power line SVI, the drive power line PVDD, and the reference voltage line PVSS. Although not shown, the reference voltage VREF, the initialization voltage VINI, the drive voltage VDDEL, and the reference voltage VSSEL may be connected from the external device to the reference voltage power line SVR, the initialization voltage power line SVI, the drive power line PVDD, and the reference voltage line PVSS via the FPC 160, the terminal section 150, and the connection wiring 341, and not via the IC chip 110 and the connection wiring 342, and may be supplied to the plurality of pixels 180 (the pixel circuit 181). For example, the reference voltage VREF, the initialization voltage VINI, and the reference voltage VSSEL are smaller than the drive voltage VDDEL.

As shown in FIG. 3, the pixel circuit 181 includes a first transistor T1, a second transistor T2, a third transistor T3, a fourth transistor T4, a fifth transistor T5, a capacitive element CS, and the light-emitting element OLED. Each of these transistors includes a gate electrode and a pair of electrodes (a source electrode and a drain electrode) consisting of a first electrode and a second electrode. Each of the capacitive element CS and the light-emitting element OLED has a pair of electrodes consisting of the first electrode and the second electrode.

For example, the first transistor T1 is a select transistor. The first transistor T1 has a function of supplying the image data signal SL(m) to a first node N1.

For example, the second transistor T2 is a drive transistor. A threshold voltage VTH of the second transistor T2 is corrected based on the reference voltage VREF and the initialization voltage VINI. In addition, the second transistor T2 controls connection and disconnection between the drive power line PVDD and the light-emitting element OLED based on the corrected threshold voltage VTH and the input image data signal SL(m). That is, the second transistor T2 has a function of causing the light-emitting element OLED to emit light by supplying the drive voltage VDDEL to the light-emitting element OLED and supplying a current.

The third transistor T3 has a function of conducting the first node N1 and the second node N2 to supply the image data signal SL(m) to the second node N2.

The fourth transistor T4 has a function of conducting the second node N2 and the reference voltage power line SVR to supply the reference voltage VREF to the second node N2 and initializing the second node N2.

The fifth transistor T5 has a function of conducting the third node N3 and the initialization voltage power line SVI to supply the initialization voltage VINI to the third node N3 and initializing the third node N3.

For example, the capacitive element CS has a function of holding a charge (for example, a first charge) equivalent to the initialization voltage VINI supplied to the third node N3, and a function of holding a charge (for example, a second charge) equivalent to a data voltage (for example, a voltage equal to or higher than a voltage VSIGL (see FIG. 6) and equal to or lower than a voltage VSIGH (see FIG. 6)) included in the image data signal SL(m) supplied to the first node N1.

The light-emitting element OLED has diode characteristics and has a function of emitting light based on a current flowing through the light-emitting element OLED (that is, a drain current Ion of the second transistor T2).

The first transistor T1 includes a gate electrode 612, a first electrode 614, and a second electrode 616. The gate electrode 612 is electrically connected to the first scan signal line 330. The first electrode 614 is electrically connected to the image data signal line 321. The second electrode 616 is electrically connected to the first node N1, a first electrode 634 of the third transistor T3, and a second electrode 694 of the capacitive element CS. The first scan signal SC1(*n*) is supplied to the first scan signal line 330. The switching of the first transistor T1 is controlled using the first scan signal SC1(*n*). In other words, the first transistor T1 is controlled to be in a conductive state (ON state) or a non-conductive state (OFF state) by the first scan signal SC1(*n*). When the signal supplied to the first scan signal SC1(*n*) is LO, the first transistor T1 is in the non-conductive state. When the signal supplied to the first scan signal SC1(*n*+1) is HI, the first transistor T1 is in the conductive state.

The first scan signal line 330 is electrically connected to the gate electrode 612 of the first transistor T1, a gate electrode 632 of the third transistor T3, and a gate electrode 642 of the fourth transistor T4.

The second transistor T2 includes a gate electrode 622, a first electrode 624, and a second electrode 626. The gate electrode 622 is electrically connected to a second electrode 636 of the third transistor T3 and a second electrode 646 of the fourth transistor T4. The first electrode 624 is electrically connected to the third node N3, a second electrode 656 of the fifth transistor T5, a first electrode 692 of the capacitive element CS, and a second electrode 684 of the light-emitting element OLED. The second electrode 626 is electrically connected to the drive power line PVDD. The drive voltage VDDEL is supplied to the drive power line PVDD. The threshold voltage of the second transistor T2 is the threshold voltage VTH. The conductive state (ON state) and the non-conductive state (OFF state) of the second transistor T2 are controlled according to the potential difference between the voltage supplied to the second node N2 and the voltage of the first electrode 624, the potential difference between the second electrode 626 and the first electrode 624, and the threshold voltage VTH. For example, when the potential difference between the voltage supplied to the second node N2 and the voltage of the first electrode 624 is smaller than the threshold voltage VTH and the potential difference between the second electrode 626 and the first electrode 624 is equal to or smaller than 0 V, the second transistor T2 is in the non-conductive state. For example, when the potential difference between the voltage supplied to the second node N2 and the voltage of the first electrode 624 is equal to or greater than the threshold voltage VTH and the potential difference between the second electrode 626 and the first electrode 624 is greater than 0 V, the second transistor T2 is in the conductive state.

The third transistor T3 includes the gate electrode 632, the first electrode 634, and the second electrode 636. The switching of the third transistor T3 is controlled using the first scan signal SC1(*n*). The conductive state (ON state) and the non-conductive state (OFF state) of the third transistor T3 are controlled by the first scan signal SC1(*n*). When the signal supplied to the first scan signal SC1(*n*) is LO, the third transistor T3 is in the conductive state. When the signal supplied to the first scan signal SC1(*n*) is HI, the third transistor T3 is in the non-conductive state.

The fourth transistor T4 includes the gate electrode 642, a first electrode 644, and the second electrode 646. The first electrode 644 is electrically connected to the reference voltage power line SVR. The reference voltage VREF is supplied to the reference voltage power line SVR. The switching of the fourth transistor T4 is controlled using the first scan signal line 330. In other words, the fourth transistor T4 is controlled to be in the conductive state (ON state) or the non-conductive state (OFF state) by the first scan signal line 330. When the signal supplied to the first scan signal line 330 is LO, the fourth transistor T4 is in the non-conductive state, and when the signal supplied to the first scan signal line 330 is HI, the fourth transistor T4 is in the conductive state.

The fifth transistor T5 includes a gate electrode 652, a first electrode 654, and the second electrode 656. The gate electrode 652 is electrically connected to the second scan signal line 334. The first electrode 654 is electrically connected to the initialization voltage power line SVI. The initialization voltage VINI is supplied to the initialization voltage power line SVI. The second scan signal SC2(*n*) is supplied to the second scan signal line 334. The switching of the fifth transistor T5 is controlled using the second scan signal SC2(*n*). In other words, the conductive state (ON state) and the non-conductive state (OFF state) of the fifth transistor T5 are controlled by the second scan signal SC2(*n*). When the signal supplied to the second scan signal SC2(*n*) is LO, the fifth transistor T5 is in the non-conductive state, and when the signal supplied to the second scan signal SC2(*n*) is HI, the fifth transistor T5 is in the conductive state.

A first electrode 682 of the light-emitting element OLED is electrically connected to the reference voltage line PVSS. As described above, the reference voltage VSSEL is supplied to the reference voltage line PVSS. For example, the first electrode 682 of the light-emitting element OLED is a cathode electrode, and the second electrode 684 of the light-emitting element OLED is an anode electrode.

For example, it is assumed that the conductive state of the transistor in the display device 10 indicates a state in which the source electrode and the drain electrode of the transistor are conductive and the transistor is in the ON state (ON), and the non-conductive state of the transistor in the display device 10 indicates a state in which the source electrode and the drain electrode of the transistor are non-conductive and the transistor is in the OFF state (OFF). Furthermore, in each transistor, the source electrode and the drain electrode may be swapped depending on a voltage or a potential supplied to each electrode. In addition, those skilled in the art will readily appreciate that even when the transistor is in the OFF state, a slight current flows, such as a leakage current.

The transistors shown in FIG. 3 can have Group 14 elements, such as silicon or germanium, or an oxide exhibiting semiconductor properties in a channel region. For example, a metal oxide with semiconductor properties can be used as the oxide exhibiting semiconductor properties. For example, an oxide semiconductor containing two or more metals including indium (In) is used as the metal oxide with semiconductor properties. Furthermore, in addition to indium, gallium (Ga), zinc (Zn), aluminum (Al), hafnium (Hf), yttrium (Y), zirconia (Zr), and lanthanoids may be used as the metal oxide with semiconductor properties. In addition, the metal oxide with semiconductor properties may be amorphous, crystalline, or a mixed phase of amorphous and crystalline. Furthermore, in the case where the display device 10 includes both a transistor containing the Group 14 element in the channel region and a transistor containing the oxide exhibiting semiconductor properties in the channel region, a method for manufacturing the display device 10 includes forming a semiconductor layer containing the Group 14 element and forming a semiconductor layer containing the oxide exhibiting semiconductor properties.

For example, the leakage current of a transistor including the metal oxide with semiconductor properties is extremely small. Therefore, using the transistor having the metal oxide with semiconductor properties, it is difficult for the charge equivalent to the voltage (potential) written in the capacitive element to escape from the capacitive element. As a result, by using the transistor having the metal oxide with semiconductor properties, the charge written in the capacitive element can be held for a long time. In addition, under the same gate-source voltage conditions (the potential difference between the gate electrode and the source electrode (Vgs) and the source-drain voltage (e.g., the potential difference between the source electrode and the drain electrode (Vds)), the drain current of the transistor having the metal oxide with semiconductor properties may be greater than the drain current of the transistor having a low-temperature polysilicon (LTPS). As a result, under the same drain current conditions, the gate-source voltage and the source-drain voltage of the transistor having the metal oxide with semiconductor properties can be made smaller than those of the transistor having the LTPS. Therefore, the power consumption of the display device 10 can be suppressed by using the transistor having the metal oxide with semiconductor properties.

For example, the channel region of the first transistor T1 or the channel region of the fourth transistor T4 may be formed using the metal oxide with semiconductor properties. In addition, the channel region of the second transistor T2 or the channel region of the fifth transistor T5 may be formed using the metal oxide with semiconductor properties. For example, when the channel region of the first transistor T1 is formed using the metal oxide, it is difficult to discharge the charge (e.g., the second charge) equivalent to the voltage included in the data signal VDATA held in the first node N1 and the second electrode 694 of the capacitive element CS, and the first node N1 and the second electrode 694 of the capacitive element CS can hold the charge for a long time.

For example, the channel region of each transistor may contain crystalline silicon. For example, the crystalline silicon may be the low-temperature polysilicon (LTPS) or single-crystal silicon. For example, each transistor in the display device 10 is formed using a thin film transistor (TFT). In addition, the channel region of each transistor may be formed using a silicon wafer or single-crystal silicon such as an SOI substrate. Each transistor may have either an n-channel field effect transistor or a p-channel field effect transistor. In the display device 10, the configuration of the transistor, the connection of the storage capacitor, power supply voltage, and the like may be appropriately adapted according to the application and specifications.

In the first embodiment, the first transistor T1, the second transistor T2, the fourth transistor T4, and the fifth transistor T5 are the n-channel field effect transistors, and the third transistor T3 is the p-channel field effect transistor.

[1-6. Driving Method for Display Device 10]

A driving method for the display device 10 will be described with reference to FIG. 4 to FIG. 8. FIG. 4 to FIG. 8 are schematic diagrams showing timing charts of the display device 10. The driving method shown in FIG. 4 to FIG. 8 are examples, and the driving method for the display device 10 is not limited to the driving method shown in FIG. 4 to FIG. 8. Configurations that are the same as or similar to those in FIG. 1 to FIG. 3 will be described as necessary. In addition, the horizontal axis of the timing charts represents time (TIME).

For example, the frequency at which the display device 10 is driven is 60 Hz, and one frame (Hereinafter, it is referred to as "1FRAME".) is driven at 60 Hz. For example, FIG. 4 shows the current frame (KthFRAME), a portion of the previous frame of the current frame (K−1stFRAME), and a portion of the subsequent frame of the current frame (K+1stFRAME).

Figure 4:
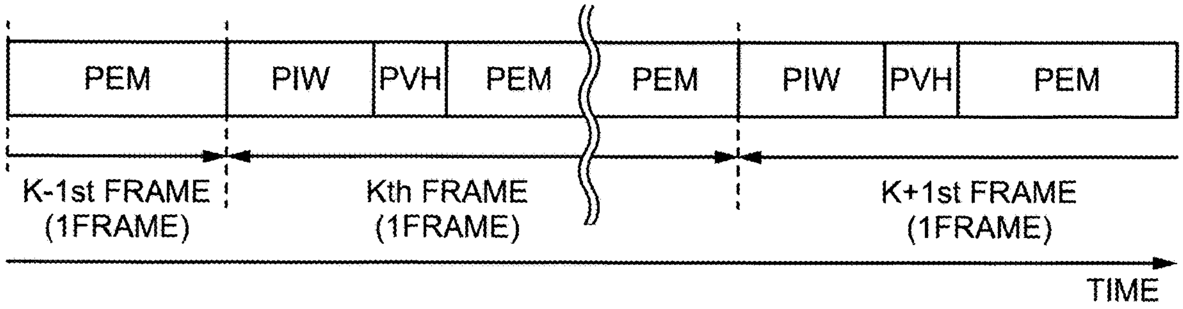
FIG. 4 is a timing chart of a self-luminous display device according to the first embodiment of the present invention.

As shown in FIG. 4, the driving method for the display device 10 includes at least an initialization period and a writing period PIW (period PIW) and a threshold acquisition and holding period PVH (period PVH) in one frame. In the pixel 180 (the pixel circuit 181) included in the display device 10, the period PVH is executed after the period PIW. In addition, after a light emission period PEM of the previous frame of the current frame, the period PIW and the period PVH of the current frame are executed, and after the light emission period PEM of the current frame, the period PIW and the period PVH of the subsequent frame of the current frame are executed.

The period PIW is a period during which the data signal VDATA is written to the pixel 180, and is a period during which the second node N2 and the third node N3 of the pixel 180 are initialized. In addition, the period PVH is a period during which the threshold voltage of the second transistor T2 is obtained by performing an operation to make the potential difference Vgs of the second transistor T2 the same as the threshold voltage, and a charge equivalent to the threshold voltage is held in the second node N2 (the gate electrode 622 of the second transistor T2). Further, the light emission period PEM is a period during which the pixel 180 emits light based on the written (supplied) data signal VDATA and the obtained threshold voltage of the second transistor T2 (threshold voltage correction).

FIG. 5 to FIG. 8 are diagrams for explaining the period PIW and the period PVH of the driving method for the pixel 180 of the display device 10. FIG. 5 to FIG. 8 show the light emission period PEM of the previous frame (K−1stFRAME) of the current frame, the period PIW and the period PVH of the current frame (KthFRAME). In addition, FIG. 5 to FIG. 8 show one horizontal period (a horizontal period HRP) for one pixel 180.

The one horizontal period in the driving method for the display device 10 includes the period PIW and the period PVH. The first scan signal SC1(*n*), the second scan signal SC2(*n*), the image data signal SL(m) including the data signal VDATA, the initialization voltage VINI, and the reference voltage VREF are input to the pixel 180 during the one horizontal period. For example, the first scan signal SC1(*n*) and the second scan signal SC2(*n*) are shifted, and the pixel 180 corresponding to the shifted signal is selected. The image data signal SL(m), the initialization voltage VINI, and the reference voltage VREF are input to the selected pixel 180. A similar operation is performed for all the pixels 180, and an image of the frame corresponding to 1FRAME is displayed in the display region 22 of the display device 10 based on the image data signal SL(m) input to all the pixels 180.

For example, the voltages (potentials) supplied to each signal and each node of each period of each frame in the timing charts shown in FIG. 4 to FIG. 8 are shown in Table 1 and Table 2.

TABLE 1

| | PIW | PVH | PEM |
|---|---|---|---|
| SC1(n) | HI | HI | LO |
| SC2(n) | HI | LO | LO |
| SL(m) | −0.5 [V](Black) ~3.5 [V](White) | — | — |
| N1 | −0.5 [V](Black) ~3.5 [V](White) | −0.5 [V] ~3.5 [V] | Rise in conjunction with the rise of potential of N3 |
| N2 | 0 [V] | 0 [V] | In conjunction with potential of N1 |
| N3 | −1.5 [V] | −1 [V] (=VREF-VTH) | Rise in conjunction with Ion with VGS |
| Vgs (=V(N2)-V(N3)) | 1.5 [V] | 1 [V] | |
| Remarks | Initialize T2 and OLED Apply VDATA to CS | Acquiring and retaining VTH Potential of N3 = VREF-VTH Potential of N1-Potential of N3 = VDATA-(VREF-VTH) Non-light emitting below VTHEL | Light emitting VGS = VDATA-(VREF-VTH) |

TABLE 1-continued

TABLE 2

| | Setting value [V] |
|---|---|
| VTH | 1 |
| VTHEL | 0.7 |
| VSIGL(Black) | −0.5 |
| VSIGH(White) | 3.5 |
| HI | 10 |
| LO | −3.5 |
| VINI | −1.5 |
| VREF | 0 |
| VDDEL | 8 |
| VSSEL | 0 |

[1-6-1. First Example of Driving Method for Display Device 10]

Figure 5:
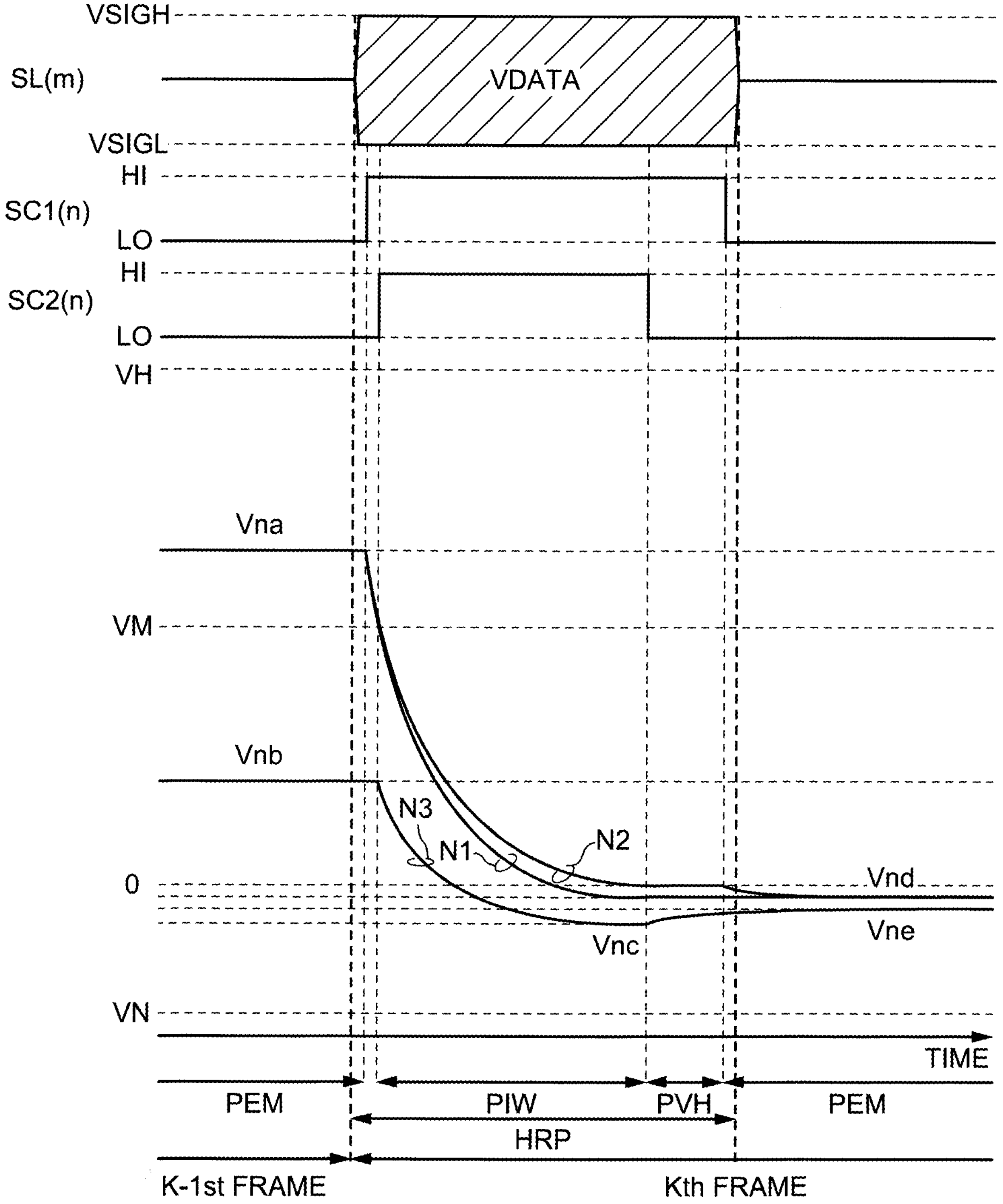
FIG. 5 is a timing chart of a self-luminous display device according to the first embodiment of the present invention.

A first example of the driving method for the display device 10 will be described with reference to FIG. 5. The driving method shown in the first example includes the pixel 180 displaying a white image based on the voltage VSIGH included in the data signal VDATA in the previous frame (K−1stFRAME) of the current frame (KthFRAME), and then the pixel 180 (the pixel circuit 181) displaying a black image based on the voltage VSIGL included in the data signal VDATA in the KthFRAME. In other words, the driving method shown in the first example includes displaying images of different colors in consecutive frames.

The image data signal SL(m) including the data signal VDATA is input to each pixel 180 according to each horizontal period. The data signal VDATA is analog data including a voltage equal to or higher than the voltage VSIGL and equal to or lower than the voltage VSIGH. For example, in each horizontal period, the voltage equal to or higher than the voltage VSIGL and equal to or lower than the voltage VSIGH is selected using the selection signal (not shown), and is supplied to the image data signal SL(m). For example, in a period during which data is not selected using the selection signal, the data signal VDATA is maintained at a voltage equal to or higher than the voltage VSIGL and equal to or lower than the voltage VSIGH. As shown in Table 2, for example, the voltage VSIGL is −0.5 V, and the pixel 180 to which the voltage VSIGL is supplied does not emit light and becomes black. In addition, for example, the voltage VSIGH is 3.5 V, and the pixel 180 to which the voltage VSIGH is supplied emits light and emits various colors. Furthermore, in FIG. 5, for example, a voltage VH is 10 V, a voltage VM is 5 V, and a voltage VN is −5 V.

The light emission period PEM of the K−1stFRAME is a period during which the pixel 180 emits light according to the potential difference Vgs (voltage V (N2)−voltage V (N3)=voltage Vna−voltage Vnb) of the second transistor T2. For example, the pixel 180 (the pixel circuit 181) emits red light, and white light is emitted by three pixels using the pixel 180 emitting red light, the pixel 180 emitting blue light, and the pixel 180 emitting green light.

For example, in the light emission period PEM of the K−1stFRAME, data is not selected using the selection signal, the data signal VDATA is maintained at a voltage equal to or higher than the voltage VSIGL and equal to or lower than the voltage VSIGH, and the first scan signal SC1(*n*) and the second scan signal SC2(*n*) are supplied with LO. The first transistor T1, the fourth transistor T4, and the fifth transistor T5 are in the OFF state. In addition, the voltage Vna supplied to the first node N1 and the second node N2 is 7 V, and the voltage Vnb supplied to the third node N3 is 2.5 V. Furthermore, the potential difference Vgs is 4.5 V and the third transistor T3 is in the ON state. Therefore, the second transistor T2 can flow the current Ion based on the potential difference Vgs and the potential difference Vds according to the voltage VSIGH input in the one horizontal period HRP of the K−1stFRAME. In addition, the second transistor T2 is in the ON state, the current Ion flows from the drive power line PVDD to the light-emitting element OLED and the reference voltage line PVSS, and the light-emitting element OLED emits light. As shown in Table 2, for example, LO is −3.5 V and HI is 10 V.

In the first period of the one horizontal period HRP of the KthFRAME following the light emission period PEM of the K−1stFRAME, the image data signal SL (m) including the data signal VDATA including the voltage VSIGL corresponding to non-light-emitting black is input to the pixel 180, and the first scan signal SC1(*n*) changes from a state in which LO is supplied to a state in which HI is supplied. The second scan signal SC2(*n*) is in the state in which LO is supplied. Therefore, the first transistor T1 and the fourth transistor T4 are turned from the OFF state to the ON state, the third transistor T3 is turned from the ON state to the OFF state, and the fifth transistor T5 is maintained in the OFF state. As a result, the voltage supplied to the first node N1 gradually drops from the voltage Vna toward the voltage VSIGL (voltage Vnd), and the voltage supplied to the second node N2 gradually drops from the voltage Vna toward the reference voltage VREF. Furthermore, in response to the drop in the voltage supplied to the second node N2, the second transistor T2 is turned from the ON state to the OFF state. For example, as shown in Table 2, the reference voltage VREF is 0 V and the voltage VSIGL (voltage Vnd) is −0.5 V. In this case, the voltage supplied to the third node N3 is maintained at Vnb.

As described above, the period PIW of the one horizontal period HRP of the KthFRAME is a period during which the data signal VDATA is written to the pixel 180 (the pixel circuit 181) and is a period during which the second node N2 and the third node N3 of the pixel 180 (the pixel circuit 181) are initialized.

In the period PIW, the image data signal SL(m) is maintained in a state in which the data signal VDATA including the voltage VSIGL is supplied, and the first scan signal SC1(*n*) is maintained in the state in which HI is supplied. In addition, the second scan signal SC1(*n*) changes from the state in which LO is supplied to the state in which HI is supplied. Therefore, the fifth transistor T5 is turned from the OFF state to the ON state, the first transistor T1 and the fourth transistor T4 are maintained in the ON state, and the third transistor is maintained in the OFF state.

As a result, the voltage supplied to the first node N1 gradually drops from the voltage Vna toward the voltage VSIGL (voltage Vnd, −0.5 V) and becomes the voltage Vnd (−0.5 V). The voltage supplied to the second node N2 gradually drops from the voltage Vna toward the reference voltage VREF and becomes the reference voltage VREF (0 V). In addition, the voltage supplied to the third node N3 gradually drops from the voltage Vnb toward the initialization voltage VINI (voltage Vnc) and becomes the voltage Vnc. For example, as shown in Table 2, the initialization voltage VINI (voltage Vnc) is −1.5 V. That is, the voltage (0 V) supplied to the second node N2 is greater than the voltage (−0.5 V) supplied to the first node N1, the voltage (−0.5 V) supplied to the first node N1 is greater than the voltage (−1.5 V) supplied to the third node N3, and the potential difference Vgs is 9.5 V (8 V−(−1.5 V)).

As described above, the data signal VDATA including the voltage VSIGL is supplied (written) to the first node N1, the second node N2 is initialized by the reference voltage VREF (0 V), and the third node N3 is initialized by the initialization voltage VINI (−1.5 V). For example, the period during which the second node N2 is initialized is the same as the period during which the data signal VDATA is supplied to the first node, and the period during which the third node N3 is initialized is shorter than the period during which the second node N2 is initialized, unlike the period during which the second node is initialized.

As described above, among the one horizontal period HRP of the KthFRAME, the period PVH following the period PIW is a period during which the operation so that the potential difference Vgs of the second transistor T2 becomes the same as the threshold voltage is performed, the threshold voltage of the second transistor T2 is obtained, and the charge equivalent to the threshold voltage is held in the second node N2 (the gate electrode 622 of the second transistor T2).

In the period PVH, the image data signal SL(m) is maintained in the state in which the data signal VDATA including the voltage VSIGL is supplied, and the first scan signal SC1(*n*) is maintained in the state in which HI is supplied. In addition, the second scan signal SC1(*n*) changes from the state in which HI is supplied to the state in which LO is supplied. Therefore, the fifth transistor T5 is turned from the ON state to the OFF state, the first transistor T1 and the fourth transistor T4 are maintained in the ON state, and the third transistor is maintained in the OFF state.

Immediately after the start of the period PVH, the potential difference Vgs is 1.5 V, the potential difference Vds is 9.5 V, and the potential difference Vgs and the potential difference Vds are greater than the threshold voltage VTH (1 V), so that the second transistor T2 is in the ON state. Therefore, the drain current Ion flows from the second electrode 626 of the second transistor T2 to the first electrode 624.

When the potential difference Vgs becomes the threshold voltage VTH, the second transistor T2 is turned from the ON state to the OFF state, and the drain current Ion does not flow. In this case, the voltage supplied to the third node N3 increases from the voltage Vnc to the voltage Vne, and the potential difference Vgs is the reference voltage VREF−the voltage Vne. That is, the reference voltage VREF (0 V)−the voltage Vne is the threshold voltage VTH (1 V), and the voltage Vne is −1 V.

As described above, in the period PVH, the threshold voltage VTH of the second transistor T2 is obtained by an operation in which the potential difference Vgs becomes the same as the threshold voltage VTH. In addition, the charge equivalent to the threshold voltage VTH is held in the second node N2 (the gate electrode 622 of the second transistor T2).

The light emission period PEM of the KthFRAME following the one horizontal period HRP of the KthFRAME is the period during which the pixel 180 emits light based on the voltage VSIGL supplied to the first node N1 and the potential difference Vsg between the voltage supplied to the second node N2 and the voltage supplied to the third node.

For example, in the light emission period PEM of the KthFRAME, data is not selected using the selection signal, and the data signal VDATA is maintained at a voltage equal to or higher than the voltage VSIGL and equal to or lower than the voltage VSIGH. In addition, the first scan signal SC1(*n*) changes from the state in which HI is supplied to the state in which LO is supplied, and the second scan signal SC2(*n*) is maintained in the state in which LO is supplied.

Therefore, the first transistor T1 and the fourth transistor T4 are turned from the ON state to the OFF state, and the third transistor T3 is turned from the OFF state to the ON state. In addition, the fifth transistor T5 is maintained in the OFF state. When the third transistor T3 is turned on, the first node N1 and the second node N2 are conductive, and the potential difference Vgs becomes the voltage VSIGL (−0.5 V−(reference voltage VREF (0 V)−threshold voltage VTH (1 V))=voltage Vnd (−0.5 V)−voltage Vne (−1 V). That is, the potential difference Vgs is 0.5 V, which is smaller than the threshold voltage VTH. Therefore, since the second transistor T2 is in the OFF state and no current flows from the drive power line PVDD to the reference voltage line PVSS, the light-emitting element OLED does not emit light. As a result, for example, the pixel 180 (the pixel circuit 181) emitting red light becomes black. In addition, similar to the pixel 180 emitting red light, the pixel 180 emitting blue light and the pixel 180 emitting green light do not emit light, so that the three pixels using the pixel 180 emitting red, the pixel 180 emitting blue, and the pixel 180 emitting green become black.

The display device 10 includes the first node N1 to which the data signal VDATA equal to or higher than the voltage VSIGL and equal to or lower than the voltage VSIGH is supplied (written), the second node N2 (the gate electrode 622 of the second transistor T2) to which the reference voltage VREF is supplied, and the third node N3 (the first electrode 624 of the second transistor T2) to which the initialization voltage VINI is supplied. That is, the display device 10 independently controls the first node N1 to which data is written, and the second node N2 and the third node N3 which contribute to the initialization of the second transistor T2 to flow a current to the light-emitting device OLED. As a result, as described in the driving method for the display device 10, the driving method for the display device 10 may include that the process (driving) executed in the writing period and the process (driving) executed in the initialization period are executed at the same timing. In other words, the driving method for the display device 10 does not need to execute the process (driving) executed in the writing period after the process (driving) executed in the initialization period.

For example, the display device including the pixel circuit in which the first node N1 is the same as the second node N2 (in which the third transistor T3 is not present) includes the writing period and the initialization period separately because the process (driving) executed in the writing period and the process (driving) executed in the initialization period cannot be executed at the same timing. Therefore, in the display device including the pixel circuit in which the first node N1 is the same as the second node N2 (in which the third transistor T3 is not present), the time required for the one horizontal period becomes longer.

On the other hand, as described above, the display device 10 includes the configuration in which the first node N1, the second node N2, and the third node N3 are independently controlled, and the process (driving) executed in the writing period and the process (driving) executed in the initialization period can be executed at the same timing.

As a result, the display device 10 can reduce the time required for one horizontal period. In addition, by reducing the time required for one horizontal period, the display device 10 can reduce the power consumption equivalent to the shortened time. Therefore, the display device 10 is a display device that can reduce power consumption.

In addition, by reducing the time required for the one horizontal period, the display device 10 can increase the number of pixels that can be written during the reduced time. Therefore, the display device 10 is a display device that can achieve high definition.

[1-6-2. Second Example of Driving Method for Display Device 10]

Figure 6:
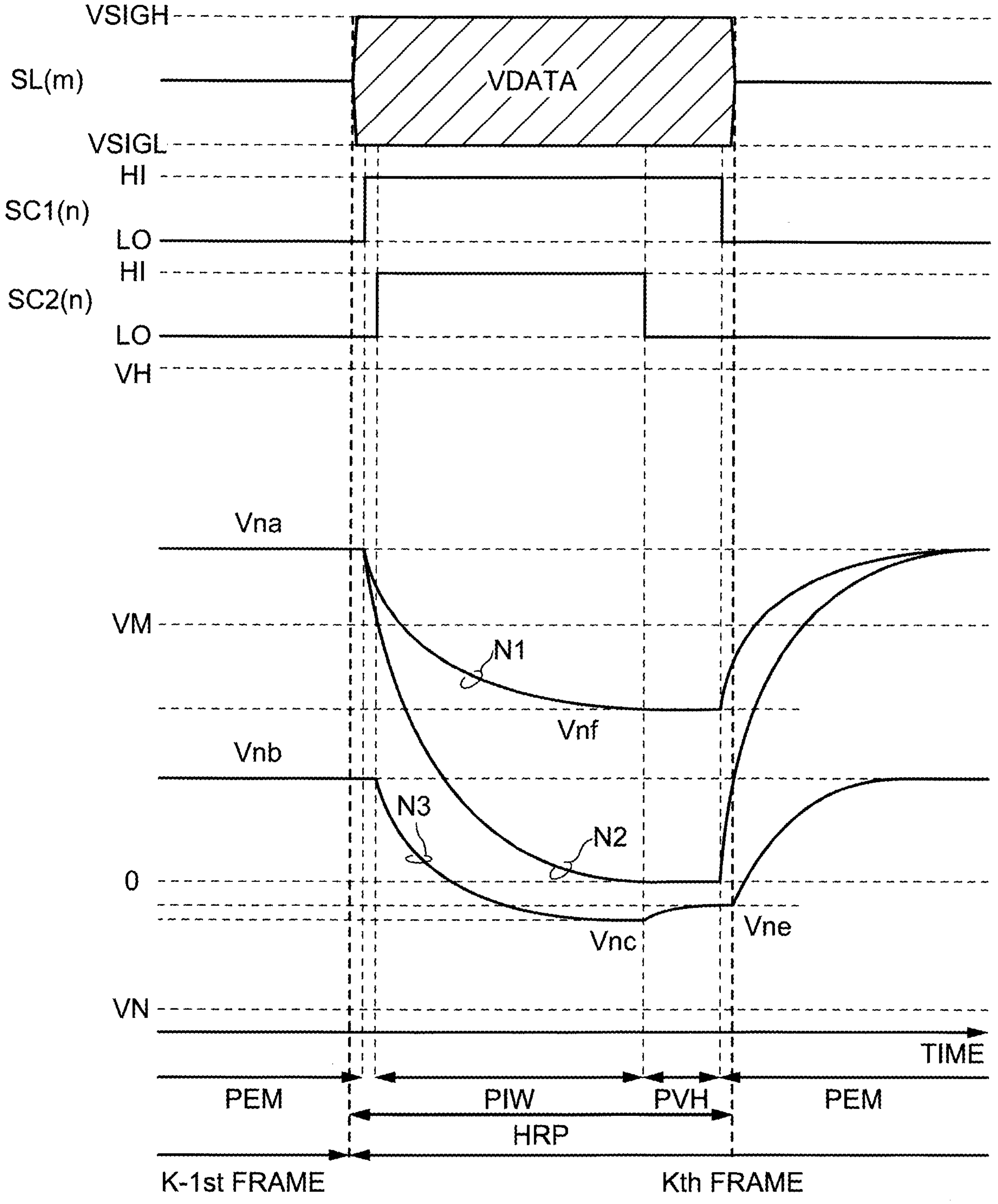
FIG. 6 is a timing chart of a self-luminous display device according to the first embodiment of the present invention.

A second example of the driving method for the display device 10 will be described with reference to FIG. 6. The driving method shown in the second example includes the pixel 180 displaying a white image based on the voltage VSIGH included in the data signal VDATA in the previous frame (K−1stFRAME) of the current frame (KthFRAME) and then the pixel 180 displaying a white image based on the voltage VSIGH included in the data signal VDATA in the KthFRAME. In other words, the driving method shown in the second example includes displaying images of the same color (white) in consecutive frames. Configurations that are the same as or similar to those in FIG. 1 to FIG. 5 will be described as necessary.

The configurations of the image data signal SL(m), the first scan signal SC1(*n*), and the second scan signal SC2(*n*) in the light emission period PEM of the K−1stFRAME and the one horizontal period HRP and the light emission period PEM of the KthFRAME are similar to those in the first example. In addition, the voltages (potentials) of the first node N1, the second node N2, and the third node N3 in the light emission period PEM of the K−1stFRAME, the operation of the respective transistors, and the like are similar to those in the first example. Therefore, configurations and the like similar to those in the first example will be described as necessary.

In the first period of the one horizontal period HRP of the KthFRAME, the image data signal SL(m) including the data signal VDATA including the voltage VSIGH corresponding to white is input to the pixel 180. The voltage supplied to the first node N1 gradually drops from the voltage Vna toward the voltage VSIGH (voltage Vnf), and the voltage supplied to the second node N2 gradually drops from the voltage Vna toward the reference voltage VREF. Furthermore, in response to the drop in the voltage supplied to the second node N2, the second transistor T2 is turned from the ON state to the OFF state. For example, as shown in Table 2, the reference voltage VREF is 0 V and the voltage VSIGH (voltage Vnf) is 3.5 V.

In the period PIW, the voltage supplied to the first node N1 gradually drops from the voltage Vna toward the voltage VSIGH (voltage Vnf, 3.5 V) and becomes the voltage Vnf (3.5 V). The voltage supplied to the second node N2 gradually drops from the voltage Vna toward the reference voltage VREF and becomes the reference voltage VREF (0 V). In addition, the voltage supplied to the third node N3 gradually drops from the voltage Vnb toward the initialization voltage VINI (voltage Vnc) and becomes the voltage Vnc. For example, as shown in Table 2, the initialization voltage VINI (voltage Vnc) is −1.5 V. In this case, the potential difference Vgs becomes 1.5 V (0 V−(−1.5 V)), and the potential difference Vds becomes 9.5 V (8V−(−1.5 V)).

As described above, similar to the first example, in the period PIW, the data signal VDATA including the voltage VSIGH is supplied (written) to the first node N1, the second node N2 is initialized by the reference voltage VREF (0 V), and the third node N3 is initialized by the initialization voltage VINI (−1.5 V).

In the period PVH following the period PIW, the image data signal SL(m) maintains the state in which the data signal VDATA including the voltage VSIGH is supplied. Immediately after the start of the period PVH, similar to the first example, the second transistor T2 is in the ON state, and the drain current Ion flows from the second electrode 626 of the second transistor T2 to the first electrode 624.

In the period PVH, the first node N1 maintains the state in which the voltage Vnf is supplied, and the second node N2 maintains the state in which the reference voltage VREF (0 V) is supplied. Furthermore, in the period PVH, similar to the first example, when the potential difference Vgs becomes the threshold voltage VTH, the second transistor T2 is turned from the ON state to the OFF state, and the drain current Ion does not flow. In addition, similar to the first example, the voltage supplied to the third node N3 is increased from the voltage Vnc to the voltage Vne, the reference voltage VREF−voltage Vne is the threshold voltage VTH, and the voltage Vne is −1 V.

As described above, similar to the first example, in the period PVH, the threshold voltage VTH of the second transistor T2 is obtained by the operation in which the potential difference Vgs of the second transistor T2 becomes the same as the threshold voltage VTH. In addition, the charge equivalent to the threshold voltage VTH is held in the second node N2 (the gate electrode 622 of the second transistor T2).

In the light emission period PEM of the KthFRAME following the one horizontal period HRP of the KthFRAME, when the third transistor T3 is turned on, the first node N1 and the second node N2 are conductive, and the voltage of the first node N1 and the voltage of the second node N2 gradually rise. As a result, the second transistor T2 is in the conductive state, and the drain current Ion flows from the drive power line PVDD to the reference voltage line PVSS. Therefore, the voltage of the third node N3 rises to follow the rise in the voltage of the first node N1 and the voltage of the second node N2.

For example, the voltage of the first node N1 and the voltage of the second node N2 rise to the voltage Vna, and the voltage of the third node N3 rises to the voltage Vnb. As a result, the potential difference Vgs is the voltage Vna (7 V)−voltage Vnb (−2.5 V). That is, the potential difference Vgs becomes 4.5 V, which is larger than the threshold voltage VTH (1 V). Therefore, the second transistor T2 is in the ON state, and the drain current Ion flows from the drive power line PVDD to the reference voltage line PVSS, so that the light-emitting element OLED emits light. In other words, as the drain current Ion flows, the voltage of the third node N3 rises to 2.5 V and the light-emitting element OLED exceeds a threshold voltage VTHEL (0.7 V, see Table 2), so that the light-emitting element OLED emits light. As a result, for example, the pixel 180 (the pixel circuit 181) emits red light, and white light is emitted by three pixels using the pixel 180 emitting red light, the pixel 180 emitting blue light, and the pixel 180 emitting green light.

[1-6-3. Third Example of Driving Method for Display Device 10]

Figure 7:
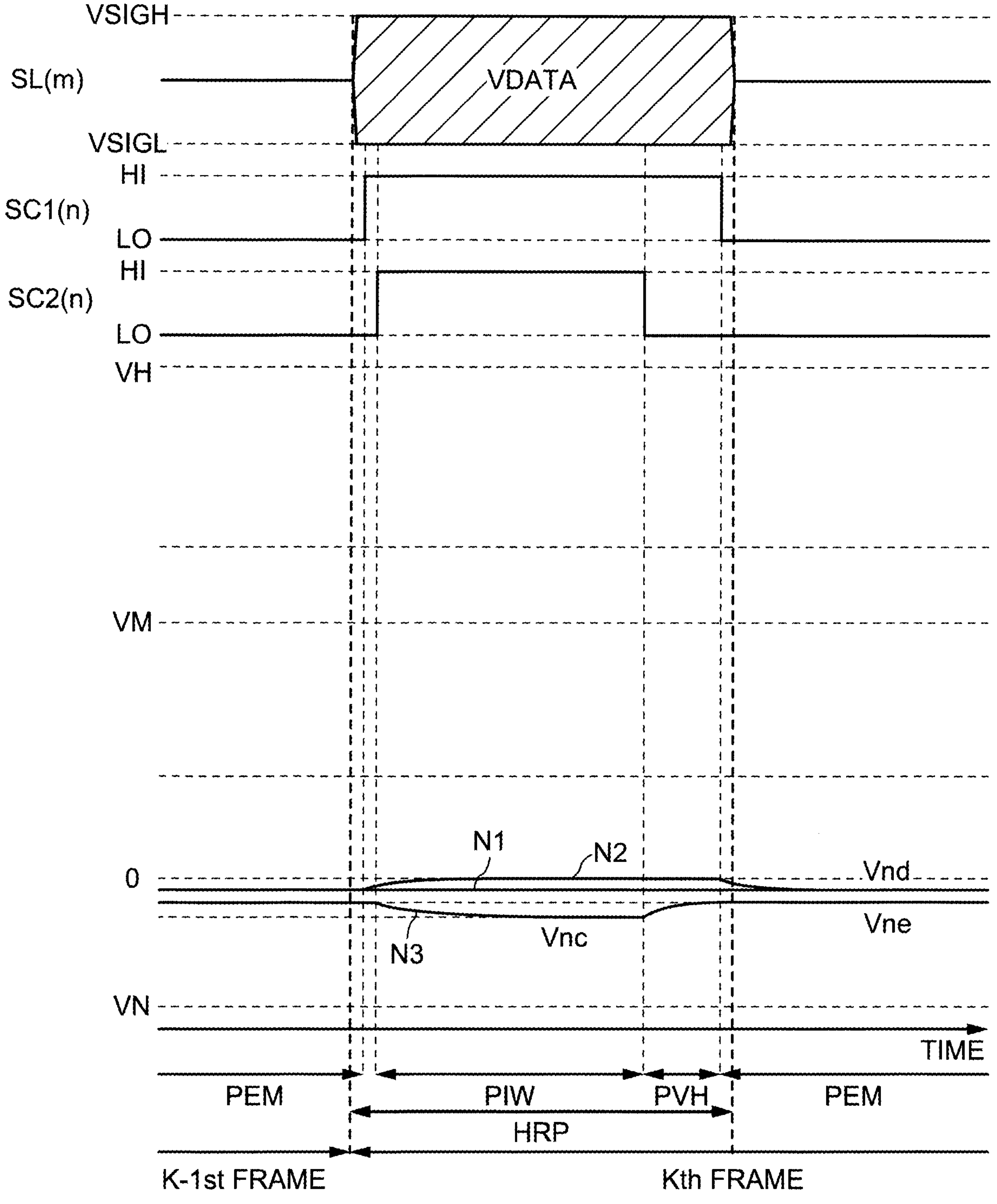
FIG. 7 is a timing chart of a self-luminous display device according to the first embodiment of the present invention.

A third example of the driving method for the display device 10 will be described with reference to FIG. 7. The driving method shown in the third example includes the pixel 180 displaying a black image based on the voltage VSIGL included in the data signal VDATA in the previous frame (K−1stFRAME) of the current frame (KthFRAME), and then the pixel 180 displaying the black image based on the voltage VSIGH included in the data signal VDATA even in the KthFRAME. In other words, the driving method shown in the third example includes displaying images of the same color (black) in consecutive frames. Configurations that are the same as or similar to those in FIG. 1 to FIG. 6 will be described as necessary.

The configurations of the image data signal SL(m), the first scan signal SC1(*n*), and the second scan signal SC2(*n*) in the light emission period PEM of the K−1stFRAME and the one horizontal period HRP and the light emission period PEM of the KthFRAME are similar to those in the first example. Configurations and the like similar to those in the first example and the second example will be described as necessary.

The light emission period PEM of the K−1stFRAME is a period during which the pixel 180 emits light according to the potential difference Vgs (voltage V (N2)−voltage V (N3)=Vnd (−0.5 V)−voltage Vne (−1 V)). For example, the potential difference Vgs is 0.5 V and is smaller than the threshold voltage VTH of the second transistor T2, (1 V, see Table 2). Therefore, since the second transistor T2 is in the OFF state and no current flows from the drive power line PVDD to the reference voltage line PVSS, the light-emitting element OLED does not emit light. As a result, for example, the pixel 180 becomes black.

In the first period of the one horizontal period HRP of the KthFRAME following the light emission period PEM of the K−1stFRAME, the image data signal SL(m) including the data signal VDATA including the voltage VSIGL (−0.5 V) corresponding to the non-light-emitting black is input to the pixel 180. The voltage supplied to the first node N1 remains at the voltage Vnd (−0.5 V), and the first node N1 maintains the state in which −0.5 V is supplied. The voltage supplied to the second node N2 gradually rises from the voltage Vnd (−0.5 V) towards the reference voltage VREF (0 V).

In the period PIW, the image data signal SL(m) maintains the state in which the data signal VDATA including the voltage VSIGL is supplied. The voltage supplied to the first node N1 remains at −0.5 V, and the first node N1 maintains the state in which −0.5 V is supplied. The voltage supplied to the second node N2 gradually rises from the voltage Vnd toward the reference voltage VREF and becomes the reference voltage VREF (0 V). In addition, the voltage supplied to the third node N3 gradually drops from the voltage Vne (−1 V) toward the initialization voltage VINI (voltage Vnc, −1.5 V) and becomes the voltage Vnc (−1.5 V).

As described above, similar to the first example, in the period PIW, the data signal VDATA including the voltage VSIGL (−0.5 V) is supplied (written) to the first node N1, the second node N2 is initialized by the reference voltage VREF (0 V), and the third node N3 is initialized by the initialization voltage VINI (−1.5 V).

In the period PVH following the period PIW, the image data signal SL(m) maintains the state in which the data signal VDATA including the voltage VSIGL is supplied.

Immediately after the start of the period PVH, the potential difference Vgs is 1.5 V (reference voltage VREF (0 V)−voltage Vnc (−1.5 V)) and the potential difference Vds is 9.5 V, and the potential difference Vgs and the potential difference Vds are greater than the threshold voltage VTH (1 V), so that the second transistor Vgs is in the ON state. Therefore, the drain current Ion flows from the second electrode 626 of the second transistor T2 to the first electrode 624. Even when the drain current Ion flows through the second transistor T2, the voltage of the third node N3 is −1.5 V and is smaller than the threshold voltage VTHEL of the light-emitting element OLED, so that the light-emitting element OLED does not emit light for a moment between frames in which black is continuously displayed.

In the period PVH, when the potential difference Vgs becomes the threshold voltage VTH (1 V), the second transistor T2 is turned from the ON state to the OFF state, and the drain current Ion does not flow. In this case, the voltage supplied to the third node N3 rises from the voltage Vnc (−1.5 V) to the voltage Vne (−1 V), and the potential difference Vgs is the threshold voltage VTH (1 V) (reference voltage VREF (0 V)−Vne (−1 V)).

As described above, similar to the first example, in the period PVH, the threshold voltage VTH of the second transistor T2 is obtained by the operation in which the potential difference Vgs of the second transistor T2 becomes the same as the threshold voltage VTH. In addition, the charge equivalent to the threshold voltage VTH is held in the second node N2 (the gate electrode 622 of the second transistor T2).

In the light emission period PEM of the KthFRAME following the one horizontal period HRP of the KthFRAME, similar to the first example, when the third transistor T3 is turned on, the first node N1 and the second node N2 are conductive, and the potential difference Vgs becomes 0.5 V. As a result, similar to the first example, the second transistor T2 is in the OFF state and no current flows from the drive power line PVDD to the reference voltage line PVSS, so that the light-emitting element OLED does not emit light. For example, the pixel 180 becomes black. In addition, similar to the pixel 180 emitting red light, the pixel 180 emitting blue light and the pixel 180 emitting green light do not emit light, so that the three pixels using the pixel 180 emitting red, the pixel 180 emitting blue, and the pixel 180 emitting green become black.

For example, the display device including the pixel circuit in which the first node N1 is the same as the second node N2 (in which the third transistor T3 is not present) includes the writing period and the initialization period separately because the process (driving) executed in the writing period and the process (driving) executed in the initialization period cannot be executed at the same timing. As a result, even when images of the same color (black) are displayed in consecutive frames, the display device including the pixel circuit in which the first node N1 is the same as the second node N2 executes the process in both the writing period and the initialization period in each of the consecutive frames. As a result, in the display device including the pixel circuit in which the first node N1 is the same as the second node N2, there is a risk that the voltage fluctuation at each node become large.

On the other hand, as described above, the display device 10 includes the configuration for independently controlling the first node N1, the second node N2, and the third node N3, and the process (driving) executed in the writing period and the process (driving) executed in the initialization period can be executed at the same timing.

As a result, the display device 10 can suppress large fluctuations in the voltage of each node when displaying images of the same color (black) in consecutive frames. For example, as described above, the voltage fluctuation at the first node N1 is 0, and the voltage fluctuations at each of the second node N2 and the third node N3 are 0.5 V. Furthermore, in the display device 10, since the voltage fluctuation at each node when displaying images of the same color (black) in consecutive frames is small, the power consumption due to the voltage fluctuation at each node can be reduced. Therefore, the display device 10 is a display device that can reduce power consumption.

[1-6-4. Fourth Example of Driving Method for Display Device 10]

Figure 8:
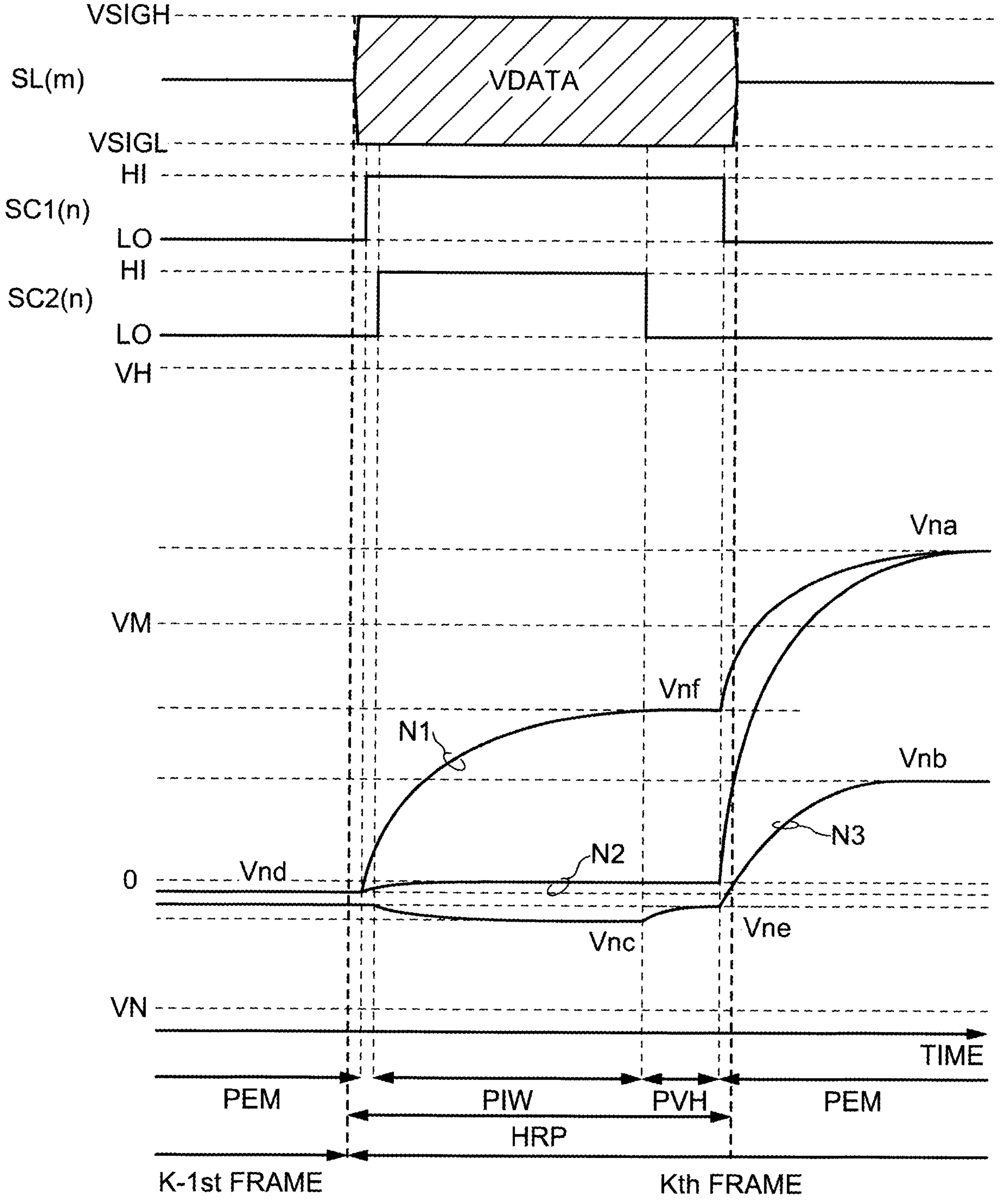
FIG. 8 is a timing chart of a self-luminous display device according to the first embodiment of the present invention.

A fourth example of the driving method for the display device 10 will be described with reference to FIG. 8. The driving method shown in the fourth example includes the pixel 180 (the pixel circuit 181) displaying a black image based on the voltage VSIGL included in the data signal VDATA in the previous frame (K−1stFRAME) of the current frame (KthFRAME), and then the pixel 180 displaying a white image based on the voltage VSIGH included in the data signal VDATA in the KthFRAME. In other words, the driving method shown in the fourth example includes displaying images of different colors in consecutive frames. Configurations that are the same as or similar to those in FIG. 1 to FIG. 5 will be described as necessary.

The configurations of the image data signal SL(m), the first scan signal SC1(*n*), and the second scan signal SC2(*n*) in the light emission period PEM of the K−1stFRAME and the one horizontal period HRP and the light emission period PEM of the KthFRAME are similar to those in the first example. In addition, the voltages (potentials) of the first node N1, the second node N2, and the third node N3 in the light emission period PEM of the K−1stFRAME, the operation of the respective transistors, and the like are similar to the third example. Configurations and the like similar to those of the first to third examples will be described as necessary.

In the first period of the one horizontal period HRP of the KthFRAME, the image data signal SL(m) including the data signal VDATA including the voltage VSIGH corresponding to white is input to the pixel 180. The voltage supplied to the first node N1 gradually rises from the voltage Vnd (−0.5 V) toward the voltage VSIGH (voltage Vnf, 3.5 V), and the voltage supplied to the second node N2 gradually rises from the voltage Vnd toward the reference voltage VREF (0 V).

In the period PIW, the voltage supplied to the first node N1 gradually rises from the voltage Vnd (−0.5 V) toward the voltage VSIGH (voltage Vnf, 3.5 V), and the first node N1 is in the state in which the voltage Vnf (3.5 V) is supplied. The voltage supplied to the second node N2 gradually rises from the voltage Vnd toward the reference voltage VREF (0 V), and the second node N2 is in the state in which the voltage VREF (0 V) is supplied. In addition, the voltage supplied to the third node N3 gradually drops from the voltage Vne (−1 V) toward the initialization voltage VINI (voltage Vnc, −1.5 V), and the third node N3 is in the state in which the voltage Vnc (−1.5 V) is supplied. In this case, the potential difference Vgs becomes 1.5 V (0 V−(−1.5 V)), and the potential difference Vds becomes 9.5 V (8 V−(−1.5 V).)

As described above, similar to the second example, in the period PIW, the data signal VDATA including the voltage VSIGH is supplied (written) to the first node N1, the second node N2 is initialized by the reference voltage VREF (0 V), and the third node N3 is initialized by the initialization voltage VINI (−1.5 V).

In the period PIW following the period PVH, similar to the second example, the first node N1 maintains the state in which the voltage Vnf is supplied, the second node N2 maintains the state in which the reference voltage VREF (0 V) is supplied, the voltage supplied to the third node N3 rises from the voltage Vnc to the voltage Vne, and the third node N3 is in the state in which the voltage Vne (−1 V) is supplied.

As described above, similar to the second example, in the period PVH, the threshold voltage VTH of the second transistor T2 is obtained by the operation in which the potential difference Vgs of the second transistor T2 becomes the same as the threshold voltage VTH. In addition, the charge equivalent to the threshold voltage VTH is held in the second node N2 (the gate electrode 622 of the second transistor T2).

In the light emission period PEM of the KthFRAME following the one horizontal period HRP of the KthFRAME, similar to the second example, the voltage of the first node N1 and the voltage of the second node N2 rise to the voltage Vna, the voltage of the third node N3 rises to the voltage Vnb, and the potential difference Vgs becomes 0.5 V (voltage Vna (7 V)−voltage Vnb (−2.5 V)). The potential difference Vgs is greater than the threshold voltage VTH (1 V), the second transistor T2 is in the ON state, and the drain current Ion flows from the drive power line PVDD to the reference voltage line PVSS. As a result, the light-emitting element OLED emits light. For example, the pixel 180 emits red light, and white light is emitted by three pixels using the pixel 180 emitting red light, the pixel 180 emitting blue light, and the pixel 180 emitting green light.

[1-7. Cross-Sectional Structure of Pixel 180 Along Line A1-A2]

Figure 9:
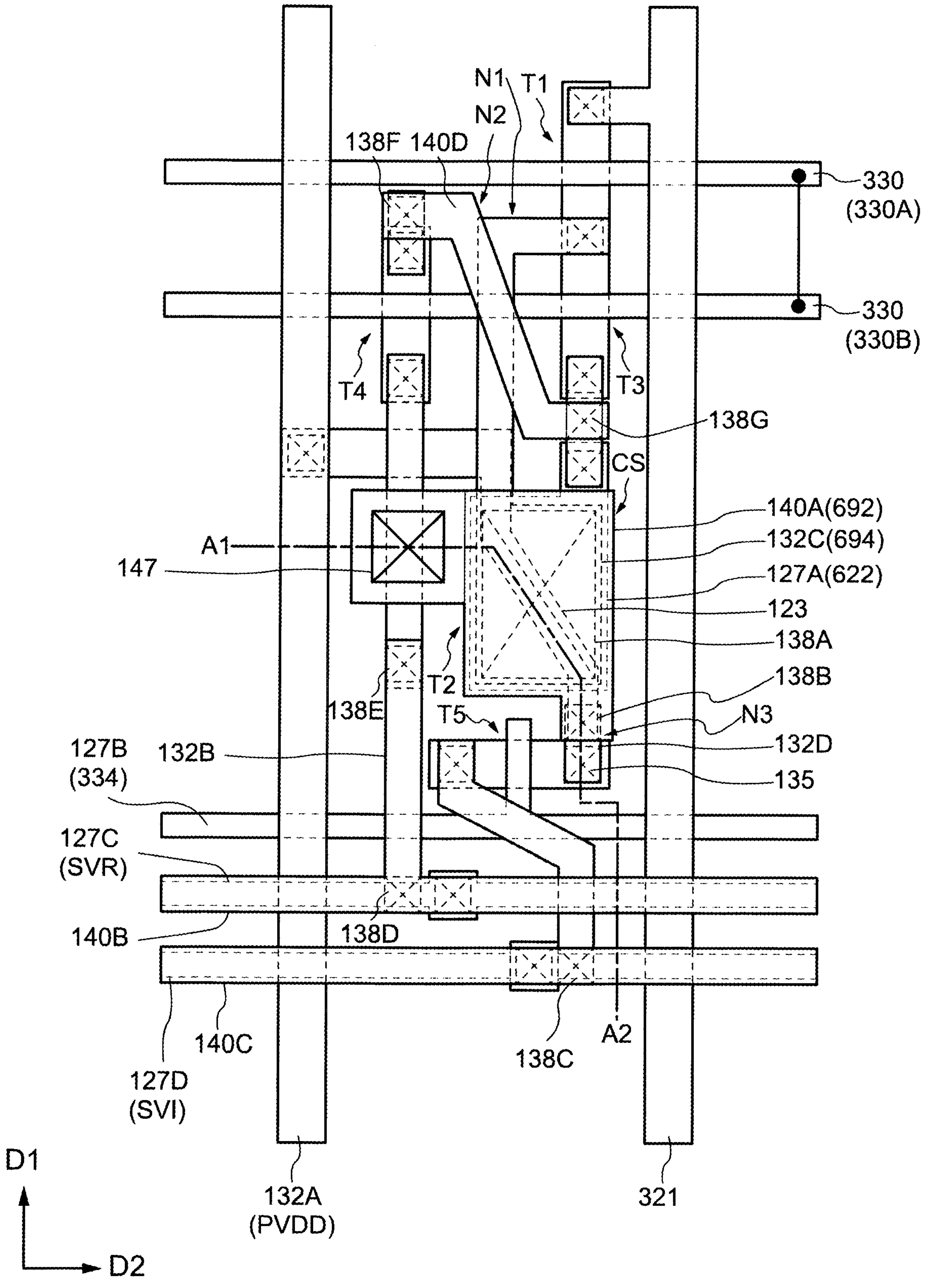
FIG. 9 is a layout diagram of a pixel according to the first embodiment of the present invention.
Figure 10:
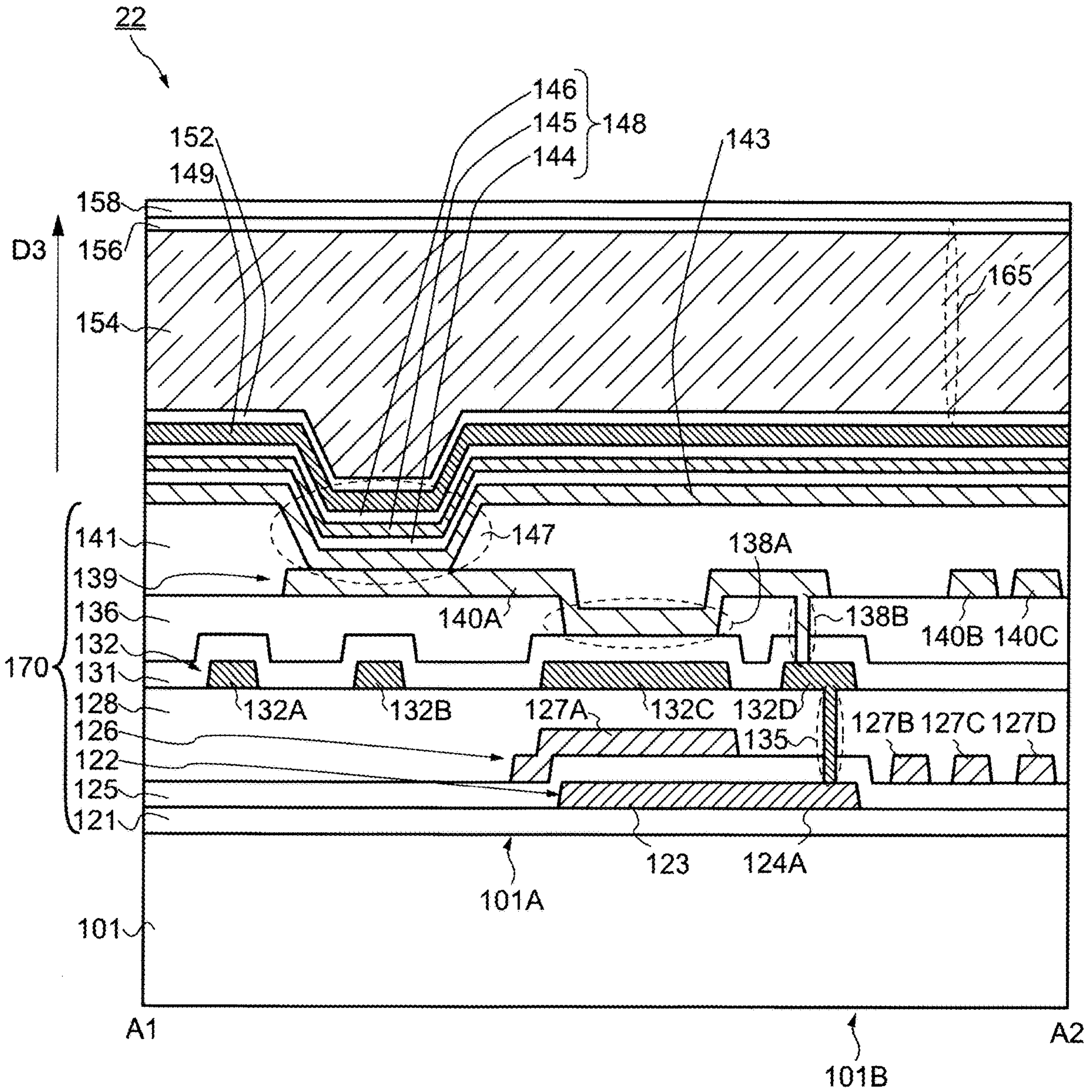
FIG. 10 is a cross-sectional view showing a cross-section cut along a line A1-A2 in the layout shown in FIG. 9.

A cross-sectional configuration of the pixel 180 along a line A1-A2 will be described with reference to FIG. 3, FIG. 9, and FIG. 10. FIG. 9 is a planar layout view of the pixel 180. FIG. 10 is a cross-sectional view showing a cross section cut along a line A1-A2 in the planar layout of the pixel 180 shown in FIG. 9. The planar layout of the pixel 180 shown in FIG. 9 and the cross-section of the pixel 180 shown in FIG. 10 are examples, and the planar layout and the cross-section of the pixel 180 are not limited to the examples shown in FIG. 9 and FIG. 10. Configurations that are the same as or similar to those in FIG. 1 to FIG. 8 will be described as necessary.

In addition, as an exemplary cross section of the pixel 180, the cross section of the pixel 180 shown in FIG. 10 is a cross section along the drive power line PVDD, a contact hole opening 147 for an anode electrode, the first electrode 692 and the second electrode 694 of the capacitive element CS, the gate electrode 622 of the second transistor T2, a channel region 123 of a semiconductor layer 122, an organic insulating film opening 138A for the capacitive element CS, a second contact hole opening 138B, a first wiring 132B, a first wiring 132D, a first contact hole opening 135, an impurity region 124A, the second scan signal line 334, the reference voltage power line SVR, and the initialization voltage power line SVI.

A substrate 101 includes a first surface 101A and a second surface 101B opposite the first surface 101A. The semiconductor layer 122 is provided on the first surface 101A of the substrate 101 via an underlayer 121. The semiconductor layer 122 includes a semiconductor layer 122A, and the semiconductor layer 122A includes the channel region 123 and the impurity region 124A. For example, the impurity region is referred to as a source region or a drain region. In addition, for example, the second transistor T2 and the fifth transistor T5 include the semiconductor layer 122A, and the first electrode 624 and the second electrode 656 include the impurity region 124A. In other words, the semiconductor layer 122A includes the channel region of the second transistor T2 and the channel region of the fifth transistor T5.

A gate insulating layer 125, a conductive layer 126, an insulating layer 128, and a conductive layer 132 are provided in this order on the semiconductor layer 122. The conductive layer 126 includes a gate wiring 127A (the gate electrode 622), a gate wiring 127B (the second scan signal line 334), a gate wiring 127C (the reference voltage power line SVR), and a gate wiring 127D (the initialization voltage power line SVI). The conductive layer 132 includes a first wiring 132A (the drive power line PVDD), the first wiring 132B, a first wiring 132C (the second electrode 694), and the first wiring 132D. In addition, a region where the conductive layer 126 and the semiconductor layer 122 overlap is the channel region. In other words, a region where the gate electrode and the semiconductor layer of each transistor overlap is the channel region.

Each transistor of the pixel 180 is formed using the semiconductor layer 122 (the channel region 123 and the impurity region 124A), the gate insulating layer 125, and the conductive layer 126 (e.g., the gate wiring 127A).

The first contact hole opening 135 reaching the semiconductor layer 122 is provided in the gate insulating layer 125 and the insulating layer 128. The first contact hole opening 135 exposes the semiconductor layer 122 (e.g., the impurity region 124A). The conductive layer 132 is electrically connected to the semiconductor layer 122 (e.g., the impurity region 124A) by the first contact hole opening 135. In addition, an opening (not shown) that reaches the conductive layer 126 (e.g., the gate wiring 127A) may be provided in the insulating layer 128.

An insulating layer 131 is provided to cover the conductive layer 132. An insulating layer 136 is provided to cover the insulating layer 131.

The second contact hole opening 138B is provided in the insulating layer 131 and the insulating layer 136. The second contact hole opening 138B is provided in the insulating layer 136. A conductive layer 139 is provided on the insulating layer 136 and in the organic insulating film opening 138A for the capacitive element CS and the second contact hole opening 138B. The conductive layer 139 includes a second wiring 140A (the first electrode 692), a second wiring 140B, and a third wiring 140C. The second contact hole opening 138B exposes the conductive layer 132 (e.g., the first wiring 132D). For example, the second contact hole opening 138B electrically connects the first electrode 692 and the first wiring 132D. For example, the capacitive element CS is formed using the insulating layer 131 as a dielectric and the first wiring 132C (the second electrode 694) and the second wiring 140A (the first electrode 692). For example, the second wiring 140A also serves as a pixel electrode. Although not shown, for example, the second contact hole opening 138 exposes a part of a plurality of terminals (not shown) included in the terminal section 150. Some of the exposed terminals are electrically connected to the FPC 160 using a conductive film such as an anisotropic conductive film (not shown).

An insulating layer 141 is provided to cover the conductive layer 139.

The underlayer 121, the semiconductor layer 122, the gate insulating layer 125, the conductive layer 126, the insulating layer 128, the conductive layer 132, the insulating layer 131, the insulating layer 136, the conductive layer 139, and an insulating layer 137 are collectively referred to as an array section 170.

Next, the layers above the insulating layer 141 will be described. The contact hole opening 147 for anode electrode is provided in the insulating layer 141. The contact hole opening 147 for anode electrode exposes the conductive layer 139 (e.g., the second wiring 140A).

An anode electrode 143 is provided to cover the exposed the conductive layer 139, the contact hole opening 147 for anode electrode, and the insulating layer 141. A functional layer 148 is provided on the anode electrode 143 and a common electrode 149 is provided on the functional layer 148 to cover the functional layer 148. The common electrode 149 is electrically connected to the cathode electrode (the first electrode 682 of the light-emitting element OLED). In this case, the light-emitting element OLED is composed of the anode electrode 143, the functional layer 148, and the common electrode 149 (cathode electrode).

The configuration of the functional layer 148 can be selected as appropriate. For example, the functional layer 148 may be configured by combining a carrier injection layer, a carrier transport layer, a light-emitting layer, a carrier blocking layer, an exciton blocking layer, and the like. For example, the functional layer 148 shown in FIG. 10 includes a first layer 144, a second layer 145, and a third layer 146. For example, the first layer 144 is a carrier (hole) injection and transport layer, the second layer 145 is a light-emitting layer, and the third layer 146 is a carrier (electron) injection and transport layer.

A sealing film 165 is provided on the common electrode 149. For example, the sealing film 165 includes a first inorganic insulating layer 152, an organic insulating layer 154, and a second inorganic insulating layer 156. In addition, the first inorganic insulating layer 152 and the second inorganic insulating layer 156 are formed to cover at least the display region 22. A cover film 158 is arranged on the second inorganic insulating layer 156.

For example, the first layer 144, the second layer 145 (light-emitting layer), and the third layer 146, and the common electrode 149 included in the functional layer 148 are not arranged on the IC chip 110, the first scan driver 120, and the second scan driver 130. The sealing film 165 and the cover film 158 are arranged on the IC chip 110, the first scan driver 120, and the second scan driver 130. The sealing film 165 and the cover film 158 suppress impurities (water, oxygen, etc.) from entering the light-emitting element OLED, the transistors, and the like from the outside of the display device 10.

Common metal materials are used as the conductive layer 126, the conductive layer 132, the conductive layer 139, and the common electrode 149. For example, aluminum (Al), titanium (Ti), chromium (Cr), cobalt (Co), nickel (Ni), molybdenum (Mo), hafnium (Hf), tantalum (Ta), tungsten (W), bismuth (Bi), silver (Ag), copper (Cu), and an alloy or compound thereof are used as the common metal materials.

For example, the semiconductor layer 122 may contain the LTPS and may contain a metal oxide.

For example, a common insulating material can be used as a material for forming the underlayer 121, the gate insulating layer 125, the insulating layer 131, the first inorganic insulating layer 152, and the second inorganic insulating layer 156. For example, inorganic insulating layers such as silicon oxide ($SiO_x$), silicon oxynitride ($SiO_xN_y$), silicon nitride ($SiN_x$), and silicon nitride oxide ($SiN_xO_y$) are used as the insulating layers.

For example, an organic compound material having excellent surface-flatness can be used as a material for forming the insulating layer 128, the insulating layer 136, the insulating layer 141, and the organic insulating layer 154. The insulating layer 128, the insulating layer 136, and the insulating layer 141 may be referred to as organic insulating layers.

[1-8. Method for Manufacturing Display Device 10]

Figure 11:
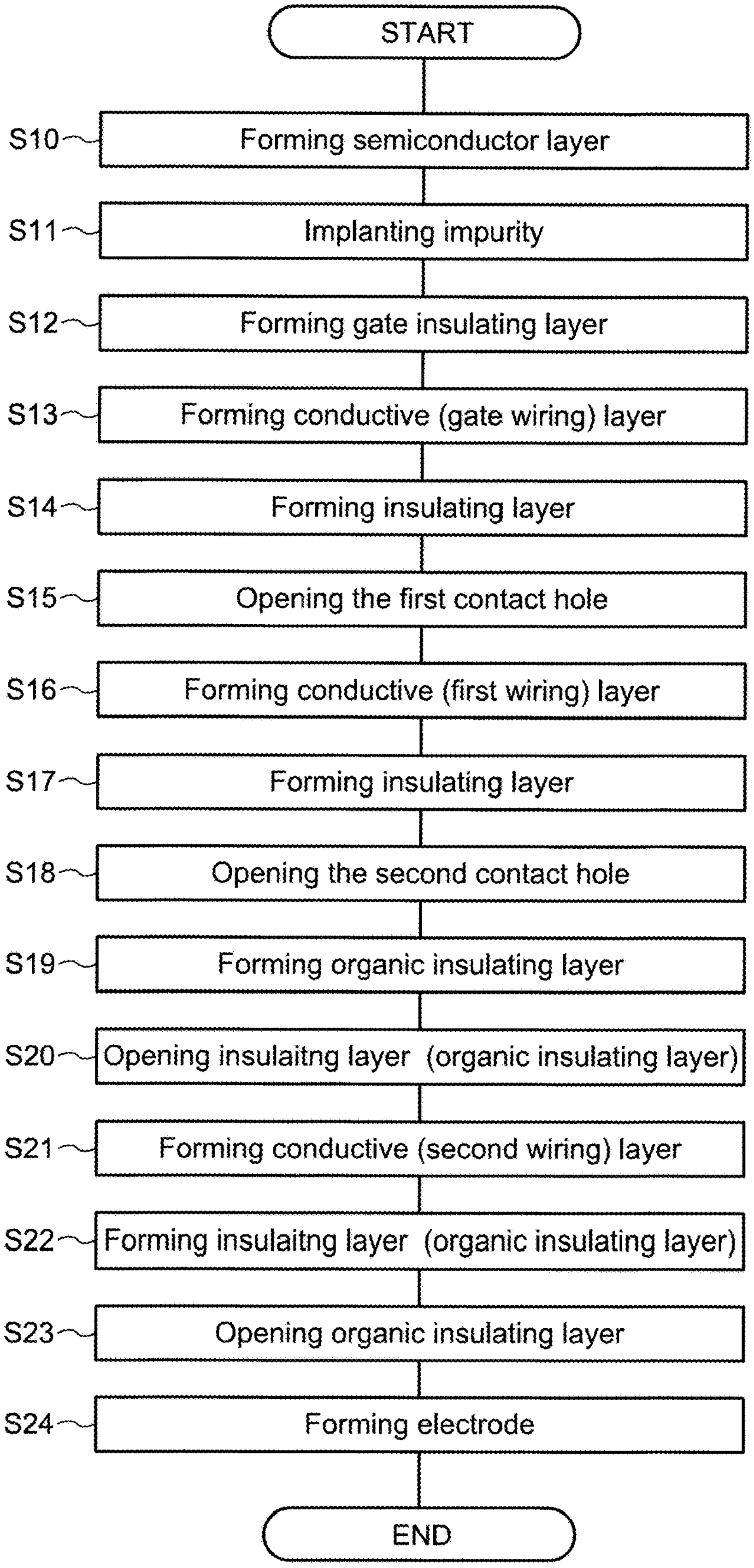
FIG. 11 is a sequence diagram showing a method for manufacturing a self-luminous display device according to the first embodiment of the present invention.
Figure 12:
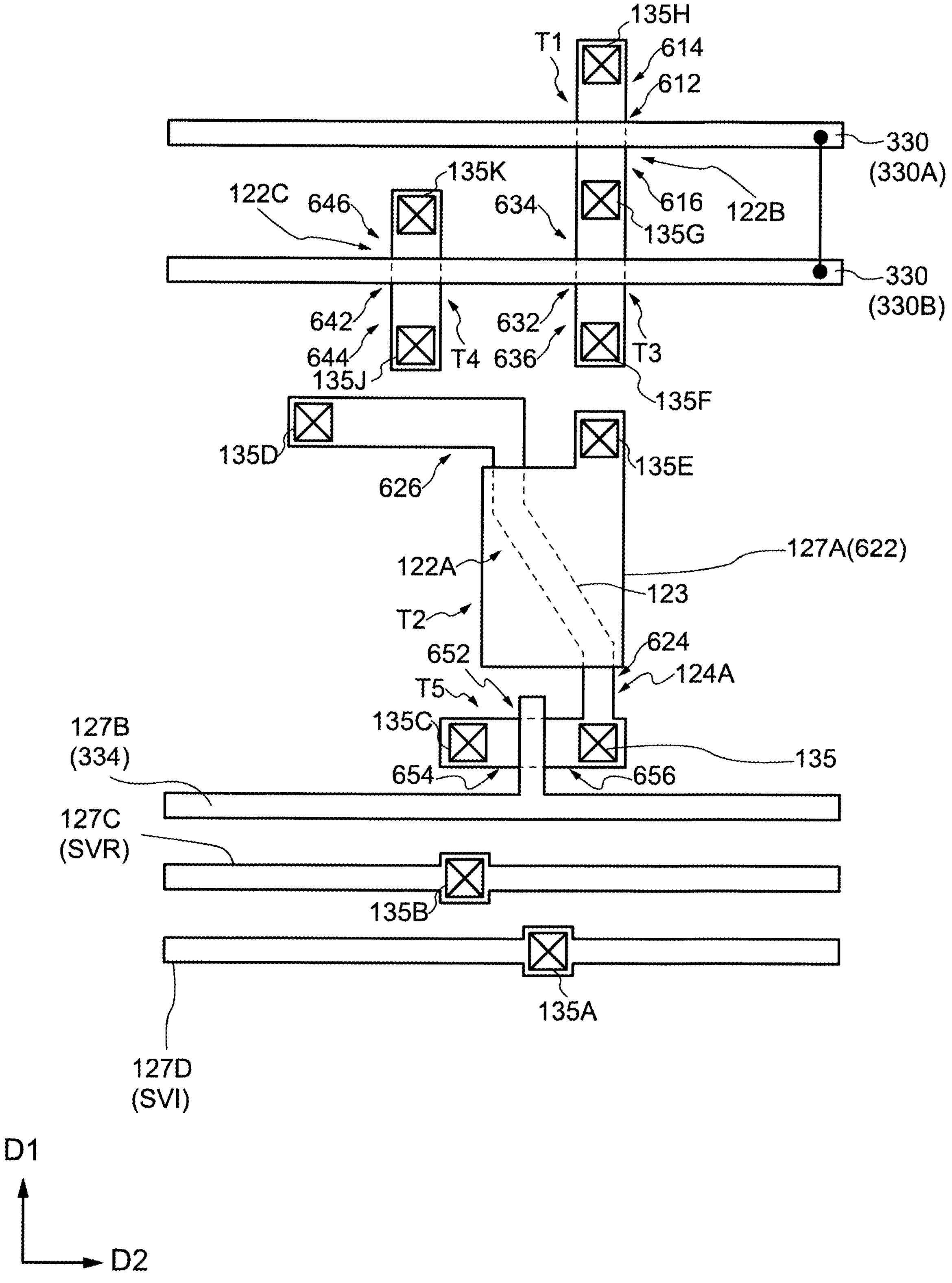
FIG. 12 is a layout diagram of a pixel according to the first embodiment of the present invention.
Figure 13:
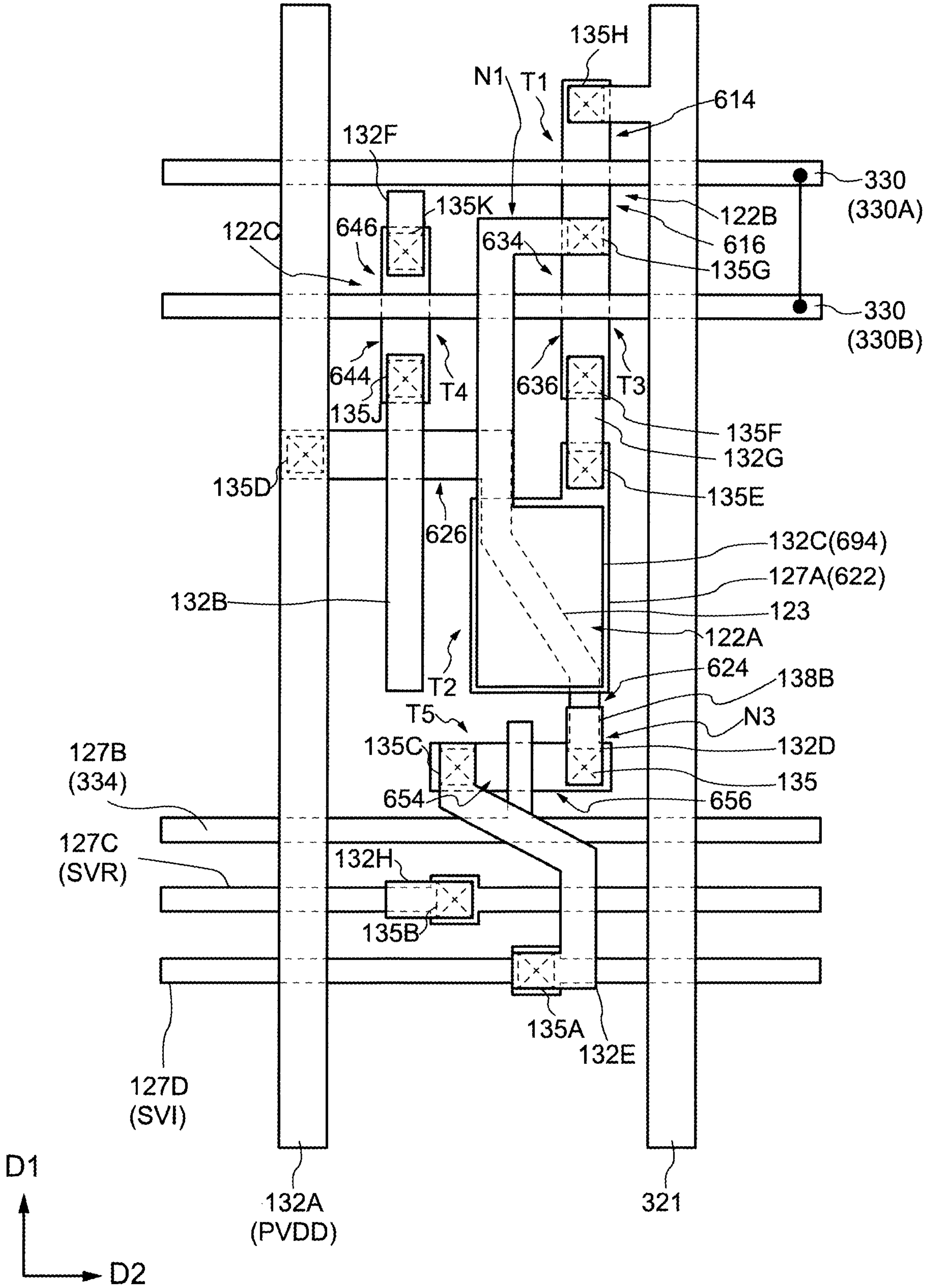
FIG. 13 is a layout diagram of a pixel according to the first embodiment of the present invention.
Figure 14:
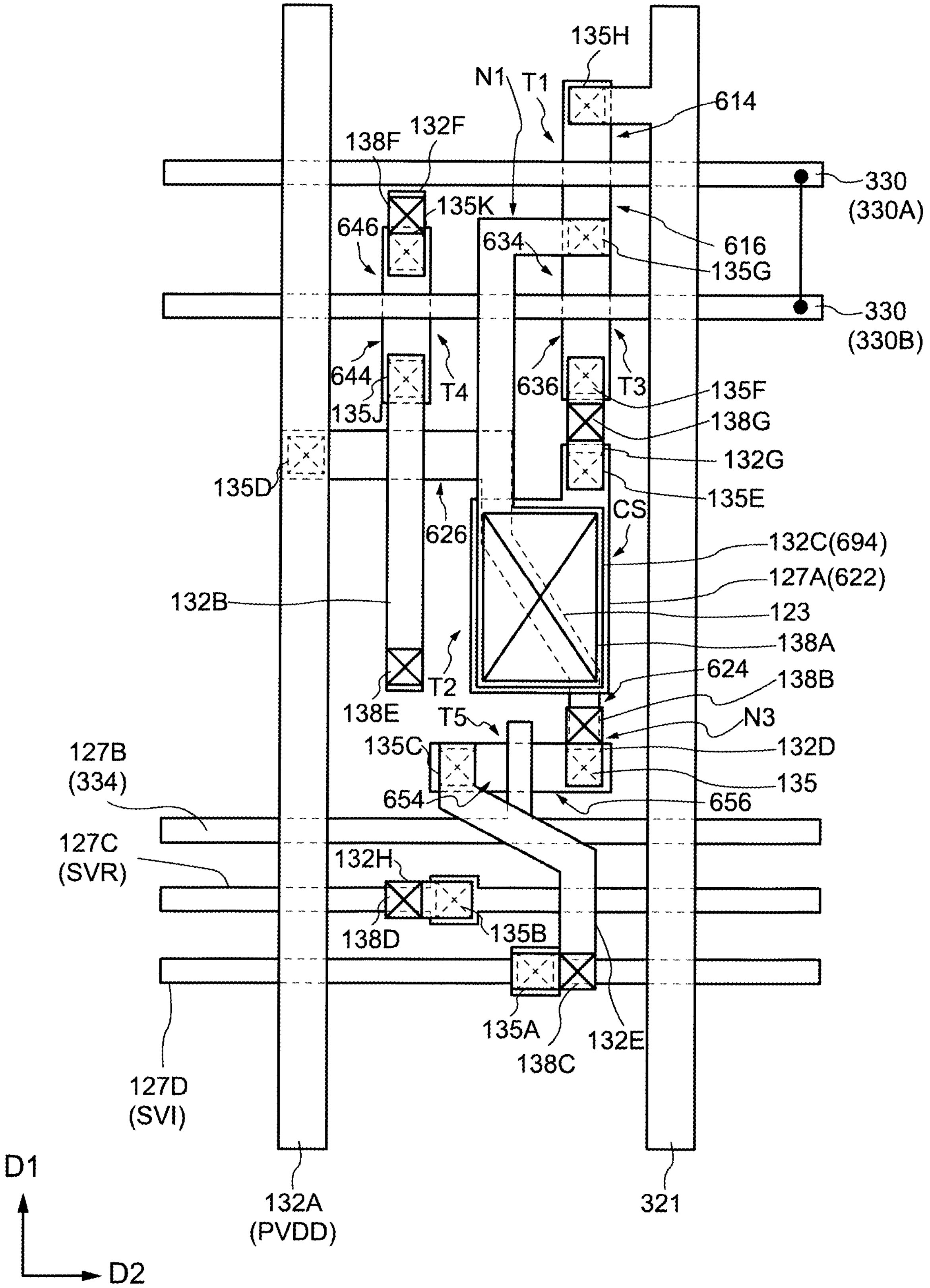
FIG. 14 is a layout diagram of a pixel according to the first embodiment of the present invention.

A method for manufacturing the display device 10 (the pixel 180) will be described with reference to FIG. 3, FIG. 9, and FIG. 14. FIG. 11 is a sequence diagram showing the method for manufacturing the display device 10. FIG. 12 to FIG. 14 are layout diagrams of the pixel 180. Configurations that are the same as or similar to those in FIG. 1 to FIG. 10 will be described as necessary.

As shown in FIG. 10, when manufacturing of the display device 10 (pixel 180) is started, the underlayer 121 is formed on the first surface 101A of the substrate 101.

As shown in FIG. 10 or FIG. 12, the semiconductor layer 122 is formed on the underlayer 121 (step 10 (S10) of FIG. 11). The semiconductor layer 122 includes the semiconductor layers 122A, 122B, and 122C. The semiconductor layer 122A serves as both the semiconductor layer of the second transistor T2 and the semiconductor layer of the fifth transistor T5. The semiconductor layer 122B serves as both the semiconductor layer of the first transistor T1 and the semiconductor layer of the third transistor T3. The semiconductor layer 122C is the semiconductor layer of the fourth transistor T4. In other words, the semiconductor layer 122B includes the channel region of the first transistor T1 and the channel region of the third transistor T3, and the semiconductor layer 122C includes the channel region of the fourth transistor T4. That is, the pixel 180 includes the semiconductor layer serving as two transistors, and the semiconductor layer of one transistor.

An impurity is implanted into the semiconductor layer 122 (step 11 (S11) of FIG. 11). The impurity region 124A is formed by S11. For example, referring to FIG. 12, the first electrode 614, the second electrode 616, the first electrode 624, the second electrode 626, the first electrode 614, the second electrode 616, the first electrode 644, the second electrode 646, the first electrode 654, and the second electrode 656 include an impurity region into which an impurity such as phosphorus (P) is implanted. For example, referring to FIG. 12, the first electrode 634 and the second electrode 636 include an impurity region into which an impurity such as boron (B) is implanted.

The gate insulating layer 125 (FIG. 10) is formed on the semiconductor layer 122 and on the underlayer 121 where the semiconductor layer 122 is not formed (step 12 (S12) of FIG. 11).

The conductive layer 126 (FIG. 10) is formed on the gate insulating layer 125 (step 13 (S13) of FIG. 11). As shown in FIG. 10 or FIG. 12, the conductive layer 126 includes the gate wiring 127A (the gate electrode 622), the gate wiring 127B (the second scan signal line 334), the gate wiring 127C (the reference voltage power line SVR), the gate wiring 127D (the initialization voltage power line SVI), a first scan signal line 330A, and a first scan signal line 330B. The gate wiring 127B (the second scan signal line 334) includes the gate electrode 652. The first scan signal line 330A includes the gate electrode 612, and the first scan signal line 330B includes the gate electrode 632 and the gate electrode 642. For example, the first scan signal line 330A and the first scan signal line 330B are electrically connected at an outer periphery of the display region 22 or in the peripheral region 24, and the same first scan signal is supplied.

A region where the gate electrode 622 of the second transistor T2 and the semiconductor layer 122A overlap is the channel region 123, and the channel region 123 corresponds to a channel length of the second transistor T2. Similarly, a region where the gate electrode 612 of the first transistor T1 and the semiconductor layer 122B overlap is the channel region of the first transistor T1 and corresponds to the channel length. As shown in FIG. 12, in a plan view, the channel region 123 of the second transistor T2 is larger (longer) than the channel region of the first transistor T1, the channel region of the third transistor T3, the channel region of the fourth transistor T4, and the channel region of the fifth transistor T5. That is, the channel length of the second transistor T2 is longer than the channel length of the first transistor T1, the channel length of the third transistor T3, the length of the fourth transistor T4, and the channel length of the fifth transistor T5. Since the second transistor T2 operates in a saturated region, the resistance of the second transistor T2 to hot carriers needs to be higher than the resistance of the other transistors in the pixel 180 to hot carriers. As a result, the channel length of the second transistor T2 is longer than the channel length of the rest of the transistors in the pixel 180.

The insulating layer 128 (FIG. 10) is formed on the conductive layer 126 and on the gate insulating layer 125 where the conductive layer 126 is not formed (step 14 (S14) of FIG. 11).

As shown in FIG. 10 or FIG. 12, the first contact hole openings 135, 135A, 135B, 135C, 135D, 135E, 135F, 135G, 135H, 135J, and 135K are opened (step 15 (S15)). Each opening opens the gate insulating layer 125 and the insulating layer 128 to expose wirings, semiconductor layers or electrodes corresponding to each opening. For example, the first contact hole opening 135 exposes the semiconductor layer 122A (e.g., the impurity region 124A) and the first contact hole opening 135A exposes the gate wiring 127D. Other openings also expose the corresponding wirings, semiconductor layers or electrodes.

The conductive layer 132 (FIG. 10) is formed on the insulating layer 128 (step 16 (S16)). As shown in FIG. 10 or FIG. 13, the conductive layer 132 includes the first wiring 132A (the drive power line PVDD), the first wiring 132B, the first wiring 132C (the second electrode 694), the first wiring 132D, a first wiring 132E, a first wiring 132F, a first wiring 132G, a first wiring 132H, and the image data signal line 321.

As shown in FIG. 13, in a plan view, the first wiring 132A is electrically connected to the second electrode 626 via the first contact hole opening 135D, the first wiring 132B is electrically connected to the first electrode 644 via the first contact hole opening 135J, the second electrode 694 is electrically connected to the first electrode 644 via the first contact hole opening 135J, and the first wiring 132D is electrically connected to the second electrode 656 via the first contact hole opening 135. In addition, as shown in FIG. 13, in a plan view, the first wiring 132E is electrically connected to the initialization voltage power line SVI via the first contact hole opening 135A and electrically connected to the first electrode 654 via the first contact hole opening 135C, the first wiring 132F is electrically connected to the second electrode 646 via the first contact hole opening 135K, the first wiring 132G is electrically connected to the second electrode 636 via the first contact hole opening 135F and electrically connected to the gate electrode 622 via the first contact hole opening 135E, the first wiring 132H is electrically connected to the reference voltage power line SVR via the contact hole opening 135B, and the image data signal line 321 is electrically connected to the first electrode 614 via the first contact hole opening 135H.

In addition, as shown in FIG. 13, the second electrode 694, the gate electrode 622, and the semiconductor layer 122A (the channel region 123) overlap. That is, the second transistor T2 (the channel region and the gate electrode 622) overlaps the second electrode 694 of the capacitive element CS.

The insulating layer 131 (FIG. 10) is formed on the conductive layer 132 and on the insulating layer 128 where the conductive layer 132 is not formed (step 17 (S17) of FIG. 11).

As shown in FIG. 10 or FIG. 14, the second contact hole openings 138B, 138C, 138D, 138E, 138F, and 138G are opened (step 18 (S18)). Each opening opens the insulating layer 131 to expose wirings, semiconductor layers or electrodes corresponding to each opening. For example, the second contact hole opening 138B exposes the first wiring 132D and the second contact hole opening 138G exposes the first wiring 132G. Other openings also expose the corresponding wirings, semiconductor layers or electrodes.

The insulating layer 136 (organic insulating layer) (FIG. 10) is formed on the insulating layer 131 (step 19 (S19) of FIG. 11).

As shown in FIG. 10 or FIG. 14, the insulating layer 136 (organic insulating layer) is opened (step 20 (S20)). In the opening of S20, the organic insulating film opening 138A for the capacitive element CS is opened. Furthermore, in the opening of S20, the second contact hole openings 138B, 138C, 138D, 138E, 138F, and 138G are opened similar to the opening of S18. That is, the second contact hole openings 138B, 138C, 138D, 138E, 138F, and 138G are opened twice. Each opening opens the insulating layer 136 to expose wirings, semiconductor layers or electrodes corresponding to each opening. For example, the organic insulating film opening 138A for the capacitive element CS removes only the insulating layer 136 on the second electrode 694 and exposes the insulating layer 131. On the other hand, the second contact hole opening 138G removes the insulating layers 136 and 131 on the first wiring 132G and exposes the first wiring 132G. Other openings also expose the corresponding wirings, semiconductor layers or electrodes.

The conductive layer 139 (FIG. 10) is formed on the insulating layer 136 and on the insulating layer 131 exposed by the organic insulating film opening 138A for the capacitive element CS (step 21 (S21). As shown in FIG. 9 or FIG. 10, the conductive layer 139 includes the second wiring 140A (the first electrode 692), the second wiring 140B, the third wiring 140C, and a fourth wiring 140D.

As shown in FIG. 9, in a plan view, the first electrode 692 is electrically connected to the first wiring 132D and the second electrode 656 via the second contact hole opening 138B and the first contact hole opening 135. The second wiring 140B is electrically connected to the first wiring 132H and the reference voltage power line SVR via the second contact hole opening 138D and the first contact hole opening 135B. The third wiring 140C is electrically connected to the first wiring 132E and the initialization voltage power line SVI via the second contact hole opening 138C and the first contact hole opening 135A. The fourth wiring 140D is electrically connected to the first wiring 132G, the gate electrode 622, and the second electrode 636 via the second contact hole opening 138G, the first contact hole opening 135F, and the first contact hole opening 135E, and is electrically connected to the first wiring 132F and the second electrode 646 via the second contact hole opening 138F and the first contact hole opening 135K.

The second wiring 140B overlaps the reference voltage power line SVR and extends in parallel along the second direction D2. Therefore, since the reference voltage power line SVR is formed using the two-layer metal wiring, the wiring resistance is smaller than the voltage line formed by the one-layer metal wiring. As a result, the reference voltage power line SVR has a high current supply capability and can supply a stable voltage to the transistor. Similar to the reference voltage power line SVR, the third wiring 140C overlaps the initialization voltage power line SVI and extends in parallel along the second direction D2. Therefore, similar to the reference voltage power line SVR, since the initialization voltage power line SVI is formed using the two-layer metal wiring, the wiring resistance is smaller than the voltage line formed by the one-layer metal wiring. As a result, the initialization voltage power line SVI has a high current supply capability and can supply a stable voltage to the transistor.

The second wiring 140A (the first electrode 692) included in the second the conductive layer 139 is in contact with the insulating layer 131 and the conductive layer 132 (the first wiring 132D), and the second wiring 140B included in the same conductive layer 139 is in contact with the insulating layer 136. That is, different wirings included in the same conductive layer 139 are in contact with different layers below the same conductive layer 139.

In addition, as shown in FIG. 9, the first electrode 692, the second electrode 694, the gate electrode 622, and the semiconductor layer 122A (the channel region 123) overlap. That is, the second transistor T2 overlaps the capacitive element CS.

Furthermore, the first wiring 132C (the second electrode 694) is formed on the insulating layer 128 formed on the gate wiring 127A (the gate electrode 622) having an area greater than the area of the surface of the second electrode 694. Since the insulating layer 128 reduces the unevenness of the lower layer, the second electrode 694 is formed on the large-area gate electrode 622 and the flat insulating layer 128. In addition, for example, as shown in FIG. 13, in a plan view, the area of the second electrode 694 is larger than the area of the electrode of the same conductive layer 132. That is, the surface of the second electrode 694 is flat, and the area of the second electrode 694 is large. In addition, the thickness of the insulating layer 131 formed on the second electrode 694 is thinner than the thickness of the insulating layer 136. Therefore, the method for manufacturing the display device 10 (the pixel 180) includes forming the first electrode 692 on the large-area gate electrode 622 and on the second electrode 694 with reduced unevenness and the thin insulating layer 131.

The insulating layer 141 (organic insulating layer) (FIG. 10) is formed on the conductive layer 139 and the insulating layer 136 where the conductive layer 139 is not formed (step 22 (S22) of FIG. 11).

As shown in FIG. 9 or FIG. 10, the insulating layer 141 (organic insulating layer) is opened (step 23 (S23)). In the opening of S23, the contact hole opening 147 for an anode electrode is opened. The contact hole opening 147 for an anode electrode removes the insulating layer 141 on the second wiring 140A and exposes the second wiring 140A. The contact hole opening 147 for an anode electrode may be referred to as an organic insulating layer opening.

The anode electrode 143 is provided on the exposed second wiring 140A, on the contact hole opening 147 for an anode electrode and the insulating layer 141, and the functional layer 148 is provided on the upper layer. The common electrode 149 is provided on the functional layer 148 (step 24 (S24)).

After S24, the sealing film 165 and the cover film 158 are provided in this order on the common electrode 149.

As shown in FIG. 10, the manufacturing of the display device 10 (pixel 180) is completed as described above.

[1-9. Speeding Up of p Channel Field-Effect Transistor]

For example, as shown in FIG. 3, the third transistor T3 is a p-channel field-effect transistor, and controls the connection and disconnection between the first node N1 and the second node N2. In order to speed up the operation of the pixel 180, the third transistor T3 needs to quickly transfer the data signal VDATA supplied to the first node N1 to the second node N2.

On the other hand, it is known that, for example, in the conductive state of each of the p-channel field-effect transistor and the n-channel field-effect transistor, carriers are trapped in a trap level, so that the threshold voltage increases. Furthermore, it is known that an operation from the conductive state to the non-conductive state of each transistor becomes slower than an operation of the transistor in the state in which carriers are not trapped in the trap level due to the increase in the threshold voltage (for example, Japanese laid-open patent publication No. 2008-028191).

For example, it is known that such a phenomenon is caused by the fact that the trap level density (density of states) contributing to the hole trap is higher than the trap level density (density of states) contributing to the electron trap in two carriers, the hole and the electron, and that such a phenomenon can occur more significantly in the p-channel field-effect transistor. For example, the density of states contributing to the hole trap is −0.4 eV to Fermi level Ei, and the density of states contributing to the electron trap is the Fermi level Ei to 0.4 eV. In addition, for example, −0.4 eV to Fermi level Ei is referred to as a deep level.

In order to suppress such a phenomenon, the method for manufacturing the display device 10 may include setting a state density of a deep level of the third transistor T3 to $1\times10^{17}\ eV^{-1}\ cm^{-3}$ or less. For example, in the case where the third transistor T3 contains the LTPS, the method for manufacturing the display device 10 includes forming the semiconductor layer 122 by increasing the purity of silane ($SiH_4$) gas. Since the impurity concentration in the LTPS formed by increasing the purity of the gas is reduced, the density of states of the deep level of the third transistor T3 can be reduced by the method for manufacturing the display device 10. In addition, for example, the method for manufacturing the display device 10 includes increasing the crystal grain size of the LTPS according to the energy of the laser radiation used to form the LTPS. Since the grain boundaries are reduced by increasing the crystal grain size of the LTPS, the density of states of the deep level of the third transistor T3 can be reduced by the method for manufacturing the display device 10. As a result, the third transistor T3 can operate at high speed.

2. Second Embodiment

Figure 15:
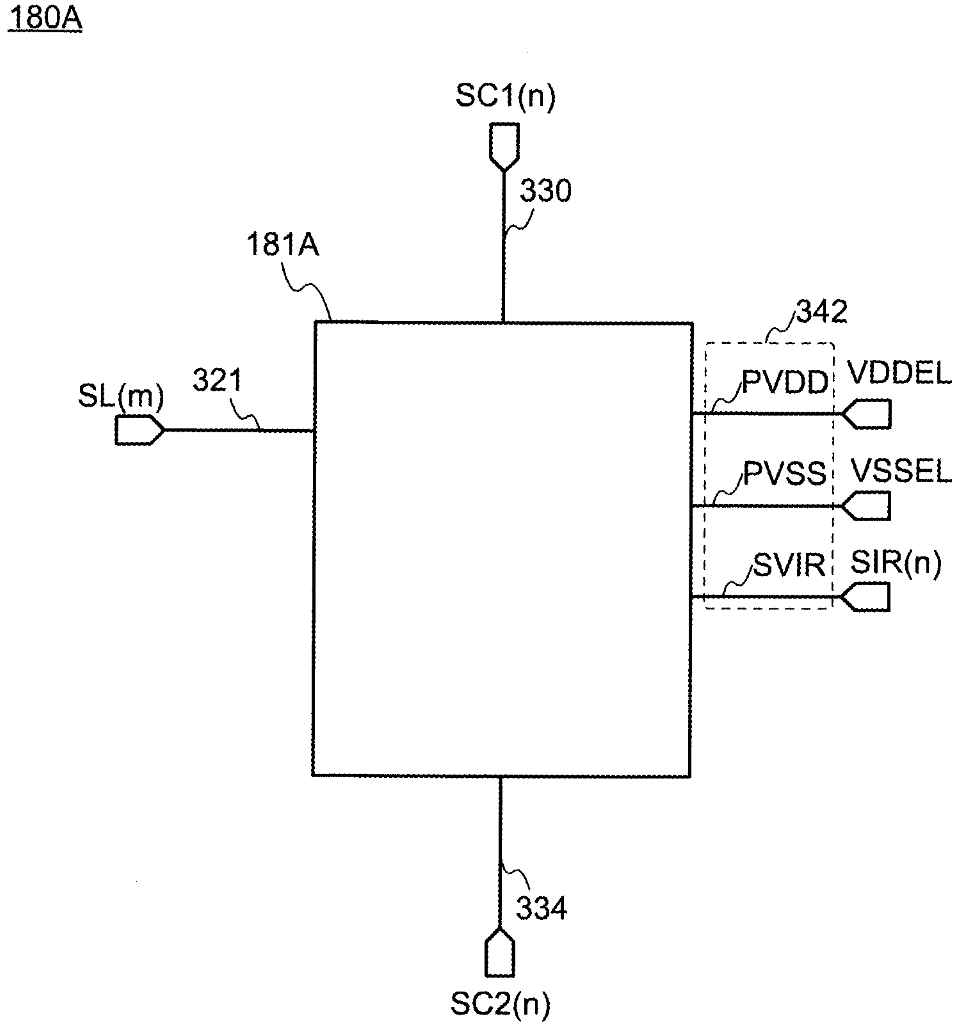
FIG. 15 is a schematic diagram showing an input signal to a pixel circuit according to the second embodiment of the present invention.
Figure 16:
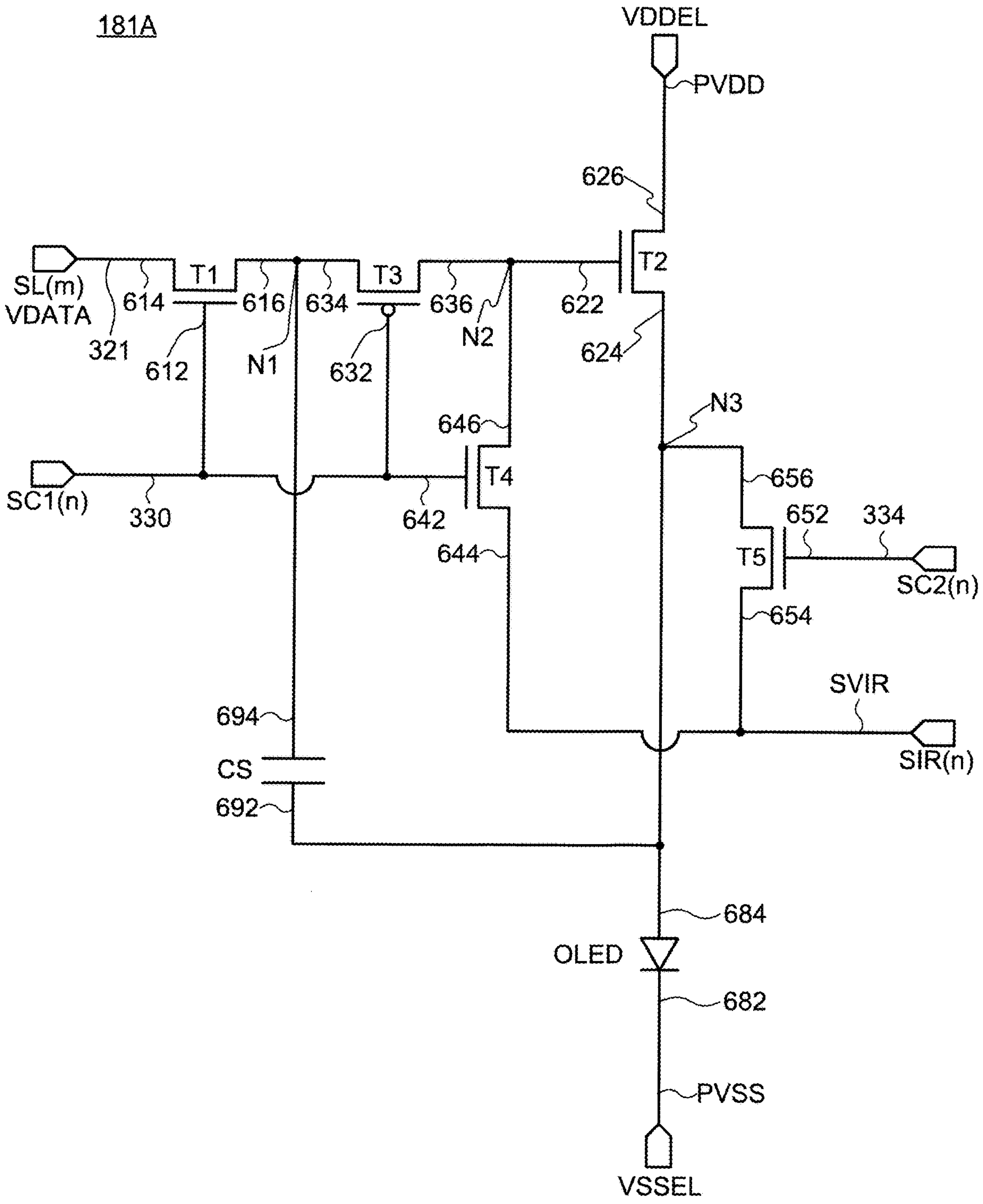
FIG. 16 is a circuit diagram showing a configuration of a pixel circuit according to the second embodiment of the present invention.
Figure 19:
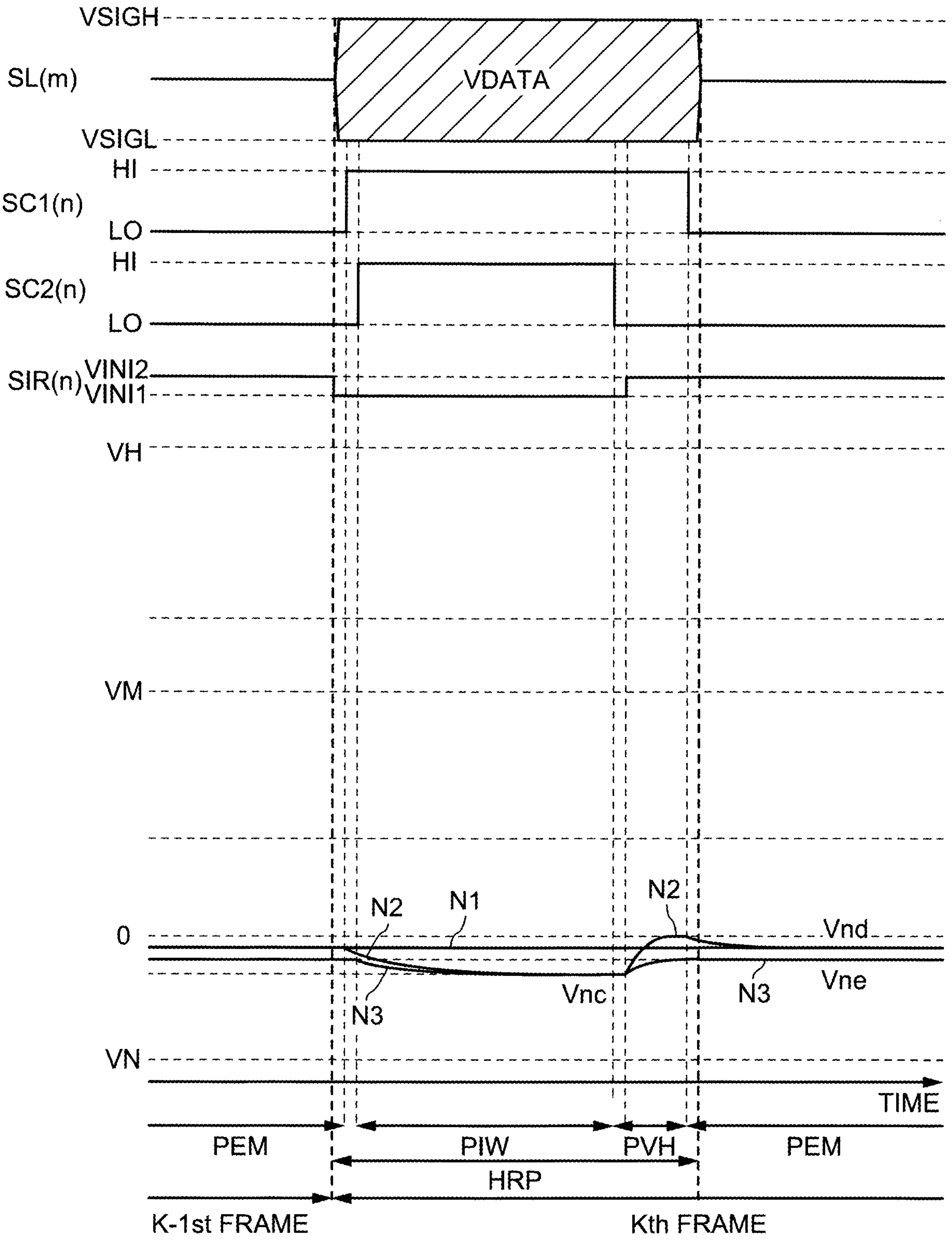
FIG. 19 is a timing chart of a self-luminous display device according to the second embodiment of the present invention.
Figure 20:
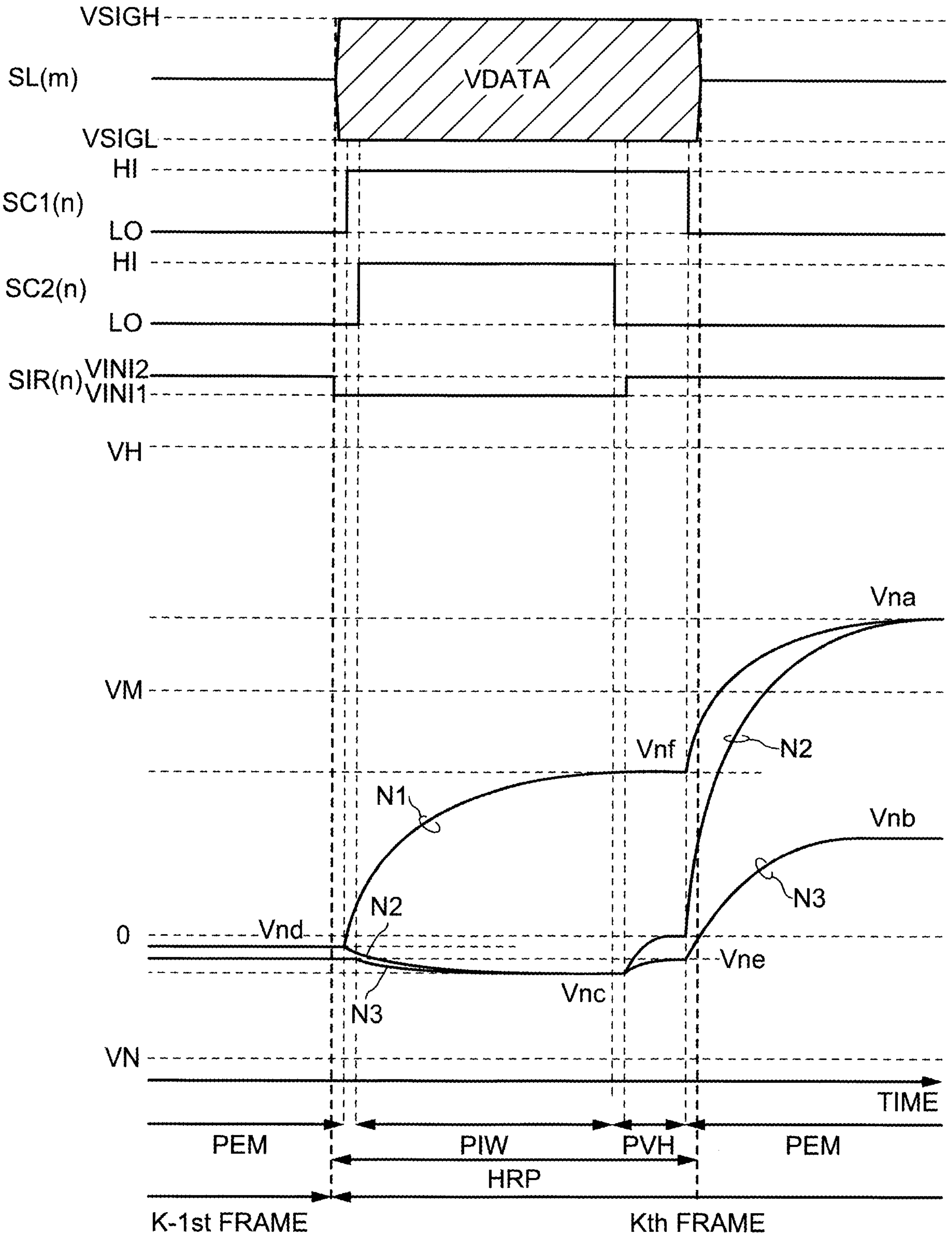
FIG. 20 is a timing chart of a self-luminous display device according to the second embodiment of the present invention.
Figure 21:
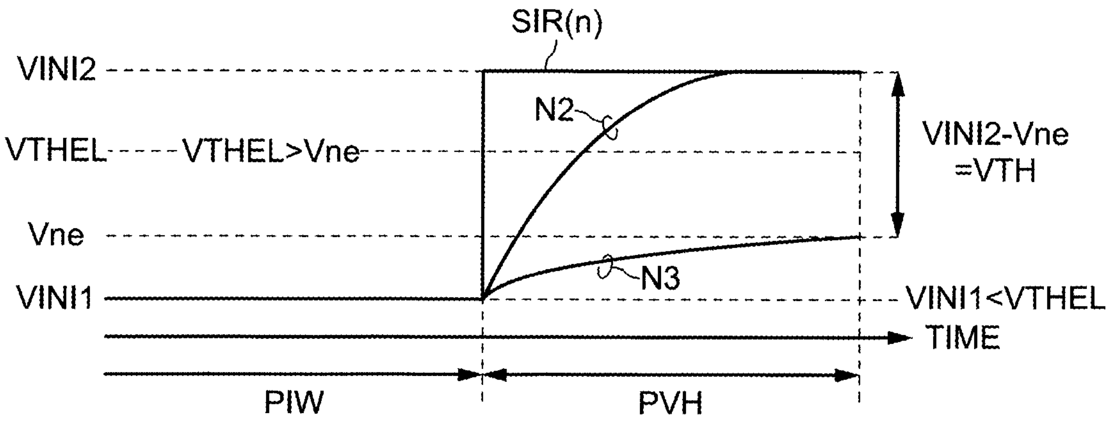
FIG. 21 is a diagram for explaining the setting of an input signal according to the second embodiment of the present invention.

An overview of the display device 10 according to the second embodiment will be described with reference to FIG. 1, FIG. 4, and FIG. 15 to FIG. 21. FIG. 15 is a schematic diagram showing an input signal to a pixel 180A (pixel circuit 181A) according to the second embodiment of the present invention. FIG. 16 is a circuit diagram showing a configuration of the pixel circuit 181A. FIG. 17 to FIG. 20 are timing charts of the display device 10 according to the second embodiment of the present invention. FIG. 21 is a diagram for explaining the setting of an input signal according to the second embodiment of the present invention.

The display device according to the second embodiment has a configuration and function in which the pixel 180 and the pixel circuit 181 of the display device 10 according to the first embodiment are replaced with the pixel 180A and the pixel circuit 181A. Other configurations and functions are similar to those of the display device 10 according to the first embodiment. In describing the configurations and functions of the second embodiment, configurations and functions similar to those of the display device 10 according to the first embodiment will be described as necessary. Configurations that are the same as or similar to those in FIG. 1 to FIG. 14 will be described as necessary.

[2-1. Configuration of Pixel 180A]

An overview of the pixel 180A and the pixel circuit 181A will be described with reference to FIG. 15 and FIG. 16.

The pixel circuit 181A is connected to a scan voltage power line SVIR. The scan voltage power line SVIR is a signal line serving as both the reference voltage power line SVR and the initialization voltage power line SVI supplied to the pixel circuit 181. In other words, the scan voltage power line SVIR is a common signal line that combines the reference voltage power line SVR and the initialization voltage SVI supplied to the pixel circuit 181. The scan voltage power line SVIR is a wiring that functions as a power supply but is handled as a signal line because the potential is changed and used. That is, the pixel circuit 181A has a configuration and function in which the reference voltage power line SVR and the initialization voltage power line SVI connected to the pixel circuit 181 are replaced with the scan voltage power line SVIR that combines the reference voltage power line SVR and the initialization voltage power line SVI. In addition, the pixel circuit 181A has a configuration and function in which the reference voltage VREF and the initialization voltage VINI supplied to the pixel circuit 181 are replaced with a scan voltage power supply SIR(n). The scan voltage power line SVIR (the signal line serving as both the reference voltage power line SVR and the initialization voltage power line SVI) may be referred to as a third control signal line. The scan voltage power supply SIR(n) may be referred to as a third control signal.

The scan voltage power supply SIR(n) is supplied to the scan voltage power line SVIR. In the pixel circuit 181A, the first electrode 644 of the fourth transistor T4 and the first electrode 654 of the fifth transistor T5 are electrically connected to the scan voltage power line SVIR.

For example, the scan voltage power line SVIR is electrically connected to the connection wiring 342 among the connection wiring 342 (FIG. 1 and FIG. 15) that differs from the drive power line PVDD and the reference voltage line PVSS. In addition, for example, the scan voltage power line SVIR may be one of the connection wiring 342.

For example, similar to the initialization voltage VINI, the scan voltage power supply SIR(n) may be supplied from an external device to the IC chip 110 (FIG. 1), and may be supplied from the IC chip 110 to a plurality of pixels 180A (the pixel circuits 181A) via the connection wiring 342 and the scan voltage power line SVIR. Although not shown, similar to the initialization voltage VINI, the scan voltage power supply SIR(n) may be supplied from an external device through the FPC 160, the terminal section 150, and the connection wiring 341 to the plurality of pixels 180A (the pixel circuits 181A) without passing through the IC chip 110 and the connection wiring 342, and connected to the scan voltage power line SVIR.

The fourth transistor T4 has a function of conducting the second node N2 and the scan voltage power line SVIR to supply the initialization voltage VINI1 or VINI2 to the second node N2 and initializing the second node N2. For example, the initialization voltages VINI1 and VINI2 are constant voltages.

The fifth transistor T5 has a function of conducting the third node N3 and the scan voltage power line SVIR to supply the initialization voltage VINI1 to the third node N3 and initializing the third node N3.

Configurations and functions of the pixel circuit 181A other than the configurations and functions described in "2-1. Configuration of Pixel 180A" are similar to those of the pixel circuit 181. The description of configurations and functions similar to the pixel circuit 181 will be omitted here.

[2-2. Driving Method for Pixel Circuit 181A]

A driving method for the display device 10 according to the second embodiment will be described with reference to FIG. 17 to FIG. 20. Configurations that are the same as or similar to those in FIG. 1 to FIG. 16 will be described as necessary. In addition, similar to the first embodiment, the horizontal axis of the timing charts represents time (TIME).

The driving method for the display device 10 according to the second embodiment has a configuration and function in which the operation related to the reference voltage power line SVR and the initialization voltage power line SVI (the reference voltage VREF and the initialization voltage VINI) in the driving method for the display device 10 according to the first embodiment is replaced with the operation related to the scan voltage power supply SIR(n). Configurations and functions other than the operation related to the scan voltage power supply SIR(n) are similar to those of the driving of the display device 10 according to the first embodiment. The description of configurations and functions similar to the driving method for the display device 10 according to the first embodiment will be omitted here.

The driving method for the display device 10 according to the second embodiment includes periods similar to those of the driving method for the display device 10 shown in FIG. 4.

FIG. 17 to FIG. 20 are diagrams for explaining the period PIW and the period PVH of a driving method for the pixel 180A (pixel circuit 181A). FIG. 17 to FIG. 20 show the light emission period PEM of the previous frame (K−1stFRAME) of the current frame, the period PIW and the period PVH of the current frame (KthFRAME). In addition, FIG. 17 to FIG. 20 show one horizontal period (the horizontal period HRP) for one pixel 180A.

In the one horizontal period in the driving method for the display device 10 according to the second embodiment, the first scan signal SC1(*n*), the second scan signal SC2(*n*), the image data signal SL(m) including the data signal VDATA, and the scan voltage power supply SIR(n) are input to the pixel 180A (the pixel circuit 181A). For example, the first scan signal SC1(*n*), the second scan signal SC2(*n*), and the scan voltage power supply SIR(n) are shifted, and the pixel 180A corresponding to the shifted signal is selected. The image data signal SL(m), the initialization voltage VINI, and the reference voltage VREF are input to the selected pixel 180A (the pixel circuit 181A). A similar operation is performed for all the pixels 180A, and an image of the frame corresponding to 1FRAME is displayed in the display region 22 of the display device 10 based on the image data signal SL(m) input to all the pixel 180A.

For example, the voltages (potentials) supplied to each signal and each node of each frame in the timing charts shown in FIG. 17 to FIG. 20 are shown in Table 3 and Table 4.

TABLE 3

| | PIW | PVH | PEM |
|---|---|---|---|
| SC1(n) | HI | HI | LO |
| SC2(n) | HI | LO | LO |
| SIR(n) | −1.5 [V] | 0 [V] | 0 [V] |
| SL(m) | −0.5 [V](Black) ~3.5 [V](White) | — | — |
| N1 | −0.5 [V](Black) ~3.5 [V](White) | −0.5 [V] ~3.5 [V] | Rise in conjunction with the rise of potential of N3 |
| N2 | −1.5 [V] | 0 [V] | In conjunction with potential of N1 |
| N3 | −1.5 [V] | −1 [V] (=VINI2-VTH) | Rise in conjunction with Ion with VGS |
| Vgs (=V(N2)-V(N3)) | 0 [V] | 1 [V] | |
| Remarks | Initializ T2 and OLED Apply VDATA to CS | Acquiring and retaining VTH Potential of N3 = VINI2-VTH Potential of N1-Potential of N3 = VDATA-(VINI2-VTH) Non-light emitting below VTHEL | Light emitting VGS = VDATA-(VINI2-VTH) |

TABLE 4

| | Setting value [V] |
|---|---|
| VTH | 1 |
| VTHEL | 0.7 |
| VDATA(Black) | −0.5 |
| VDATA(White) | 3.5 |
| HI | 10 |
| LO | −3.5 |
| VINI1 | −1.5 |
| VINI2 | 0 |
| VDDEL | 8 |
| VSSEL | 0 |

[2-2-1. First Example of Driving Method for Pixel Circuit 181A]

Figure 17:
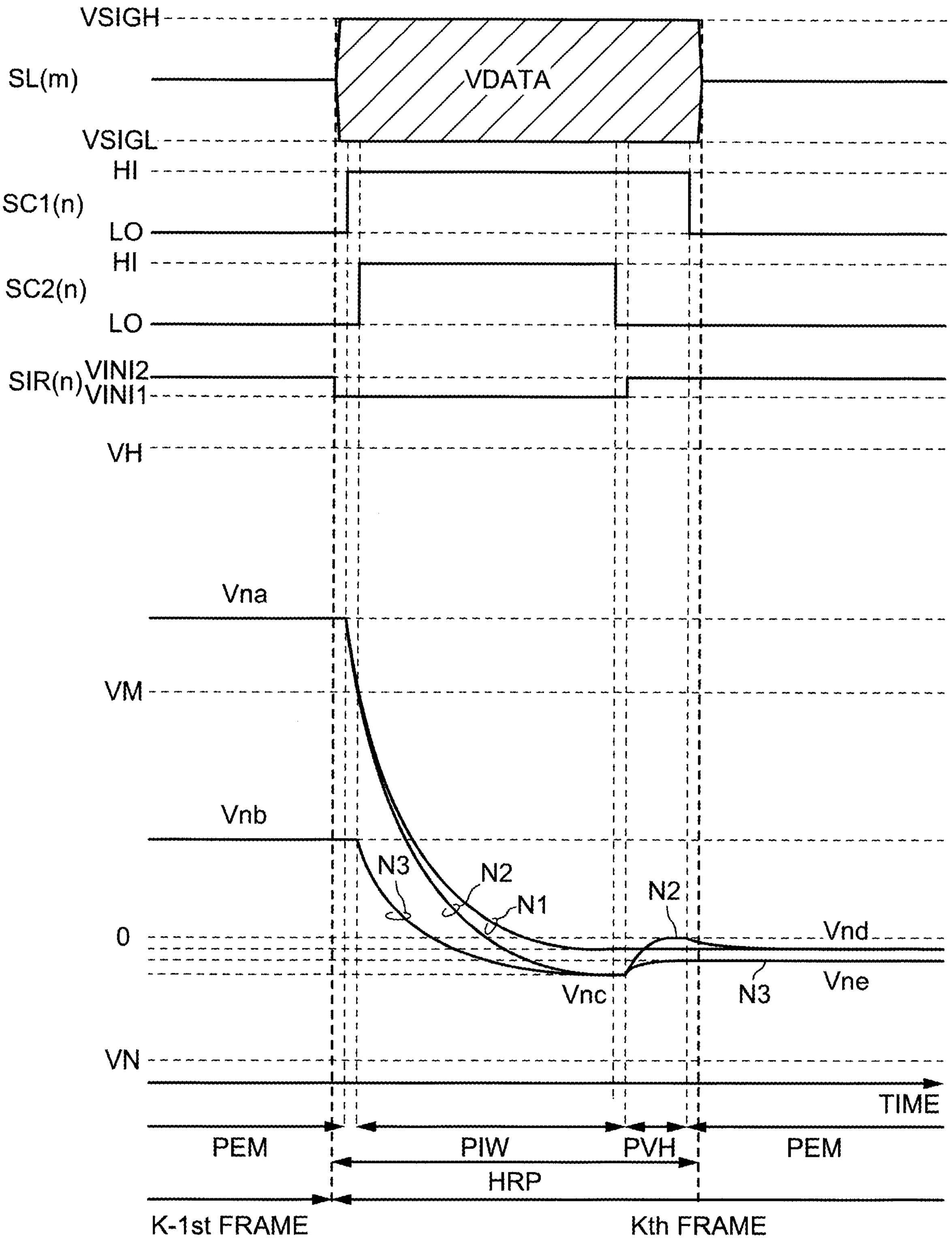
FIG. 17 is a timing chart of a self-luminous display device according to the second embodiment of the present invention.

A first example of a driving method for the pixel circuit 181A will be described with reference to FIG. 17. Similar to the first example of the driving method for the display device 10 according to the first embodiment, the first example of the driving method for the pixel circuit 181A includes displaying images of different colors in consecutive frames.

The configurations of the image data signal SL(m), the first scan signal SC1(*n*), and the second scan signal SC2(*n*) in the light emission period PEM of the K−1stFRAME, the one horizontal period HRP and the light emission period PEM of the K−1stFRAME are similar to those of the first example of the display device 10 according to the first embodiment. In addition, the voltages (potentials) of the first node N1, the second node N2, and the third node N3, in the light emission period PEM of the K−1stFRAME, the operation of the respective transistors, and the like are similar to those described in "1-6-1. First Example of Driving Method for Display device 10". The configuration and the like similar to those described in "1-6-1. First Example of Driving Method for Display device 10" will be described as necessary.

Furthermore, in the scan voltage power supply SIR(n), the initialization voltage VINI2 is supplied in the light emission period PEM of the K−1stFRAME, the initialization voltage VINI1 is supplied in the first period and the period PIW of the KthFRAME, and the initialization voltage VINI2 is supplied in the period PVH and the light emission period PEM of the KthFRAME.

For example, as shown in Table 4, the initialization voltage VINI2 is 0 V and the initialization voltage VINI1 is −1.5 V. The initialization voltage VINI2 is the same as the reference voltage VREF, and the initialization voltage VINI1 is the same as the initialization voltage VINI. In addition, for example, similar to the first example of the display device 10 according to the first embodiment, the voltage VH is 10 V, the voltage VM is 5 V, and the voltage VN is −5 V.

In the first period of the one-horizontal period HRP of the KthFRAME following the light emission period PEM of the K−1stFRAME, the scan voltage power supply SIR(n) changes from a state in which the initialization voltage VINI2 is supplied to a state in which the initialization voltage VINI1 is supplied. When the scan voltage power supply SIR(n) is supplied with the initialization voltage VINI1, the first scan signal SC1(*n*) changes from the state in which LO is supplied to the state in which HI is supplied. In addition, the second scan signal SC2(*n*) is in the state in which LO is supplied. Therefore, the first transistor T1 and the fourth transistor T4 are turned from the OFF state to the ON state, the third transistor T3 is turned from the ON state to the OFF state, and the fifth transistor T5 is maintained in the OFF state. As a result, the voltage supplied to the first node N1 gradually drops from the voltage Vna toward the voltage VSIGL (voltage Vnd, −0.5 V), and the voltage supplied to the second node N2 gradually drops from the voltage Vna toward the initialization voltage VINI1(−1.5 V). Furthermore, in response to the drop in the voltage supplied to the second node N2, the second transistor T2 changes from the ON state to the OFF state.

In the period PIW, the image data signal SL(m) maintains the state in which the data signal VDATA including the voltage VSIGL is supplied, the first scan signal SC1(*n*) maintains the state in which HI is supplied, and the scan voltage power supply SIR(n) maintains the state in which the initialization voltage VINI1 is supplied. In addition, the second scan signal SC1(*n*) changes from the state in which LO is supplied to the state in which HI is supplied. Therefore, the fifth transistor T5 is turned from the OFF state to the ON state, the first transistor T1 and the fourth transistor T4 are maintained in the ON state, and the third transistor is maintained in the OFF state. In addition, during the end of the period PIW, the image data signal SL(m) is maintained in the state in which the data signal VDATA including the voltage VSIGL is supplied, the first scan signal SC1(*n*) is maintained in the state in which HI is supplied, and the scan voltage power supply SIR(n) is maintained in the state in which the initialization voltage VINI1 is supplied. Furthermore, the second scan signal SC1(*n*) is turned from the state in which HI is supplied to the state in which LO is supplied. Therefore, the fifth transistor T5 is turned from the ON state to the OFF state, the first transistor T1 and the fourth transistor T4 are maintained in the ON state, and the third transistor is maintained in the OFF state.

As a result, the voltage supplied to the first node N1 gradually drops from the voltage Vna toward the voltage VSIGL (voltage Vnd, −0.5 V) and becomes the voltage Vnd (−0.5 V). The voltage supplied to the second node N2 gradually drops from the voltage Vna toward the initialization voltage VINI1 (−1.5 V) and becomes the initialization voltage VINI1 (−1.5 V). In addition, the voltage supplied to the third node N3 gradually drops from the voltage Vnb toward the initialization voltage VINI1 (voltage Vnc, −1.5 V) and becomes the voltage Vnc (−1.5 V). That is, the voltage (−1.5 V) supplied to the second node N2 is the same as the voltage (−1.5 V) supplied to the third node N3, the voltage (0 V) supplied to the first node N1 is greater than the voltage (−1.5 V) supplied to the second node N2 and the voltage (−1.5 V) supplied to the third node N3, the potential difference Vgs is 0 V (−1.5 V−(−1.5 V)), and the potential difference Vds is 9.5 V (8 V−(−1.5 V).

As described above, the data signal VDATA including the voltage VSIGL is supplied (written) to the first node N1, and the second node N2 and the third node N3 are initialized by the initialization voltage VINI1 (−1.5 V).

In the period PVH, the image data signal SL(m) maintains the state in which the data signal VDATA including the voltage VSIGL is supplied, the first scan signal SC1(*n*) maintains the state in which HI is supplied, and the second scan signal SC1(*n*) maintains the state in which LO is supplied. In addition, after LO is supplied to the second scan signal SC1(*n*) in the period PIW, the scan voltage power supply SIR(n) changes from the state in which the initialization voltage VINI1 is supplied to the state in which the initialization voltage VINI2 is supplied. When the scan voltage power supply SIR(n) is supplied with the initialization voltage VINI1, the first scan signal SC2(*n*) changes from the state in which HI is supplied to the state in which LOW is supplied. Therefore, the fifth transistor T5 is turned from the ON state to the OFF state, the first transistor T1 and the fourth transistor T4 are maintained in the ON state, and the third transistor is maintained in the OFF state.

Immediately after the start of the period PVH, the potential difference Vgs is 0 V, the potential difference Vds is 9.5 V, and the potential difference Vgs is smaller than the threshold voltage VTH (1 V), so that the second transistor T2 is in the OFF state. Therefore, the drain current Ion does not flow from the second electrode 626 of the second transistor T2 to the first electrode 624.

In the period PVH, since the fourth transistor T4 is maintained in the ON state, when the voltage supplied to the scan voltage power supply SIR(n) is changed from the initialization voltage VINI1 to the initialization voltage VINI2, the voltage supplied to the second node N2 gradually rises from the voltage Vnc (−1.5 V) toward the initialization voltage VINI2 (0 V), and becomes the initialization voltage VINI2 (0 V). In this case, although the fifth transistor T5 is in the OFF state, since the Vgs of the second transistor T2 is directed to 1.5 V greater than the threshold voltage VTH (1 V) 0 V (node N2)−(−1.5 V) (node N3)), the drain current Ion of the second transistor T2 starts to flow, and the voltage supplied to the third node N3 gradually increases from the voltage Vnc (1 V). As a result, the voltage supplied to the third node N3 becomes the voltage Vne (−1 V), and the potential difference Vgs becomes 1 V (0 V−(−1 V)). Since the potential difference Vgs is the same as the threshold voltage VTH (1 V), the second transistor T2 is in the OFF state. Therefore, the drain current Ion does not flow from the second electrode 626 of the second transistor T2 to the first electrode 624.

As described above, in the period PVH, the threshold voltage VTH of the second transistor T2 is obtained by the operation in which the potential difference Vgs of the second transistor T2 becomes the same as the threshold voltage VTH. In addition, the charge equivalent to the threshold voltage VTH is held in the second node N2 (the gate electrode 622 of the second transistor T2).

In the light emission period PEM of the KthFRAME following the horizontal period HRP of the KthFRAME, data is not selected using the selection signal, and the data signal VDATA is maintained at a voltage equal to or higher than the voltage VSIGL and equal to or lower than the voltage VSIGH. In addition, the first scan signal SC1(*n*) changes from the state in which HI is supplied to the state in which LO is supplied, the second scan signal SC2(*n*) is maintained in the state in which LO is supplied, and the scan voltage power supply SIR(n) is maintained in the state in which the initialization voltage VINI2 (0 V) is supplied.

Therefore, the first transistor T1 and the fourth transistor T4 are turned from the ON state to the OFF state, and the third transistor T3 is turned from the OFF state to the ON state. In addition, the fifth transistor T5 is maintained in the OFF state. When the third transistor T3 is turned on, the first node N1 and the second node N2 are conductive, and the potential difference Vgs becomes 0.5 V. The potential difference Vgs is smaller than the threshold voltage VTH. Therefore, since the second transistor T2 is in the OFF state and no current flows from the drive power line PVDD to the reference voltage line PVSS, the light-emitting element OLED does not emit light. As a result, for example, the pixel 180A (the pixel circuit 181A) emitting red light, the pixel 180A emitting blue light, and the pixel 180A emitting green light do not emit light, so that the three pixels using the pixel 180A that emits red, the pixel 180A emitting blue, and the pixel 180A emitting green become black.

As described above, similar to the driving method for the display device 10 according to the first embodiment, the driving method for the display device 10 according to the second embodiment (the driving method for the pixel circuit 181A) includes executing the process (driving) executed in the writing period and the process (driving) executed in the initialization period at the same timing. Therefore, the driving method for the pixel circuit 181A has effects similar to those of the driving method for the display device 10 according to the first embodiment.

In addition, the pixel circuit 181A is connected to the scan voltage power line SVIR serving as both the reference voltage power line SVR and the initialization voltage power line SVI supplied to the pixel circuit 181. Therefore, since the pixel circuit 181A has a configuration capable of reducing the number of signal lines, the display device including the pixel circuit 181A can reduce the size of the pixel. As a result, the display device including the pixel-circuit 181A can increase the number of pixels and achieve high definition.

[2-2-2. Second Example of Driving Method for Pixel Circuit 181A]

Figure 18:
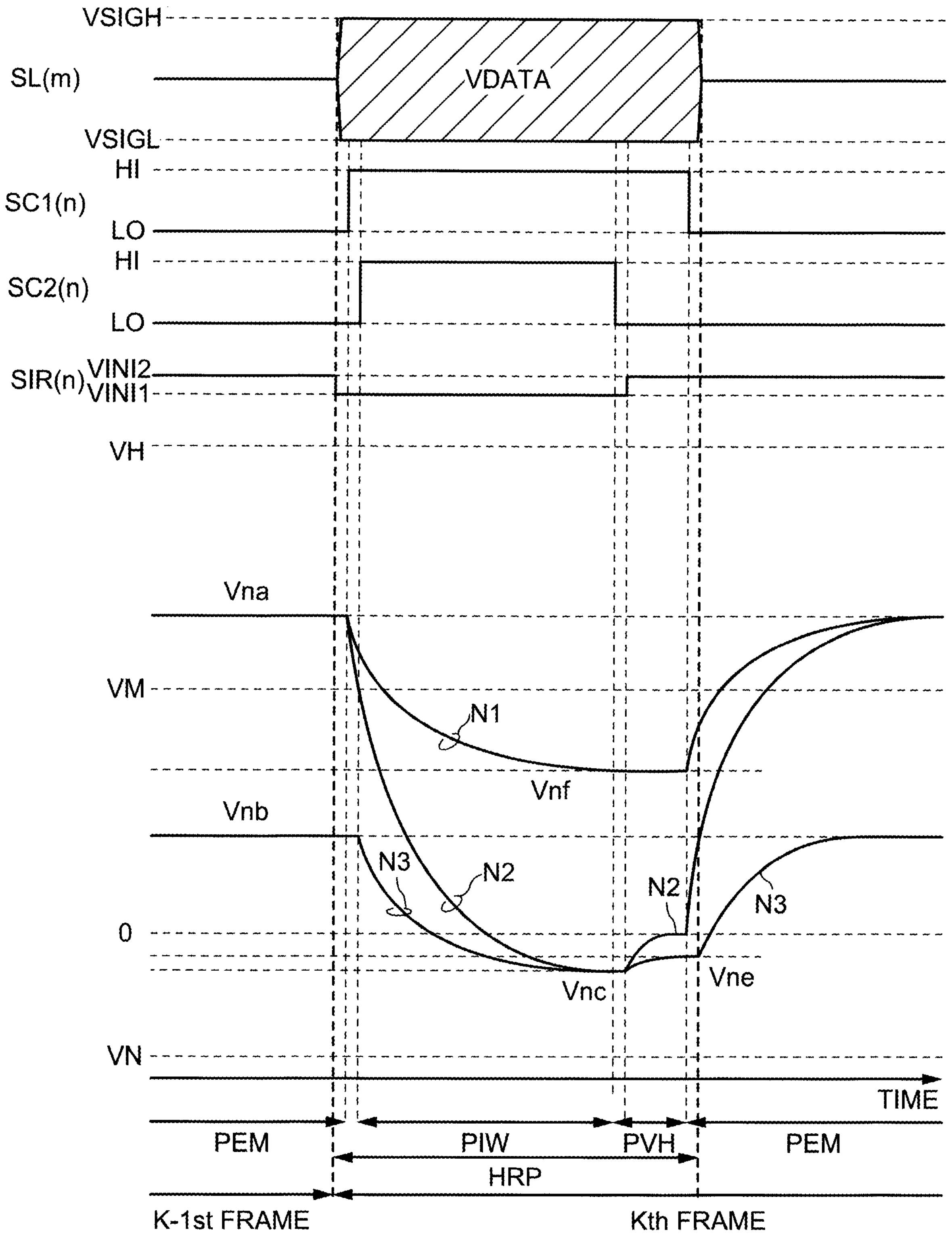
FIG. 18 is a timing chart of a self-luminous display device according to the second embodiment of the present invention.

A second example of the driving method for the pixel circuit 181A will be described with reference to FIG. 18. Similar to the second example of the driving method for the display device 10 according to the first embodiment, the driving method of the pixel circuit 181A shown in the second example includes displaying images of the same color (white) in consecutive frames. Configurations that are the same as or similar to those in FIG. 1 to FIG. 17 will be described as necessary.

The configurations of the image data signal SL(m), the scan voltage power supply SIR(n), the first scan signal SC1(*n*), and the second scan signal SC2(*n*) in the light emission period PEM of the K−1stFRAME, the one horizontal period HRP and the light emission period PEM of the KthFRAME, and the conductive state and the non-conductive state of the respective transistors are similar to those described in "2-2-1. First Example of Driving Method for Pixel Circuit 181A". In addition, the voltages (potentials) of the first node N1, the second node N2, and the third node N3 in the light emission period PEM of the K−1stFRAME, the operation of the respective transistors, and the like are similar to the configurations described in "2-2-1. First Example of Driving Method for Pixel Circuit 181A". Configurations similar to those described in "2-2-1. First Example of Driving Method for Pixel Circuit 181A" will be described as necessary. In addition, configurations and the like similar to "1-6-2. Second Example of Driving Method for Display device 10" will be described as necessary.

In the first period of the one-horizontal period HRP of the KthFRAME, the image data signal SL(m), including the data signal VDATA, including the voltage VSIGH corresponding to white, is input to the pixel 180A (the pixel circuit 181A). The voltage supplied to the first node N1 gradually drops from the voltage Vna toward the voltage VSIGH (voltage Vnf, 3.5 V). The voltage supplied to the second node N2 and the voltage supplied to the third node N3 are similar to those described in "2-2-1".

In the period PIW, the voltage supplied to the first node N1 gradually drops from the voltage Vna toward the voltage Vnf and becomes the voltage Vnf (3.5 V). The voltage supplied to the second node N2, the voltage supplied to the third node N3, the potential difference Vgs, and the potential difference Vds are similar to those described in "2-2-1".

As described above, in the period PIW, the data signal VDATA including the voltage VSIGH is supplied (written) to the first node N1, and the second node N2 and the third node N3 are initialized by the initialization voltage VINI1 (−1.5 V).

In the period PVH following the period PIW, the image data signal SL(m) is maintained in the state in which the data signal VDATA including the voltage VSIGH is supplied. The first node N1 is maintained in the state in which the voltage Vnf is supplied. The voltage supplied to the second node N2, the voltage supplied to the third node N3, the potential difference Vgs, and the potential difference Vds are similar to those described in "2-2-1. First Example of Driving Method for Pixel Circuit 181A".

As described above, similar to that described in "2-2-1", in the period PVH, the threshold voltage VTH of the second transistor T2 is obtained by the operation in which the potential difference Vgs of the second transistor T2 becomes the same as the threshold voltage VTH. In addition, the charge equivalent to the threshold voltage VTH is held in the second node N2 (the gate electrode 622 of the second transistor T2).

Similar to the driving method for the display device 10 according to the first embodiment, in the light emission period PEM of the KthFRAME following the one horizontal period HRP of the KthFRAME, the first node N1 and the second node N2 are conductive, the voltage of the first node N1 and the voltage of the second node N2 gradually rise, the second transistor T2 is in the conductive state, the drain current Ion flows from the drive power line PVDD to the reference voltage line PVSS, and the voltage of the third node N3 rises to follow the rise in the voltage of the first node N1 and the voltage of the second node N2.

As a result, similar to the driving method for the display device 10 according to the first embodiment, the potential difference Vgs becomes 4.5 V, and the potential difference Vgs becomes greater than the threshold voltage VTH. Therefore, the second transistor T2 is in the ON state, and the drain current Ion flows from the drive power line PVDD to the reference voltage line PVSS, so that the light-emitting element OLED emits light. For example, the pixel 180A (the pixel circuit 181A) emits red light, and white light is emitted by three pixels using the pixel 180A emitting red light, the pixel 180A emitting blue light, and the pixel 180A emitting green light.

[2-2-3. Third Example of Driving Method for Pixel Circuit 181A]

A third example of the driving method for the pixel circuit 181A will be described with reference to FIG. 19. Similar to the third example of the driving method for the display device 10 according to the first embodiment, the driving method shown in the third example of the driving method for the pixel circuit 181A includes displaying images of the same color (black) in consecutive frames. Configurations that are the same as or similar to those in FIG. 1 to FIG. 18 will be described as necessary.

The configurations of the image data signal SL(m), the scan voltage power supply SIR(n), the first scan signal SC1(*n*), and the second scan signal SC2(*n*) in the light emission period PEM of the K−1stFRAME, the one horizontal period HRP and the light emission period PEM of the KthFRAME, and the conductive state and the non-conductive state of the respective transistors are similar to those described in "2-2-1. First Example of Driving Method for Pixel Circuit 181A". In addition, the voltages (potentials) of the first node N1, the second node N2, the third node N3 in the light emission period PEM of the K−1stFRAME, the operation of the respective transistors, and the like are similar to the configurations described in the third example of the driving method for the display device 10 according to the first embodiment. Configurations and the like similar to that described in "2-2-1. First Example of Driving Method for Pixel Circuit 181A" and "2-2-2. Second Example of Driving Method for Pixel Circuit 181A" will be described as necessary. In addition, configurations and the like similar to "1-6-3. Third Example of Driving Method for Display device 10" will be described as necessary.

For example, in the light emission period PEM of the K−1stFRAME, the potential difference Vgs becomes 0.5 V, and the potential difference Vgs is smaller than the threshold voltage VTH of the second transistor T2. Since the second transistor T2 is in the OFF state and no current flows from the drive power line PVDD to the reference voltage line PVSS, the light-emitting element OLED does not emit light. As a result, for example, the pixel 180A (the pixel circuit 181A) becomes black.

In the first period of the one horizontal period HRP of the KthFRAME following the light emission period PEM of the K−1stFRAME, the image data signal SL(m), including the data signal VDATA, including the voltage VSIGL (−0.5 V) corresponding to the non-light-emitting black, is input to the pixel 180A (the pixel circuit 181A). The voltage supplied to the first node N1 remains at the voltage Vnd (−0.5 V) and the first node N1 maintains the state in which −0.5 V is supplied. The voltage supplied to the second node N2 gradually drops from the voltage Vnd (−0.5 V) towards the voltage Vnc (−1.5 V).

In the period PIW, the image data signal SL(m) maintains the state in which the data signal VDATA including the voltage VSIGL is supplied. The voltage supplied to the first node N1 remains −0.5 V and the first node N1 is maintained in the state in which −0.5 V is supplied. The voltage supplied to the second node N2 gradually drops from the voltage Vnd toward the voltage Vnc and becomes the voltage Vnc (−1.5 V). In addition, the voltage supplied to the third node N3 gradually drops from the voltage Vne (−1 V) toward the initialization voltage VINI1 (voltage Vnc, −1.5 V) and becomes the voltage Vnc (−1.5 V).

As described above, in the period PIW, the data signal VDATA including the voltage VSIGL (−0.5 V) is supplied (written) to the first node N1, and the second node N2 and the third node N3 are initialized by the initialization voltage VINI1 (−1.5 V).

In the period PVH following the period PIW, the image data signal SL(m) maintains the state in which the data signal VDATA including the voltage VSIGL is supplied. The voltage to be supplied to the first node N1, the voltage to be supplied to the second node N2, the voltage to be supplied to the third node N3, the potential difference Vgs, and the potential difference Vds are similar to those described in "2-2-1. First Example of Driving Method for Pixel Circuit 181A".

As described above, similar to that described in "2-2-1. First Example of Driving Method for Pixel Circuit 181A", in the period PVH, the threshold voltage VTH of the second transistor T2 is obtained by the operation in which the potential difference Vgs of the second transistor T2 becomes the same as the threshold voltage VTH. In addition, the charge equivalent to the threshold voltage VTH is held in the second node N2 (the gate electrode 622 of the second transistor T2).

In the light emission period PEM of the KthFRAME following the one horizontal period HRP of the KthFRAME, the voltage supplied to the first node N1, the voltage supplied to the second node N2, the voltage supplied to the third node N3, the potential difference Vgs, and the potential difference Vds are similar to those described in "2-2-1. First Example of Driving Method for Pixel Circuit 181A". In addition, similar to that described in "2-2-1. First Example of Driving Method for Pixel Circuit 181A", in the light emission period PEM of the KthFRAME following the one horizontal period HRP of the KthFRAME, the pixel 180A emitting red light does not emit light, and the three pixels using the pixel 180A emitting red light, the pixel 180A emitting blue light, and the pixel 180A emitting green light become black.

As described above, in the third example of the driving method for the display device 10 (the driving method for the pixel circuit 181A) according to the second embodiment, similar to the third example of the driving method for the display device 10 according to the first embodiment, since the voltage fluctuation at each node when displaying images of the same color (black) in consecutive frames is small, the power consumption due to the voltage fluctuation at each node can be reduced. Therefore, the display device 10 is a display device that can reduce power consumption.

[2-2-4. Fourth Example of Driving Method for Pixel Circuit 181A]

A fourth example of the driving method for the pixel-circuit 181A will be described with reference to FIG. 20. The driving method shown in the fourth example of the driving method for the pixel circuit 181A includes displaying images of different colors in consecutive frames similar to the fourth example of the driving method for the display device 10 according to the first embodiment. Configurations that are the same as or similar to those in FIG. 1 to FIG. 19 will be described as necessary.

The configurations of the image data signal SL(m), the scan voltage power supply SIR(n), the first scan signal SC1(*n*), and the second scan signal SC2(*n*) in the light emission period PEM of the K−1stFRAME, the one horizontal period HRP of the KthFRAME and the light emission period PEM, the conductive state and the non-conductive state of the respective transistors and the like are similar to those described in "2-2-1. First Example of Driving Method for Pixel Circuit 181A". In addition, the voltages (potentials) of the first node N1, the second node N2, the third node N3 in the light emission period PEM of the K−1stFRAME, the operation of the respective transistors, and the like are similar to those described in "2-2-3. Third Example of Driving Method for Pixel Circuit 181A". Configurations similar to those described in "2-2-1. First Example of Driving Method for Pixel Circuit 181A" to "2-2-3. Third Example of Driving Method for Pixel Circuit 181A" will be described as necessary. In addition, configurations and the like similar to "1-6-4. Fourth Example of Driving Method for Display device 10" will be described as necessary.

In the first period of the one horizontal period HRP of the KthFRAME, the image data signal SL(m), including the data signal VDATA, including the voltage VSIGH corresponding to white, is input to the pixel 180A (the pixel circuit 181A). The voltage supplied to the first node N1 gradually rises from the voltage Vnd (−0.5 V) toward the voltage VSIGH (voltage Vnf, 3.5 V), and the voltage supplied to the second node N2 gradually drops from the voltage Vne (−1 V) toward the voltage Vnc (−1.5 V).

In the period PIW, the voltage supplied to the first node N1 gradually rises from the voltage Vnd (−0.5 V) toward the voltage VSIGH (voltage Vnf, 3.5 V), and the first node N1 is in the state in which the voltage Vnf (3.5 V) is supplied. The voltage supplied to the second node N2 gradually drops from the voltage Vne (−1 V) toward the voltage Vnc (−1.5 V), and the second node N2 is in the state in which the voltage Vnc (−1.5 V) is supplied. In addition, the voltage supplied to the third node N3 gradually drops from the voltage Vne (−1 V) toward the initialization voltage VINI1 (voltage Vnc, −1.5 V), and the third node N3 is in the state in which the voltage Vnc (−1.5 V) is supplied. In this case, the potential difference Vgs becomes 0 V (−1.5 V−(−1.5 V)) and the potential difference Vds becomes 9.5 V (8 V−(−1.5 V)).

As described above, in the period PIW, the data signal VDATA including the voltage VSIGH is supplied (written) to the first node N1, and the second node N2 and the third node N3 are initialized by the initialization voltage VINI1 (−1.5 V).

In the period PVH following the period PIW, similar to that described in "2-2-2", the first node N1 maintains the state in which the voltage Vnf is supplied, the second node N2 maintains the state in which the initialization voltage VINI2 (0 V) is supplied, the voltage supplied to the third node N3 rises from the voltage Vnc to the voltage Vne, and the third node N3 is in the state in which the voltage Vne (−1 V) is supplied.

As described above, in the period PVH, the threshold voltage VTH of the second transistor T2 is obtained by the operation in which the potential difference Vgs of the second transistor T2 becomes the same as the threshold voltage VTH. In addition, the charge equivalent to the threshold voltage VTH is held in the second node N2 (the gate electrode 622 of the second transistor T2).

In the light emission period PEM of the KthFRAME following the one horizontal period of the KthFRAME, the potential difference Vgs becomes 4.5 V similar to that described in "2-2-2. Second Example of Driving Method for Pixel Circuit 181A". The potential difference Vgs is greater than the threshold voltage VTH, the second transistor T2 is in the ON state, and the drain current Ion flows from the drive power line PVDD to the reference voltage line PVSS. As a result, the light-emitting element OLED emits light.

For example, the pixel 180A emits red light, and white light is emitted by three pixels using the pixel 180A emitting red light, the pixel 180A emitting blue light, and the pixel 180A emitting green light.

[2-3. Setting Value of Initialization Voltages VINI1 and VINI2]

Setting values of the initialization voltages VINI1 and VINI2 will be described with reference to FIG. 21. FIG. 21 is a diagram for explaining the setting values of the initialization voltages VINI1 and VINI2 of the scan voltage power line SVIR to which the scan voltage power supply SIR(n) is supplied. Configurations that are the same as or similar to those in FIG. 1 to FIG. 20 will be described as necessary.

For example, as shown in FIG. 21, between the period PIW and the period PVH, the scan voltage power supply SIR(n) changes from the state in which the initialization voltage VINI1 is supplied to the state in which the initialization voltage VINI2 is supplied according to the timings of the first scan signal SC1(*n*) and the second scan signal SC2(*n*).

In the period PIW, in the pixel circuit 181A, the scan voltage power supply SIR(n) (the initialization voltage VINI2) is supplied from the scan voltage power line SVIR to the second node N2 and the third node N3, and the second node N2 and the third node N3 are initialized. The pixel 180A including the pixel circuit 181A does not emit light in the period PIW. The condition that the light-emitting element OLED does not emit light is that the initialization voltage VINI1 supplied to the third node N3 is smaller than the threshold voltage VTHEL of the light-emitting element OLED. That is, the initialization voltage VINI1<the threshold voltage VTHEL.

In addition, the pixel circuit 181A corrects the threshold voltage VTH and holds the charge equivalent to the threshold voltage VTH in the period PVH. The pixel 180A including the pixel circuit 181A does not emit light in the period PVH. The condition that the light-emitting element OLED does not emit light is that the voltage Vne supplied to the third node N3 is smaller than the threshold voltage VTHEL of the light-emitting element OLED. That is, the voltage Vne<the threshold voltage VTHEL.

Furthermore, for example, in the case where the pixel circuit 181A emits light based on the voltage VSIGH (the initialization voltage VINI2) corresponding to white, the initialization voltage VINI2 is supplied to the second node N2 and the voltage Vne is supplied to the third node N3. In this case, the potential difference Vgs is a difference between the voltage supplied to the second node N2 and the voltage supplied to the third node N3, and the potential difference Vgs=the initialization voltage VINI2−the voltage Vne. In addition, since the charge corresponding to the threshold voltage VTH is held in the potential difference Vgs, the initialization voltage VINI2−the voltage Vne=the threshold voltage VTH.

As shown in FIG. 21, the condition of the initialization voltage VINI2 calculated using the above formula is the initialization voltage VINI2<the threshold voltage VTHEL+the threshold voltage VTH. In addition, the condition of the initialization voltage VINI1 is the initialization voltage VINI1<the threshold voltage VTHEL.

3. Third Embodiment

Figure 22:
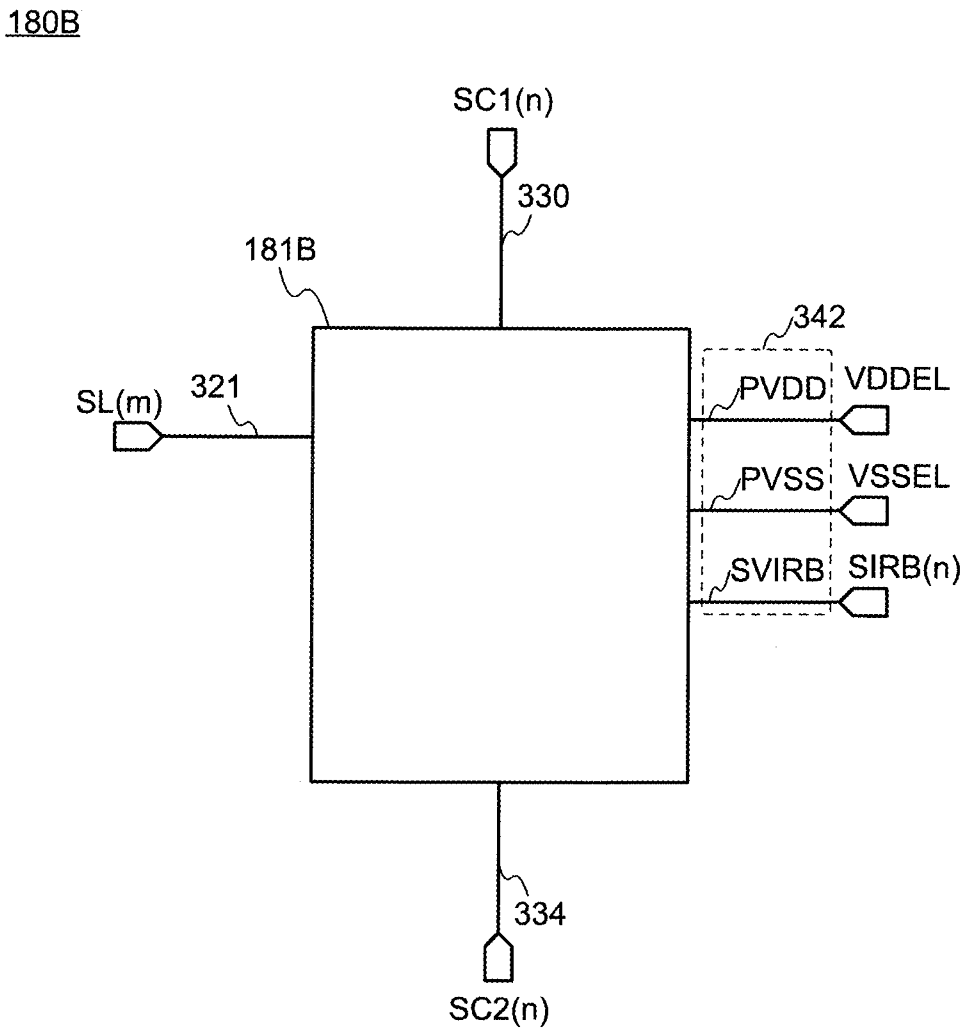
FIG. 22 is a schematic diagram showing an input signal to a pixel circuit according to the third embodiment of the present invention.
Figure 23:
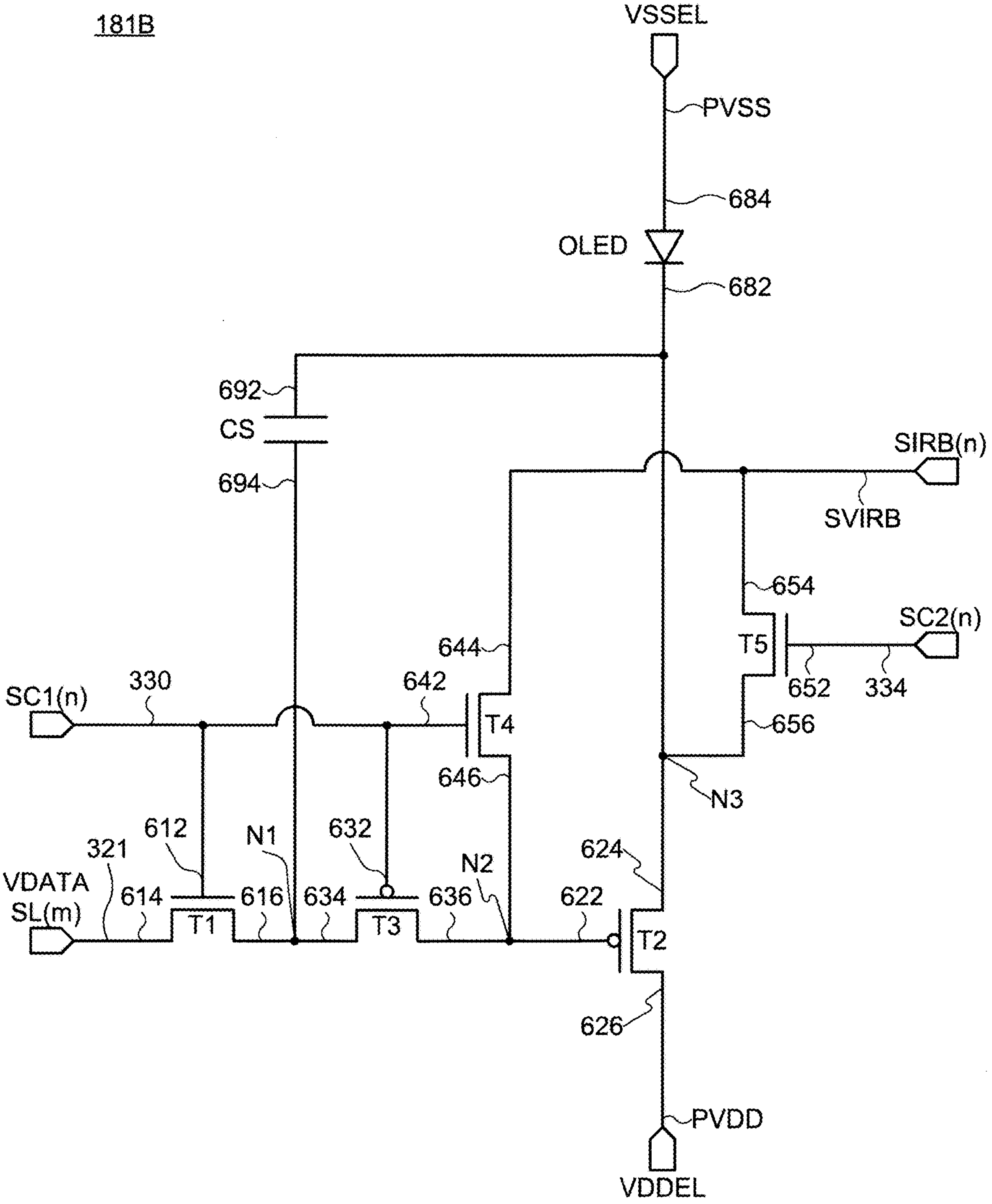
FIG. 23 is a circuit diagram showing a configuration of a pixel circuit according to the third embodiment of the present invention.
Figure 27:
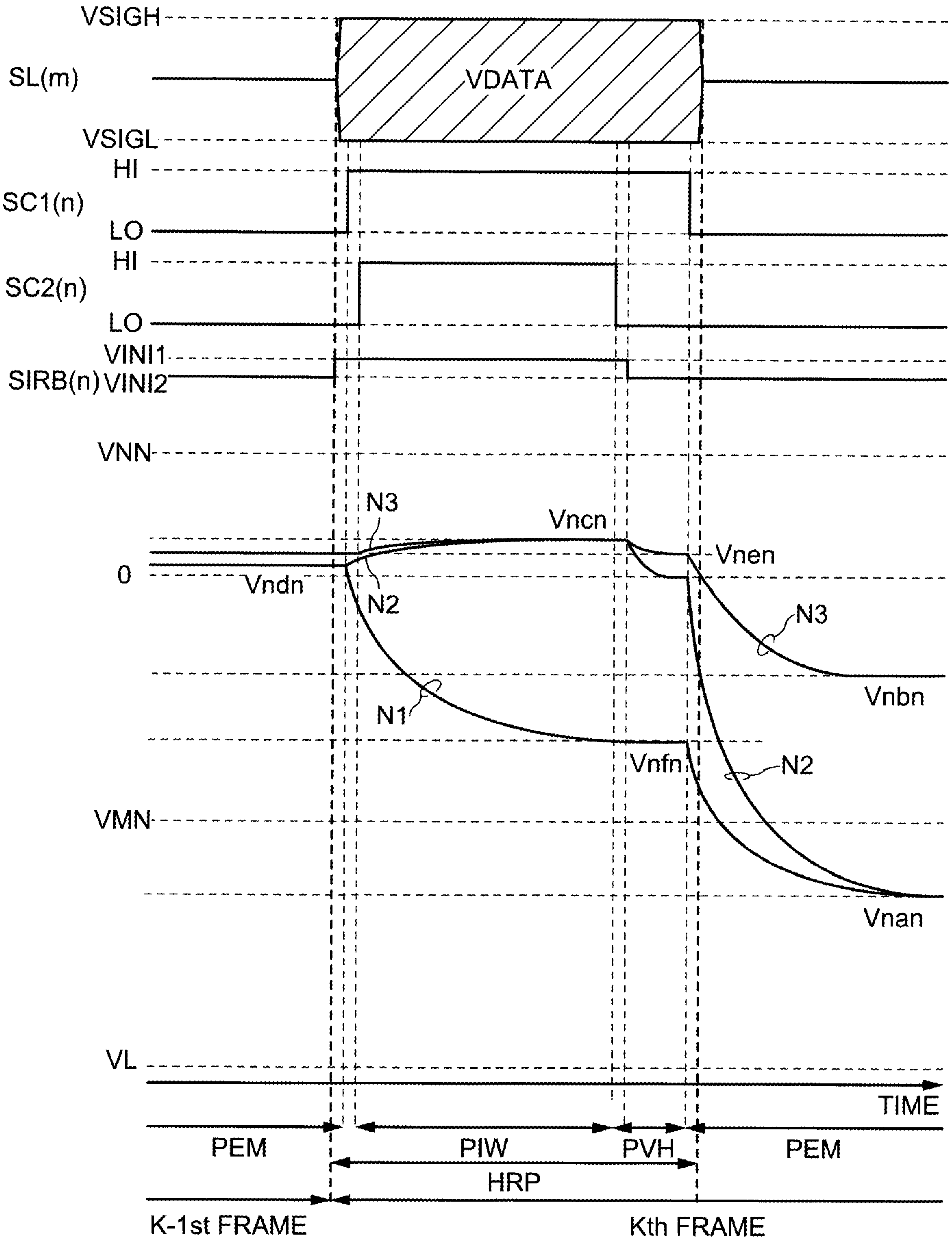
FIG. 27 is a timing chart of a self-luminous display device according to the third embodiment of the present invention.
Figure 28:
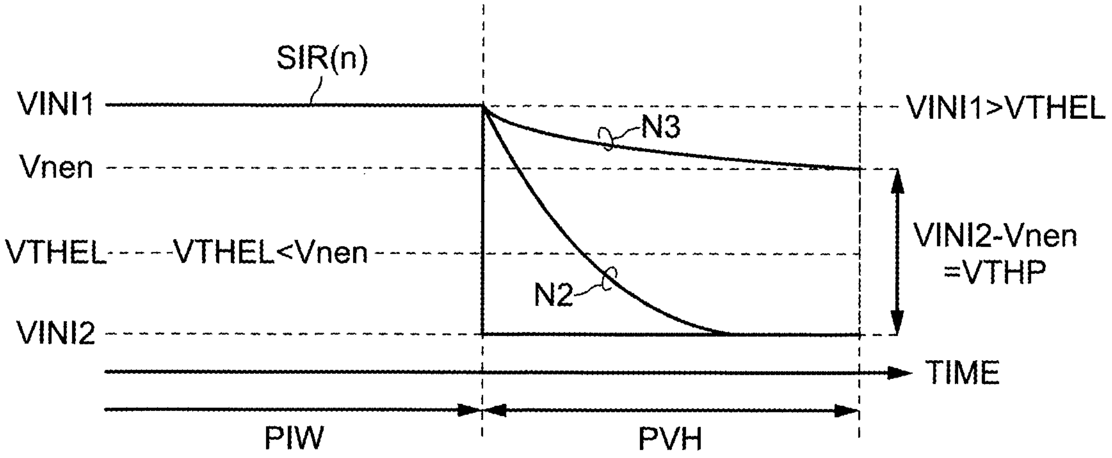
FIG. 28 is a diagram for explaining the setting of an input signal according to the third embodiment of the present invention.

An overview of the display device 10 according to the third embodiment will be described with reference to FIG. 1, FIG. 4, FIG. 22, and FIG. 28. FIG. 22 is a schematic diagram showing an input signal to a pixel 180B (pixel circuit 181B) according to the third embodiment of the present invention. FIG. 23 is a circuit diagram showing a configuration of the pixel circuit 181B. FIG. 24 to FIG. 27 are timing charts of the display device 10 according to the third embodiment of the present invention. FIG. 28 is a diagram for explaining the setting of the input signal according to the third embodiment of the present invention.

The display device according to the third embodiment has a configuration and function in which the pixel 180A and the pixel circuit 181A of the display device 10 according to the second embodiment are replaced with the pixel 180B and the pixel circuit 181B. Other configurations and functions are similar to those of the display device 10 according to the second embodiment. Therefore, in describing the configurations and functions of the third embodiment, configurations and functions similar to those of the display device 10 according to the second embodiment will be described as necessary.

[3-1. Configuration of Pixel 180B]

An overview of the pixel 180B and the pixel circuit 181B will be described with reference to FIG. 22 and FIG. 23.

As shown in FIG. 22 and FIG. 23, the pixel circuit 181B includes a configuration and function in which the scan voltage power line SVIR of the pixel circuit 181A is replaced with a scan voltage power line SVIRB. In addition, as shown in FIG. 23, the configuration of the second transistor T2 and the light-emitting element OLED of the pixel circuit 181B is different from that of the pixel circuit 181A.

Specifically, as shown in FIG. 22, the pixel circuit 181B is connected to the scan voltage power line SVIRB to which a scan voltage power supply SIRB(n) is supplied. Similar to the scan voltage power line SVIR, the scan voltage power line SVIRB is a signal line serving as both the reference voltage power line SVR and the initialization voltage power line SVI. The scan voltage power supply SIRB(n) is a signal obtained by inverting the polarity of the scan voltage power supply SIR(n) supplied to the pixel circuit 181A. Similar to the scan voltage power supply SIRB(n), signals other than the scan voltage power supply SIRB(n) supplied to the pixel circuit 181B are also signals obtained by inverting the polarity of the signals other than the scan voltage power supply SIR(n) supplied to the pixel circuit 181A. The scan voltage power line SVIRB (the signal line serving as both the reference voltage power line SVR and the initialization voltage power line SVI) may be referred to as a third control signal line. The scan voltage power supply SIRB(n) may be referred to as a third control signal.

Specifically, as shown in FIG. 23, the pixel circuit 181B includes the second transistor T2, a p-channel field-effect transistor. In addition, in the pixel circuit 181B, the second electrode 684 of the light-emitting element OLED is electrically connected to the reference voltage line PVSS, and the first electrode 682 of the light-emitting element OLED is electrically connected to the first electrode 624 of the second transistor T2, the third node N3, the second electrode 656 of the fifth transistor T5, and the first electrode 692 of the capacitive element CS. The first electrode 682 of the light-emitting element OLED is, for example, the cathode electrode, and the second electrode 684 of the light-emitting element OLED is, for example, the anode electrode.

The fourth transistor T4 has a function of conducting the second node N2 and the scan voltage power line SVIRB to supply the initialization voltage VINI1 or VINI2 to the second node N2 and initializing the second node N2.

The fifth transistor T5 has a function of conducting the third node N3 and the scan voltage power line SVIRB to supply the initialization voltage VINI2 to the third node N3 and initializing the third node N3.

The configurations and functions of the pixel circuit 181B other than the configurations and functions described in "3-1" are similar to those of the pixel circuit 181 or the pixel circuit 181A.

[3-2. Driving Method for Pixel Circuit 181B]

A driving method for the display device 10 according to the third embodiment will be described with reference to FIG. 24 to FIG. 27. Configurations that are the same as or similar to those in FIG. 1 to FIG. 23 will be described as necessary. Similar to the first embodiment and the second embodiment, the horizontal axis of the timing charts represents time (TIME).

For example, the driving method for the display device 10 according to the third embodiment is a driving method in which the polarities of the respective signals in the driving method for the display device 10 according to the second embodiment are inverted, and is a driving method in which the polarities of the voltages (potentials) supplied to the respective nodes in the driving method for the display device 10 according to the second embodiment are inverted. Other configurations and functions are similar to those of the driving method for the display device 10 according to the first embodiment and the driving method for the display device 10 according to the second embodiment. Therefore, the description of configurations and functions similar to the driving method for the display device 10 according to the second embodiment will be omitted here.

The driving method for the display device 10 according to the third embodiment includes periods similar to those of the driving method for the display device 10 shown in FIG. 4.

FIG. 24 to FIG. 27 are diagrams for explaining the period PIW and the period PVH of the driving method for the pixel 180B (the pixel circuit 181B). FIG. 24 to FIG. 27 show the light emission period PEM of the previous frame (K−1stFRAME) of the current frame, and the period PIW and the period PVH of the current frame (KthFRAME). In addition, FIG. 24 to FIG. 27 show the one horizontal period (the horizontal period HRP) for one pixel 180B.

In the one horizontal period in the driving method for the display device 10 according to the third embodiment, the first scan signal SC1(*n*), the second scan signal SC2(*n*), the image data signal SL(m) including the data signal VDATA, and the scan voltage power supply SIRB(n) are input to the pixel 180B. For example, the first scan signal SC1(*n*), the second scan signal SC2(*n*), and the scan voltage power supply SIR(n) are shifted, and the pixel 180B corresponding to the shifted signal is selected. The image data signal SL(m), the initialization voltage VINI, and the reference voltage VREF are input to the selected pixel 180B. A similar operation is performed for all the pixel 180B, and an image of the frame corresponding to 1FRAME is displayed in the display region 22 of the display device 10 based on the image data signal SL(m) input to all the pixel 180B.

For example, the voltages (potentials) supplied to each signal and each node of each frame in the timing charts shown in FIG. 24 to FIG. 27 are shown in Table 5 and Table 6.

TABLE 5

| | PIW | PVH | PEM |
|---|---|---|---|
| SC1(n) | HI | HI | LO |
| SC2(n) | HI | LO | LO |
| SIR(n) | 1.5 [V] | 0 [V] | 0 [V] |

TABLE 5-continued

| | PIW | PVH | PEM |
|---|---|---|---|
| SL(m) | −3.5 [V](White) ~0.5 [V](Black) | — | — |
| N1 | −3.5 [V](White) ~0.5 [V](Black) | −3.5 [V] ~0.5 [V] | Drop with drop of potential of N3 |
| N2 | 1.5 [V] | 0 [V] | In conjunction with potential of N1 |
| N3 | 1.5 [V] | 1 [V] (=VINI2-VTH) | Drop in conjunction with Ion with VGS |
| Vgs (=V(N2)-V(N3)) | 0 [V] | −1 [V] | |
| Remarks | Initialize T2 and OLED Apply VDATA to CS | Acquiring and retaining VTH Potential of N3 = VINI2-VTHP Potential of N1-Potential of N3 = VDATA-(VINI2-VTHP) Non-light emitting above VTHEL | Light emitting VGS = VDATA-(VINI2-VTHP) |

TABLE 6

| | Setting value [V] |
|---|---|
| VTHP | −1 |
| VTHEL | −0.7 |
| VDATA(Black) | 0.5 |
| VDATA(White) | −3.5 |
| HI | 3.5 |
| LO | −10 |
| VINI1 | 1.5 |
| VINI2 | 0 |
| VDDEL | −8 |
| VSSEL | 0 |

As described above, the polarity of the signal supplied to the pixel circuit 181B is a signal obtained by inverting the polarity of the signal supplied to the pixel circuit 181A. For example, as shown in Table 5, Table 6, and FIG. 24 to FIG. 27, the voltage VSIGL included in the data signal VDATA is −3.5 V, and the pixel 180B to which the voltage VSIGL is supplied emits light. For example, one pixel emits red light, one pixel emits green light, one pixel emits blue light, and white light is emitted by the three pixels. In addition, for example, the voltage VSIGH included in the data signal VDATA is 0.5 V, and the pixel 180B to which the voltage VSIGH is supplied does not emit light and becomes black. Furthermore, for example, a voltage VL (LO) is −10 V, a voltage VNN is 5 V, a voltage VMN is −5 V, the initialization voltage VINI1 is 1.5 V, and the initialization voltage VINI2 is 0 V. For example, the voltage VH (HI), the voltage VL (LO), the voltage VNN, the voltage VMN, the initialization voltage VINI1, and the initialization voltage VINI2 supplied to the voltage 181B correspond to the voltages (potentials) obtained by inverting the polarities of the voltage VN (LO), the voltage VH (HI), the voltage VN, the voltage VM, the initialization voltage VINI2, and the initialization voltage VINI1 supplied to the circuit 181A.

[3-2-1. First Example of Driving Method for Pixel Circuit 181B]

A first example of a driving method for the pixel circuit 181B will be described with reference to FIG. 24. The first example of the driving method for the pixel circuit 181B includes the pixel 180B displaying a white image based on the voltage VSIGL (−3.5 V) included in the data signal VDATA in the previous frame (K−1stFRAME) of the current frame (KthFRAME), and then the pixel 180B displaying a black image based on the voltage VSIGH (0.5 V) included in the data signal VDATA in the KthFRAME. In other words, the first example of the display device 10 according to the third embodiment includes displaying images of different colors in consecutive frames.

As described above, the configurations and functions of the image data signal SL(m), the first scan signal SC1(*n*), and the second scan signal SC2(*n*) in the light emission period PEM of the K−1stFRAME, the one horizontal period HRP and the light emission period PEM of the KthFRAME are similar to those of the signals in which the polarities of the voltages (potentials) of the respective signals of the driving method for the display device 10 according to the second embodiment are inverted. In addition, for example, the voltages (potentials) of the first node N1, the second node N2, and the third node N3 in the light emission period PEM of the K−1stFRAME, the one horizontal period HRP and the light emission period PEM of the KthFRAME are voltages (potentials) obtained by inverting the polarities of the voltages (potentials) of the respective nodes of the driving method for the display device 10 according to the second embodiment. The conduction and non-conduction of the transistors in the light emission period PEM of the K−1stFRAME, the one horizontal period HRP and the light emission period PEM of the KthFRAME are also similar to those described in "2-2-1. First Example of Driving Method for Display device 10".

For example, a voltage Vnan, a voltage Vnbn, a voltage Vncn, a voltage Vndn, a voltage Vnen, and a voltage Vnfn are voltages (potentials) obtained by inverting the polarities of the voltage Vna, the voltage Vnb, the voltage Vnc, the voltage Vnd, the voltage Vne and the voltage Vnf. Referring to the voltages (potentials) in the driving method according to the second embodiment, the voltage Vnan is −7 V, the voltage Vnbn is −2.5 V, the voltage Vncn is 1.5 V, the voltage Vndn is 0.5 V, the voltage Vnen is 1 V, and the voltage Vnfn is −3.5 V.

Figure 24:
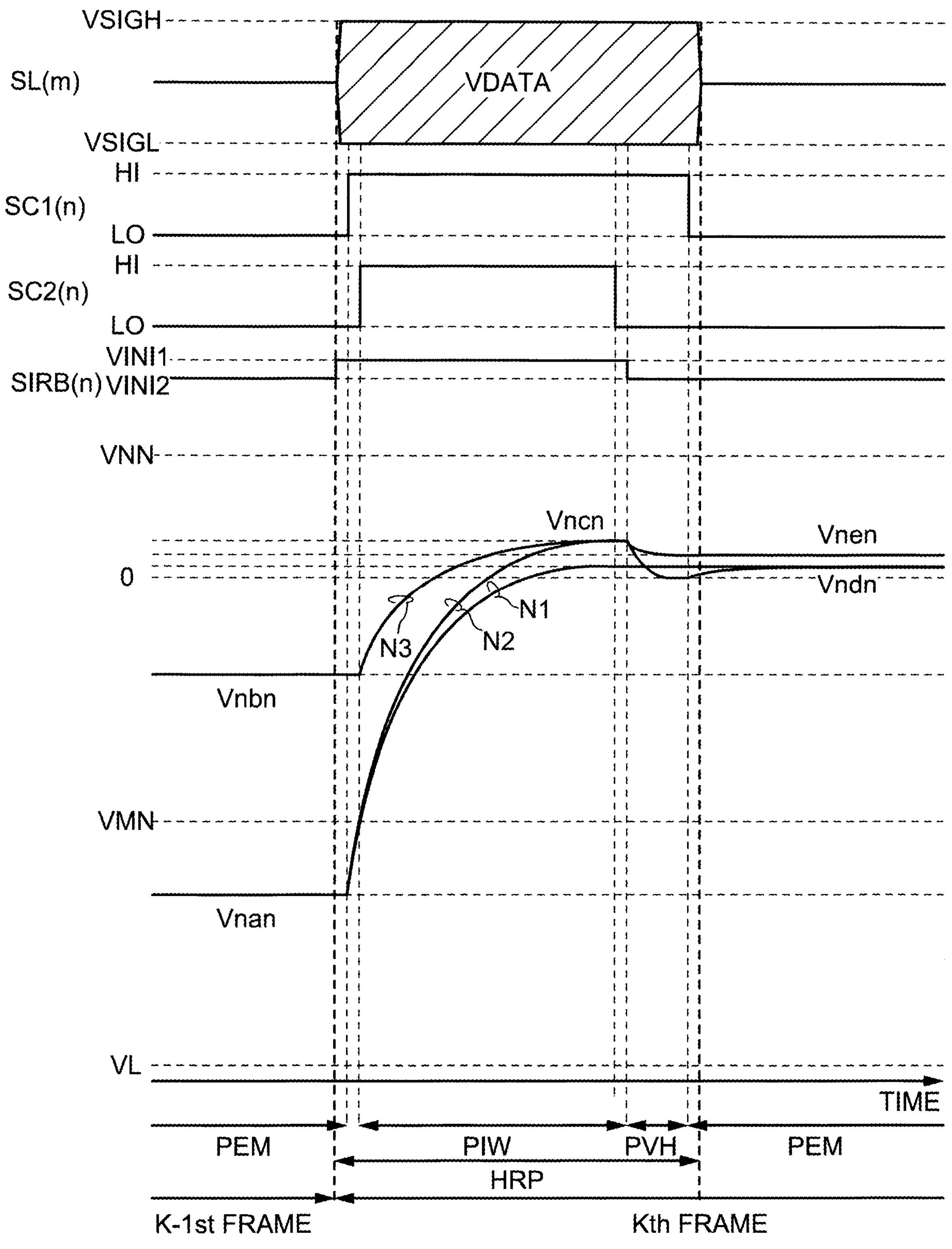
FIG. 24 is a timing chart of a self-luminous display device according to the third embodiment of the present invention.

Referring to the conductive state and the non-conductive state of the respective transistors in the light emission period PEM of the K−1stFRAME of the first example in the driving method according to the second embodiment and FIG. 24, in the light emission period PEM of the K−1stFRAME, the pixel 180B emits light according to the potential difference Vgs of the second transistor T2 (voltage V (N2)−voltage V (N3)=voltage Vnan−voltage Vnbn). The potential difference Vgs is −4.5 V, the pixel 180B emits red light, and white light is emitted by three pixels using the pixel 180B emitting red light, the pixel 180B emitting blue light, and the pixel 180B emitting green light.

In the first period of the one horizontal period HRP of the KthFRAME following the light emission period PEM of the K−1stFRAME, the scan voltage power supply SIRB(n) changes from the state in which the initialization voltage VINI2 (0 V) is supplied to the state in which the initialization voltage VINI1 (1.5 V) is supplied. When the scan voltage power supply SIRB(n) is in the state in which the initialization voltage VINI1 is supplied, the first scan signal SC1(*n*) changes from the state in which LO is supplied to the state in which HI is supplied. In addition, the second scan signal SC2(*n*) is in the state in which LO is supplied. Referring to the conductive state and the non-conductive state of the respective transistors in the first period of the one horizontal period HRP of the KthFRAME of the first example in the driving method according to the second embodiment and FIG. 24, the voltage supplied to the first node N1 gradually rises from the voltage Vnan toward the voltage VSIGH (voltage Vndn), and the voltage supplied to the second node N2 gradually rises from the voltage Vnan toward the initialization voltage VINI1 (voltage Vncn). Furthermore, in response to the drop in the voltage supplied to the second node N2, the second transistor T2 is turned from the ON state to the OFF state.

In the period PIW, the image data signal SL(m) maintains the state in which the data signal VDATA including the voltage VSIGH is supplied. Furthermore, in the period PIW, the first scan signal SC1(*n*) is maintained in the state in which HI is supplied, the scan voltage power supply SIRB (n) is maintained in the state in which the initialization voltage VINI1 is supplied, and the second scan signal SC1(*n*) changes from the state in which LO is supplied to the state in which HI is supplied. In addition, during the end of the period PIW, the image data signal SL(m) maintains the state in which the data signal VDATA including the voltage VSIGL is supplied, the first scan signal SC1(*n*) maintains the state in which HI is supplied, and the scan voltage power supply SIR(n) maintains the state in which the initialization voltage VINI1 is supplied. In addition, the second scan signal SC1(*n*) changes from the state in which HI is supplied to the state in which LO is supplied.

Referring to the conductive state and the non-conductive state of the respective transistors of the period PIW of the first example in the driving method according to the second embodiment and FIG. 24, the voltage supplied to the first node N1 gradually rises from the voltage Vnan toward the voltage VSIGH and becomes the voltage Vndn (0.5 V). The voltage supplied to the second node N2 gradually rises from the voltage Vnan toward the initialization voltage VINI1 (voltage Vncn) and becomes the voltage Vncn (1.5 V). In addition, the voltage supplied to the third node N3 gradually rises from the voltage Vnbn toward the initialization voltage VINI1 (voltage Vnc) and becomes the voltage Vnc (1.5 V). The potential difference Vgs is 0 V, and the potential difference Vds is −9.5 V (−8 V−(1.5 V)).

As described above, in the period PIW, the data signal VDATA including the voltage VSIGH is supplied (written) to the first node N1, and the second node N2 and the third node N3 are initialized by the initialization voltage VINI1 (1.5V).

In the period PVH, the image data signal SL(m) maintains the state in which the data signal VDATA including the voltage VSIGH is supplied. In addition, the first scan signal SC1(*n*) maintains the state in which HI is supplied and the second scan signal SC1(*n*) maintains the state in which LO is supplied. Furthermore, LO is supplied to the second scan signal SC1(*n*) in the period PIW, and then the scan voltage power supply SIRB(n) changes from the state in which the initialization voltage VINI1 is supplied to the state in which the initialization voltage VINI2 is supplied. When the scan voltage power supply SIR(n) is in the state in which the initialization voltage VINI2 is supplied, the first scan signal SC1(*n*) changes from the state in which HI is supplied to the state in which LO is supplied.

Immediately after the start of the period PVH, the potential difference Vgs is 0 V, the potential difference Vds is −9.5 V, and the potential difference Vgs is greater than the threshold voltage VTHP of the second transistor T2 (−1 V, see Table 6), so that the second transistor T2 is in the OFF state. Therefore, the drain current Ion does not flow from the first electrode 624 to the second electrode 626 of the second transistor T2.

In the period PVH, referring to the conductive state and the non-conductive state of the respective transistors in the period PVH of the KthFRAME of the first example in the driving method according to the second embodiment and FIG. 24, since the fourth transistor T4 is maintained in the ON state, when the voltage supplied to the scan voltage power supply SIRB(n) changes from the initialization voltage VINI1 to the initialization voltage VINI2, the voltage supplied to the second node N2 gradually drops from the voltage Vncn (1.5 V) toward the initialization voltage VINI2 (0 V) and becomes the initialization voltage VINI2 (0 V). In this case, although the fifth transistor T5 is in the OFF state, the Vgs of the second transistor T2 towards −1.5 V (0 V (node N2)−(1.5 V) (node 3)), so that the drain current Ion of the second transistor T2 starts to flow, and the voltage supplied to the third node T3 gradually drops from the voltage Vncn (1.5 V) toward the voltage Vne (1 V). As a result, the voltage supplied to the third node N3 becomes the voltage Vnen (1 V), and the potential difference Vgs becomes −1 V (0 V−(1 V)). Since the potential difference Vgs is the same as the threshold voltage VTHP (−1 V), the second transistor T2 is in the OFF state. Therefore, the drain current Ion does not flow from the second electrode 626 of the second transistor T2 to the first electrode 624.

As described above, in the period PVH, the threshold voltage VTHP of the second transistor T2 is obtained by the operation in which the potential difference Vgs of the second transistor T2 becomes the same as the threshold voltage VTHP. In addition, the charge equivalent to the threshold voltage VTHP is held in the second node N2 (the gate electrode 622 of the second transistor T2).

In the light emission period PEM of the KthFRAME following the one horizontal period HRP of the KthFRAME, data is not selected using the selection signal, and the data signal VDATA is maintained at a voltage equal to or higher than the voltage VSIGL and equal to or lower than the voltage VSIGH. In addition, the first scan signal SC1(*n*) changes from the state in which HI is supplied to the state in which LO is supplied, the second scan signal SC2(*n*) is maintained in the state in which LO is supplied, and the scan voltage power supply SIRB(n) is maintained in the state in which the initialization voltage VINI2 (0 V) is supplied.

Therefore, the first transistor T1 and the fourth transistor T4 are turned from the ON state to the OFF state, and the third transistor T3 is turned from the OFF state to the ON state. In addition, the fifth transistor T5 is maintained in the OFF state. When the third transistor T3 is turned on, the first node N1 and the second node N2 are conductive, and the potential difference Vgs becomes −0.5 V. The potential difference Vgs is smaller than the threshold voltage VTHP. Therefore, since the second transistor T2 is in the OFF state and no current flows from the drive power line PVDD to the reference voltage line PVSS, the light-emitting element OLED does not emit light. As a result, for example, the pixel 180B (pixel circuit 181B) emitting red light, the pixel 180B emitting blue light, and the pixel 180B emitting green light do not emit light, so that the three pixels using the pixel 180B emitting red light, the pixel 180B emitting blue light, and the pixel 180B emitting green light become black.

As described above, similar to the driving method for the display device 10 according to the second embodiment, the driving method for the display device 10 according to the third embodiment (the driving method for the pixel circuit 181B) includes executing the process (driving) executed in the writing period and the process (driving) executed in the initialization period at the same timing. In addition, similar to the pixel circuit 181A, the pixel circuit 181B has a configuration capable of reducing the number of signal lines, so that the display device including the pixel circuit 181B can reduce the size of the pixel. Therefore, the display device 10 and the driving method for the display device 10 according to the third embodiment has effects similar to the display device 10 and the driving method for the display device 10 according to the second embodiment.

[3-2-2. Second Example of Driving Method for Pixel Circuit 181B]

Figure 25:
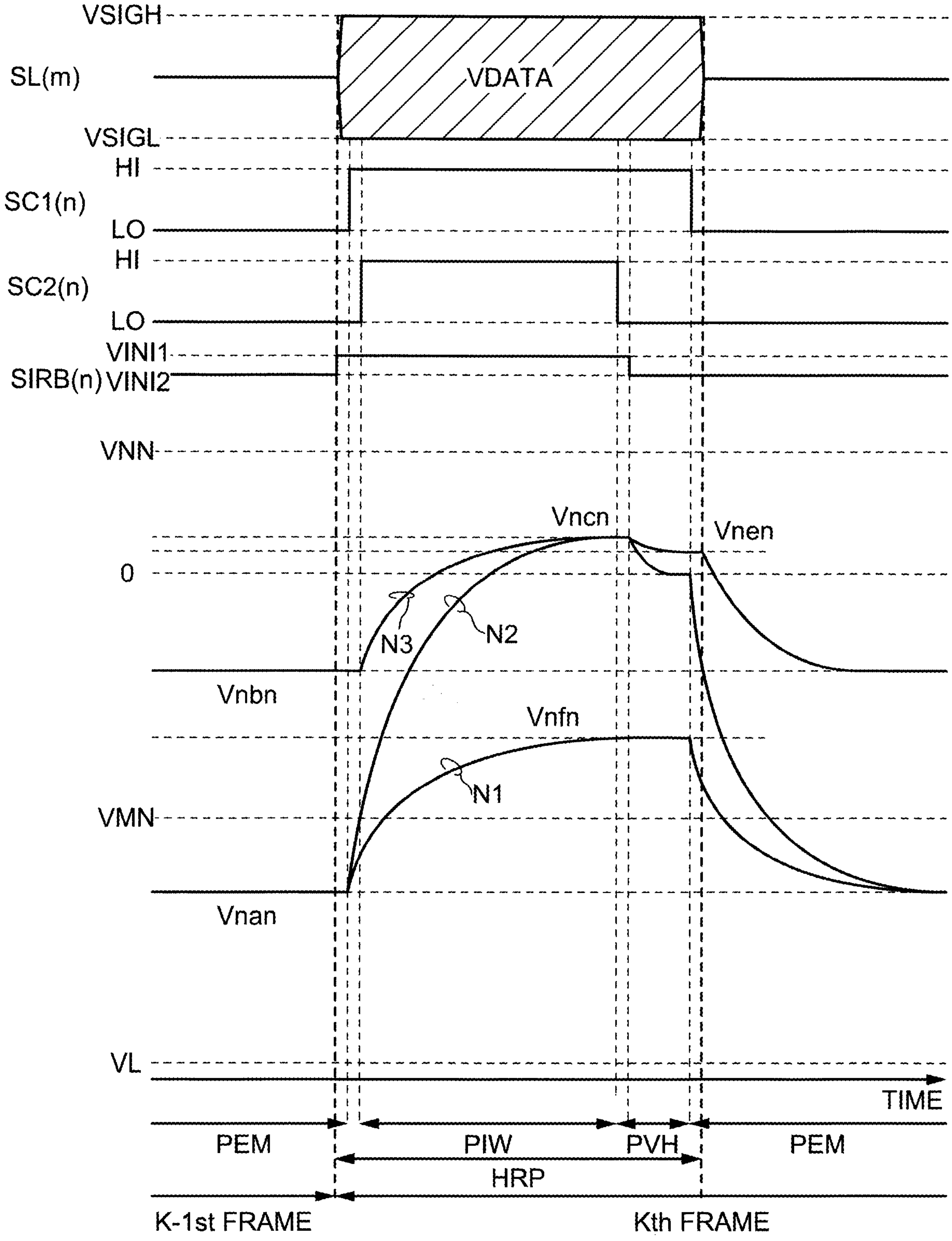
FIG. 25 is a timing chart of a self-luminous display device according to the third embodiment of the present invention.

A second example of the driving method for the pixel circuit 181B will be described with reference to FIG. 25. The driving method shown in the second example of the pixel circuit 181B includes the pixel 180B displaying a white image based on the voltage VSIGL (−3.5 V) included in the data signal VDATA in the previous frame (K−1stFRAME) of the current frame (KthFRAME), and then the pixel 180B displaying a white image based on the voltage VSIGL (−3.5 V) included in the data signal VDATA even in the KthFRAME. In other words, the second example of the display device 10 according to the third embodiment includes displaying images of the same color (white) in consecutive frames. Configurations that are the same as or similar to those in FIG. 1 to FIG. 24 will be described as necessary.

The configuration of the image data signal SL(m), the scan voltage power supply SIRB(n), the first scan signal SC1(*n*), and the second scan signal SC2(*n*) in the light emission period PEM of the K−1stFRAME, the one horizontal period HRP and the light emission period PEM of the KthFRAME, and the conductive state and the non-conductive state of the respective transistors are similar to those described in "3-2-1". In addition, the voltages (potentials) of the first node N1, the second node N2, the third node N3 in the light emission period PEM of the K−1stFRAME, the operation of the respective transistors and the like are similar to those described in "3-2-1. First Example of Driving Method for Pixel Circuit 181B". Configurations and the like similar to that described in "3-2-1. First Example of Driving Method for Pixel Circuit 181B" will be described as necessary. In addition, configurations and the like similar to that described in "2-2-2. Second Example of Driving Method for Pixel Circuit 181A" will be described as necessary.

In the first period of the one horizontal period HRP of the KthFRAME, the image data signal SL(m), including the data signal VDATA, including the voltage VSIGL corresponding to white, is input to the pixel 180B. The voltage supplied to the first node N1 gradually rises from the voltage Vnan toward the voltage VSIGL (voltage Vnfn, −3.5 V). The voltage supplied to the second node N2 and the voltage supplied to the third node N3 are similar to those described in "3-2-1. First Example of Driving Method for Pixel Circuit 181B".

In the period PIW, the voltage supplied to the first node N1 gradually rises from the voltage Vnan toward the voltage Vnfn and becomes the voltage Vnfn (−3.5 V). The voltage supplied to the second node N2, the voltage supplied to the third node N3, the potential difference Vgs, and the potential difference Vds are similar to those described in "3-2-1. First Example of Driving Method for Pixel Circuit 181B".

As described above, in the period PIW, the data signal VDATA including the voltage VSIGL is supplied (written) to the first node N1, and the second node N2 and the third node N3 are initialized by the initialization voltage VINI1 (1.5 V).

In the period PVH following the period PIW, the image data signal SL(m) maintains the state in which the data signal VDATA including the voltage VSIGL is supplied. The first node N1 maintains the state in which the voltage Vnfn is supplied. The voltage supplied to the second node N2, the voltage supplied to the third node N3, the potential difference Vgs, and the potential difference Vds are similar to those described in "3-2-1. First Example of Driving Method for Pixel Circuit 181B".

As described above, similar to that described in "3-2-1", in the period PVH, the threshold voltage VTHP of the second transistor T2 is obtained by the operation in which the potential difference Vgs of the second transistor T2 becomes the same as the threshold voltage VTHP. In addition, the charge equivalent to the threshold voltage VTHP is held in the second node N2 (the gate electrode 622 of the second transistor T2).

In the light emission period PEM of the KthFRAME following the one horizontal period HRP of the KthFRAME, referring to the conductive state and the non-conductive state in the driving method according to the second embodiment and FIG. 4, the first node N1 and the second node N2 are conductive, the voltage of the first node N1 and the voltage of the second node N2 gradually drop, the second transistor T2 is in the conductive state, the drain current Ion flows from the reference voltage line PVSS to the drive power line PVDD, and the voltage of the third node N3 drops to follow the drop in the voltage of the first node N1 and the voltage of the second node N2.

As a result, the potential difference Vgs (voltage Vnan (−7 V)−voltage Vnbn (−2.5 V)) becomes −4.5 V, and the potential difference Vgs becomes smaller than the threshold voltage VTHP (−1 V). Therefore, the second transistor T2 is in the ON state, and the drain current Ion flows from the reference voltage line PVSS to the drive power line PVDD, so that the light-emitting element OLED emits light. For example, the pixel 180B (the pixel circuit 181B) becomes red and emits white light by three pixels using the pixel 180B emitting blue light and the pixel 180B emitting green light.

[3-2-3. Third Example of Driving Method for Pixel Circuit 181B]

A third example of the driving method for the pixel circuit 181B will be described with reference to FIG. 26. The driving method for the pixel circuit 181B shown in the third example includes the pixel 180B displaying a black image in the previous frame (K−1stFRAME) of the current frame (KthFRAME) based on the voltage VSIGL included in the data signal VDATA, and then the pixel circuit 181B displaying a black image based on the voltage VSIGH included in the data signal VDATA even in the KthFRAME. In other words, the method includes displaying images of the same color (black) in consecutive frames. Configurations that are the same as or similar to those in FIG. 1 to FIG. 25 will be described as necessary.

The configuration of the image data signal SL(m), the scan voltage power supply SIRB(n), the first scan signal SC1(*n*), and the second scan signal SC2(*n*) in the light emission period PEM of the K−1stFRAME, the one horizontal period HRP and the light emission period PEM of the KthFRAME, and the conductive state and the non-conductive state of the respective transistors are similar to those described in "3-2-1. First Example of Driving Method for Pixel Circuit 181B".

Figure 26:
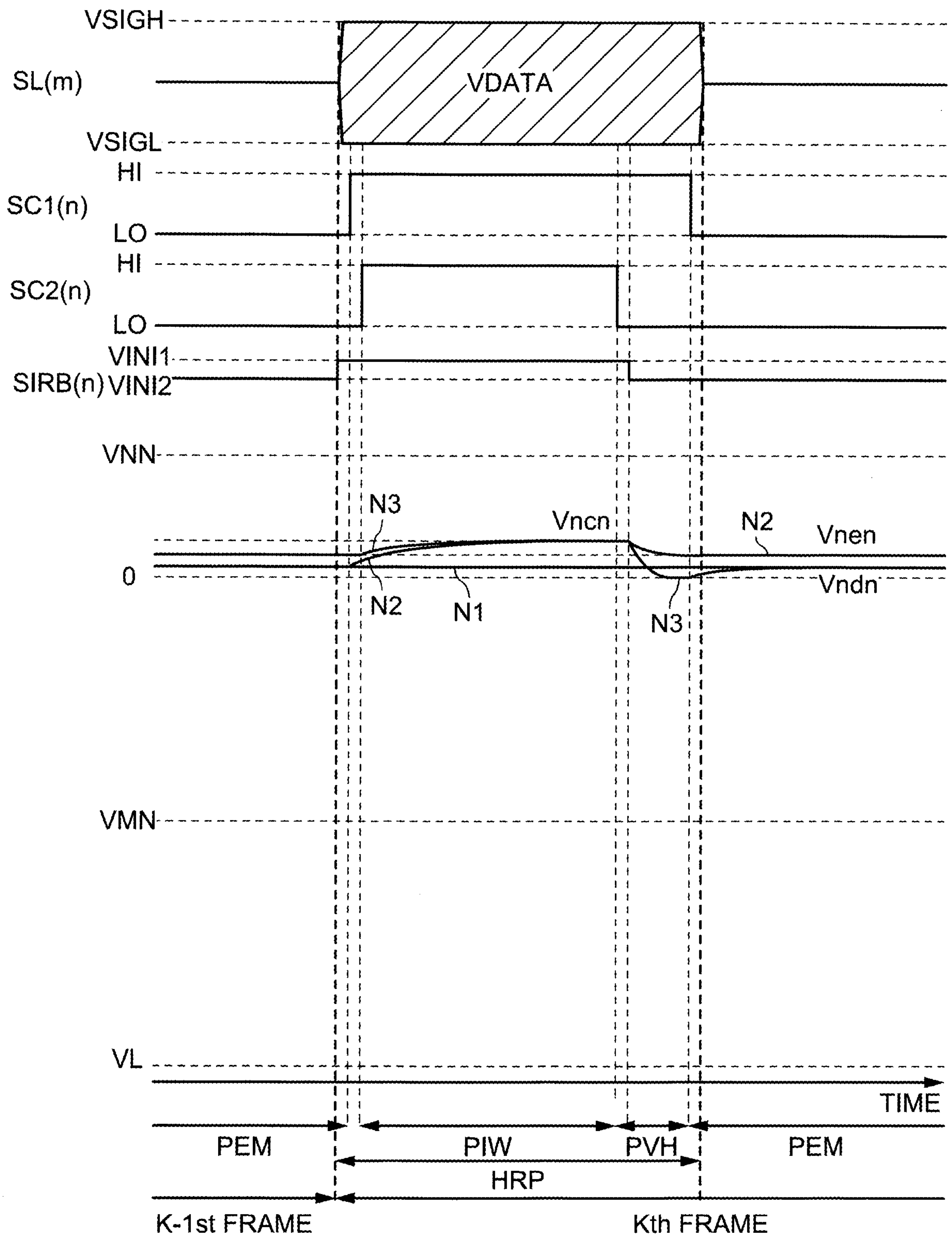
FIG. 26 is a timing chart of a self-luminous display device according to the third embodiment of the present invention.

Referring to the conductive state and the non-conductive state of the respective transistors in the light emission period PEM of the K−1stFRAME of the third example in the driving method according to the second embodiment and FIG. 26, in the light emission period PEM of the K−1stFRAME, the pixel 180B emits light according to the potential difference Vgs of the second transistor T2 (voltage V (N2)−voltage V (N3)=voltage Vnen−voltage Vnen). The potential difference Vgs is 0 V and the potential difference Vgs is greater than the threshold voltage VTHP (−1 V) of the second transistor T2. Since the second transistor T2 is in the OFF state and no current flows from the reference voltage line PVSS to the drive power line PVDD, the light-emitting element OLED does not emit light. As a result, for example, the pixel 180B becomes black.

In the first period of the one horizontal period HRP of the KthFRAME following the light emission period PEM of the K−1stFRAME, the image data signal SL(m), including the data signal VDATA, including the voltage VSIGH (0.5 V) corresponding to the non-light-emitting black, is input to the pixel 180B. Referring to the conductive state and the non-conductive state of the respective transistors in the first period of the one horizontal period HRP of the third example in the driving method according to the second embodiment and FIG. 26, the voltage supplied to the first node N1 remains at the voltage Vndn (0.5 V) and the first node N1 maintains the state in which 0.5 V is supplied. The voltage supplied to the second node N2 gradually rises from the voltage Vndn (0.5 V) toward the initialization voltage VINI1 (voltage Vncn, 1.5 V).

In the period PIW, the image data signal SL(m) maintains the state in which the data signal VDATA including the voltage VSIGH is supplied. The first node N1 maintains the state in which 0.5 V is supplied. The voltage supplied to the second node N2 gradually rises from the voltage Vndn toward the voltage Vncn and becomes the voltage Vncn (1.5 V). In addition, the voltage supplied to the third node N3 gradually rises from the voltage Vnen (1 V) toward the initialization voltage VINI1 (voltage Vncn, 1.5 V) and becomes the voltage Vncn (1.5 V).

As described above, in the period PIW, the data signal VDATA including the voltage VSIGH (0.5 V) is supplied (written) to the first node N1, and the second node N2 and the third node N3 are initialized by the initialization voltage VINI1 (1.5 V).

In the period PVH following the period PIW, the image data signal SL(m) maintains the state in which the data signal VDATA including the voltage VSIGH is supplied. The voltage to be supplied to the first node N1, the voltage to be supplied to the second node N2, the voltage to be supplied to the third node N3, the potential difference Vgs, and the potential difference Vds are similar to those described in "3-2-1. First Example of Driving Method for Pixel Circuit 181B".

As described above, similar to that described in "3-2-1. First Example of Driving Method for Pixel Circuit 181B", in the period PVH, the threshold voltage VTHP of the second transistor T2 is obtained by the operation in which the potential difference Vgs of the second transistor T2 becomes the same as the threshold voltage VTHP. In addition, the charge equivalent to the threshold voltage VTHP is held in the second node N2 (the gate electrode 622 of the second transistor T2).

In the light emission period PEM of the KthFRAME following the one horizontal period HRP of the KthFRAME, the voltage supplied to the first node N1, the voltage supplied to the second node N2, the voltage supplied to the third node N3, the potential difference Vgs, and the potential difference Vds are similar to those described in "3-2-1. First Example of Driving Method for Pixel Circuit 181B". Similar to that described in "3-2-1. First Example of Driving Method for Pixel Circuit 181B", the pixel 180B emitting red light does not emit light, and three pixels using the pixel 180B emitting red light, the pixel 180B emitting blue light, and the pixel 180B emitting green light become black.

As described above, in the third example of the driving method for the display device 10 (the driving method for the pixel circuit 181B) according to the third embodiment, similar to the third example of the driving method for the display device 10 according to the second embodiment, since the voltage fluctuation at each node when displaying images of the same color (black) in consecutive frames is small, the power consumption due to the voltage fluctuation at each node can be reduced. Therefore, the display device 10 is a display device that can reduce power consumption.

[3-2-4. Fourth Example of Driving Method for Pixel Circuit 181B]

A fourth example of the driving method for the pixel circuit 181B will be described with reference to FIG. 27. The driving method shown in the fourth example of the driving method for the pixel circuit 181B includes the pixel 180B displaying a black image in the previous frame (K−1stFRAME) of the current frame (KthFRAME) based on the voltage VSIGH included in the data signal VDATA, and then the pixel 180B displaying a white image based on the voltage VSIGL included in the data signal VDATA in the KthFRAME. In other words, the method includes displaying images of different colors in consecutive frames. Configurations that are the same as or similar to those in FIG. 1 to FIG. 26 will be described as necessary.

The configuration of the image data signal SL(m), the scan voltage power supply SIRB(n), the first scan signal SC1(*n*), and the second scan signal SC2(*n*) in the light emission period PEM of the K−1stFRAME, the one horizontal period HRP and the light emission period PEM of the KthFRAME, the conductive state and the non-conductive state of the respective transistors and the like are similar to those described in “3-2-1”. In addition, the voltages (potentials) of the first node N1, the second node N2, and the third node N3 in the light emission period PEM of the K−1stFRAME, the operation of the respective transistors and the like are similar to those described in “3-2-3. Third Example of Driving Method for Pixel Circuit 181B”. Configurations and the like similar to that described in “3-2-1. First Example of Driving Method for Pixel Circuit 181B” to “3-2-3. Third Example of Driving Method for Pixel Circuit 181B” will be described as necessary.

In the first period of the one horizontal period HRP of the KthFRAME, the image data signal SL(m), including the data signal VDATA, including the voltage VSIGL corresponding to white, is input to the pixel 180B. The voltage supplied to the first node N1 gradually drops from the voltage Vndn (0.5 V) toward the voltage VSIGL (voltage Vnfn, −3.5 V), and the voltage supplied to the second node N2 gradually rises from the voltage Vnen (1 V) toward the voltage Vncn (1.5 V).

In the period PIW, the voltage supplied to the first node N1 gradually drops from the voltage Vndn (0.5 V) toward the voltage VSIGL (voltage Vnfn, −3.5 V), and the first node N1 is in the state in which the voltage Vnfn (−3.5 V) is supplied. The voltage supplied to the second node N2 gradually rises from the voltage Vnen (0.5 V) toward the voltage Vncn (1.5 V), and the second node N2 is in the state in which the voltage Vncn (1.5 V) is supplied. In addition, the voltage supplied to the third node N3 gradually rises from the voltage Vnen (1 V) toward the initialization voltage VINI1 (voltage Vncn, 1.5 V), and the third node N3 is in the state in which the voltage Vncn (1.5 V) is supplied. In this case, the potential difference Vgs becomes 0 V (1.5 V−(1.5 V)) and the potential difference Vds becomes −9.5 V (−8 V−(1.5 V)).

As described above, in the period PIW, the data signal VDATA including the voltage VSIGL is supplied (written) to the first node N1, and the second node N2 and the third node N3 are initialized by the initialization voltage VINI1 (1.5 V).

In the period PVH following the period PIW, similar to that described in “3-2-2”, the first node N1 maintains the state in which the voltage Vnfn is supplied, the second node N2 maintains the state in which the initialization voltage VINI2 (0 V) is supplied, the voltage supplied to the third node N3 drops from the voltage Vncn to the voltage Vnen, and the third node N3 is in the state in which the voltage Vnen (1 V) is supplied. In this case, Vgs is −1 V (0 V−1 V) and is the same as the threshold voltage VTHP (−1 V).

As described above, in the period PVH, the threshold voltage VTHP of the second transistor T2 is obtained by the operation in which the potential difference Vgs of the second transistor T2 becomes the same as the threshold voltage VTHP. In addition, the charge equivalent to the threshold voltage VTHP is held in the second node N2 (the gate electrode 622 of the second transistor T2).

In the light emission period PEM of the KthFRAME following the one horizontal period HRP of thee KthFRAME, the potential difference Vgs becomes −4.5 V similar to that described in “3-2-2”. The potential difference Vgs is smaller than the threshold voltage VTHP, the second transistor T2 is in the ON state, and the drain current Ion flows from the reference voltage line PVSS to the drive power line PVDD. As a result, the light-emitting element OLED emits light. For example, the pixel 180B emits red light, and white light is emitted by three pixels using the pixel 180A emitting red light, the pixel 180B emitting blue light, and the pixel 180B emitting green light.

[3-3. Setting Value of Initialization Voltages VINI1 and VINI2]

Setting values of the initialization voltages VINI1 and VINI2 will be described with reference to FIG. 28. FIG. 28 is a diagram for explaining the setting values of the initialization voltages VINI1 and VINI2 of the scan voltage power line SVIRB to which the scan voltage power supply SIRB(n) is supplied. Configurations that are the same as or similar to those in FIG. 1 to FIG. 27 will be described as necessary.

For example, as shown in FIG. 28, between the period PIW and the period PVH, the scan voltage power supply SIRB(n) changes from the state in which the initialization voltage VINI1 is supplied to the state in which the initialization voltage VINI2 is supplied according to the timings of the first scan signal SC1(*n*) and the second scan signal SC2(*n*).

In the period PIW, in the pixel circuit 181B, the scan voltage power supply SIRB(n) (the initialization voltage VINI1) is supplied from the scan voltage power line SVIRB to the second node N2 and the third node N3, and the second node N2 and the third node N3 are initialized. The pixel 180B including the pixel circuit 181B does not emit light in the period PIW. The condition that the light-emitting element OLED does not emit light is that the initialization voltage VINI1 supplied to the third node N3 is greater than the threshold voltage VTHEL of the light-emitting element OLED. That is, the initialization voltage VINI1>the threshold voltage VTHEL.

Furthermore, in the period PVH, the pixel circuit 181B corrects the threshold voltage VTHP and holds the charge equivalent to the threshold voltage VTHP. The pixel 180B including the pixel circuit 181B does not emit light in the period PVH. The condition that the light-emitting element OLED does not emit light is that the voltage Vnen supplied to the third node N3 is greater than the threshold voltage VTHEL of the light-emitting element OLED. That is, the voltage Vnen>the threshold voltage VTHEL.

For example, in the case where the pixel circuit 181B emits light based on the voltage VSIGL corresponding to white, the initialization voltage VINI2 is supplied to the second node N2 and the voltage Vnen is supplied to the third node N3. In this case, the potential difference Vgs is the difference between the voltage supplied to the second node N2 and the voltage supplied to the third node N3, and the potential difference Vgs=the initialization voltage VINI2−the voltage Vnen. In addition, since the charge corresponding to the threshold voltage VTHP is held at the potential difference Vgs, the initialization voltage VINI2−the voltage Vnen=the threshold voltage VTHP.

As shown in FIG. 28, the condition of the initialization voltage VINI2 calculated using the above formula is the initialization voltage VINI2>the threshold voltage VTHEL+the threshold voltage VTHP. In addition, the condition of the initialization voltage VINI1 is the initialization voltage VINI1>the threshold voltage VTHEL.

4. Fourth Embodiment

Figure 29:
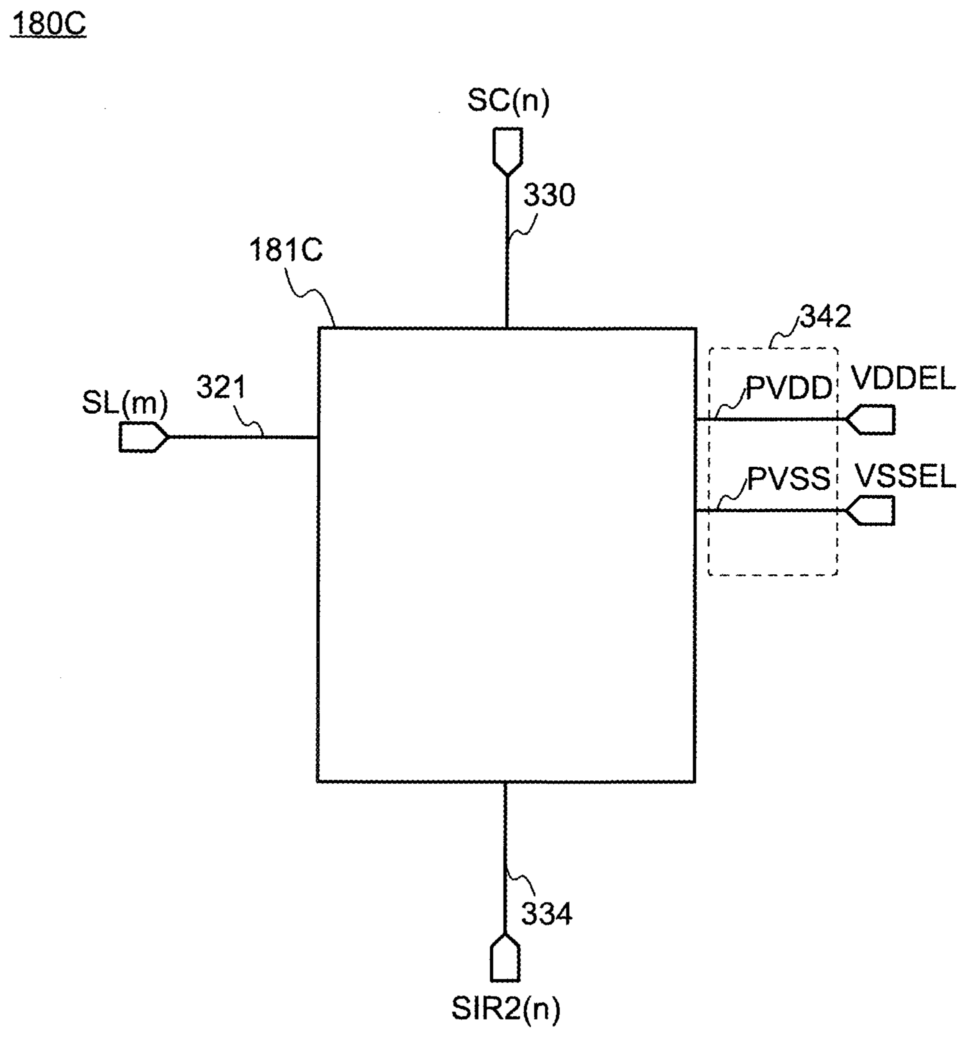
FIG. 29 is a schematic diagram showing an input signal to a pixel circuit according to the fourth embodiment of the present invention.
Figure 30:
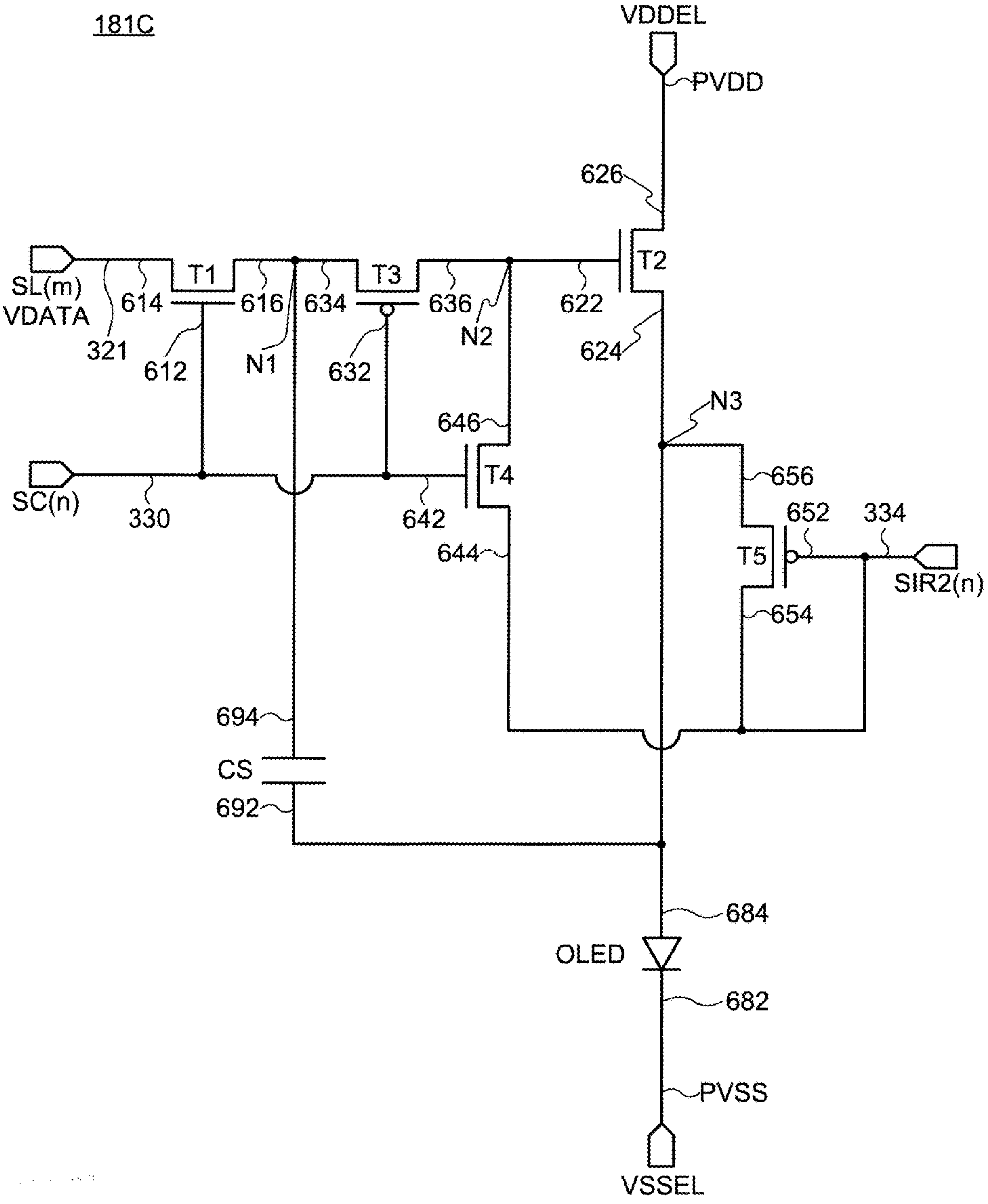
FIG. 30 is a circuit diagram showing a configuration of a pixel circuit according to the fourth embodiment of the present invention.
Figure 33:
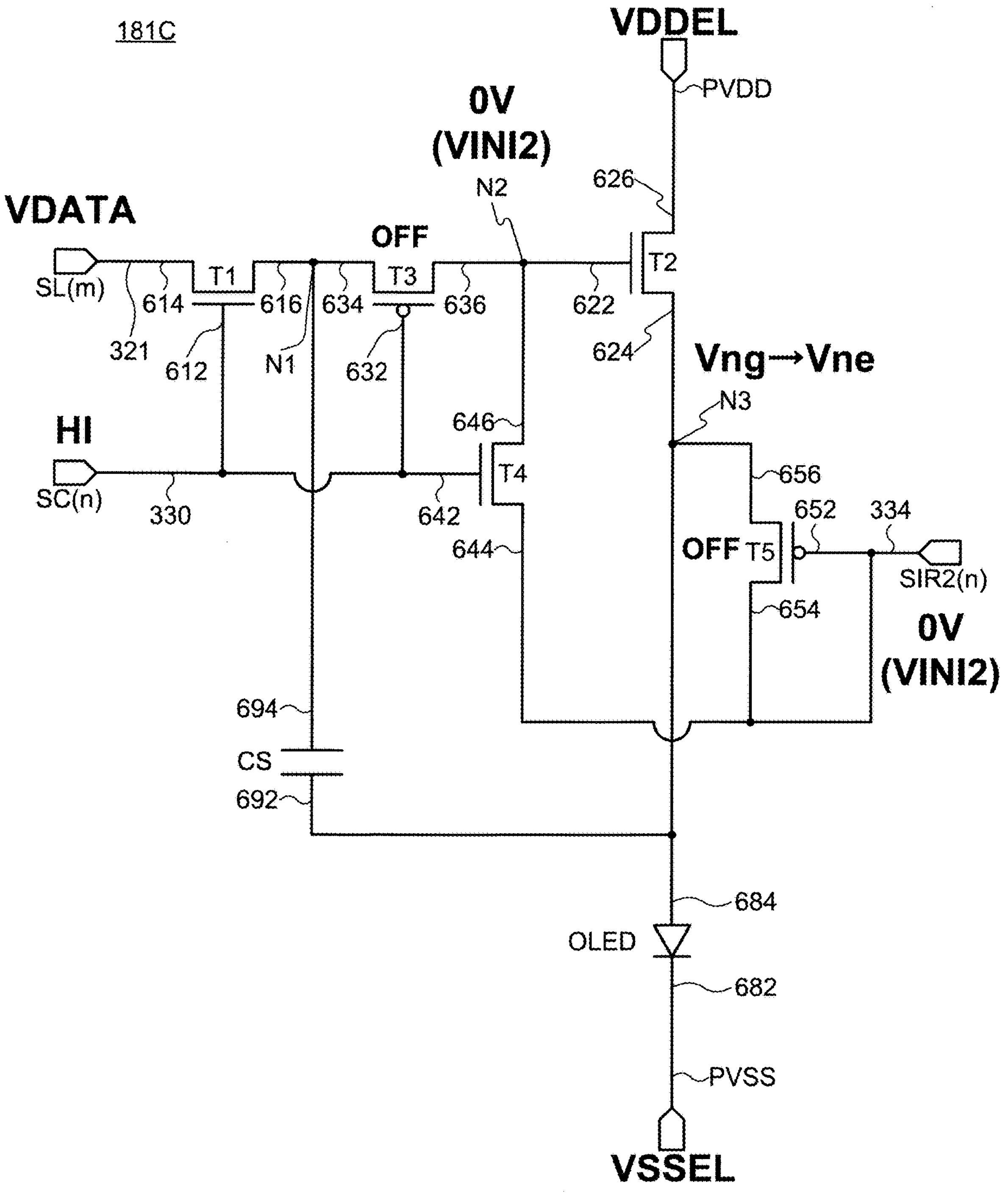
FIG. 33 is a schematic diagram showing an operation state of the pixel circuit shown in FIG. 30 at the timing shown in FIG. 31.
Figure 34:
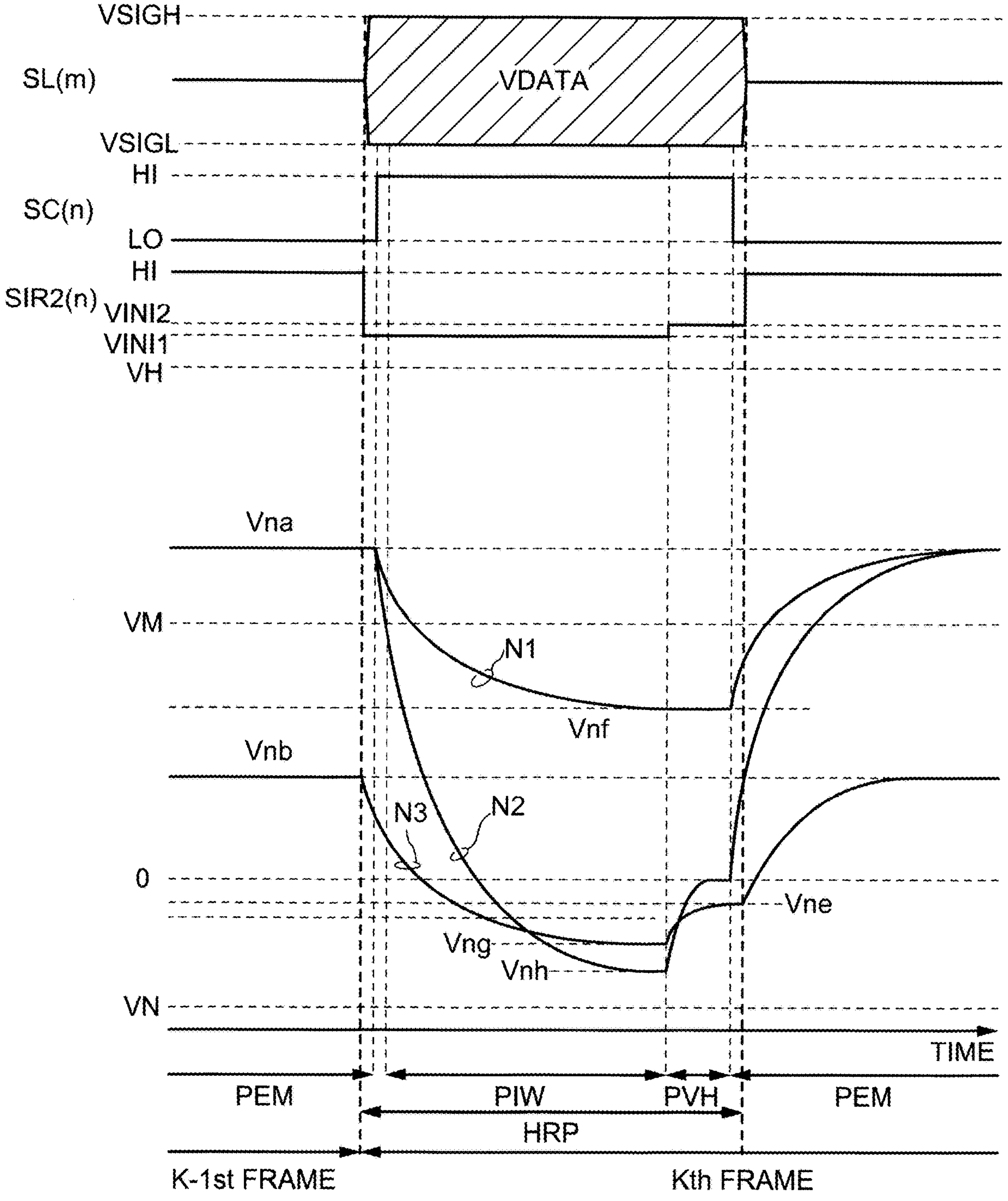
FIG. 34 is a timing chart of a self-luminous display device according to the fourth embodiment of the present invention.
Figure 35:
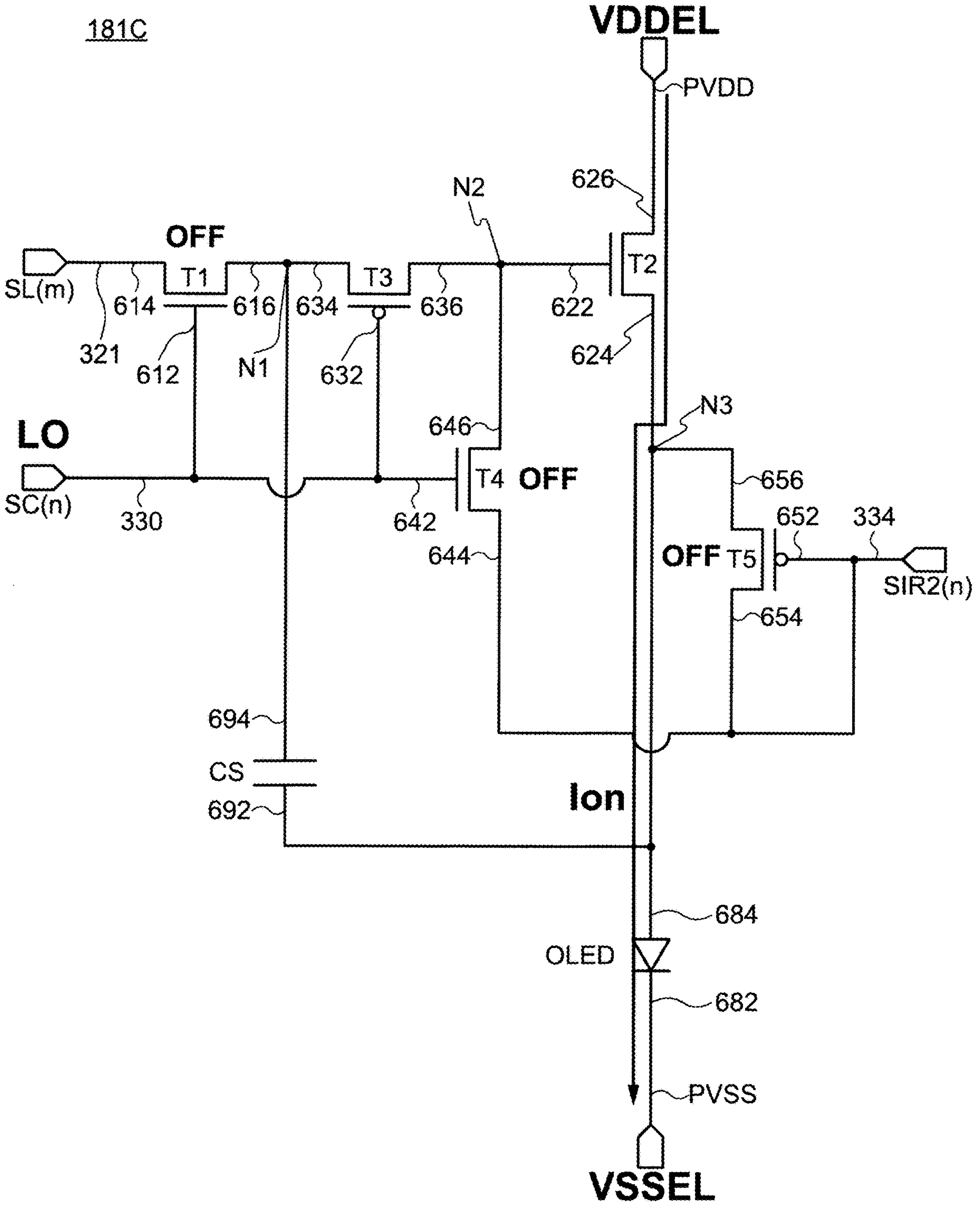
FIG. 35 is a schematic diagram showing an operation state of the pixel circuit shown in FIG. 30 at the timing shown in FIG. 34.

An overview of the display device 10 according to the fourth embodiment will be described with reference to FIG. 1, FIG. 4, and FIG. 29 to FIG. 37. FIG. 29 is a schematic diagram showing an input signal to a pixel 180C (pixel circuit 181C) according to the fourth embodiment of the present invention. FIG. 30 is a circuit diagram showing a configuration of the pixel circuit 181C. FIG. 31, FIG. 34, FIG. 36, and FIG. 37 are timing charts of the display device 10 according to the fourth embodiment of the present invention. FIG. 32 and FIG. 33 are schematic diagrams showing operation states of the pixel circuit 181C at the timing shown in FIG. 31. FIG. 35 is a schematic diagram showing an operation state of the pixel circuit 181C at the timing shown in FIG. 34.

The display device according to the fourth embodiment has a configuration and function in which the pixel 180A and the pixel circuit 181A of the display device 10 according to the second embodiment are replaced with the pixel 180C and the pixel circuit 181C. Other configurations and functions are similar to those of the display device 10 according to the second embodiment. Therefore, in describing the configurations and functions of the fourth embodiment, configurations and functions similar to those of the display device 10 according to the second embodiment will be described as necessary. In addition, configurations that are the same as or similar to those in FIG. 1 to FIG. 28 will be described as necessary.

[4-1. Configuration of Pixel 180C]

An overview of the pixel 180C and the pixel circuit 181C will be described with reference to FIG. 29 and FIG. 30.

The pixel circuit 181C is connected to the second scan signal line 334. The second scan signal line 334 according to the fourth embodiment is a signal line serving as both the second scan signal line 334 and the scan voltage power line SVIR supplied to the pixel circuit 181A. In other words, the second scan signal line 334 according to the fourth embodiment is a signal line in which the second scan signal line 334 and the scan voltage power line SVIR supplied to the pixel circuit 181A are combined and integrated. A scan voltage power supply SIR2(*n*) that combines the second scan signal and the scan voltage power supply SIR(n) supplied to the pixel circuit 181A is supplied to in the second scan signal line 334 according to the fourth embodiment. The second scan signal line 334 (the signal line serving as both the second scan signal line 334 and the scan voltage power line SVIR) according to the fourth embodiment may be referred to as a third control signal line. The scan voltage power supply SIR2(*n*) may be referred to as a third control signal.

In the pixel circuit 181C, the first electrode 644 of the fourth transistor T4, the first electrode 654 of the fifth transistor T5, and the gate electrode 652 are electrically connected to the second scan signal line 334. The fourth transistor T4 has a function of conducting the second node N2 and the second scan signal line 334 to supply the initialization voltage VINI1 or VINI2 to the second node N2 and initializing the second node N2.

In addition, the pixel circuit 181C includes the fifth transistor T5, a p-channel field-effect transistor. The fifth transistor T5 has a function of conducting the third node N3 and the second scan signal line 334 to supply the initialization voltage VINI1 to the third node N3 and initializing the third node N3.

Configurations and functions of the pixel circuit 181C other than the configurations and functions described in "4-1" are similar to those of the pixel circuit 181A.

[4-2. Driving Method for Pixel Circuit 181C]

A driving method for the display device 10 according to the fourth embodiment will be described with reference to FIG. 29 to FIG. 37. Configurations that are the same as or similar to those in FIG. 1 to FIG. 30 will be described as necessary. In addition, similar to the first embodiment, the horizontal axis of the timing charts represents time (TIME).

The driving method for the display device 10 according to the fourth embodiment has a configuration and function in which the operation related to the second scan signal SC2(*n*) and the scan voltage power supply SIR(n) in the driving method for the display device 10 according to the second embodiment is replaced with the operation related to the scan voltage power supply SIR2(*n*). Configurations and functions other than the operation related to the scan voltage power supply SIR2(*n*) are similar to those of the driving of the display device 10 according to the second embodiment. The description of configurations and functions similar to those of the driving method for the display device 10 according to the second embodiment will be omitted here.

The driving method for the display device 10 according to the fourth embodiment includes periods similar to those of the driving method for the display device 10 shown in FIG. 4.

FIG. 31, FIG. 34, FIG. 36, and FIG. 37 are diagrams for explaining the period PIW and the period PVH of the driving method for the pixel 180C. FIG. 31 to FIG. 34 show the light emission period PEM of the previous frame (K−1stFRAME) of the current frame, and the period PIW and the period PVH of the current frame (KthFRAME). Furthermore, in FIG. 31, FIG. 34, FIG. 36, and FIG. 37, one horizontal period (the horizontal period HRP) for one pixel 180C is shown.

In the one horizontal period in the driving method for the display device 10 according to the fourth embodiment, a scan signal SC(n), the scan voltage power supply SIR2(*n*), and the image data signal SL(m) including the data signal VDATA are input to the pixel 180C. For example, the scan signal SC(n) and the scan voltage power supply SIR2(*n*) are shifted, and the pixel 180C corresponding to the shifted signal is selected. The image data signal SL(m), the initialization voltage VINI, and the reference voltage VREF are input to the selected pixel 180C. A similar operation is performed for all the pixels 180C (the pixel circuit 181C), and an image of the frame corresponding to 1FRAME is displayed in the display region 22 of the display device 10 based on the image data signal SL(m) input to all the pixels 180C.

For example, the voltages (potentials) supplied to each signal and each node of each frame in the timing charts shown in FIG. 31, FIG. 34, FIG. 36, and FIG. 37 are shown in Table 7 and Table 8.

TABLE 7

| | PIW | PVH | PEM |
|---|---|---|---|
| SC(n) | HI | HI | LO |
| SIR2(n) | −3.5 [V] | 0 [V] | 10 [V] |
| SL(m) | −0.5 [V](Black) ~3.5 [V](White) | — | — |
| N1 | −0.5 [V](Black) ~3.5 [V](White) | −0.5 [V] ~3.5 [V] | Rise in conjunction with the rise of potential of N3 |
| N2 | −3.5 [V] | 0 [V] | In conjunction with potential of N1 |
| N3 | −2.5 [V] | −1 [V] (=VINI2-VTH) | Rise in conjunction with Ion with VGS |
| Vgs (=V(N2)-V(N3)) | −1 [V] | 1 [V] | |
| Remarks | Initialize T2 and OLED Apply VDATA to CS Potential of N3 = VINI1-VTHPT5 | Acquiring and retainign VTH Potential of N3 = VINI2-VTH Potential of N1-Potential of N3 = VDATA-(VINI2-VTH) Non-light emitting below VTHEL | Light emitting VGS = VDATA-(VINI2-VTH) |

TABLE 8

| | Setting value [V] |
|---|---|
| VTH | 1 |
| VTHPT5 | −1 |
| VTHEL | 0.7 |
| VDATA(White) | 3.5 |
| VDATA(Black) | −0.5 |
| HI | 10 |
| LO | −3.5 |
| VINI1 | −3.5 |
| VINI2 | 0 |
| VDDEL | 8 |
| VSSEL | 0 |

As shown in the driving method for the display device 10 according to the fourth embodiment, Table 7, Table 8, and FIG. 31 to FIG. 34, the voltage VSIGL included in the data signal VDATA is −0.5 V, and the pixel 180C to which the voltage VSIGL is supplied does not emit light and becomes black. The voltage VSIGH included in the data signal VDATA is 3.5 V, and the pixel 180C to which the voltage VSIGH is supplied emits light. For example, one pixel emits red light, one pixel emits green light, one pixel emits blue light, and white light is emitted by the three pixels. In addition, for example, the voltage VL (LO) is −3.5 V, the voltage VH (HI) is 10 V, the voltage VN is −5 V, the voltage VM is 1 V, the initialization voltage VINI1 is −3.5 V, the initialization voltage VINI2 is 0 V, the threshold voltage VTH of the second transistor T2 is 1 V, the threshold voltage VTHPT5 of the fifth transistor T5 is −1 V, and the threshold voltage VTHEL of the light-emitting element OLED is 0.7 V.

[4-2-1. First Example of Driving Method for Pixel Circuit 181C]

A first example of the driving method for the pixel circuit 181C will be described with reference to FIG. 31 and FIG. 33. The first example of the driving method for the pixel circuit 181C includes displaying images of different colors in consecutive frames similar to "2-2-1. First Example of Driving Method for Pixel Circuit 181A".

Configurations and functions of the image data signal SL(m) in the light emission period PEM of the K−1stFRAME, the one horizontal period HRP and the light emission period PEM of the KthFRAME are similar to those of "2-2-1. First Example of Driving Method for Pixel Circuit 181A", and the configurations and functions of the scan signal SC(n) are similar to those of the first scan signal SC1(*n*) in the display device 10 according to the second embodiment.

In the light emission period PEM of the K−1stFRAME, the pixel 180C emits light according to the potential difference Vgs of the second transistor T2 (voltage V (N2)−voltage V (N3)=voltage Vna−voltage Vnb). For example, the scan signal SC(n) and the scan voltage power supply SIR2(*n*) are supplied with LO. The first transistor T1, the fourth transistor T4, and the fifth transistor T5 are in the OFF state, and the third transistor T3 is in the ON state. In addition, the voltage Vna supplied to the first node N1 and the second node N2 is 7 V, and the voltage Vnb supplied to the third node N3 is 2.5 V. Therefore, the potential difference Vgs is 4.5 V, and the second transistor T2 can flow the current Ion based on the potential difference Vgs and the potential difference Vds according to the voltage VSIGH input in the one horizontal period HRP of the K−1stFRAME. In addition, the second transistor T2 is in the ON state, and the current Ion flows from the drive power line PVDD to the light-emitting element OLED and the reference voltage line PVSS, and the light-emitting element OLED emits light. For example, the pixel 180C emits red light, and white light is emitted by three pixels using the pixel 180C emitting red light, the pixel 180C emitting blue light, and the pixel 180C emitting green light.

Figure 31:
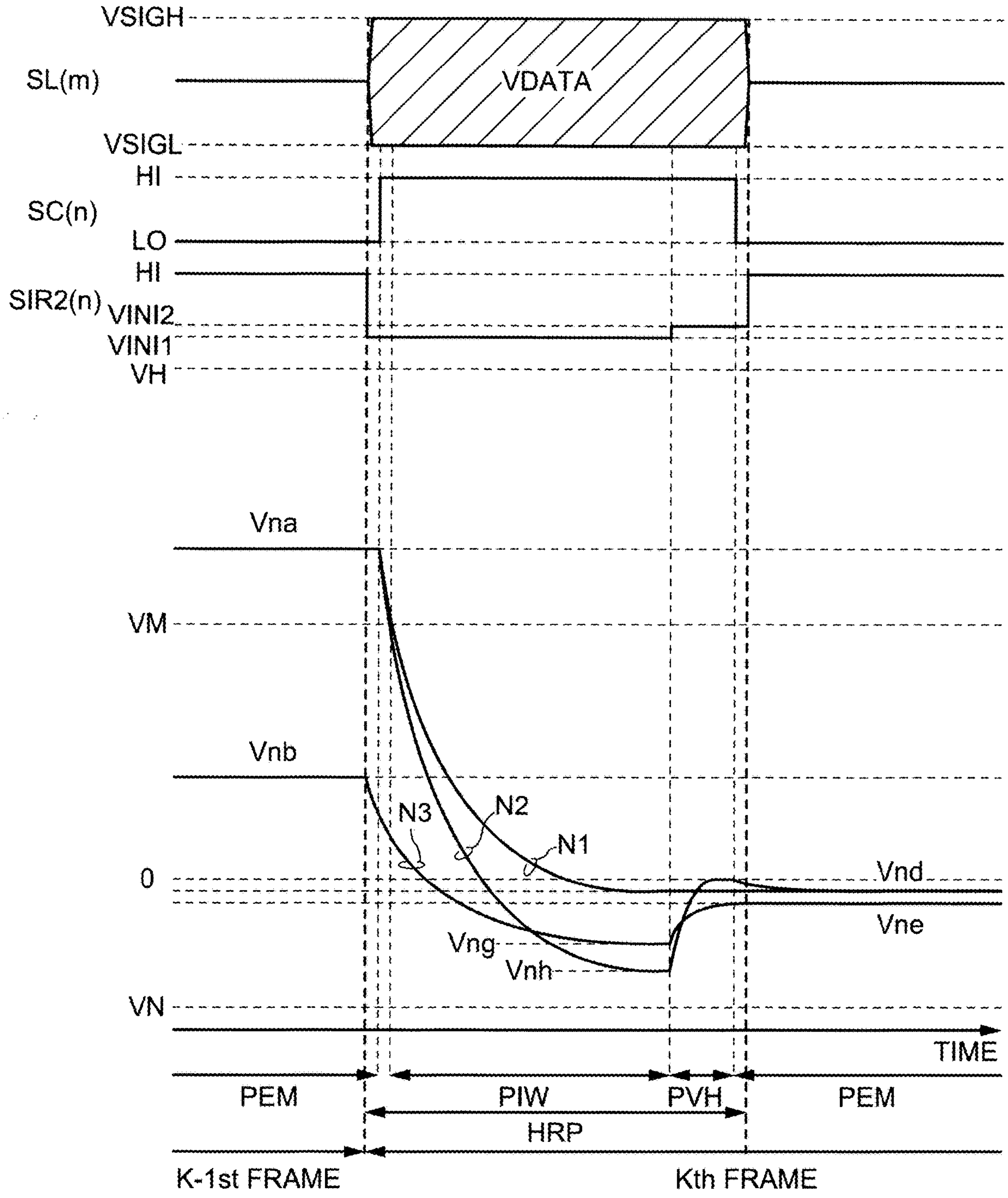
FIG. 31 is a timing chart of a self-luminous display device according to the fourth embodiment of the present invention.
Figure 32:
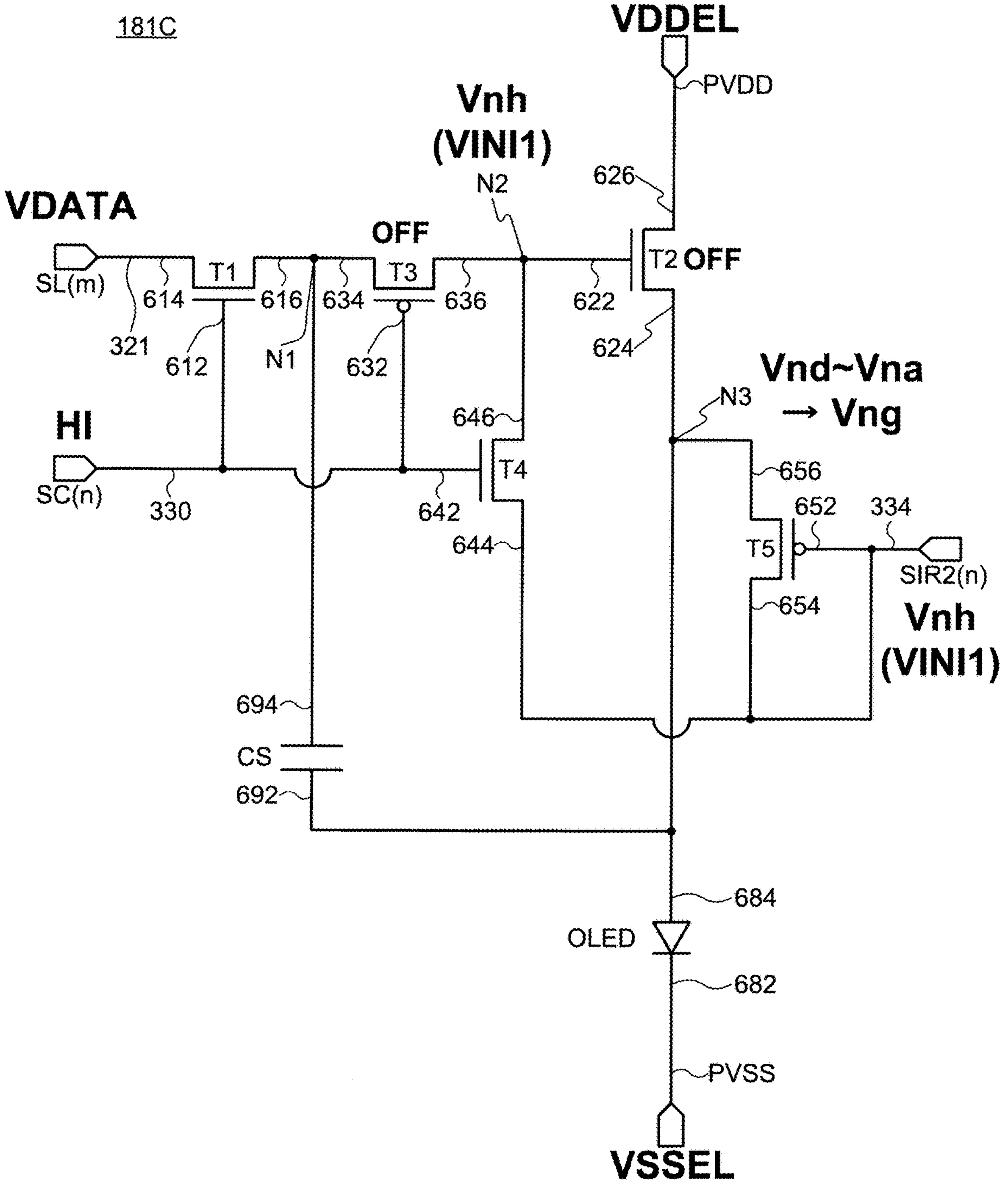
FIG. 32 is a schematic diagram showing an operation state of the pixel circuit shown in FIG. 30 at the timing shown in FIG. 31.

For example, as shown in FIG. 31 and FIG. 32, in the first period of the one horizontal period HRP of the KthFRAME following the light emission period PEM of the K−1stFRAME, the scan voltage power supply SIR2(*n*) changes from the state in which HI is supplied to the state in which the initialization voltage VINI1 (voltage Vnh, −3.5 V) is supplied. When the scan voltage power supply SIR2(*n*) is in the state in which the initialization voltage VINI1 is supplied, the scan signal SC(n) changes from the state in which LO is supplied to the state in which HI is supplied. Therefore, the first transistor T1, the fourth transistor T4, and the fifth transistor T5 are turned from the OFF state to the ON state, and the third transistor T3 is turned from the ON state to the OFF state. As a result, for example, the voltage supplied to the third node N3 gradually drops from the voltage Vnb. In addition, the voltage supplied to the first node N1 gradually drops from the voltage Vna toward the voltage VSIGL (voltage Vnd, −0.5 V), and the voltage supplied to the second node N2 gradually drops from the voltage Vna toward the initialization voltage VINI1 (voltage Vnh, −3.5 V).

In the period PIW, the image data signal SL(m) maintains the state in which the data signal VDATA including the voltage VSIGL is supplied, the scan signal SC(n) maintains the state in which HI is supplied, and the scan voltage power supply SIR2(*n*) maintains the state in which the initialization voltage VINI1 (voltage Vnh, −3.5 V) is supplied. Therefore, the first transistor T1, the fourth transistor T4, and the fifth transistor T5 are maintained in the ON state, and the third transistor is maintained in the OFF state.

As a result, the voltage supplied to the third node N3 gradually drops from the voltage Vnb, and when the potential difference between the initialization voltage supplied to the gate electrode 652 and the voltage supplied to the second electrode 656 (the voltage supplied to the third node N3) becomes the same as the threshold voltage VTHPT5 (−1 V) of the fifth transistor T5, the fifth transistor T5 is turned from the ON state to the OFF state. That is, the voltage supplied to the second electrode 656 (the voltage supplied to the third node N3) becomes the voltage Vng (−2.5 V), so that the fifth transistor T5 is turned from the ON state to the OFF state. In addition, the voltage supplied to the first node N1 gradually drops from the voltage Vna toward the voltage VSIGL (voltage Vnd, −0.5 V) and becomes the voltage Vnd (−0.5 V). The voltage supplied to the second node N2 gradually drops from the voltage Vna toward the initialization voltage VINI1 (voltage Vnh, −3.5 V) and becomes the initialization voltage VINI1 (−3.5 V). When the voltage (−3.5 V) supplied to the second node N2 is lower than the voltage (−2.5 V) of the third node N3, the second transistor T2 is turned from the ON state to the OFF state. When the second transistor T2 is in the OFF state, the potential difference Vds is 10.5 V (8 V−(−2.5 V)).

As described above, the data signal VDATA including the voltage VSIGL is supplied (written) to the first node N1, the second node N2 is initialized by the initialization voltage VINI1(−3.5 V), and the third node N3 is initialized by the initialization voltage VINI1 (voltage Vnh, −3.5 V) to the voltage Vng (−2.5 V).

For example, as shown in FIG. 31 and FIG. 33, in the period PVH, the image data signal SL(m) is maintained in the state in which the data signal VDATA including the voltage VSIGL is supplied, and the scan signal SC(n) is maintained in the state in which HI is supplied. The scan voltage power supply SIR2(*n*) changes from the state in which the initialization voltage VINI1 (voltage Vnh, −3.5 V) is supplied to the state in which the initialization voltage VINI2 (0 V) is supplied. Therefore, the fifth transistor T5 is turned from the OFF state to the ON state, the first transistor T1 and the fourth transistor T4 are maintained in the ON state, and the third transistor is maintained in the OFF state.

Immediately after the start of the period PVH, the potential difference Vgs is −1 V, the potential difference Vds is 9.5 V, and the potential difference Vgs is smaller than the threshold voltage VTH (1 V), so that the second transistor T2 is in the OFF state. Therefore, the drain current Ion does not flow from the second electrode 626 of the second transistor T2 to the first electrode 624.

As a result, the voltage supplied to the first node N1 maintains the voltage Vnd (−0.5 V), and the voltage supplied to the second node N2 gradually rises from the voltage Vnh (−3.5 V) toward the initialization voltage VINI2 (0 V) and becomes the initialization voltage VINI2 (0 V). In addition, the voltage supplied to the third node N3 gradually rises from the voltage Vng (−2.5 V), and when the potential difference between the initialization voltage supplied to the gate electrode 652 and the voltage supplied to the second electrode 656 (the voltage supplied to the third node N3) becomes the same as the threshold voltage VTH (1 V) of the second transistor T2, the second transistor T2 is turned from the ON state to the OFF state. That is, the voltage supplied to the second electrode 656 (the voltage supplied to the third node N3) is changed from the voltage Vng (−2.5 V) to the voltage Vne (−1 V), so that the second transistor T2 is turned from the ON state to the OFF state. Therefore, the potential difference Vgs becomes 1 V (0 V−(−1 V). Since the potential difference Vgs is the same as the threshold voltage VTH (1 V), the second transistor T2 is in the OFF state. Therefore, the drain current Ion does not flow from the second electrode 626 of the second transistor T2 to the first electrode 624.

As described above, in the period PVH, the threshold voltage VTH of the second transistor T2 is obtained by the operation in which the potential difference Vgs of the second transistor T2 becomes the same as the threshold voltage VTH. In addition, the charge equivalent to the threshold voltage VTH is held in the second node N2 (the gate electrode 622 of the second transistor T2).

In the light emission period PEM of the KthFRAME following the horizontal period HRP of the KthFRAME, data is not selected using the selection signal, and the data signal VDATA is maintained at a voltage equal to or higher than the voltage VSIGL and equal to or lower than the voltage VSIGH. In addition, the scan signal SC(n) changes from the state in which HI is supplied to the state in which LO is supplied. When the scan signal SC(n) is in the state in which LO is supplied, the scan voltage power supply SIR2 (*n*) changes from the state in which the initialization voltage VINI2 (0 V) is supplied to the state in which HI (10 V) is supplied.

Therefore, the first transistor T1 and the fourth transistor T4 are turned from the ON state to the OFF state, and the third transistor T3 is turned from the OFF state to the ON state. In addition, the fifth transistor T5 is maintained in the OFF state. When the third transistor T3 is turned on, the first node N1 and the second node N2 are conductive, and the potential difference Vgs becomes 0.5 V (−0.5 V−(−1 V)). The potential difference Vgs is smaller than the threshold voltage VTH. Therefore, since the second transistor T2 is in the OFF state and no current flows from the drive power line PVDD to the reference voltage line PVSS, the light-emitting element OLED does not emit light. As a result, for example, the pixel 180C emitting red light, the pixel 180C emitting blue light, and the pixel 180C emitting green light do not emit light, so that the three pixels using the pixel 180C emitting red light, the pixel 180C emitting blue light, and the pixel 180C emitting green light become black.

As described above, similar to the driving method for the display device 10 according to the second embodiment, the driving method for the display device 10 according to the fourth embodiment (the driving method for the pixel circuit 181C) includes executing the process (driving) executed in the writing period and the process (driving) executed in the initialization period at the same timing. Therefore, the driving method for the pixel circuit 181C has effects similar to those of the driving method for the display device 10 according to the second embodiment.

In addition, the pixel circuit 181C is connected to the second scan signal line 334 in which the second scan signal line SC2(*n*) and the scan voltage power line SVIR supplied to the pixel circuit 181A are combined and integrated. Therefore, since the pixel circuit 181C has a configuration capable of reducing the number of signal lines, the display device including the pixel circuit 181C can reduce the size of the pixel. As a result, the display device including the pixel circuit 181C can increase the number of pixels and achieve high definition.

[4-2-2. Second Example of Driving Method for Pixel Circuit 181C]

A second example of the driving method for the pixel circuit 181C will be described with reference to FIG. 34 and FIG. 35. The driving method shown in the second example of the pixel circuit 181C includes displaying images of the same color (white) in consecutive frames similar to "2-2-2. Second Example of Driving Method for Pixel Circuit 181B". Configurations that are the same as or similar to those in FIG. 1 to FIG. 31 will be described as necessary.

The configuration of the image data signal SL(m), the scan voltage power supply SIR2(*n*), and the scan signal SC(n) in the light emission period PEM of the K−1stFRAME, the one horizontal period HRP and the light emission period PEM of the KthFRAME, and the conductive state and the non-conductive state of the respective transistors are similar to those described in "4-2-1". In addition, the voltages (potentials) of the first node N1, the second node N2, the third node N3 in the light emission period PEM of the K−1stFRAME, the operation of the respective transistors, and the like are similar to those described in "4-2-1. First Example of Driving Method for Pixel Circuit 181C". Configurations and the like similar to those described in "4-2-1. First Example of Driving Method for Pixel Circuit 181C" will be described as necessary. In addition, configurations and the like similar to "2-2-2. Second Example of Driving Method for Pixel Circuit 181A" will be described as necessary.

In the first period of one horizontal period HRP of the KthFRAME, the image data signal SL(m), including the data signal VDATA, including the voltage VSIGH corresponding to white, is input to the pixel 180C. The voltage supplied to the first node N1 gradually drops from the voltage Vna toward the voltage VSIGH (voltage Vnf, 3.5 V). Since the voltage supplied to the second node N2 and the voltage supplied to the third node N3 are similar to those described in "4-2-1", the description will be omitted.

In the period PIW, the voltage supplied to the first node N1 gradually drops from the voltage Vna toward the voltage Vnf and becomes the voltage Vnf (3.5 V). Since the voltage supplied to the second node N2, the voltage supplied to the third node N3, the potential difference Vgs, and the potential difference Vds are similar to those described in "4-2-1", the description will be omitted.

As described above, in the period PIW, the data signal VDATA including the voltage VSIGH is supplied (written) to the first node N1, the second node N2 is initialized by the initialization voltage VINI1(−3.5 V), and the third node N3 is initialized by the initialization voltage VINI1 (voltage Vnh, −3.5 V) and the voltage Vng (−2.5 V).

In the period PVH following the period PIW, the image data signal SL(m) maintains the state in which the data signal VDATA including the voltage VSIGH is supplied. The first node N1 maintains the state in which Vnf is supplied. Since the voltage supplied to the second node N2, the voltage supplied to the third node N3, the potential difference Vgs, and the potential difference Vds are similar to those described in "4-2-1. First Example of Driving Method for Pixel Circuit 181C", the description will be omitted.

As described above, similar to that described in "4-2-1. First Example of Driving Method for Pixel Circuit 181C", in the period PVH, the threshold voltage VTH of the second transistor T2 is obtained by the operation in which the potential difference Vgs of the second transistor T2 becomes the same as the threshold voltage VTH. In addition, the charge equivalent to the threshold voltage VTH is held in the second node N2 (the gate electrode 622 of the second transistor T2).

In the light emission period PEM of the KthFRAME following the one horizontal period HRP of the KthFRAME, similar to the driving method for the display device 10 according to the second embodiment, for example, as shown in FIG. 35, the first node N1 and the second node N2 are conductive, the voltage of the first node N1 and the voltage of the second node N2 gradually rise, the second transistor Ion is in the conductive state, the drain current N3 flows from the drive power line PVDD to the reference voltage line PVSS, and the voltage of the third node N3 rises to follow the rise in the voltage of the first node N1 and the voltage of the second node N2.

As a result, similar to the driving method for the display device 10 according to the first embodiment, the potential difference Vgs becomes 4.5 V, and the potential difference Vgs becomes greater than the threshold voltage VTH. Therefore, the second transistor T2 is in the ON state, and the drain current Ion flows from the drive power line PVDD to the reference voltage line PVSS, so that the light-emitting element OLED emits light. For example, the pixel 180C emits red light, and white light is emitted by three pixels using the pixel 180C emitting blue light and the pixel 180C emitting green light.

[4-2-3. Third Example of Driving Method for Pixel Circuit 181C]

Figure 36:
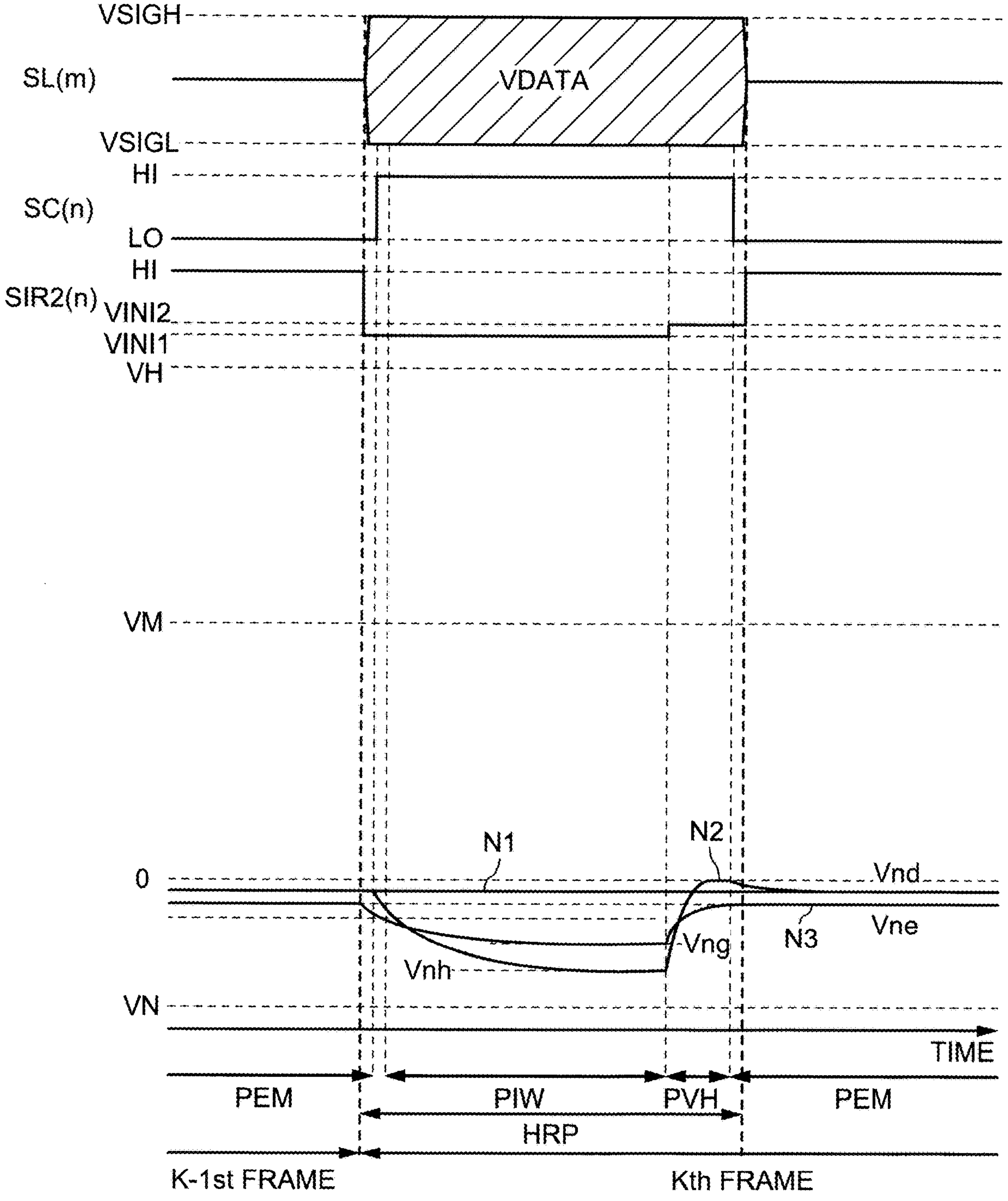
FIG. 36 is a timing chart of a self-luminous display device according to the fourth embodiment of the present invention.

A third example of the driving method for the pixel-circuit 181C will be described with reference to FIG. 36. The driving method shown in the third example of the driving method for the pixel circuit 181C includes displaying images of the same color (black) in consecutive frames similar to the third example of the driving method for the display device 10 according to the second embodiment. The same or similar configurations as those in FIG. 1 to FIG. 35 will be described as necessary.

Configurations of the image data signal SL(m), the scan voltage power supply SIR2(*n*), the scan signal SC(n) in the light emission period PEM of the K−1stFRAME, the one horizontal period HRP and the light emission period PEM of the KthFRAME, the conductive state and the non-conductive state of the respective transistors are similar to those described in "4-2-1". Configurations and the like similar to those described in "4-2-1. First Example of Driving Method for Pixel Circuit 181C" will be described as necessary. In addition, configurations and the like similar to "2-2-3. Third Example of Driving Method for Pixel Circuit 181A" will be described as necessary.

In the light emission period PEM of the K−1stFRAME, for example, the potential difference Vgs is 0.5 V, and the potential difference Vgs is smaller than the threshold voltage VTH of the second transistor T2 (1 V, see Table 8). Since the second transistor T2 is in the OFF state and no current flows from the drive power line PVDD to the reference voltage line PVSS, the light-emitting element OLED does not emit light. As a result, for example, the pixel 180C becomes black.

In the first period of the one horizontal period HRP of the KthFRAME following the light emission period PEM of the K−1stFRAME, the scan voltage power supply SIR2(*n*) changes from the state in which HI is supplied to the state in which the initialization voltage VINI1 (voltage Vnh, −3.5 V) is supplied. When the scan voltage power supply SIR2(*n*) is in the state in which the initialization voltage VINI1 is supplied, the scan signal SC(n) changes from the state in which LO is supplied to the state in which HI is supplied. The image data signal SL(m), including the data signal VDATA, including the voltage VSIGL (−0.5 V) corresponding to the non-light-emitting black, is input to the pixel 180C (pixel circuit 181C). The voltage supplied to the first node N1 remains at the voltage Vnd (−0.5 V) and the first node N1 maintains the state in which −0.5 V is supplied. The voltage supplied to the third node N3 gradually drops from the voltage Vnd (−0.5 V) towards the voltage Vng (−2.5 V). The voltage supplied to the second node N2 gradually drops from the voltage Vnd (−0.5 V) towards the voltage Vnh (−3.5 V).

In the period PIW, the image data signal SL(m) maintains the state in which the data signal VDATA including the voltage VSIGL is supplied. The voltage supplied to the first node N1 remains at −0.5 V and the first node N1 maintains the state in which −0.5 V is supplied. The voltage supplied to the second node N2 gradually drops from the voltage Vnd toward the voltage Vnh and becomes the voltage Vnh (−3.5 V). In addition, the voltage supplied to the third node N3 gradually drops from the voltage Vne (−1 V) towards the voltage Vng (−2.5 V) and becomes the voltage Vng (−2.5 V).

As described above, in the period PIW, the data signal VDATA including the voltage VSIGL (−0.5 V) is supplied (written) to the first node N1, the second node N2 is initialized by the initialization voltage VINI1 (−3.5 V), and the third node N3 is initialized to the voltage Vng (−2.5 V) by the initialization voltage VINI1 (voltage Vnh, −3.5 V).

In the period PVH following the period PIW, the image data signal SL(m) maintains the state in which the data signal VDATA including the voltage VSIGL is supplied. The voltage supplied to the first node N1, the voltage supplied to the second node N2, the voltage supplied to the third node N3, the potential difference Vgs, and the potential difference Vds are similar to those described in "4-2-1. First Example of Driving Method for Pixel Circuit 181C".

As described above, similar to that described in "4-2-1. First Example of Driving Method for Pixel Circuit 181C", in the period PVH, the threshold voltage VTH of the second transistor T2 is obtained by the operation in which the potential difference Vgs of the second transistor T2 becomes the same as the threshold voltage VTH. In addition, the charge equivalent to the threshold voltage VTH is held in the second node N2 (the gate electrode 622 of the second transistor T2).

In the light emission period PEM of the KthFRAME following the one horizontal period HRP of the KthFRAME, the voltage supplied to the first node N1, the voltage supplied to the second node N2, the voltage supplied to the third node N3, the potential difference Vgs, and the potential difference Vds are similar to those described in "4-2-1. First Example of Driving Method for Pixel Circuit 181C". In addition, similar to that described in "4-2-1. First Example of Driving Method for Pixel Circuit 181C", in the light emission period PEM of the KthFRAME following the one horizontal period HRP of the KthFRAME, the pixel 180C emitting red light does not emit light, and the three pixels using the pixel 180C emitting red light, the pixel 180C emitting blue light, and the pixel 180C emitting green light becomes black.

As described above, in the third example of the driving method for the display device 10 (the driving method for the pixel circuit 181C) according to the fourth embodiment, similar to the third example of the driving method for the display device 10 according to the first embodiment, since the voltage fluctuation at each node when displaying images of the same color (black) in consecutive frames is small, the power consumption due to the voltage fluctuation at each node can be reduced. Therefore, the display device 10 is a display device that can reduce power consumption.

[4-2-4. Fourth Example of Driving Method for Pixel Circuit 181C]

Figure 37:
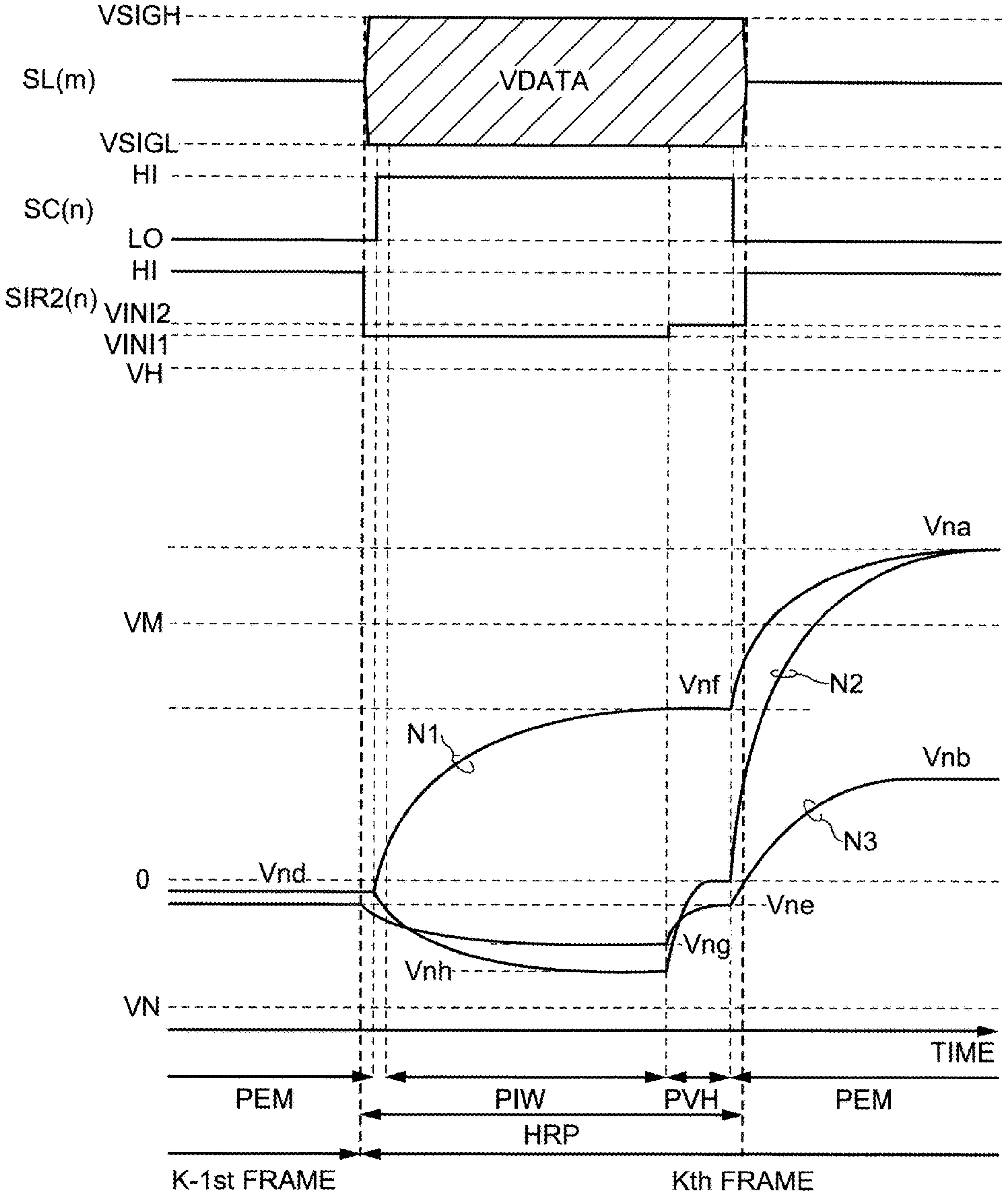
FIG. 37 is a timing chart of a self-luminous display device according to the fourth embodiment of the present invention.

A fourth example of the driving method for the pixel circuit 181C will be described with reference to FIG. 37. The driving method shown in the fourth example of the driving method for the pixel circuit 181C includes displaying images of different colors in consecutive frames similar to the fourth example of the driving method for the display device 10 according to the second embodiment. Configurations that are the same as or similar to those in FIG. 1 to FIG. 36 will be described as necessary.

The configuration of the image data signal SL(m), the scan voltage power supply SIR2(*n*), the scan signal SC(n), the conductive state and the non-conductive state of the respective transistors in the light emission period PEM of the K−1stFRAME, the one horizontal period HRP and the light emission period PEM of the KthFRAME are similar to those described in "4-2-1". In addition, the voltages (potentials) of the first node N1, the second node N2, and the third node N3 in the emission period PEM of the K−1stFRAME, the operation of the respective transistors, and the like are similar to those described in "4-2-3. Third Example of Driving Method for Pixel Circuit 181C". Configurations and the like similar to those described in "4-2-1. First Example of Driving Method for Pixel Circuit 181C" to "4-2-3. Third Example of Driving Method for Pixel Circuit 181C" will be described as necessary. In addition, configurations and the like similar to "3-2-3. Fourth Example of Driving Method for pixel Circuit 181C" will be described as necessary.

In the first period of the one horizontal period HRP of the KthFRAME, the image data signal SL(m), including the data signal VDATA, including the voltage VSIGH corresponding to white, is input to the pixel 180C (the pixel circuit 181C). In addition, as described in "4-2-3", the scan voltage power supply SIR2(*n*) changes from the state in which HI is supplied to the state in which the initialization voltage VINI1 (voltage Vnh, −3.5 V) is supplied. When the scan voltage power supply SIR2(*n*) is in the state in which the initialization voltage VINI1 is supplied, the scan signal SC(n) changes from the state in which LO is supplied to the state in which HI is supplied. The voltage supplied to the first node N1 gradually rises from the voltage Vnd (−0.5 V) toward the voltage VSIGH (voltage Vnf, 3.5 V), the voltage supplied to the second node N2 gradually drops from the voltage Vnd (−0.5 V) toward the voltage Vng (−3.5 V), and the voltage supplied to the third node N3 gradually drops from the voltage Vne (−1 V) toward the voltage Vnh (−2.5 V).

In the period PIW, the voltage supplied to the first node N1 gradually rises from the voltage Vnd (−0.5 V) toward the voltage VSIGH (voltage Vnf, 3.5 V), and the first node N1 is in the state in which the voltage Vnf (3.5 V) is supplied. The voltage supplied to the second node N2 gradually drops from the voltage Vne (−1 V) toward the voltage Vng (−3.5 V), and the second node N2 is in the state in which the voltage Vnd (−3.5 V) is supplied. In addition, the voltage supplied to the third node N3 gradually drops from the voltage Vne (−1 V) toward the voltage Vnh (−2.5 V), and the third node N3 is in the state in which the voltage Vnh (−2.5 V) is supplied. In this case, the potential difference Vgs becomes −1 V (−3.5 V−(−3.5 V) and the potential difference Vds becomes 10.5 V (8 V−(−2.5 V)).

As described above, in the period PIW, the data signal VDATA including the voltage VSIGH is supplied (written) to the first node N1, the second node N2 is initialized by the initialization voltage VINI1 (−3.5 V), and the third node N3 is initialized to the voltage Vng (−2.5 V) by the initialization voltage VINI1 (voltage Vnh, −3.5 V).

In the period PIW following the period PVH, similar to that described in "4-2-2. Second Example of Driving Method for Pixel Circuit 181C", the first node N1 maintains the state in which the voltage Vnf is supplied, the second node N2 rises to the initialization voltage VINI2 (0 V), the voltage supplied to the third node N3 rises from the voltage Vnc to the voltage Vne, and the third node N3 is in the state in which the voltage Vne (−1 V) is supplied.

As described above, in the period PVH, the threshold voltage VTH of the second transistor T2 is obtained by the operation in which the potential difference Vgs of the second transistor T2 becomes the same as the threshold voltage VTH. In addition, the charge equivalent to the threshold voltage VTH is held in the second node N2 (the gate electrode 622 of the second transistor T2).

In the light emission period PEM of the KthFRAME following the one horizontal period HRP of the KthFRAME, similar to that described in "4-2-2. Second Example of Driving Method for Pixel Circuit 181C", the potential difference Vgs becomes 4.5 V. The potential difference Vgs is greater than the threshold voltage VTH, the second transistor T2 is in the ON state, and the drain current Ion flows from the drive power line PVDD to the reference voltage line PVSS. As a result, the light-emitting element OLED emits light. For example, the pixel 180C emits red light, and white light is emitted by three pixels using the pixel 180A emitting red light, the pixel 180C emitting blue light, and the pixel 180C emitting green light.

5. Fifth Embodiment

Figure 38:
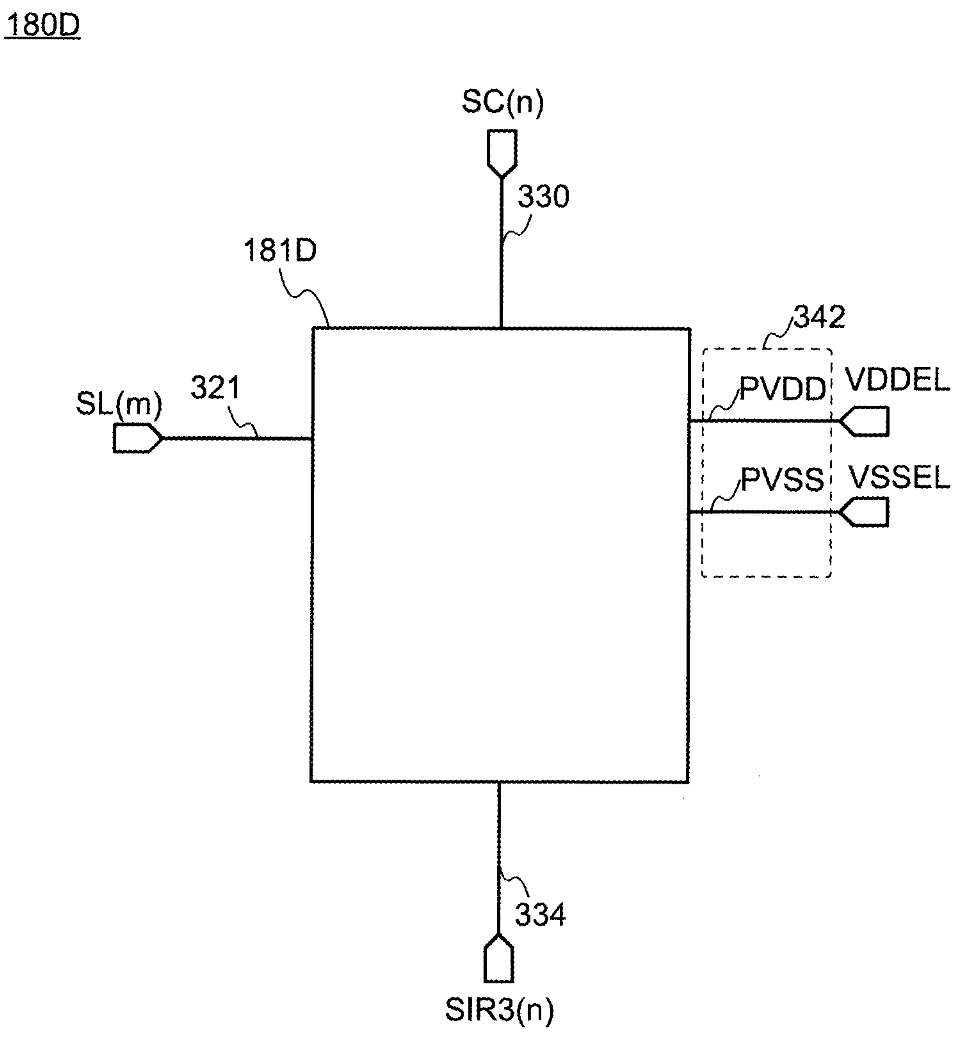
FIG. 38 is a schematic diagram showing an input signal to a pixel circuit according to the fifth embodiment of the present invention.
Figure 39:
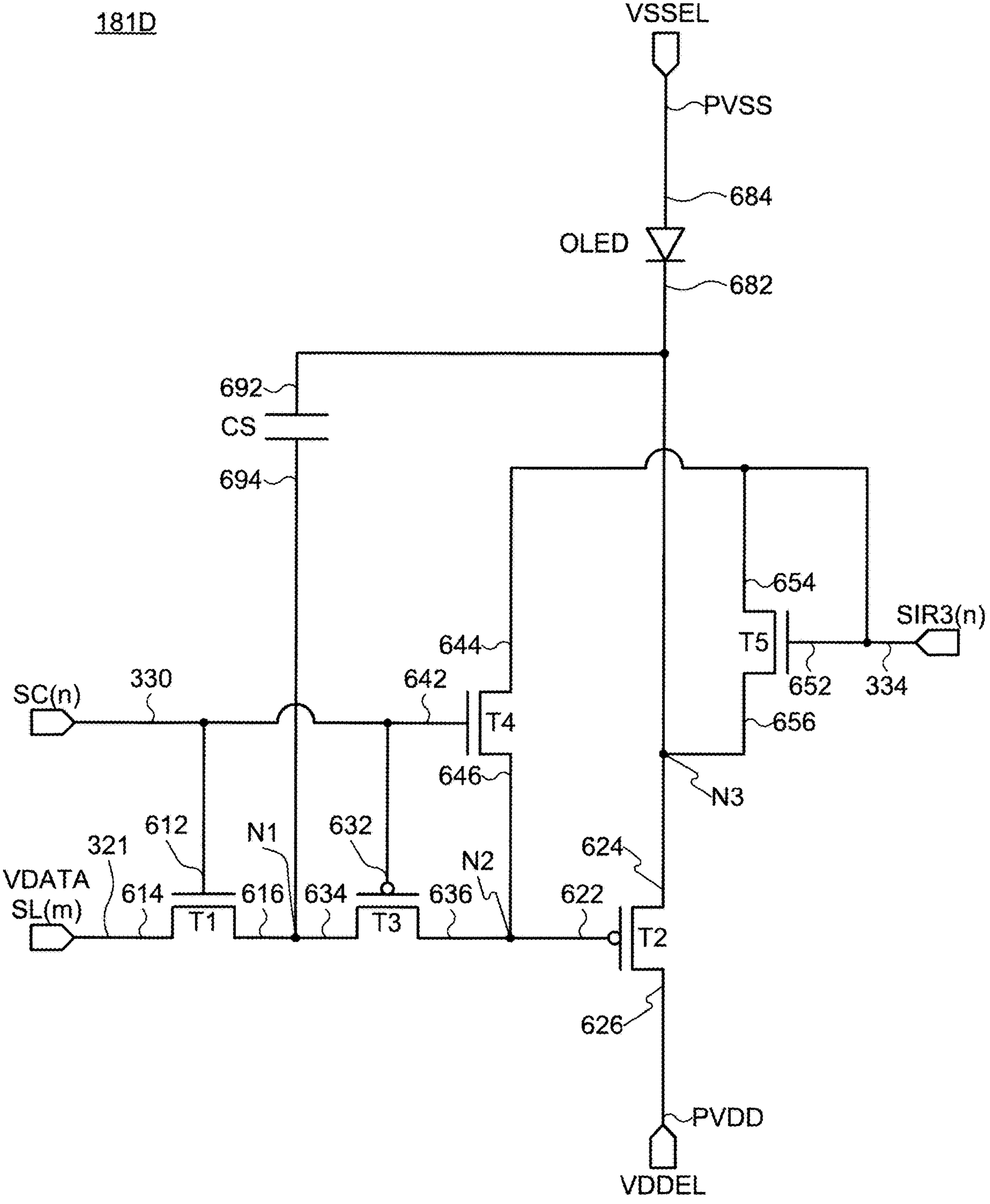
FIG. 39 is a circuit diagram showing a configuration of a pixel circuit according to the fifth embodiment of the present invention.
Figure 41:
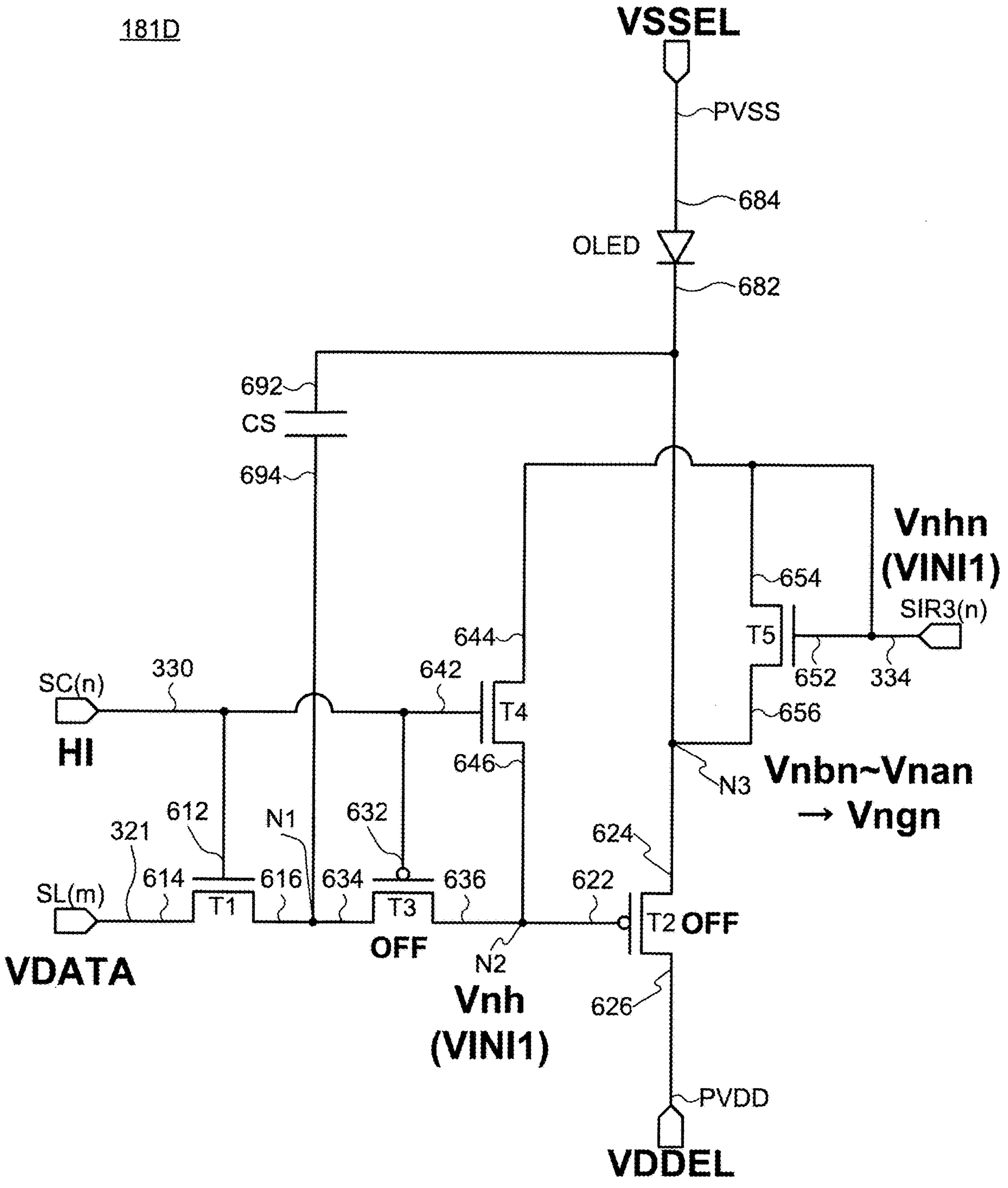
FIG. 41 is a schematic diagram showing an operation state of the pixel circuit shown in FIG. 39 at the timing shown in FIG. 40.
Figure 42:
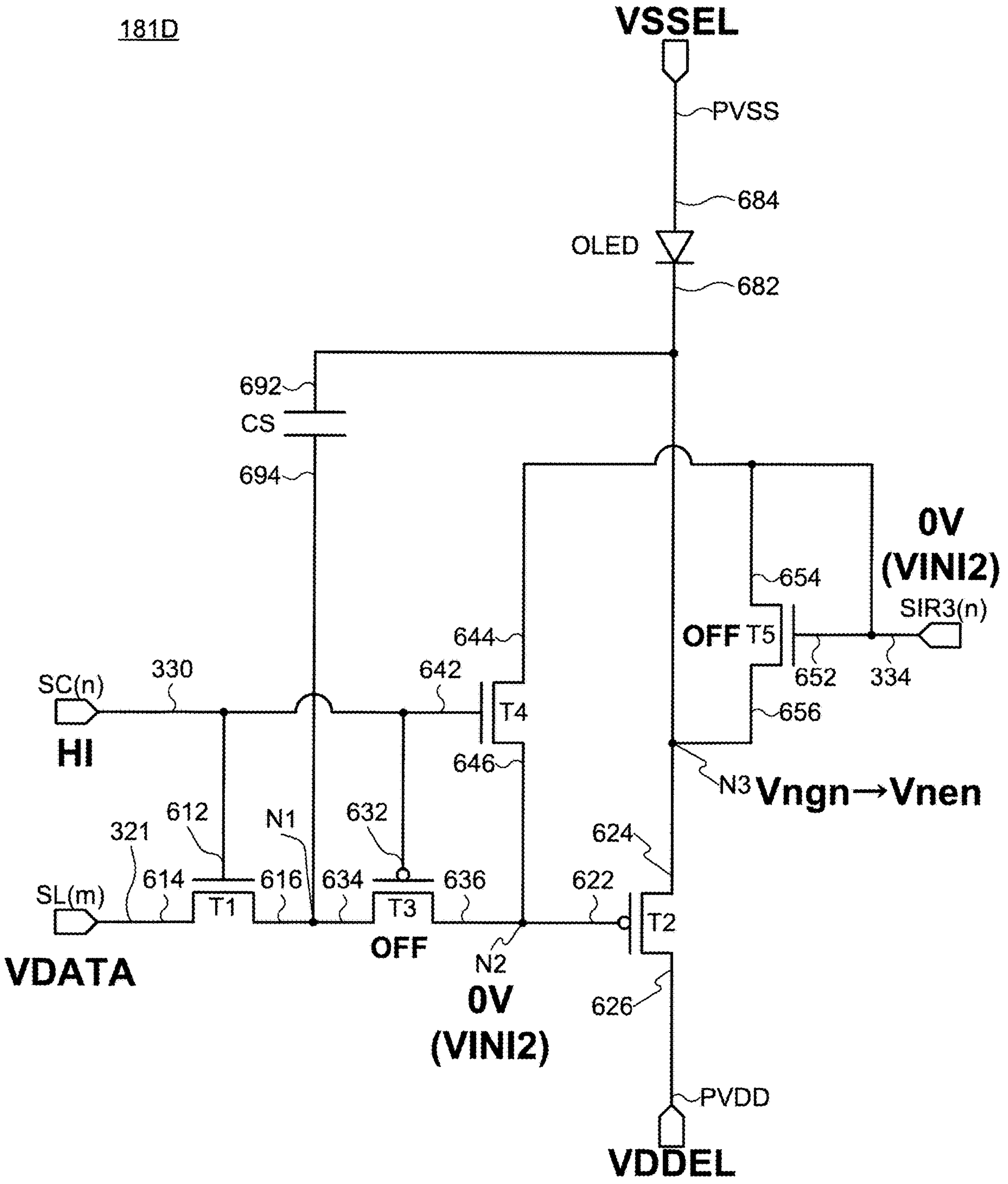
FIG. 42 is a schematic diagram showing an operation state of the pixel circuit shown in FIG. 39 at the timing shown in FIG. 40.
Figure 43:
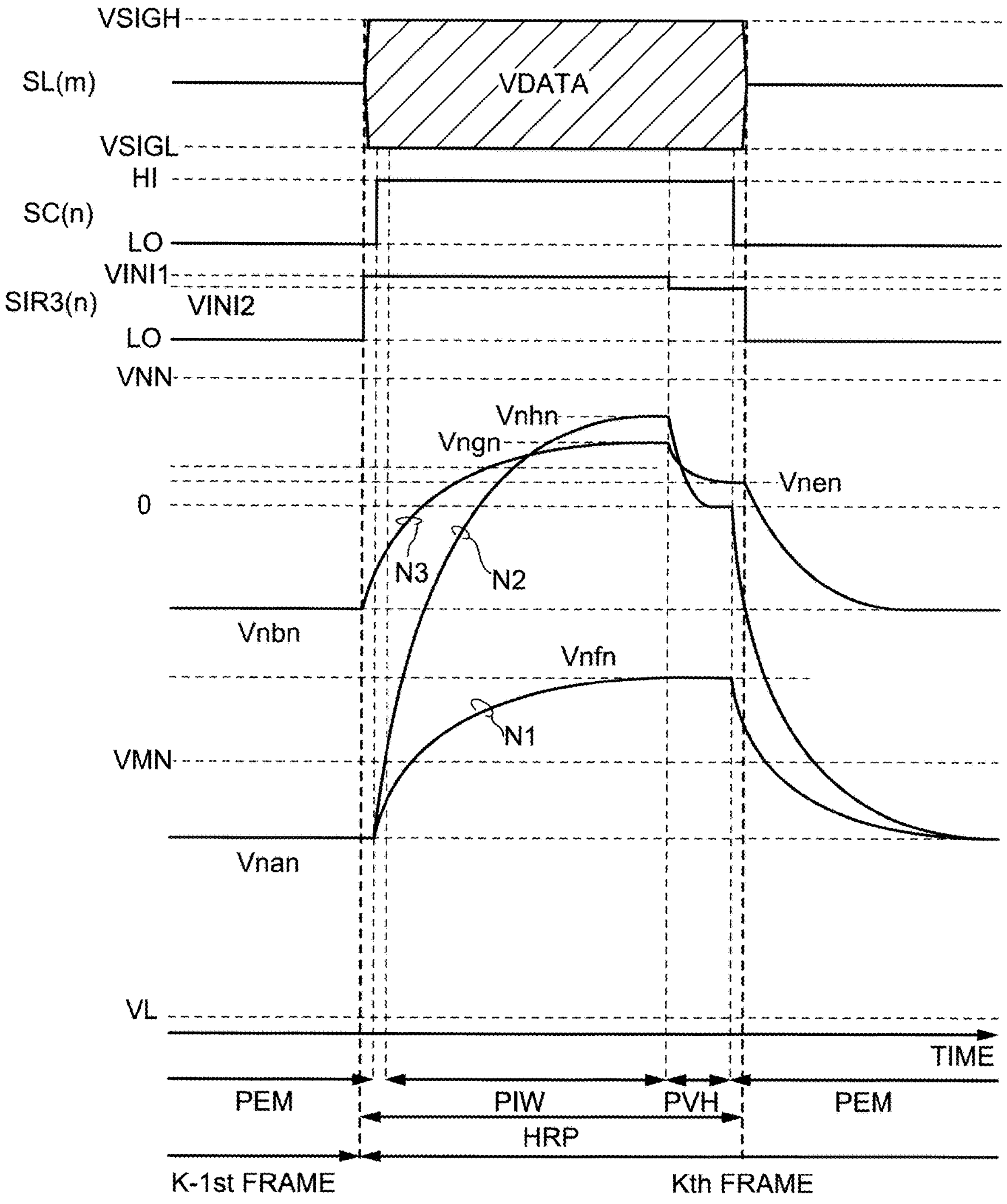
FIG. 43 is a timing chart of a self-luminous display device according to the fifth embodiment of the present invention.
Figure 44:
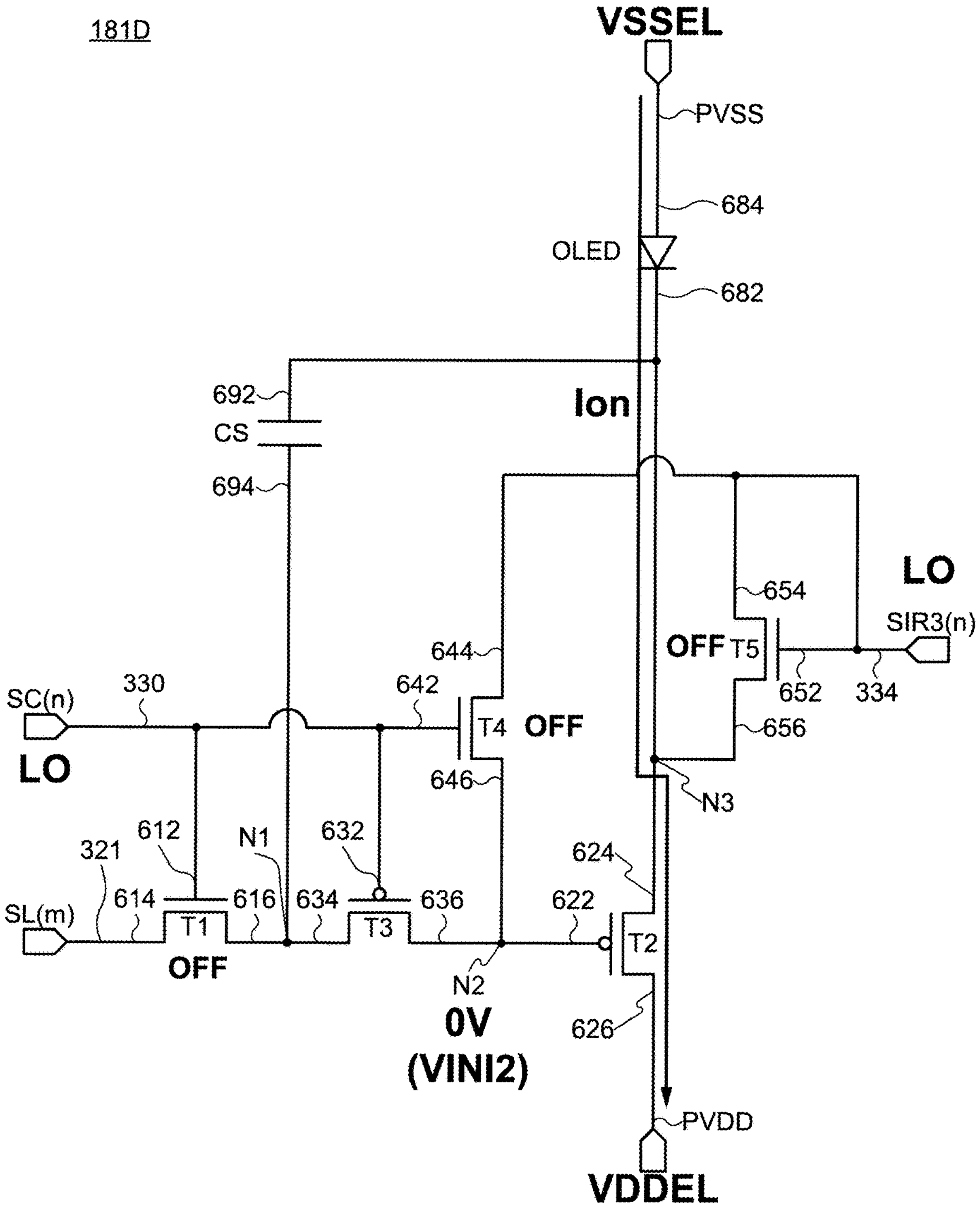
FIG. 44 is a schematic diagram showing an operation state of the pixel circuit shown in FIG. 39 at the timing shown in FIG. 43.

An overview of the display device 10 according to the fifth embodiment will be described with reference to FIG. 1, FIG. 4, and FIG. 38 to FIG. 46. FIG. 38 is a schematic diagram showing an input signal to a pixel 180D (pixel circuit 181D) according to the fifth embodiment of the present invention. FIG. 39 is a circuit diagram showing a configuration of the pixel circuit 181D. FIG. 40, FIG. 43, FIG. 45, and FIG. 46 are timing charts of the display device 10 according to the fifth embodiment of the present invention. FIG. 41 and FIG. 42 are schematic diagrams showing operation states of the pixel circuit 181D at the timings shown in FIG. 40. FIG. 44 is a schematic diagram showing the operation state of the pixel circuit 181D at the timing shown in FIG. 43.

The display device 10 according to the fifth embodiment has a configuration and function in which the pixel 180B and the pixel circuit 181B of the display device 10 according to the third embodiment are replaced with the pixel 180D and the pixel circuit 181D. Other configurations and functions are similar to those of the display device 10 according to the third embodiment. Therefore, in describing the configurations and functions of the fifth embodiment, configurations and functions similar to those of the display device 10 according to the third embodiment will be described as necessary.

[5-1. Configuration of Pixel 180D]

An overview of the pixel 180D and the pixel circuit 181D will be described with reference to FIG. 38 and FIG. 39.

As shown in FIG. 38 and FIG. 39, the pixel circuit 181D includes a configuration and function in which the second scan signal SC2(*n*) and the scan voltage power supply SIRB(n) supplied to the pixel circuit 181B are replaced with a scan voltage power supply SIR3(*n*) that combines the second scan signal SC2(*n*) and the scan voltage power supply SIRB(n). In addition, as shown in FIG. 39, the configuration of the second transistor T2 and the light-emitting element OLED of the pixel circuit 181D is different from that of the pixel circuit 181B.

Specifically, as shown in FIG. 38, the pixel circuit 181D is connected to the second scan signal line 334 to which the scan voltage power supply SIR3(*n*) is supplied. The second scan signal line 334 according to the fifth embodiment is a signal line serving as both the second scan signal line 334 and the scan voltage power line SVIRB supplied to the pixel circuit 181B. In other words, the second scan signal line 334 according to the fifth embodiment is a signal line in which the second scan signal line 334 supplied to the pixel circuit 181B and the scan voltage power line SVIRB are combined and integrated. In addition, the scan voltage power supply SIR3(*n*) is a signal obtained by inverting the polarity of the scan voltage power supply SIR2(*n*) supplied to the pixel circuit 181C. Similar to the scan voltage power supply SIR3(*n*), signals other than the scan voltage power supply SIR3(*n*) supplied to the pixel circuit 181D are also signals obtained by inverting the polarity of the signals other than the scan voltage power supply SIR2(*n*) supplied to the pixel circuit 181C. The second scan signal line 334 (the signal line serving as both the second scan signal line 334 and the scan voltage power line SVIRB) according to the fifth embodiment may be referred to as a third control signal line. The scan voltage power supply SIR3(*n*) may be referred to as a third control signal.

Specifically, as shown in FIG. 39, the pixel circuit 181D includes the second transistor T2, and a p-channel field-effect transistor. In addition, in the pixel circuit 181D, the second electrode 684 of the light-emitting element OLED is electrically connected to the reference voltage line PVSS, and the first electrode 682 of the light-emitting element OLED is electrically connected to the first electrode 624 of the second transistor T2, the third node N3, the second electrode 656 of the fifth transistor T5, and the first electrode 692 of the capacitive element CS. The first electrode 682 of the light-emitting element OLED is, for example, the cathode electrode, and the second electrode 684 of the light-emitting element OLED is, for example, the anode electrode.

The fourth transistor T4 has a function of conducting the second node N2 and the second scan signal line 334 to supply the scan voltage power supply SIR3(*n*) (the initialization voltage VINI1 or VINI2) to the second node N2 and initializing the second node N2.

The fifth transistor T5 has a function of conducting the third node N3 and the second scan signal line 334 to supply the scan voltage power supply SIR3(*n*) (the initialization voltage VINI2) to the third node N3 and initializing the third node N3.

Configurations and functions of the pixel circuit 181D other than the configurations and functions described in "5-1. Configuration of Pixel 180D" are similar to that of the pixel circuit 181B.

[5-2. Driving Method for Pixel Circuit 181D]

A driving method for the display device 10 according to the fifth embodiment will be described with reference to FIG. 40 to FIG. 46. Configurations that are the same as or similar to those in FIG. 1 to FIG. 39 will be described as necessary. Similar to the first embodiment and the second embodiment, the horizontal axis of the timing charts represents time (TIME).

For example, the driving method for the display device 10 according to the fifth embodiment has a configuration and function in which the operation related to the second scan signal SC2(*n*) and the scan voltage power supply SIRB(n) in the driving method for the display device 10 according to the third embodiment is replaced with the operation related to the scan voltage power supply SIR3(*n*) that combines the second scan signal SC2(*n*) and the scan voltage power supply SIRB(n). The description of configurations and functions similar to those of the driving method for the display device 10 according to the third embodiment will be omitted here.

In addition, for example, the driving method for the display device according to the fifth embodiment is a driving method in which the polarities of the respective signals in the driving method for the display device 10 (the pixel circuit 181C) according to the fourth embodiment are inverted, and is a driving method in which the polarities of the voltages (potentials) supplied to the respective nodes in the driving method for the display device 10 according to the fourth embodiment are inverted. In addition, the scan voltage power supply SIR3(*n*) is a signal obtained by inverting the polarity of the scan voltage power supply SIR2(*n*) according to the fourth embodiment. The description of configurations and functions similar to those of the driving method for the display device 10 according to the fourth embodiment will be omitted here.

The driving method for the display device 10 according to the fifth embodiment includes periods similar to those of the driving method for the display device 10 shown in FIG. 4.

FIG. 40, FIG. 43, FIG. 45, and FIG. 46 are diagrams for explaining the period PIW and the period PVH of the driving method for the pixel 180D. FIG. 40, FIG. 43, FIG. 45, and FIG. 46 show the light emission period PEM of the previous frame (K−1stFRAME) of the current frame, the period PIW and the period PVH of the current frame (KthFRAME). In addition, FIG. 40, FIG. 43, FIG. 45, and FIG. 46 show one horizontal period (the horizontal period HRP) for one pixel 180D.

In the one horizontal period in the driving method for the display device 10 according to the fifth embodiment, the scan signal SC(n) and the scan voltage power supply SIR3(*n*) are input to the pixel 180D. For example, the scan signal SC(n) and the scan voltage power supply SIR3(*n*) are shifted, and the pixel 180D corresponding to the shifted signal is selected. The image data signal SL(m), the initialization voltage VINI, and the reference voltage VREF are input to the selected pixel 180D. A similar operation is performed for all the pixels 180D, and an image of the frame corresponding to 1FRAME is displayed in the display region 22 of the display device 10 based on the image data signal SL(m) input to all the pixels 180D.

For example, the voltages (potentials) supplied to each signal and each node of each frame in the timing charts shown in FIG. 40, FIG. 43, FIG. 45, and FIG. 46 are shown in Table 9 and Table 10.

TABLE 9

| | PIW | PVH | PEM |
|---|---|---|---|
| SC(n) | HI | HI | LO |
| SIR3(n) | 3.5 [V] | 0 [V] | -10 [V] |
| SL(m) | −3.5 [V](White) ~0.5 [V](Black) | — | — |
| N1 | −3.5 [V](White) ~0.5 [V](Black) | −3.5 [V] ~0.5 [V] | Drop with drop of potential of N3 |
| N2 | 3.5 [V] | 0 [V] | In conjunction with potential of N1 |
| N3 | 2.5 [V] | 1 [V] (=VINI2-VTHP) | Drop in conjunction with lon with VGS |

TABLE 9-continued

| | PIW | PVH | PEM |
|---|---|---|---|
| Vgs (=V(N2)-V(N3)) | 1 [V] | −1 [V] | |
| Remarks | Initialize T2 and OLED Apply VDATA to CS Potential of N3 = Potential of N2-VTHT5 | Acquiring and retaining VTH Potential of N3 = VINI2-VTHP Potential of N1-Potential of N3 = VDATA-(VINI2-VTHP) Non-light emitting above VTHEL | Light emitting VGS = VDATA-(VINI2-VTHP) |

TABLE 10

| | Setting value [V] |
|---|---|
| VTHP | −1 |
| VTHT5 | 1 |
| VTHEL | −0.7 |
| VDATA(Black) | 0.5 |
| VDATA(White) | −3.5 |
| HI | 3.5 |
| LO | −10 |
| VINI1 | 3.5 |
| VINI2 | 0 |
| VDDEL | −8 |
| VSSEL | 0 |

As described above, the polarity of the signal supplied to the pixel circuit 181D is a signal obtained by inverting the polarity of the signal supplied to the pixel circuit 181C. For example, as shown in Table 9, Table 10, FIG. 40, FIG. 43, FIG. 45, and FIG. 46, the voltage VSIGL included in the data signal VDATA is −3.5 V, and the pixel 180D to which the voltage VSIGL is supplied emits light. For example, one pixel emits red light, one pixel emits green light, one pixel emits blue light, and white light is emitted by the three pixels. In addition, for example, the voltage VSIGH included in the data signal VDATA is 0.5 V, and the pixel 180D to which the voltage VSIGH is supplied does not emit light and becomes black. Furthermore, for example, the voltage VL (LO) is −10 V, the voltage VNN is 5 V, the voltage VMN is −5 V, the initialization voltage VINI1 is 3.5 V, and the initialization voltage VINI2 is 0 V. For example, the voltage VH (HI), the voltage VL (LO), the voltage VNN, the voltage VMN, the initialization voltage VINI1, the initialization voltage, and the initialization voltage VINI2 supplied to the voltage 181D correspond to voltages (potentials) obtained by inverting the polarities of the voltage VL (LO), the voltage VH (HI), the voltage VN, the voltage VM, the initialization voltage VINI2, and the initialization voltage VINI1 supplied to the pixel circuit 181C.

[5-2-1. First Example of Driving Method for Pixel Circuit 181D]

A first example of the driving method for the pixel circuit 181D will be described with reference to FIG. 40 to FIG. 42. The first example of the driving method for the pixel circuit 181D includes the pixel 180D displaying a white image based on the voltage VSIGL (−3.5 V) included in the data signal VDATA in the previous frame (K−1stFRAME) of the current frame (KthFRAME), and then the pixel 180D displaying a black image based on the voltage VSIGH (0.5 V) included in the data signal VDATA in the KthFRAME. In other words, the first example of the display device 10 according to the fifth embodiment includes displaying images of different colors in consecutive frames.

As described above, the configuration and function of each signal in the light emission period PEM of the K−1stFRAME, the one horizontal period HRP and the light emission period PEM of the KthFRAME is similar to the configuration and function of the signal obtained by inverting the voltages (potentials) of the respective signals of the driving method for the display device 10 according to the fourth embodiment. In addition, for example, the voltages (potentials) of the first node N1, the second node N2, and the third node N3 in the light emission period PEM of the K−1stFRAME, the one horizontal period HRP and the light emission period PEM of the KthFRAME are voltages (potentials) obtained by inverting the polarities of the voltages (potentials) of the respective nodes of the driving method for the display device 10 according to the fourth embodiment. The conduction and non-conduction of the transistors in the light emission period PEM of the K−1stFRAME, the one horizontal period HRP and the light emission period PEM of the KthFRAME are also similar to those described in "4-2-1. First Example of Driving Method for Pixel Circuit 181C".

For example, the voltage Vnan, the voltage Vnbn, the voltage Vncn, the voltage Vndn, the voltage Vnen and the voltage Vnfn are voltages (potentials) obtained by inverting the polarities of the voltage Vna, the voltage Vnb, the voltage Vnc, the voltage Vnd, the voltage Vne and the voltage Vnf. Referring to the respective voltages (potentials) in the driving method according to the fourth embodiment, the voltage Vnan is −7 V, the voltage Vnbn is −2.5 V, the voltage Vncn is 1.5 V, the voltage Vndn is 0.5 V, the voltage Vnen is 1 V, the voltage Vnfn is −3.5 V, a voltage Vngn is 2.5 V, and a voltage Vnhn is 3.5 V.

Figure 40:
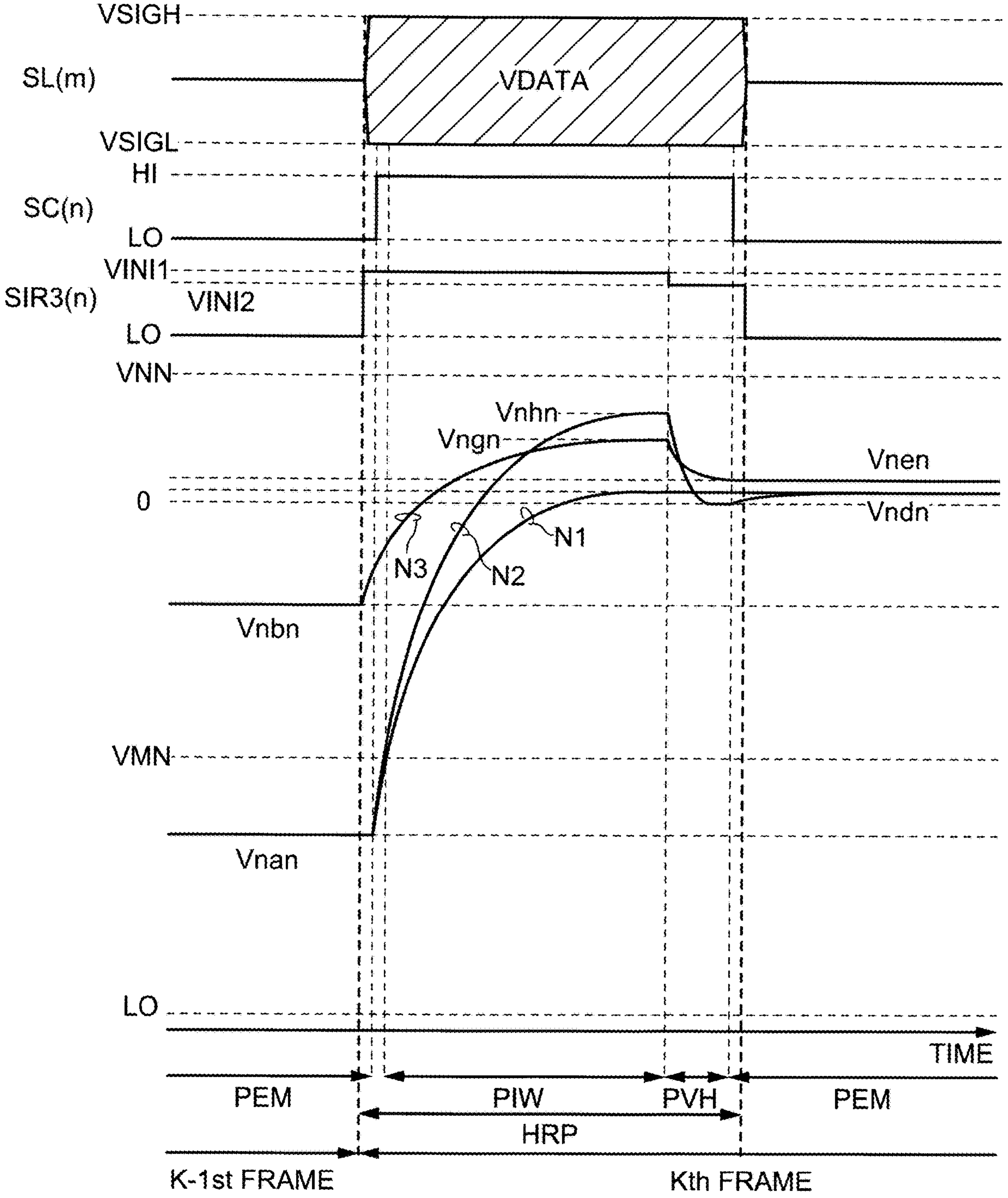
FIG. 40 is a timing chart of a self-luminous display device according to the fifth embodiment of the present invention.

Referring to the conductive state and the non-conductive state of the respective transistors in the light emission period PEM of the K−1stFRAME of the first example in the driving method according to the fourth embodiment and FIG. 40, in the light emission period PEM of the K−1stFRAME, the pixel 180D emits light according to the potential difference Vgs of the second transistor T2 (voltage V (N2)−voltage V (N3)=voltage Vnan−voltage Vnbn). The potential difference Vgs is −4.5 V, and the pixel 180B emits red light, and white light is emitted by three pixels using the pixel 180 emitting red light, the pixel 180 emitting blue light, and the pixel 180 emitting green light.

For example, in the first period of the one horizontal period HRP of the KthFRAME following the light emission period PEM of the K−1stFRAME, the scan voltage power supply SIR3(*n*) changes from the state in which LO is supplied to the state in which the initialization voltage VINI1 (3.5 V) is supplied. When the scan voltage power supply SIR3(*n*) is supplied with the initialization voltage VINI1, the scan signal SC(n) changes from the state in which LO is supplied to the state in which HI is supplied. Referring to the conductive state and the non-conductive state in the first period of the horizontal period HRP of the KthFRAME of the first example in the driving method according to the fourth embodiment and FIG. 40, the voltage supplied to the first node N1 gradually rises from the voltage Vnan toward the voltage VSIGH (voltage Vndn), and the voltage supplied to the second node N2 gradually rises from the voltage Vnan toward the initialization voltage VINI1 (Vnhn).

For example, as shown in FIG. 40 and FIG. 41, in the period PIW, the image data signal SL(m) maintains the state in which the data signal VDATA including the voltage VSIGH is supplied, the scan signal SC(n) maintains the state in which HI is supplied, and the scan voltage power supply SIR3(*n*) maintains the state in which the initialization voltage VINI1 is supplied. Referring to the conductive state and the non-conductive state in the period PIW of the first example in the driving method according to the fourth embodiment and FIG. 40, when the voltage supplied to the third node N3 gradually rises from the voltage Vnbn and the potential difference between the initialization voltage VINI1 (3.5 V) supplied to the gate electrode 652 and the voltage supplied to the second electrode 656 (the voltage supplied to the third node N3) becomes the same as the threshold voltage VTHT5 (1 V) of the fifth transistor T5, the fifth transistor T5 is turned from the ON state to the OFF state. That is, the voltage supplied to the second electrode 656 (the voltage supplied to the third node N3) becomes the voltage Vngn (2.5 V), so that the fifth transistor T5 is turned from the ON state to the OFF state. In addition, the voltage supplied to the first node N1 gradually rises from the voltage Vnan toward the voltage VSIGH (voltage Vndn, 0.5 V) and becomes the voltage Vndn (0.5 V). The voltage supplied to the second node N2 gradually rises from the voltage Vnan toward the initialization voltage VINI1 (voltage Vnhn, 3.5 V) and becomes the initialization voltage VINI1 (3.5 V). When the potential difference Vgs between the voltage supplied to the second node N2 and the voltage supplied to the third node N3 becomes the same as the threshold voltage VTHT5 (1 V), the fifth transistor T5 is turned from the ON state to the OFF state. When the fifth transistor T5 is in the OFF state, the potential difference Vds is −10.5 V (−8 V−(2.5 V)).

As described above, in the period PIW, the data signal VDATA including the voltage VSIGH is supplied (written) to the first node N1, the second node N2 is initialized by the initialization voltage VINI1 (3.5 V), and the third node N3 is initialized to the voltage Vngn (2.5 V) by the initialization voltage VINI1 (voltage Vnhn, 3.5 V).

In the period PVH, the image data signal SL(m) maintains the state in which the data signal VDATA including the voltage VSIGH is supplied. In addition, the scan signal SC(n) is maintained in the state in which HI is supplied, and the scan voltage power supply SIR3(*n*) changes from the state in which the initialization voltage VINI1 is supplied to the state in which the initialization voltage VINI2 is supplied.

Immediately after the start of the period PVH, the potential difference Vgs is 1 V, the potential difference Vds is −10.5 V, and the potential difference Vgs is higher than the threshold voltage VTHP (−1 V, see Table 10) of the second transistor T2, so that the second transistor T2 is in the OFF state. Therefore, the drain current Ion does not flow from the first electrode 624 to the second electrode 626 of the second transistor T2.

In the period PVH, referring to the conductive state and the non-conductive state of the respective transistors in the period PVH of the KthFRAME of the first example in the driving method according to the fourth embodiment and FIG. 40, since the fourth transistor T4 is maintained in the ON state, when the voltage supplied to the scan voltage power supply SIR3(*n*) changes from the initialization voltage VINI1 to the initialization voltage VINI2, the voltage supplied to the second node N2 gradually drops from the voltage Vnhn (3.5 V) toward the initialization voltage VINI2 (0 V) and becomes the initialization voltage VINI2 (0 V) (e.g., FIG. 40 and FIG. 42). In this case, for example, as shown in FIG. 40 and FIG. 42, the fifth transistor T5 is in the OFF state, but Vgs of the second transistor T2 becomes −2.5 V (0 V (node N2)−(2.5 V) (node N3)) smaller (lower) than the threshold voltage VTHP (−1 V), the drain current Ion of the second transistor T2 starts to flow, and the voltage supplied to the third node N3 gradually drops from the voltage Vngn (2.5 V) toward the voltage Vnen (1 V). As a result, the voltage supplied to the third node N3 becomes the voltage Vnen (1 V) and the voltage supplied to the second node N2 is the initialization voltage VINI2 (0 V), so that the potential difference Vgs is −1 V (0 V−(1 V)). Since the potential difference Vgs is the same as the threshold voltage VTHP (−1 V), the second transistor T2 is in the OFF state. Therefore, the drain current Ion does not flow from the second electrode 626 of the second transistor T2 to the first electrode 624.

As described above, in the period PVH, the threshold voltage VTHP of the second transistor T2 is obtained by the operation in which the potential difference Vgs of the second transistor T2 is the same as the threshold voltage VTHP. In addition, the charge equivalent to the threshold voltage VTHP is held in the second node N2 (the gate electrode 622 of the second transistor T2).

In the light emission period PEM of the KthFRAME following the one horizontal period HRP of the KthFRAME, data is not selected using the selection signal, and the data signal VDATA is maintained at a voltage equal to or higher than the voltage VSIGL and equal to or lower than the voltage VSIGH. In addition, the scan signal SC(n) changes from the state in which HI is supplied to the state in which LO is supplied. When the scan signal SC(n) is in the state in which LO is supplied, the scan voltage power supply SIR3 (*n*) changes from the state in which the initialization voltage VINI2 (0 V) is supplied to the state in which LO (−10 V) is supplied.

Therefore, referring to the conductive state and the non-conductive state of the respective transistors in the period PVH of the KthFRAME of the first example in the driving method according to the fourth embodiment and FIG. 40, the first node N1 and the second node N2 are conductive, and the potential difference Vgs becomes −0.5 V. The potential difference Vgs is greater than the threshold voltage VTHP. Therefore, since the second transistor T2 is in the OFF state and no current flows from the drive power line PVDD to the reference voltage line PVSS, the light-emitting element OLED does not emit light. As a result, for example, the pixel 180D emitting red light, the pixel 180D emitting blue light, and the pixel 180D emitting green light do not emit light, so that the three pixels using the pixel 180D emitting red light, the pixel 180D emitting blue light, and the pixel 180D emitting green light become black.

As described above, similar to the driving method for the display device 10 according to the fourth embodiment, the driving method for the display device 10 according to the fifth embodiment (the driving method for the pixel circuit 181D) includes executing the process (driving) executed in the writing period and the process (driving) executed in the initialization period at the same timing. In addition, similar to the pixel circuit 181B, the pixel circuit 181D has a configuration capable of reducing the number of signal lines, so that the display device including the pixel circuit 181D can reduce the size of the pixel. Therefore, the display device 10 and the driving method for the display device 10 according to the fifth embodiment has effects similar to those of the display device 10 and the driving method for the display device 10 according to the third embodiment.

[5-2-2. Second Example of Driving Method for Pixel Circuit 181D]

A second example of the driving method for the pixel-circuit 181D will be described with reference to FIG. 43 and FIG. 44. The driving method shown in the second example of the pixel circuit 181D includes the pixel 180D displaying a white image based on the voltage VSIGL (−3.5 V) included in the data signal VDATA in the previous frame (K−1stFRAME) of the current frame (KthFRAME), and then the pixel 180D displaying a white image based on the voltage VSIGL (−3.5 V) included in the data signal VDATA even in the KthFRAME. In other words, the second example of the display device 10 according to the fifth embodiment includes displaying images of the same color (white) in consecutive frames. Configurations that are the same as or similar to those in FIG. 1 to FIG. 40 will be described as necessary.

The configuration of the image data signal SL(m), the scan voltage power supply SIR(n), and the scan signal SC(n) in the light emission period PEM of the K−1stFRAME, the one horizontal period HRP and the light emission period PEM of the KthFRAME, and the conductive state and the non-conductive state of the respective transistors are similar to those described in "5-2-1". In addition, the voltages (potentials) of the first node N1, the second node N2, and the third node N3 in the light emission period PEM of the K−1stFRAME, the operation of the respective transistors, and the like are similar to those described in "5-2-1". Configurations and the like similar to those described in "5-2-1" will be described as necessary.

In the first period of the one horizontal period HRP of the KthFRAME, the image data signal SL(m), including the data signal VDATA, including the voltage VSIGL corresponding to white, is input to the pixel 180D. The voltage supplied to the first node N1 gradually rises from the voltage Vnan toward the voltage VSIGL (voltage Vnfn, −3.5 V). Since the voltage supplied to the second node N2 and the voltage supplied to the third node N3 are similar to those described in "5-2-1. First Example of Driving Method for Pixel Circuit 181D", the description will be omitted here.

In the period PIW, the voltage supplied to the first node N1 gradually rises from the voltage Vnan toward the voltage Vnfn and becomes the voltage Vnfn (−3.5 V). The voltage supplied to the second node N2, the voltage supplied to the third node N3, the potential difference Vgs, and the potential difference Vds are similar to those described in "5-2-1. First Example of Driving Method for Pixel Circuit 181D".

As described above, in the period PIW, the data signal VDATA including the voltage VSIGL is supplied (written) to the first node N1, the second node N2 is initialized by the initialization voltage VINI1 (voltage Vnhn, −3.5 V), and the third node N3 is initialized to the voltage Vngn (−2.5 V) by the initialization voltage VINI1 (voltage Vnhn, −3.5 V).

In the period PVH following the period PIW, the image data signal SL(m) maintains the state in which the data signal VDATA including the voltage VSIGL is supplied. The first node N1 maintains the state in which the voltage Vnfn is supplied. The voltage supplied to the second node N2, the voltage supplied to the third node N3, the potential difference Vgs, and the potential difference Vds are similar to those described in "5-2-1. First Example of Driving Method for Pixel Circuit 181D".

As described above, similar to that described in "5-2-1. First Example of Driving Method for Pixel Circuit 181D", the threshold voltage VTHP of the second transistor T2 is corrected in the period PVH so that the potential difference Vgs of the second transistor T2 becomes the same as the threshold voltage VTHP. In addition, the charge equivalent to the threshold voltage VTHP is held in the second node N2 (the gate electrode 622 of the second transistor T2).

In the light emission period PEM of the KthFRAME following the one horizontal period HRP of the KthFRAME, similar to that described in "4-2-1", for example, as shown in FIG. 44, the first node N1 and the second node N2 are conductive, the voltage of the first node N1 and the voltage of the second node N2 gradually drop, the second transistor T2 is in the conductive state, the drain current Ion flows from the reference voltage line PVSS to the drive power line PVDD, and the voltage of the third node N3 drops to follow the drop in the voltage of the first node N1 and the voltage of the second node N2.

As a result, the potential difference Vgs (voltage Vnan (−7 V)−voltage Vnbn (−2.5 V)) becomes −4.5 V and the potential difference Vgs becomes smaller than the potential difference VTHP (−1 V). Therefore, the second transistor T2 is in the ON state, and the drain current Ion flows from the reference voltage line PVSS to the drive power line PVDD, so that the light-emitting element OLED emits light. For example, the pixel 180D emits red light, and white light is emitted by three pixels using the pixel 180D emitting red light, the pixel 180D emitting blue light, and the pixel 180D emitting green light.

[5-2-3. Third Example of Driving Method for Pixel Circuit 181D]

Figure 45:
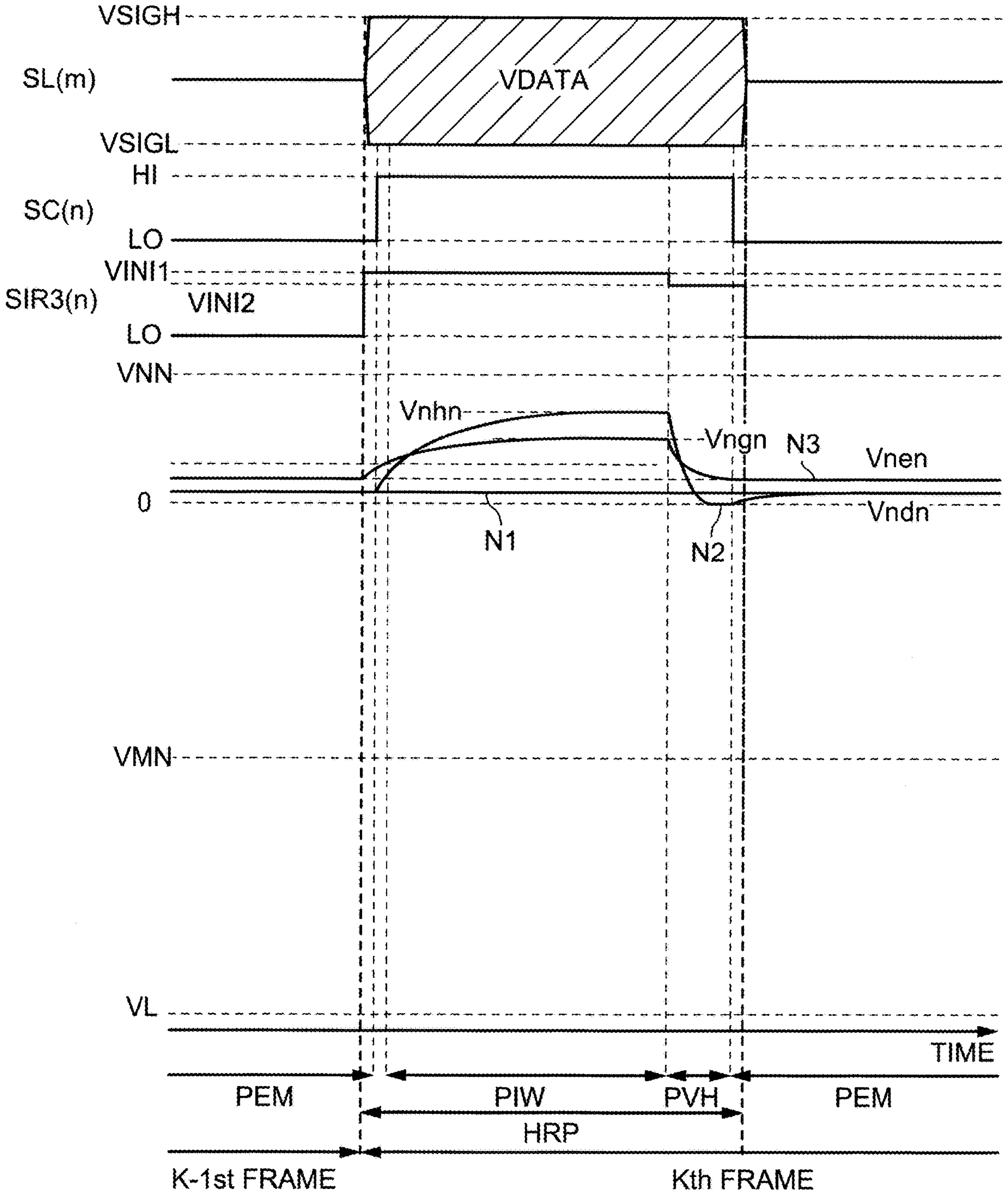
FIG. 45 is a timing chart of a self-luminous display device according to the fifth embodiment of the present invention.

A third example of a driving method for the pixel circuit 181D will be described with reference to FIG. 45. The driving method shown in the third example of the driving method for the pixel circuit 181D includes the pixel 180D displaying a black image in the previous frame (K−1stFRAME) of the current frame (KthFRAME) based on the voltage VSIGL included in the data signal VDATA, and then the pixel circuit 181D displaying a black image based on the voltage VSIGH included in the data signal VDATA even when in the KthFRAME. In other words, the method includes displaying images of the same color (black) in consecutive frames. Configurations that are the same as or similar to those in FIG. 1 to FIG. 44 will be described as necessary.

The configuration of the image data signal SL(m), the scan voltage power supply SIR3(*n*), and the scan signal SC(n) in the light emission period PEM of the K−1stFRAME, the one horizontal period HRP and the light emission period PEM of the KthFRAME, and the conductive state and the non-conductive state of the respective transistors are similar to those described in "5-2-1. First Example of Driving Method for Pixel Circuit 181D".

Referring to the conductive state and the non-conductive state of the respective transistors in the light emission period PEM of the K−1stFRAME in the configuration described in "5-2-1. First Example of Driving Method for Pixel Circuit 181D" and FIG. 45, in the light emission period PEM of the K−1stFRAME, the pixel 180D emits light according to the potential difference Vgs of the second transistor T2 (voltage V (N2)−voltage V (N3)=voltage VINI2−voltage Vnen). The potential difference Vgs is −0.5 V and the potential difference Vgs is greater than the threshold voltage VTHP (−1 V) of the second transistor T2. Therefore, since the second transistor T2 is in the OFF state and no current flows from the reference voltage line PVSS to the drive power line PVDD, the light-emitting element OLED does not emit light. As a result, for example, the pixel 180D becomes black.

In the first period of the one horizontal period HRP of the KthFRAME following the light emission period PEM of the K−1stFRAME, the image data signal SL(m), including the data signal VDATA, including the voltage VSIGH (0.5 V) corresponding to the non-light-emitting black, is input to the pixel 180D. Referring to the conductive state and the non-conductive state of the respective transistors in the first period of the one horizontal period HRP of the KthFRAME in the configuration described in "5-2-1. First Example of Driving Method for Picture Circuit 181D" and FIG. 45, the voltage supplied to the first node N1 remains at the voltage Vndn (0.5 V), and the first node N1 maintains the state in which 0.5 V is supplied. The voltage supplied to the second node N2 gradually rises from the voltage Vndn (0.5 V) toward the initialization voltage VINI1 (voltage Vnhn, 3.5 V).

In the period PIW, referring to the conductive state and the non-conductive state of the respective transistors in the first period of the one horizontal period HRP of the KthFRAME in the configuration described in "5-2-1. First Example of Driving Method for Pixel Circuit" and FIG. 45, the image data signal (m) maintains the state in which the data signal VDATA including the voltage VSIGH is supplied, the first node N1 maintains the state in which 0.5 V is supplied, and the voltage supplied to the second node N2 gradually rises and becomes the voltage Vnhn (3.5 V). In addition, the voltage supplied to the third node N3 becomes the voltage Vngn (2.5 V).

As described above, in the period PIW, the data signal VDATA including the voltage VSIGH (0.5 V) is supplied (written) to the first node N1, and the second node N2 and the third node N3 are initialized by the initialization voltage VINI1 (3.5 V).

In the period PVH following the period PIW, the image data signal SL(m) maintains the state in which the data signal VDATA including the voltage VSIGH is supplied. The voltage supplied to the first node N1, the voltage supplied to the second node N2, the voltage supplied to the third node N3, the potential difference Vgs, and the potential difference Vds are similar to those described in "5-2-1. First Example of Driving Method for Pixel Circuit 181D", so that the description will be omitted here.

As described above, similar to that described in "5-2-1. First Example of Driving Method for Pixel Circuit 181D", in the period PVH, the threshold voltage VTHP of the second transistor T2 is obtained by the operation in which the potential difference Vgs of the second transistor T2 becomes the same as the threshold voltage VTHP. In addition, the charge equivalent to the threshold voltage VTHP is held in the second node N2 (the gate electrode 622 of the second transistor T2).

In the light emission period PEM of the KthFRAME following the one horizontal period HRP of the KthFRAME, the voltage supplied to the first node N1, the voltage supplied to the second node N2, the voltage supplied to the third node N3, the potential difference Vgs, and the potential difference Vds are similar to those described in "3-2-3. Third Example of Driving Method for Pixel Circuit 181B", so that the description will be omitted. Similar to the that described in "3-2-3. Third Example of Driving Method for Pixel Circuit 181B", in the light emission period PEM of the KthFRAME following the one horizontal period HRP of the KthFRAME, the three pixels using the pixel 180D emitting red light, the pixel 180D emitting blue light, and the pixel 180D emitting green light do not emit light, so that the three pixels using the pixel 180D emitting red light, the pixel 180D emitting blue light, and the pixel 180D emitting green light become black.

As described above, in the third example of the driving method for the display device 10 (the driving method for the pixel circuit 181D) according to the fifth embodiment, similar to the third example of the driving method for the display device 10 according to the second embodiment, since the voltage fluctuation at each node when displaying images of the same color (black) in consecutive frames is small, the power consumption due to the voltage fluctuation at each node can be reduced. Therefore, the display device 10 is a display device that can reduce power consumption.

[5-2-4. Fourth Example of Driving Method for Pixel Circuit 181D]

Figure 46:
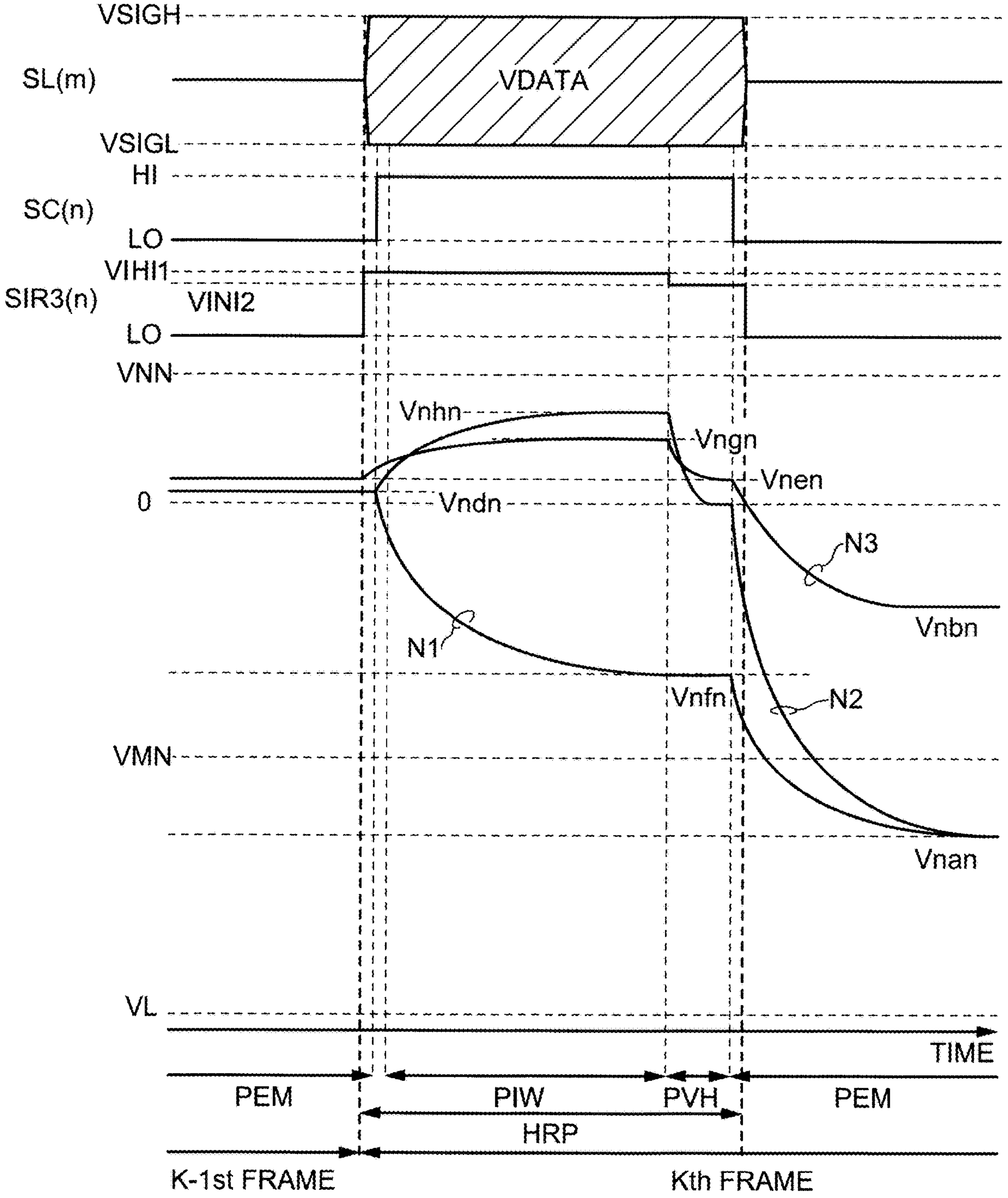
FIG. 46 is a timing chart of a self-luminous display device according to the fifth embodiment of the present invention.

A fourth example of a driving method for the pixel circuit 181D will be described with reference to FIG. 46. The driving method shown in the fourth example of the driving method for the pixel circuit 181D includes the pixel 180D displaying a black image based on the voltage VSIGH included in the data signal VDATA in the pervious frame (K−1stFRAME) of the current frame (KthFRAME), and then the pixel 180 (the pixel circuit 181) displaying a white image based on the voltage VSIGL included in the data signal VDATA in the KthFRAME. In other words, the method includes displaying images of different colors in consecutive frames. Configurations that are the same as or similar to those in FIG. 1 to FIG. 45 will be described as necessary.

The configuration of the image data signal SL(m), the scan voltage power supply SIR3(*n*), and the scan signal SC(n) in the light emission period PEM of the K−1stFRAME, the one-horizontal period HRP and the light emission period PEM of the KthFRAME, and the conductive state and the non-conductive state of the respective transistors are similar to those described in "5-2-1. First Example of Driving Method for Pixel Circuit 181D".

The voltages (potentials) of the first node N1, the second node N2, and the third node N3 in the light emission period PEM of the K−1stFRAME, the operation of the respective transistors, and the like are similar to those described in "5-2-3. Third Example of Driving Method for Pixel Circuit 181D". That is, the pixel 180D does not emit light and becomes black.

In the first period of the one horizontal period HRP of the KthFRAME, the image data signal SL(m), including the data signal VDATA, including the voltage VSIGL corresponding to white, is input to the pixel 180D. The voltage supplied to the first node N1 gradually drops from the voltage Vndn (0.5 V) toward the voltage VSIGL (voltage Vnfn, −3.5 V), and the voltage supplied to the second node N2 gradually rises from the voltage Vnen (1 V) toward the voltage Vngn (2.5 V).

In the period PIW, the first node N1 becomes the state in which the voltage Vnfn (−3.5 V) is supplied and the second node N2 becomes the state in which the voltage Vnhn (3.5 V) is supplied. In addition, the third node N3 is in the state in which Vngn (2.5 V) is supplied. In this case, the potential difference Vgs becomes 1 V (3.5V−(2.5 V)) and the potential difference Vds becomes −10.5 V (−8 V−(2.5 V)).

As described above, in the period PIW, the data signal VDATA including the voltage VSIGL is supplied (written) to the first node N1, and the second node N2 and the third node N3 are initialized by the initialization voltage VINI1 (3.5 V).

In the period PVH following the period PIW, and the light emission period PEM following the period PVH, the conducting state and the non-conducting state of the transistors are similar to the configuration described in "5-2-2. Second Example of Driving Method for Pixel Circuit 181D", the voltage supplied to the first node N1, the voltage supplied to the second node N2, and the voltage supplied to the third node N3, the potential difference Vgs and the potential difference Vds are similar to the state described in "5-2-2. Second Example of Driving Method for Pixel Circuit 181D".

Similar to the state described in "5-2-2. Second Example of Driving Method for Pixel Circuit 181D", in the period PVH in the third example of the driving method for the pixel circuit 181D, the threshold voltage VTHP of the second transistor T2 is obtained by the operation in which the potential difference Vgs of the second transistor T2 becomes the same as the threshold voltage VTHP. In addition, the charge equivalent to the threshold voltage VTHP is held in the second node N2 (the gate electrode 622 of the second transistor T2).

In addition, similar to the state described in "5-2-2. Second Example of Driving Method for Pixel Circuit 181D", in the light emission period PEM of the KthFRAME in the third example of the driving method for the pixel circuit 181D, similar to that described in "3-3-2", the pixel 180D emits red light and white light is emitted by three pixels using the pixel 180A emitting red light, the pixel 180D emitting blue light, and the pixel 180D emitting green light.

6. Sixth Embodiment

Figure 47:
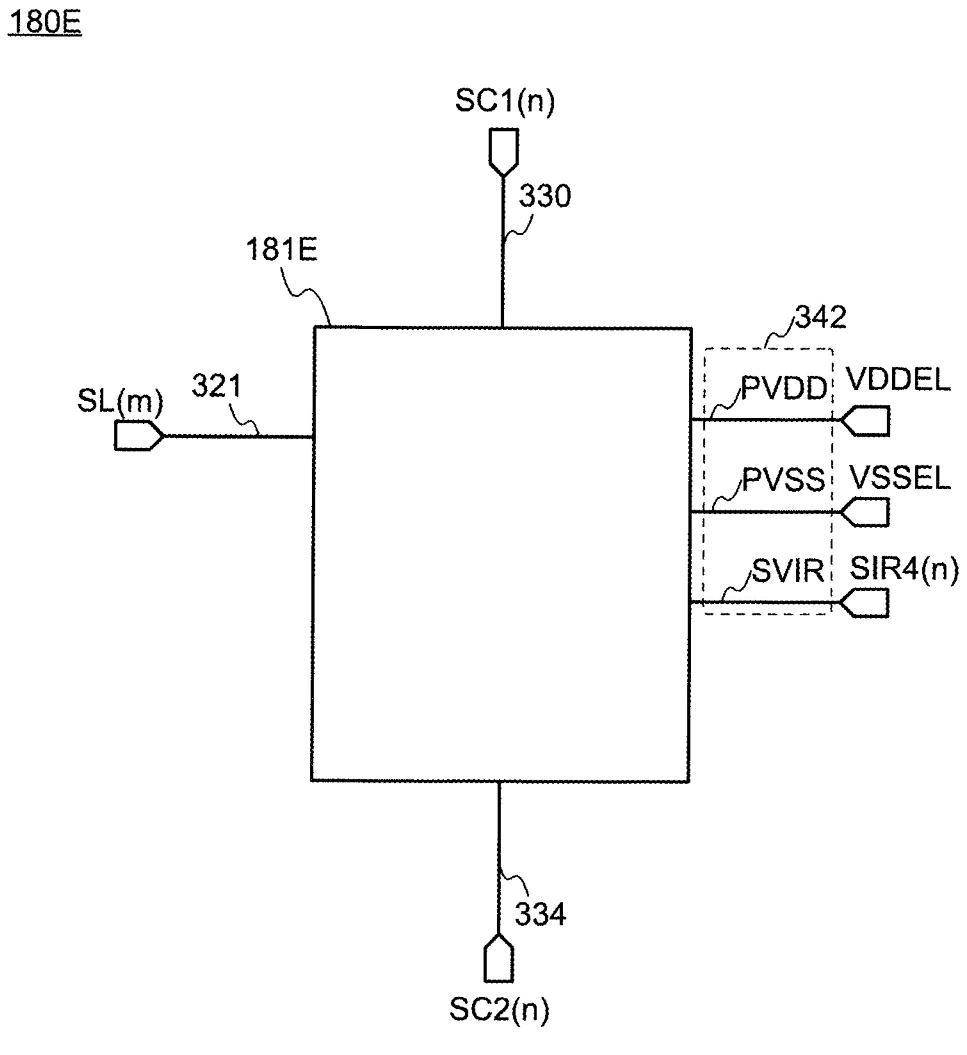
FIG. 47 is a schematic diagram showing an input signal to a pixel circuit according to the sixth embodiment of the present invention.
Figure 48:
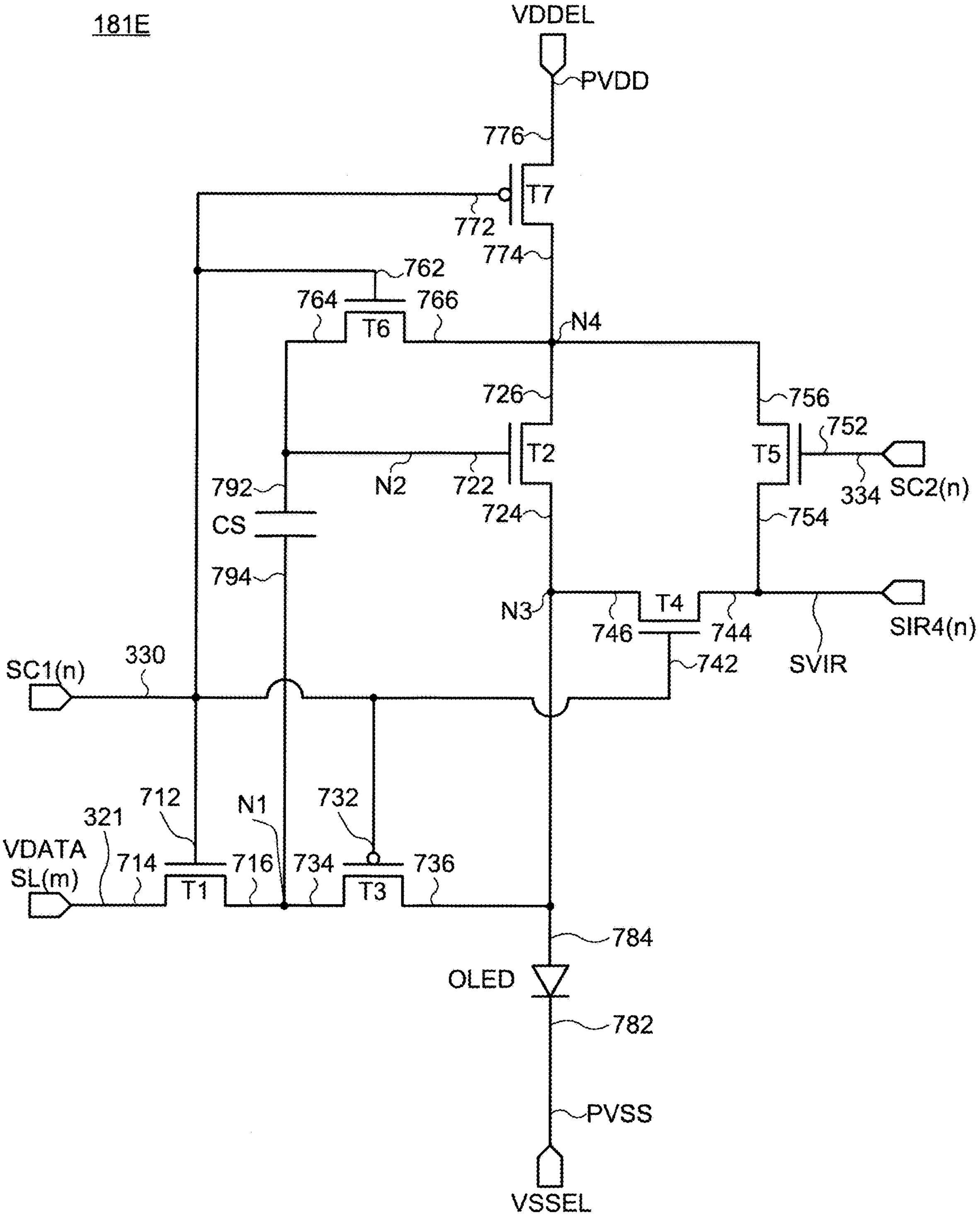
FIG. 48 is a circuit diagram showing a configuration of a pixel circuit according to the sixth embodiment of the present invention.

An overview of the display device 10 according to the sixth embodiment will be described with reference to FIG. 1, FIG. 4, and FIG. 47 to FIG. 52. FIG. 47 is a schematic diagram showing an input signal to a pixel 180E (pixel circuit 181E) according to the sixth embodiment of the present invention. FIG. 48 is a circuit diagram showing a configuration of the pixel circuit 181E. FIG. 49 to FIG. 52 are timing charts of the display device 10 according to the sixth embodiment of the present invention.

The display device 10 according to the sixth embodiment includes the pixel 180E and the pixel circuit 181E. The configuration of the pixel 180E and the pixel circuit 181E is different from the configuration of the pixel 180 and the pixel circuit 181 of the display device 10 according to the first embodiment. Specifically, the circuit configuration of the pixel circuit 181E is different from the circuit configuration of the pixel circuit 181. In addition, the pixel circuit 181E has a configuration and function in which the scan voltage power supply SIR(n) supplied to the pixel circuit 181 is replaced with a scan voltage power supply SIR4(*n*). Other configurations and functions are similar to those of the display device 10 according to the first embodiment. In describing the configurations and functions of the sixth embodiment, configurations and functions similar to those of the display device 10 according to the first embodiment will be described as necessary. In addition, configurations that are the same as or similar to those in FIG. 1 to FIG. 46 will be described as necessary.

[6-1. Configuration of Pixel 180E]

An overview of the pixel 180E and the pixel circuit 181E will be described with reference to FIG. 47 and FIG. 48.

As shown in FIG. 47, the pixel circuit 181E is connected to the scan voltage power line SVIR to which the scan voltage power supply SIR4(*n*) is supplied. For example, the scan voltage power line SVIR, the drive voltage VDDEL, and the reference voltage VSSEL are electrically connected to different connection wirings 342. In addition, for example, the scan voltage power line SVIR, the drive voltage VDDEL, and the reference voltage VSSEL may be different connection wirings 342.

As shown in FIG. 48, the pixel circuit 181E includes the first transistor T1, the second transistor T2, the third transistor T3, the fourth transistor T4, the fifth transistor T5, a sixth transistor T6, a seventh transistor T7, the capacitive element CS, and the light-emitting element OLED. Each of these transistors includes a gate electrode and a pair of electrodes (a source electrode and a drain electrode) consisting of the first electrode and the second electrode. Each of the capacitive element CS and the light-emitting element OLED has a pair of electrodes consisting of the first electrode and the second electrode.

For example, the first transistor T1 is the select transistor. The first transistor T1 has a function of supplying the image data signal SL(m) to the first node N1.

For example, the second transistor T2 is a drive transistor. The threshold voltage VTH of the second transistor T2 is corrected based on the initialization voltage VINI1 and the initialization voltage VINI2. In addition, the second transistor T2 controls connection and disconnection between the third node N3 (a first electrode 724, a second electrode 736, a second electrode 746, and a second electrode 784) and a fourth node N4 (a second electrode 726, a second electrode 756, a second electrode 766, and a first electrode 774) based on the corrected threshold voltage VTH and the input image data signal SL(m).

The third transistor T3 has a function of conducting the first node N1 and the third node N3.

The fourth transistor T4 has a function of conducting the third node N3 (the first electrode 724, the second electrode 736, the second electrode 746, and the second electrode 784) and the scan voltage power line SVIR (a first electrode 744 and a first electrode 754) to supply the scan voltage power supply SIR4(*n*) to the third node N3 and initializing the third node N3.

The fifth transistor T5 has a function of conducting the fourth node N4 (the second electrode 726, the second electrode 756, the second electrode 766, and the first electrode 774) and the scan voltage power line SVIR to supply the scan voltage power supply SIR4(*n*) to the fourth node N4 (the second electrode 726, the second electrode 756, the second electrode 766, and the first electrode 774) and initializing the fourth node N4 (the second electrode 726, the second electrode 756, the second electrode 766, and the first electrode 774).

The sixth transistor T6 has a function of conducting the second node N2 (a gate electrode 722, a first electrode 792, the first electrode 774) and the fourth node N4 (the second electrode 726, the second electrode 756, the second electrode 766, the first electrode 774).

The seventh transistor T7 has a function of conducting the drive power line PVDD (a second electrode 776) and the fourth node N4 (the second electrode 726, the second electrode 756, the second electrode 766, and the first electrode 774).

For example, the capacitive element CS has a function of holding a charge corresponding to the voltage supplied to the second node N2 and a function of holding a charge corresponding to the data voltage included in the image data signal SL(m) supplied to the first node N1.

The light-emitting element OLED has diode characteristics and has a function of emitting light based on a current flowing through the light-emitting element OLED (that is, the drain current Ion of the second transistor T2).

The first transistor T1 includes a gate electrode 712, a first electrode 714, and a second electrode 716. The gate electrode 712 is electrically connected to the first scan signal line 330. The first electrode 714 is electrically connected to the image data signal line 321. The second electrode 716 is electrically connected to the first node N1, a first electrode 734 of the third transistor T3, and a second electrode 794 of the capacitive element CS. The switching of the first transistor T1 is controlled using the first scan signal SC1(*n*). In other words, the conductive state and the non-conductive state of the first transistor T1 are controlled by the first scan signal SC1(*n*). When the signal supplied to the first scan signal SC1(*n*) is LO, the first transistor T1 is in the non-conductive state. When the signal supplied to the first scan signal SC1(*n*) is HI, the first transistor T1 is in the conductive state.

The first scan signal line 330 is electrically connected to the gate electrode 712 of the first transistor T1, a gate electrode 732 of the third transistor T3, a gate electrode 742 of the fourth transistor T4, a gate electrode 762 of the sixth transistor T6, and a gate electrode 772 of the seventh transistor T7.

The second transistor T2 includes the gate electrode 722, the first electrode 724, and the second electrode 726. The gate electrode 722 is electrically connected to the second node N2, a first electrode 764 of the sixth transistor T6, and the first electrode 792 of the capacitive element CS. The first electrode 724 is electrically connected to the third node N3, the second electrode 736 of the third transistor T3, the second electrode 746 of the fourth transistor T4, and the second electrode 784 of the light-emitting element OLED. The second electrode 726 is electrically connected to the second electrode 756 of the fifth transistor T5, the second electrode 766 of the sixth transistor T6, and the first electrode 774 of the seventh transistor T7. The threshold voltage of the second transistor T2 is the threshold voltage VTH. In the second transistor T2, the conductive state and the non-conductive state are controlled according to the potential difference Vgs between the voltage supplied to the second node N2 and the voltage supplied to the third node N3, the potential difference Vds between the second electrode 726 and the first electrode 724, and the threshold voltage VTH.

The third transistor T3 includes the gate electrode 732, the first electrode 734, and the second electrode 736. The switching of the third transistor T3 is controlled using the first scan signal SC1(*n*). In other words, the conductive state and the non-conductive state of the third transistor T3 are controlled by the first scan signal SC1(*n*). When the signal supplied to the first scan signal SC1(*n*) is LO, the third transistor T3 is in the conductive state. When the signal supplied to the first scan signal SC1(*n*) is HI, the third transistor T3 is in the non-conductive state.

The fourth transistor T4 includes the gate electrode 742, the first electrode 744, and the second electrode 746. The first electrode 744 is electrically connected to the scan voltage power line SVIR. The switching of the fourth transistor T4 is controlled using the first scan signal SC1(*n*). In other words, the conductive state and the non-conductive state of the fourth transistor T4 are controlled by the first scan signal SC1(*n*). When the first scan signal SC1(*n*) is LO, the fourth transistor T4 is in the non-conductive state. When the first scan signal SC1(*n*) is HI, the fourth transistor T4 is in the conductive state.

The fifth transistor T5 includes a gate electrode 752, the first electrode 754, and the second electrode 756. The gate electrode 752 is electrically connected to the second scan signal line 334. The first electrode 754 is electrically connected to the scan voltage power line SVIR. The switching of the fifth transistor T5 is controlled using the second scan signal SC2(*n*). In other words, the conductive state and the non-conductive state of the fifth transistor T5 are controlled by the second scan signal SC2(*n*). When the signal supplied to the second scan signal SC2(*n*) is LO, the fifth transistor T5 is in the non-conductive state, and when the signal supplied to the second scan signal SC2(*n*) is HI, the fifth transistor T5 is in the conductive state.

The sixth transistor T6 includes the gate electrode 762, the first electrode 764, and the second electrode 766. The gate electrode 762 is electrically connected to the first scan signal line 330. The switching of the sixth transistor T6 is controlled using the first scan signal SC1(*n*). In other words, the conductive state and the non-conductive state of the sixth transistor T6 are controlled by the first scan signal SC1(*n*). When the signal supplied to the first scan signal SC1(*n*) is LO, the sixth transistor T6 is in the non-conductive state, and when the signal supplied to the first scan signal SC(n) is HI, the sixth transistor T6 is in the conductive state.

The seventh transistor T7 includes the gate electrode 772, the first electrode 774, and the second electrode 776. The gate electrode 772 is electrically connected to the first scan signal line 330. The second electrode 776 is electrically connected to the drive power line PVDD. The switching of the seventh transistor T7 is controlled using the first scan signal SC1(*n*). In other words, the conductive state and the non-conductive state of the seventh transistor T7 are controlled by the first scan signal SC1(*n*). When the signal supplied to the first scan signal SC1(*n*) is LO, the seventh transistor T is in the conductive state, and when the signal supplied to the first scan signal SC(n) is HI, the seventh transistor T7 is in the non-conductive state.

A first electrode 782 of the light-emitting element OLED is electrically connected to the reference voltage line PVSS. As described above, the reference voltage VSSEL is supplied to the reference voltage line PVSS. The first electrode 782 of the light-emitting element OLED is, for example, the cathode electrode, and the second electrode 784 of the light-emitting element OLED is, for example, the anode electrode.

Each transistor included in the pixel circuit 181E may have a similar configuration as each transistor included in the pixel circuit 181. For example, the channel region of the transistors may contain low-temperature polysilicon (LTPS), and the n-channel transistor may be formed using the metal oxide with semiconductor properties.

In the sixth embodiment, the first transistor T1, the second transistor T2, the fourth transistor T4, the fifth transistor T5, and the sixth transistor T6 are n-channel field effect transistors, and the third transistor T3 and the seventh transistor T7 are p-channel field effect transistors.

[6-2. Driving Method for Pixel Circuit 181E]

A driving method for the display device 10 according to the sixth embodiment will be described with reference to FIG. 48 to FIG. 52. Configurations that are the same as or similar to those in FIG. 1 to FIG. 48 will be described as necessary. In addition, similar to the first embodiment, the horizontal axis of the timing charts represents time (TIME).

The driving method for the display device 10 according to the sixth embodiment includes periods similar to that of the driving method for the display device 10 shown in FIG. 4.

FIG. 49 to FIG. 52 are diagrams for explaining the period PIW and the period PVH of the driving method for the pixel 180E. FIG. 49 to FIG. 52 show the light emission period PEM of the previous frame (K−1stFRAME) of the current frame, the period PIW and the period PVH of the current frame (KthFRAME). In addition, FIG. 49 to FIG. 52 show one horizontal period (the horizontal period HRP) for one pixel 180E.

In the one horizontal period in the display device 10 according to the sixth embodiment, the first scan signal SC1(*n*), the second scan signal SC2(*n*), the image data signal SL(m) including the data signal VDATA, and the scan voltage power supply SIR4(*n*) are input to the pixel 180E. For example, the first scan signal SC1(*n*), the second scan signal SC2(*n*), and the scan voltage power supply SIR4(*n*) are shifted, and the pixel 180E corresponding to the shifted signal is selected. The image data signal SL(m), the drive voltage VDDEL, and the reference voltage VSSEL are input to the selected pixel 180E. A similar operation is performed for all the pixels 180E, and an image of the frame corresponding to 1FRAME is displayed in the display region 22 of the display device 10 based on the image data signal SL(m) input to all the pixels 180E.

For example, the voltages (potentials) supplied to each signal and each node of each frame in the timing charts shown in FIG. 49 to FIG. 52 are shown in Table 11 and Table 12.

TABLE 11

| | PIW | PVH | PEM |
|---|---|---|---|
| SC1(n) | HI | HI | LO |
| SC2(n) | HI | LO | LO |
| SIR4(n) | 0.5 [V] | −1 [V] | 0.5 [V] |
| SL(m) | −4.5 [V](White) ~−0.5 [V](Black) | — | — |
| N1 | −4.5 [V](White) ~−0.5 [V](Black) | −4.5 [V] ~−0.5 [V] | In conjunction with potential of N3 |
| N2 | 0.5 [V] | 0 [V] | Rise in conjunction with the rise of potential of N1 |
| N3 | 0.5 [V] | −1 [V] | Rise in conjunction with lon with VGS |
| Vgs (=V(N2)-V(N3)) | 0 [V] | 1 [V] | |
| Remarks | Initialize T2 and OLED Apply VDATA to CS | Acquiring and retaining VTH Potential of N2 = VINI2 + VTH Potential of N2-Potential of N1 = (VINI2 + VTH)-VDATA Non-light emitting below VTHEL | Light emitting VGS = VINI2 + VTH-VDATA |

TABLE 12

| | Setting value [V] |
|---|---|
| VTH | 1 |
| VTHEL | 0.7 |
| VDATA(Black) | −0.5 |
| VDATA(White) | −4.5 |
| HI | 10 |
| LO | 6.5 |
| VINI1 | 0.5 |
| VINI2 | −1 |
| VDDEL | 8 |
| VSSEL | 0 |

[6-2-1. First Example of Driving Method for Pixel Circuit 181E]

Figure 49:
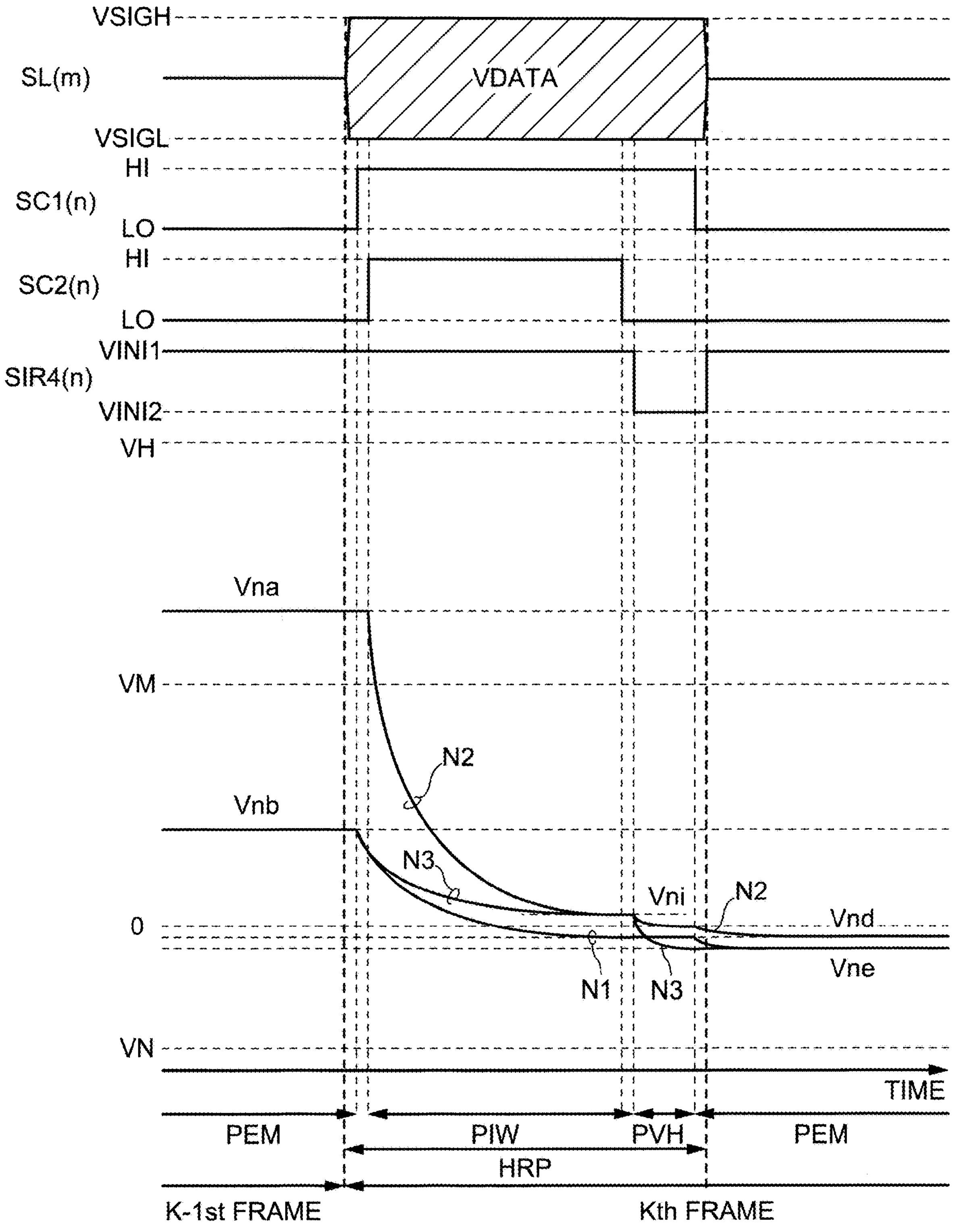
FIG. 49 is a timing chart of a self-luminous display device according to the sixth embodiment of the present invention.

A first example of a driving method for the pixel circuit 181E will be described with respect to FIG. 49. Similar to the first example of a driving method for the display device 10 according to the first embodiment, the first example of the driving method for the pixel circuit 181E includes displaying images of different colors in consecutive frames.

The timings at which the image data signal SL(m), the first scan signal SC1(*n*), and the second scan signal SC2(*n*) are supplied to the pixel circuit 181E in the light emission period PEM of the K−1stFRAME, the one horizontal period HRP and the light emission period PEM of the KthFRAME are similar to those in the first example of the driving method for the display device 10 according to the first embodiment.

As shown in Table 11 and Table 12, the image data signal SL(m) including the data signal VDATA supplied to the pixel circuit 181E according to each horizontal period is −4.5 V or more and −0.5 V or less. For example, the voltage VSIGL is −4.5 V, and the pixel 180E to which the voltage VSIGL is supplied emits light and emits each color. Furthermore, for example, the voltage VSIGH is −0.5 V, and the pixel 180E to which the voltage VSIGH is supplied does not emit light and becomes black. In addition, for example, the initialization voltage VINI2 is −1 V, the initialization voltage VINI1 is 0.5 V, the voltage VH is 10 V, the voltage VL is −6.5 V, the voltage VM is 5 V, and the voltage VN is −5 V.

For the scan voltage power supply SIR4(*n*), the initialization voltage VINI1 is supplied in the light emission period PEM of the K−1stFRAME, the first period and the period PIW of the one horizontal period HRP of the KthFRAME, and the initialization voltage VINI2 is supplied in the period PVH of the KthFRAME. The scan voltage power supply SIR4(*n*) is supplied with the initialization voltage VINI1 during the first period of the light emission period PEM. When the first scan signal SC1(*n*) changes from the state in which HI is supplied to the state in which LO is supplied, the scan voltage power supply SIR4(*n*) changes from the state in which the initialization voltage VINI1 is supplied to the state in which the initialization voltage VINI2 is supplied.

In the light emission period PEM of the K−1stFRAME, LO is supplied to the first scan signal SC1(*n*) and the second scan signal SC2(*n*). The first transistor T1, the fourth transistor T4, the fifth transistor T5, and the sixth transistor T6 are in the non-conductive state, and the third transistor T3 and the seventh transistor T7 are in the conductive state. For example, the voltage Vna supplied to the second node N2 is 7 V, the voltage Vnb supplied to the first node and the third node N3 is 2.5 V, the potential difference Vgs is 4.5 V, and the second transistor T2 is in the conductive state. Therefore, the second transistor T2 can flow the current Ion based on the potential difference Vgs and the potential difference Vds corresponding to the voltage VSIGH input in the one horizontal period HRP of the K−1stFRAME. The seventh transistor T7 is in the conductive state, the current Ion flows from the drive power line PVDD to the light-emitting element OLED and the reference voltage line PVSS, and the light-emitting element OLED emits light. For example, the pixel 180E emits red light, and white light is emitted by three pixels using the pixel 180E emitting red light, the pixel 180E emitting blue light, and the pixel 180E emitting green light.

In the first period of the one horizontal period HRP of the KthFRAME following the light emission period PEM of the K−1stFRAME, the image data signal SL(m), including the data signal VDATA, including the voltage VSIGH (−0.5 V) corresponding to the non-light-emitting black, is input to the pixel 180E. The second scan signal SC2(*n*) maintains the state in which LO is supplied. When the first scan signal SC1(*n*) changes from the state in which LO is supplied to the state in which HI is supplied, the first transistor T1, the fourth transistor T4, and the sixth transistor T6 change from the non-conductive state to the conductive state, the third transistor T3 and the seventh transistor T7 are turned from the conductive state to the non-conductive state, and the fifth transistor T5 is maintained in the non-conductive state. As a result, the voltage supplied to the first node N1 and the voltage supplied to the third node N3 drop from the voltage Vnb.

In the period PIW, the image data signal SL(m) maintains the state in which the data signal VDATA including the voltage VSIGH is supplied, the first scan signal SC1(*n*) maintains the state in which HI is supplied, and the scan voltage power supply SIR4(*n*) maintains the state in which the initialization voltage VINI1 is supplied. In addition, the second scan signal SC1(*n*) changes from the state in which LO is supplied to the state in which HI is supplied. Therefore, the fifth transistor T5 is turned from the non-conductive state to the conductive state, the first transistor T1, the fourth transistor T4, the fifth transistor T5, and the sixth transistor T6 are maintained in the conductive state, and the third transistor T3 and the seventh transistor T7 are maintained in the non-conductive state.

In addition, during the end of the period PIW, the image data signal SL(m) maintains the state in which the data signal VDATA including the voltage VSIGL is supplied, the first scan signal SC1(*n*) maintains the state in which HI is supplied, and the scan voltage power supply SIR4(*n*) maintains the state in which the initialization voltage VINI1 is supplied. In addition, the second scan signal SC1(*n*) changes from the state in which LO is supplied to the state in which HI is supplied. Therefore, the fifth transistor T5 is turned from the conductive state to the non-conductive state, the first transistor T1, the fourth transistor T4, and the sixth transistor T6 are maintained in the conductive state, and the third transistor T3 and the seventh transistor T7 are maintained in the non-conductive state. The fifth transistor T5 changes to the non-conductive state at the last timing.

As a result, the voltage supplied to the first node N1 gradually drops from the voltage Vnb toward the voltage VSIGL (voltage Vnd, −0.5 V) and becomes the voltage Vnd (−0.5 V). The voltage supplied to the second node N2 gradually drops from the voltage Vna toward the initialization voltage VINI1 (voltage Vni, 0.5 V) and becomes the voltage Vni (0.5 V). Furthermore, the voltage supplied to the third node N3 gradually drops from the voltage Vnb toward the initialization voltage VINI1 (voltage Vni, 0.5 V) and becomes the voltage Vni (0.5 V). Therefore, the potential difference Vgs and the potential difference Vds are 0 V (0.5−(0.5 V)). As a result, since the potential difference Vgs is smaller than the threshold voltage VTH (1 V), the second transistor T2 is in the non-conductive state. Therefore, the drain current Ion does not flow from the second electrode 726 of the second transistor T2 to the first electrode 724.

As described above, the data signal VDATA including the voltage VSIGL is supplied (written) to the first node N1, and the second node N2 and the third node N3 are initialized by the initialization voltage VINI1.

In the period PVH, the image data signal SL(m) maintains the state in which the data signal VDATA including the voltage VSIGL is supplied, the first scan signal SC1(*n*) maintains the state in which HI is supplied, and the second scan signal SC1(*n*) has been changed to LO. The scan voltage power supply SIR4(*n*) changes from the state in which the initialization voltage VINI1 is supplied to the state in which the initialization voltage VINI2 is supplied. Therefore, the first transistor T1, the fourth transistor T4, and the sixth transistor T6 are maintained in the conductive state, and the third transistor T3, the fifth transistor T5, and the seventh transistor T7 are maintained in the non-conductive state.

Furthermore, in the period at the end of the period PVH, when the first scan signal SC1(*n*) is changed from the state in which HI is supplied to the state in which LO is supplied, the scan voltage power supply SIR4(*n*) changes from the state in which the initialization voltage VINI2 is supplied to the state in which the initialization voltage VINI1 is supplied. Therefore, the first transistor T1, the fourth transistor T4, and the sixth transistor T6 are turned from the conductive state to the non-conductive state, the third transistor T3 and the seventh transistor T7 are turned from the non-conductive state to the conductive state, and the fifth transistor T5 is maintained in the non-conductive state.

Therefore, in the period PVH, the voltage supplied to the first node N1 is maintained at the voltage Vnd (−0.5 V). Since the fourth transistor T4 maintains the conductive state, the voltage supplied to the third node N3 gradually drops from the voltage Vni (0.5 V) toward the initialization voltage VINI2 (−1 V) and becomes the initialization voltage VINI2 (−1 V). In this case, although the fifth transistor T5 is in the non-conductive state, since the Vgs of the second transistor T2 is directed toward 1.5 V (0.5 V (node N2)−(−1 V) (node N3)) which is greater than the threshold voltage VTH (1 V), the drain current Ion starts to flow, and the voltage supplied to the second node N2 gradually drops from the voltage Vni (0.5 V). Since the initialization voltage VINI2 (voltage Vne, −1 V) continues to be supplied to the third node N3, when the voltage supplied to the second node N2 becomes 0 V, the potential difference Vgs becomes the threshold voltage VTH. As a result, the second transistor T2 is in the non-conductive state. Therefore, the drain current Ion does not flow from the second electrode 726 of the second transistor T2 to the first electrode 724.

As described above, in the period PVH, the threshold voltage VTH of the second transistor T2 is obtained by the operation in which the potential difference Vgs of the second transistor T2 becomes the same as the threshold voltage VTH. In addition, the charge equivalent to the threshold voltage VTH is held in the second node N2 (the gate electrode 722 of the second transistor T2).

In the light emission period PEM of the KthFRAME following the horizontal period HRP of the KthFRAME, data is not selected using the selection signal, and the data signal VDATA is maintained at a voltage equal to or higher than the voltage VSIGL and equal to or lower than the voltage VSIGH. In addition, the first scan signal SC1(*n*) changes from the state in which HI is supplied to the state in which LO is supplied, the second scan signal SC2(*n*) maintains the state in which LO is supplied, and the scan voltage power supply SIR4(*n*) maintains the state in which the initialization voltage VINI1 (0.5 V) is supplied.

Therefore, the first transistor T1, the fourth transistor T4, and the sixth transistor T6 are turned from the conductive state to the non-conductive state, and the third transistor T3 and the seventh transistor T7 are turned from the non-conductive state to the conductive state. In addition, the fifth transistor T5 is maintained in the non-conductive state. When the third transistor T3 is in the conductive state, the first node N1 and the third node N3 are conductive, and the voltage supplied to the first node N1 becomes the voltage Vne (−1 V). Since the first node N1 and the third node N3 are conductive and then the voltage supplied to the second node N1 gradually drops toward −1 V, the voltage supplied to the second node N2 gradually drops from the voltage Vni (0 V) due to the capacitive coupling between the second node N2 (the gate electrode 722 of the second transistor T2 and the first electrode 724 of the capacitive element CS) and the third node N3 (0 V). For example, the voltage supplied to the second node N2 becomes the voltage Vnd (−0.5 V).

Therefore, the potential difference Vgs is −0.5 V in the light emission period PEM of the KthFRAME. The potential difference Vgs is smaller than the threshold voltage VTH. Therefore, the second transistor T2 is in the non-conductive state and no current flows from the drive power line PVDD to the reference voltage line PVSS, so that the light-emitting element OLED does not emit light. As a result, for example, the pixel 180E emitting red light, the pixel 180E emitting blue light, and the pixel 180E emitting green light do not emit light, so that three pixels using the pixel 180E emitting red light, the pixel 180E emitting blue light, and the pixel 180E emitting green light become black.

[6-2-2. Second Example of Driving Method for Pixel Circuit 181E]

Figure 50:
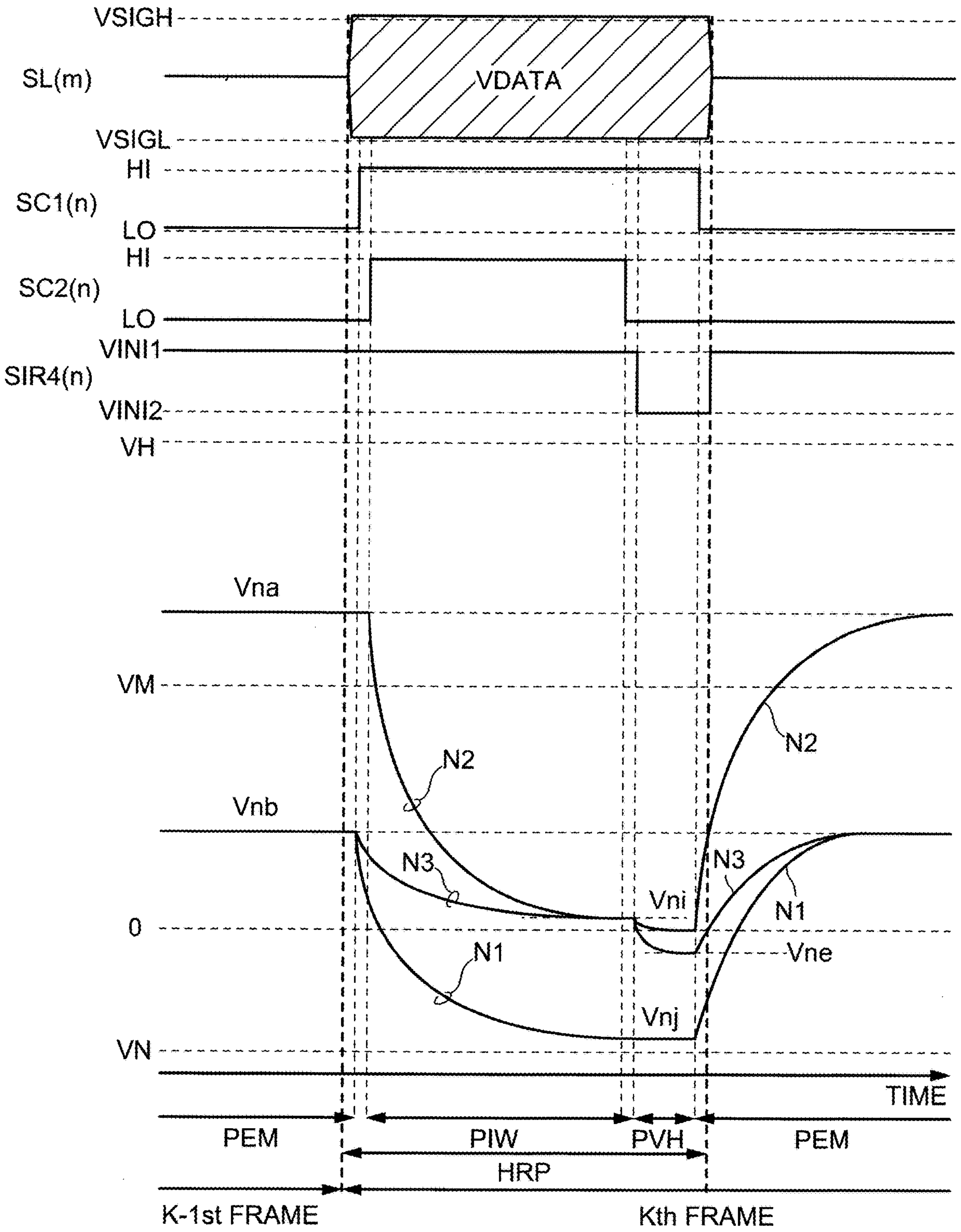
FIG. 50 is a timing chart of a self-luminous display device according to the sixth embodiment of the present invention.

A second example of a driving method for the pixel circuit 181E will be described with reference to FIG. 50. Similar to the second example of the driving method for the display device 10 according to the first embodiment, the driving method shown in the second example of the pixel circuit 181E includes displaying images of the same color (white) in consecutive frames. Configurations that are the same as or similar to those in FIG. 1 to FIG. 49 will be described as necessary.

The timings at which the image data signal SL(m), the scan voltage power supply SIR4(*n*), the first scan signal SC1(*n*), and the second scan signal SC2(*n*) are supplied to the pixel circuit 181E in the light emission period PEM of the K−1stFRAME, the one horizontal period HRP and the light emission period PEM of the KthFRAME are similar to the configuration described in "6-6-1. First Example of Driving Method for Pixel Circuit 181E". In addition, the voltage (potential) of the first node N1 in the light emission period PEM of the K−1stFRAME, the voltages (potentials) of the second node N2 and the third node N3 in the light emission period PEM of the K−1stFRAME and the one horizontal period HRP of the KthFRAME, and the operations, and the like of the respective transistors are similar to those described in "6-2-1. First Example of Driving Method for Pixel Circuit 181E". Configurations and the like similar to that described in "6-2-1. First Example of Driving Method for Pixel Circuit 181E" will be described as necessary.

In the first period of the one horizontal period HRP of the KthFRAME, the image data signal SL(m), including the data signal VDATA, including the voltage VSIGL (−4.5 V) corresponding to white, is input to the pixel 180E. The voltage supplied to the first node N1 gradually drops from the voltage Vnb toward the voltage VSIGL (voltage Vnj, −4.5 V).

In the period PIW, the voltage supplied to the first node N1 gradually drops from the voltage Vnb toward the voltage Vnj and becomes the voltage Vnj (−4.5 V). The voltage supplied to the second node N2, the voltage supplied to the third node N3, the potential difference Vgs, and the potential difference Vds are similar to those described in "6-2-1. First Example of Driving Method for Pixel Circuit 181E".

As described above, similar to that described in "6-2-1. First Example of Driving Method for Pixel Circuit 181E", in the period PIW, the data signal VDATA including the voltage VSIGL is supplied (written) to the first node N1, and the second node N2 and the third node N3 are initialized by the initialization voltage VINI1.

In the period PVH following the period PIW, the image data signal SL(m) maintains the state in which the data signal VDATA including the voltage VSIGL is supplied. The first node N1 maintains the state in which Vnj is supplied.

The voltage supplied to the second node N2, the voltage supplied to the third node N3, the potential difference Vgs, and the potential difference Vds are similar to those described in “6-2-1. First Example of Driving Method for Pixel Circuit 181E”.

As described above, similar to that described in “6-2-1. First Example of Driving Method for Pixel Circuit 181E”, in the period PVH, the threshold voltage VTH of the second transistor T2 is obtained by the operation in which the potential difference Vgs of the second transistor T2 becomes the same as the threshold voltage VTH. In addition, the charge equivalent to the threshold voltage VTH is held in the second node N2 (the gate electrode 722 of the second transistor T2).

In the light emission period PEM of the KthFRAME following the one horizontal period HRP of the KthFRAME, the first node N1 and the third node N3 are conductive similar to that described in “6-2-1. First Example of Driving Method for Pixel Circuit 181E”. The fourth transistor T4 and the sixth transistor T6 are in the non-conductive state, but the voltage of the third node N3 gradually rises, so that the voltage supplied to the second node N2 gradually rises from the voltage Vni (0 V) due to the capacitive coupling between the second node N2 (the gate electrode 722 of the second transistor T2, the first electrode 724 of the capacitive element CS) and the third node N3. When the voltage of the second node N2 gradually rises from the voltage Vni (0 V) and the potential difference Vgs exceeds the threshold voltage VTH, the second transistor T2 is turned from the non-conductive state to the conductive state. Since the seventh transistor T7 is in the conductive state, when the second transistor T2 is in the conductive state, the drain current Ion flows from the drive power line PVDD to the reference voltage line PVSS, and the voltage supplied to the first node N1 rises to follow the rise in the voltage supplied to the first node N1 and the voltage supplied to the second node N2. In this case, the potential difference between the first electrode 792 and the second electrode 794 in the period PVH is 4.5 V (the potential difference between the voltage supplied to the second node N2 and the voltage supplied to the third node N3), and the capacitive element CS holds the charge equivalent to 4.5 V. For example, since the capacitive element CS holds the charge equivalent to 4.5 V, as shown in FIG. 50, when the voltage supplied to the first node N1 and the voltage supplied to the third node N3 rise to the voltage Vnb (2.5 V), the voltage rises to the voltage Vna (7 V) supplied to the second node N2.

The potential difference Vgs (4.5 V) is greater than the threshold voltage VTH and the threshold voltage VTHEL of the light-emitting element OLED. Therefore, the second transistor T2 is in the conductive state, and the drain current Ion flows from the drive power line PVDD to the reference voltage line PVSS, so that the light-emitting element OLED emits light. For example, the pixel 180E is red, and white light is emitted by three pixels using the pixel 180E emitting red, the pixel 180E emitting blue, and the pixel 180E emitting green.

[6-2-3. Third Example of Driving Method for Pixel Circuit 181E]

Figure 51:
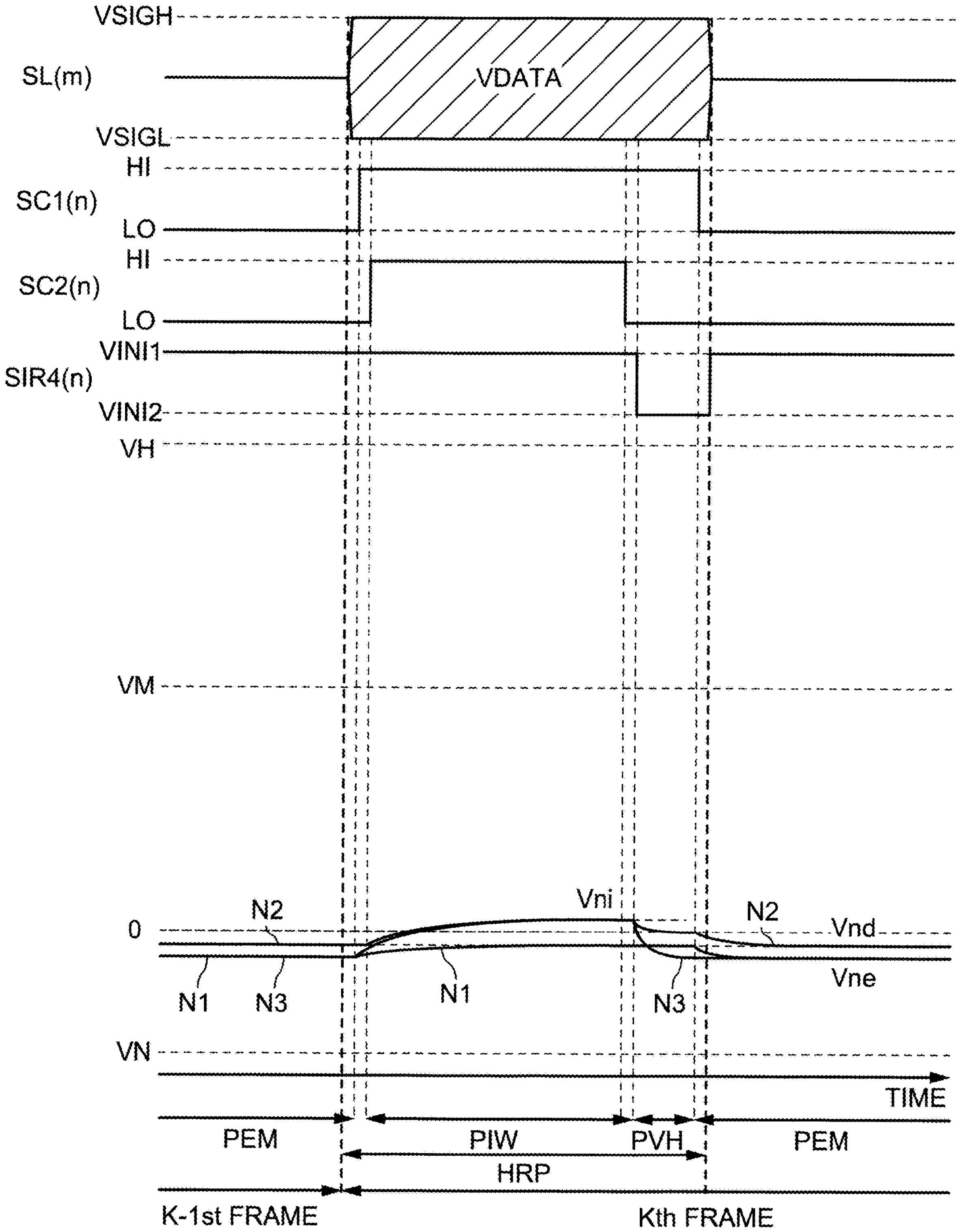
FIG. 51 is a timing chart of a self-luminous display device according to the sixth embodiment of the present invention.

A third example of the driving method for the pixel circuit 181E will be described with reference to FIG. 51. The driving method shown in the third example of the driving method for the pixel circuit 181E includes displaying images of the same color (black) in consecutive frames similar to the third example of the driving method for the display device 10 according to the first embodiment. Configurations that are the same as or similar to those in FIG. 1 to FIG. 50 will be described as necessary.

The timings at which the image data signal SL(m), the scan voltage power supply SIR4(*n*), the first scan signal SC1(*n*), and the second scan signal SC2(*n*) are supplied to the pixel circuit 181E in the light emission period PEM of the K−1stFRAME, the one horizontal period HRP and the light emission period PEM of the KthFRAME, and the conduction state and the non-conductive state of the respective transistors are similar to the configuration described in “6-2-1. First Example of Driving Method for Pixel Circuit 181E”. Configurations and the like similar to that described in “6-2-1. First Example of Driving Method for Pixel Circuit 181E” and “6-2-2. Second Example of Driving Method for Pixel Circuit 181E” will be described as necessary.

For example, in the light emission period PEM of the K−1stFRAME, the potential difference Vgs is 0.5 V, and the potential difference Vgs is smaller than the threshold voltage VTH (1 V, see Table 12) of the second transistor T2. Since the second transistor T2 is in the non-conductive state and no current flows from the drive power line PVDD to the reference voltage line PVSS, the light-emitting element OLED does not emit light. As a result, for example, similar to the pixel 180E described in the light emission period PEM of the KthFRAME in “6-2-1. First Example of Driving Method for Pixel Circuit 181E”, three pixels using the pixel 180E emitting red light, the pixel 180E emitting blue light, and the pixel 180E emitting green light become black.

In the first period of the one horizontal period HRP of the KthFRAME following the light emission period PEM of the K−1stFRAME, the image data signal SL(m), including the data signal VDATA, including the voltage VSIGLH (−0.5 V) corresponding to the non-light-emitting black, is input to the pixel 180E. The voltage supplied to the first node N1 gradually rises from the voltage Vne (−1 V) to the voltage Vnd (−0.5 V), the voltage supplied to the second node N2 gradually rises from the voltage Vnd (−0.5 V) to the voltage Vni (0.5 V), and the voltage supplied to the third node N3 gradually rises from the voltage Vne (−1 V) to the voltage Vni (0.5 V).

In the period PIW, the image data signal SL(m) maintains the state in which the data signal VDATA including the voltage VSIGH is supplied. The first node N1 is supplied with −0.5 V, and the second node N2 and the third node N3 are supplied with Vni (0.5 V).

As described above, in the period PIW, the data signal VDATA including the voltage VSIGL (−0.5 V) is supplied (written) to the first node N1, and the second node N2 and the third node N3 are initialized by the initialization voltage VINI1.

Similar to that described in “6-2-1. First Example of Driving Method for Pixel Circuit 181E”, in the period PVH following the period PIW, the threshold voltage VTH of the second transistor T2 is obtained by the operation in which the potential difference Vgs of the second transistor T2 becomes the same as the threshold voltage VTH. In addition, the charge equivalent to the threshold voltage VTH is held in the second node N2 (the gate electrode 722 of the second transistor T2).

In the light emission period PEM of the KthFRAME following the one horizontal period HRP of the KthFRAME, similar to that described in “6-2-1. First Example of Driving Method for Pixel Circuit 181E”, the pixel 180E emitting red light does not emit light, and the three pixels using the pixel 180E emitting red light, the pixel 180E emitting blue light, and the pixel 180E emitting green light become black.

[6-2-4. Fourth Example of Driving Method for Pixel Circuit 181E]

Figure 52:
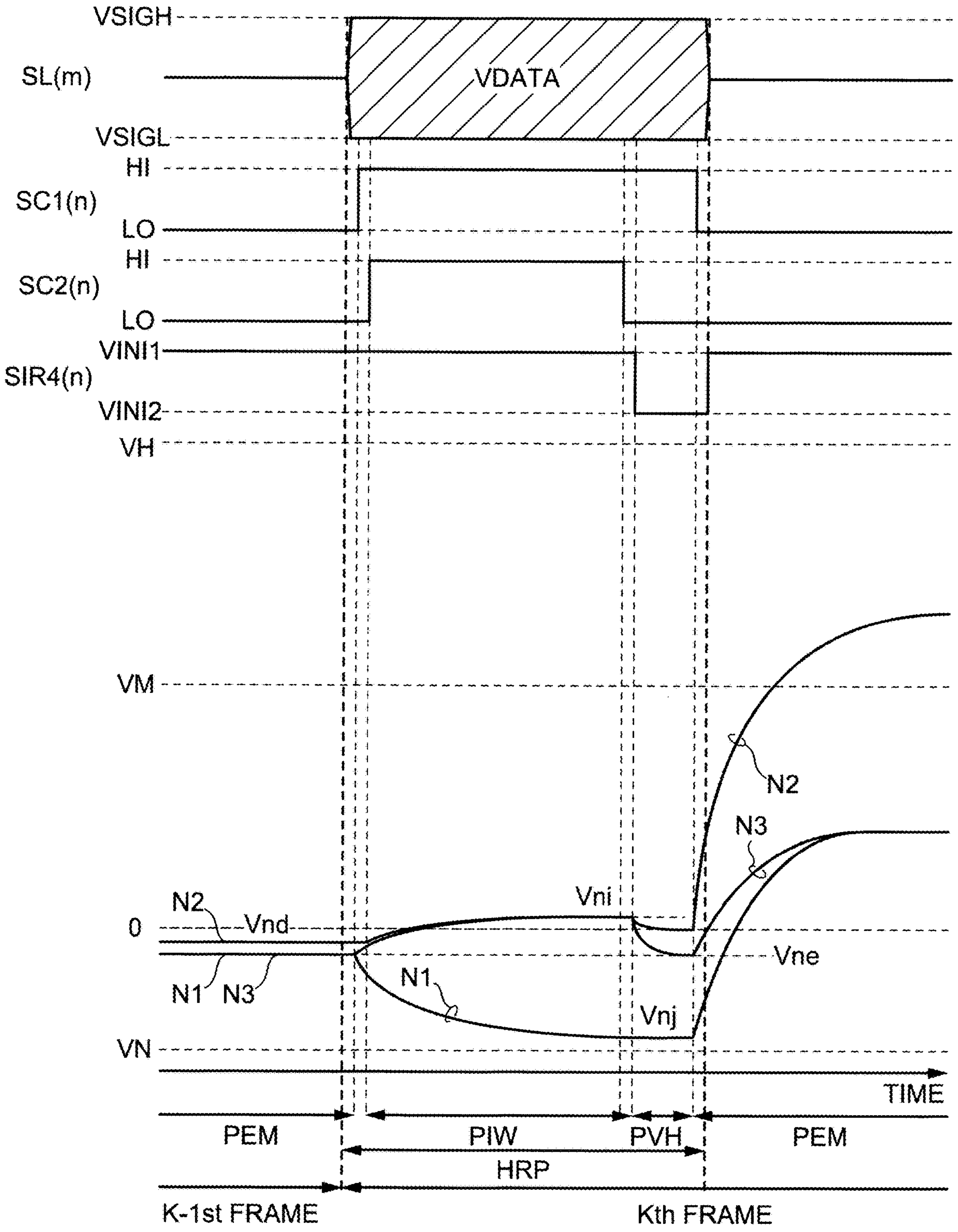
FIG. 52 is a timing chart of a self-luminous display device according to the sixth embodiment of the present invention.

A fourth example of the driving method for the pixel circuit 181E will be described with reference to FIG. 52. The driving method shown in the fourth example of the driving method for the pixel circuit 181E includes displaying images of different colors in consecutive frames similar to the fourth example of the driving method for the display device 10 according to the first embodiment. Configurations that are the same as or similar to those in FIG. 1 to FIG. 51 will be described as necessary.

The timings at which the image data signal SL(m), the scan voltage power supply SIR4(*n*), the first scan signal SC1(*n*), and the second scan signal SC2(*n*) are supplied to the pixel circuit 181E in the light emission period PEM of the K−1stFRAME, the one horizontal period HRP and the light emission period PEM of the KthFRAME, and the conduction state and the non-conductive state of the transistors are similar to the configuration described in "6-2-1. First Example of Driving Method for Pixel Circuit 181E". Configuration and the like similar to that described in "6-2-1. First Example of Driving Method for Pixel Circuit 181E" and "6-2-2. Second Example of Driving Method for Pixel Circuit 181E" will be described as necessary.

The voltages (potentials) of the first node N1, the second node N2, and the third node N3 in the light emission period PEM of the K−1stFRAME, the operation of the respective transistors, and the like are similar to those described in "6-2-3. Third Example of Driving Method for Pixel Circuit 181E".

In the first period of the one horizontal period HRP of the KthFRAME, the image data signal SL(m), including the data signal VDATA, including the voltage VSIGL (−4.5 V) corresponding to white, is input to the pixel 180E. The voltage supplied to the first node N1 gradually drops from the voltage Vne (−1 V) toward the voltage VSIGL (voltage Vnj, −4.5 V). The voltage supplied to the second node N2 gradually rises from the voltage Vnd (−0.5 V) toward the voltage Vni (0.5 V). The voltage supplied to the third node N3 gradually rises from the voltage Vne (−1 V) toward the voltage Vni (0.5 V).

As a result, in the period PIW, the image data signal SL(m) maintains the state in which the data signal VDATA including the voltage VSIGL is supplied. The first node N1 is supplied with the voltage Vnj (−4.5 V) and the second node N2 and the third node N3 are supplied with the voltage Vni (0.5 V).

As described above, in the period PIW, the data signal VDATA including the voltage VSIGL is supplied (written) to the first node N1, and the second node N2 and the third node N3 are initialized by the initialization voltage VINI1.

The voltages (potentials) of the first node N1, the second node N2, and the third node N3 in the period PVH and the light emission period PEM of the KthFRAME, the operation of the respective transistors, and the like are similar to those described in "6-2-3. Third Example of Driving Method for Pixel Circuit 181E".

As described above, in the period PVH, the threshold voltage Vgs of the second transistor T2 is obtained by the operation in which the potential difference Vgs of the second transistor T2 becomes the same as the threshold voltage VTH. In addition, the charge equivalent to the threshold voltage VTH is held in the second node N2 (the gate electrode 722 of the second transistor T2). In addition, for example, in the light emission period PEM of the KthFRAME following the one horizontal period HRP of the KthFRAME, the pixel 180E emits red light and white light is emitted by three pixels using the pixel 180A emitting red light, the pixel 180E emitting blue light, and the pixel 180E emitting green light.

As described above, similar to the driving method for the display device 10 according to the first embodiment and the driving method for the display device 10 according to the second embodiment, the driving method for the display device 10 according to the sixth embodiment (the driving method for the pixel circuit 181E) includes executing the process (driving) executed in the writing period and the process (driving) executed in the initialization period at the same timing. Therefore, the driving method for the display device 10 according to the sixth embodiment (the driving method for the pixel-circuit 181E) has effects similar to those of the driving method for the display device 10 according to the first embodiment and the driving method for the display device 10 according to the second embodiment.

7. Seventh Embodiment

Figure 53:
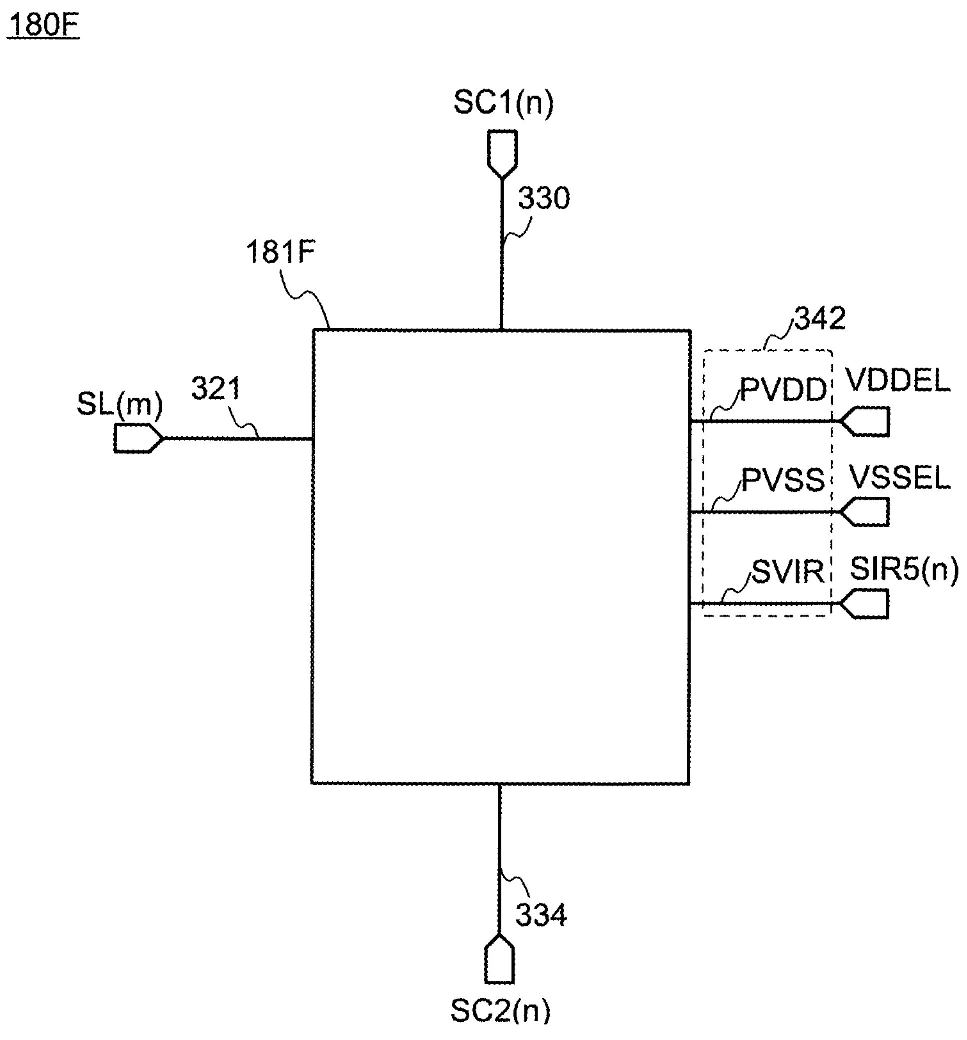
FIG. 53 is a schematic diagram showing an input signal to a pixel circuit according to the seventh embodiment of the present invention.
Figure 54:
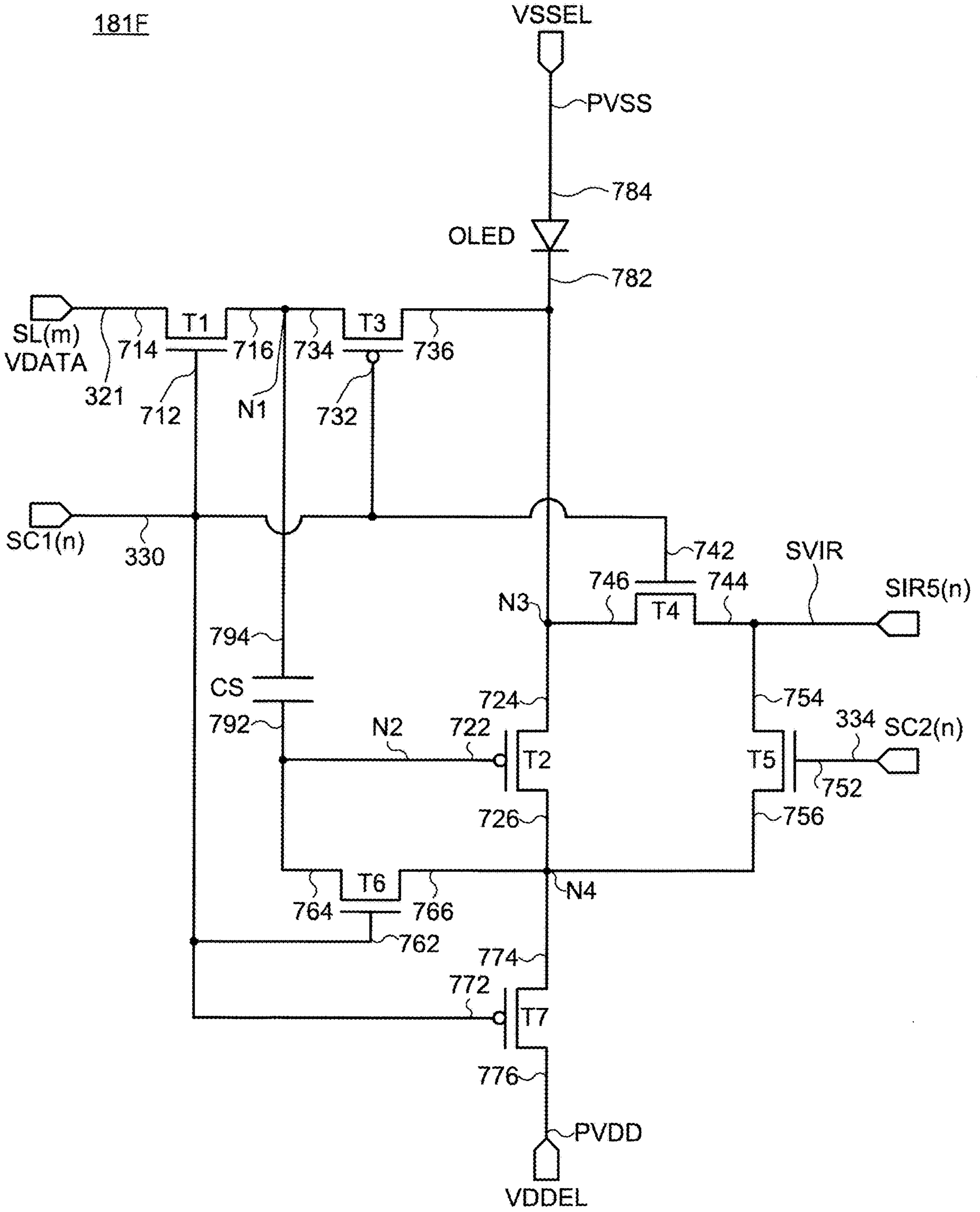
FIG. 54 is a circuit diagram showing a configuration of a pixel circuit according to the seventh embodiment of the present invention.

An overview of the display device 10 according to a seventh embodiment will be described with reference to FIG. 1, FIG. 4, and FIG. 53 to FIG. 58. FIG. 53 is a schematic diagram showing an input signal to a pixel 180F (pixel circuit 181F) according to the seventh embodiment of the present invention. FIG. 54 is a circuit diagram showing a configuration of the pixel circuit 181F. FIG. 55 to FIG. 58 are timing charts of the display device 10 according to the seventh embodiment of the present invention.

The display device 10 according to the seventh embodiment includes the pixel 180F and the pixel circuit 181F. The configurations and functions of the pixel 180F and the pixel circuit 181E include the configurations and functions replaced with the scan voltage power supply SIR5(*n*) in which the polarity of the scan voltage power supply SIR4(*n*) supplied to the pixel circuit 181E is inverted, the configurations and functions replaced with a signal obtained by inverting the polarity of the image data signal SL(m) including the data signal VDATA supplied to the pixel circuit 181E, the configurations and functions in which the polarity of the second transistor T2 included in the pixel circuit 181E is replaced with the p-channel type, and the configurations and functions in which the connection of the light-emitting element OLED included in the pixel circuit 181E is changed. Other configurations and functions of the display device 10 according to the seventh embodiment are similar to those of the display device 10 according to the sixth embodiment. In describing the configurations and functions of the seventh embodiment, configurations and functions similar to those of the display device 10 according to the sixth embodiment will be described as necessary. In addition, configurations that are the same as or similar to those in FIG. 1 to FIG. 52 will be described as necessary.

[7-1. Configuration of Pixel 180F]

An overview of the pixel 180F and the pixel circuit 181F will be described with reference to FIG. 53 and FIG. 54.

As shown in FIG. 53, the pixel circuit 181F is connected to the scan voltage power line SVIR to which the scan voltage power supply SIR5(*n*) is supplied. As shown in FIG. 54, as described above, the pixel circuit 181F includes configurations and functions in which the polarity of the second transistor 181E included in the pixel circuit T2 is replaced with the p-channel type, and configurations and functions in which the connection of the light-emitting element OLED included in the pixel circuit 181E is changed.

For example, the second transistor T2 is a drive transistor similar to the second transistor T2 included in the pixel circuit 181E. The threshold voltage VTHP of the second transistor T2 is corrected based on the initialization voltage VINI1 and the initialization voltage VINI2. In addition, the second transistor T2 controls connection and disconnection between the third node N3 (the first electrode 724, the second electrode 736, the second electrode 746, and the second electrode 784) and the second electrode 726, the second electrode 756, the second electrode 766, and the first electrode 774 based on the corrected threshold voltage VTHP and the input image data signal SL(m). The first electrode 724 of the second transistor T2 is electrically connected to the third node N3, the second electrode 736 of the third transistor T3, and the second electrode 784 of the light-emitting element OLED.

In addition, in the second transistor T2, the conductive state and the non-conductive state are controlled according to the potential difference Vgs between the voltage supplied to the second node N2 and the voltage supplied to the third node N3, the potential difference Vds between the second electrode 726 and the first electrode 724, and the threshold voltage VTHP.

The light-emitting element OLED includes the first electrode 782 and the second electrode 784. The second electrode 784 of the light-emitting element OLED is electrically connected to the reference voltage line PVSS.

Configurations and functions other than the pixel circuit 181F described in "7-1. Configuration of Pixel 180F" are similar to those of the pixel circuit 181E.

[7-2. Driving Method for Pixel Circuit 181F]

A driving method for the display device 10 according to the seventh embodiment will be described with reference to FIG. 54 to FIG. 58. Configurations that are the same as or similar to those in FIG. 1 to FIG. 54 will be described as necessary. In addition, similar to the first embodiment, the horizontal axis of the timing charts represents time (TIME).

The driving method for the display device 10 according to the seventh embodiment includes periods similar to that of the driving method for the display device 10 shown in FIG. 4.

FIG. 55 to FIG. 58 are diagrams for explaining the period PIW and the period PVH of the driving method for the pixel 180F (pixel circuit 181F). FIG. 55 to FIG. 58 show the light emission period PEM of the previous frame (K−1stFRAME) of the current frame, the period PIW and the period PVH of the current frame (KthFRAME). In addition, FIG. 55 to FIG. 58 show the one horizontal period (the horizontal period HRP) for one pixel 180F.

In the display device 10 according to the seventh embodiment, the first scan signal SC1(*n*), the second scan signal SC2(*n*), the image data signal SL(m) including the data signal VDATA, and the scan voltage power supply SIR5(*n*) are input to the pixel 180F. For example, the first scan signal SC1(*n*), the second scan signal SC2(*n*), and the scan voltage power supply SIR5(*n*) are shifted, and the pixel 180F corresponding to the shifted signal is selected. The image data signal SL(m), the drive voltage VDDEL, and the reference voltage VSSEL are input to the selected pixel 180F. A similar operation is performed for all the pixels 180F, and an image of the frame corresponding to 1FRAME is displayed in the display region 22 of the display device 10 based on the image data signal SL(m) input to all the pixels 180F (pixel circuit 181F).

For example, the voltages (potentials) supplied to each signal and each node of each frame in the timing charts shown in FIG. 55 to FIG. 58 are shown in Table 13 and Table 14.

TABLE 13

| | PIW | PVH | PEM |
|---|---|---|---|
| SC1(n) | HI | HI | LO |
| SC2(n) | HI | LO | LO |
| SIR5(n) | −0.5 [V] | −1 [V] | -0.5 [V] |
| SL(m) | 0.5 [V](Black) ~4.5 [V](White) | — | — |
| N1 | 0.5 [V](Black) ~4.5 [V](White) | 0.5 [V] ~4.5 [V] | In conjunction with potential of N3 |
| N2 | −0.5 [V] | 0 [V] | Drop with drop of potential of N1 |
| N3 | −0.5 [V] | 1 [V] | Drop in conjunction with lon with VGS |
| Vgs (=V(N2)-V(N3)) | 0 [V] | 1 [V] | |
| Remarks | Initialize T2 and OLED Apply VDATA to CS | Acquiring and retaining VTH otential of N2 = VINI2 + VTHP Potential of N2-Potential of N1 = (VINI2 + VTHP)-VDATA Non-light emitting above VTHEL | Light emitting VGS = (VINI2 + VTHP)-VDATA |

TABLE 14

| | Setting value [V] |
|---|---|
| VTHP | −1 |
| VTHEL | −0.7 |
| VDATA(White) | 4.5 |
| VDATA(Black) | 0.5 |
| HI | 6.5 |
| LO | −10 |
| VINI1 | −0.5 |
| VINI2 | 1 |
| VDDEL | −8 |
| VSSEL | 0 |

As shown in Table 13 and table 14, the image data signal SL(m) including the data signal VDATA supplied to the pixel circuit 181F according to each horizontal period is 0.5 V or more and 4.5 V or less. For example, the voltage VSIGL is 0.5 V, and the pixel 180 to which the voltage VSIGL is supplied does not emit light and becomes black. Furthermore, for example, the voltage VSIGH is 4.5 V, and the pixel 180F to which the voltage VSIGH is supplied emits light and emits each color. For example, one pixel emits red light, one pixel emits green light, one pixel emits blue light, and white light is emitted by the three pixels. Furthermore, for example, the voltage VL (LO) is −10 V, the voltage VH (HI) is 3.5 V, the voltage VNN is 5 V, the voltage VMN is −5 V, the initialization voltage VINI1 is −0.5 V, and the initialization voltage VINI2 is 1 V. For example, the voltage VH (HI), the voltage VL (LO), the voltage VNN, the voltage VMN, the initialization voltage VINI1, and the initialization voltage VINI2 supplied to the pixel circuit 181F correspond to the voltages obtained by inverting the polarities (potentials) of the voltage VL (LO), the voltage VH (HI), the voltage VN, the voltage VM, the initialization voltage VINI2, and the initialization voltage VINI1 supplied to the pixel circuit 181A.

[7-2-1. First Example of Driving Method for Pixel Circuit 181F]

Figure 55:
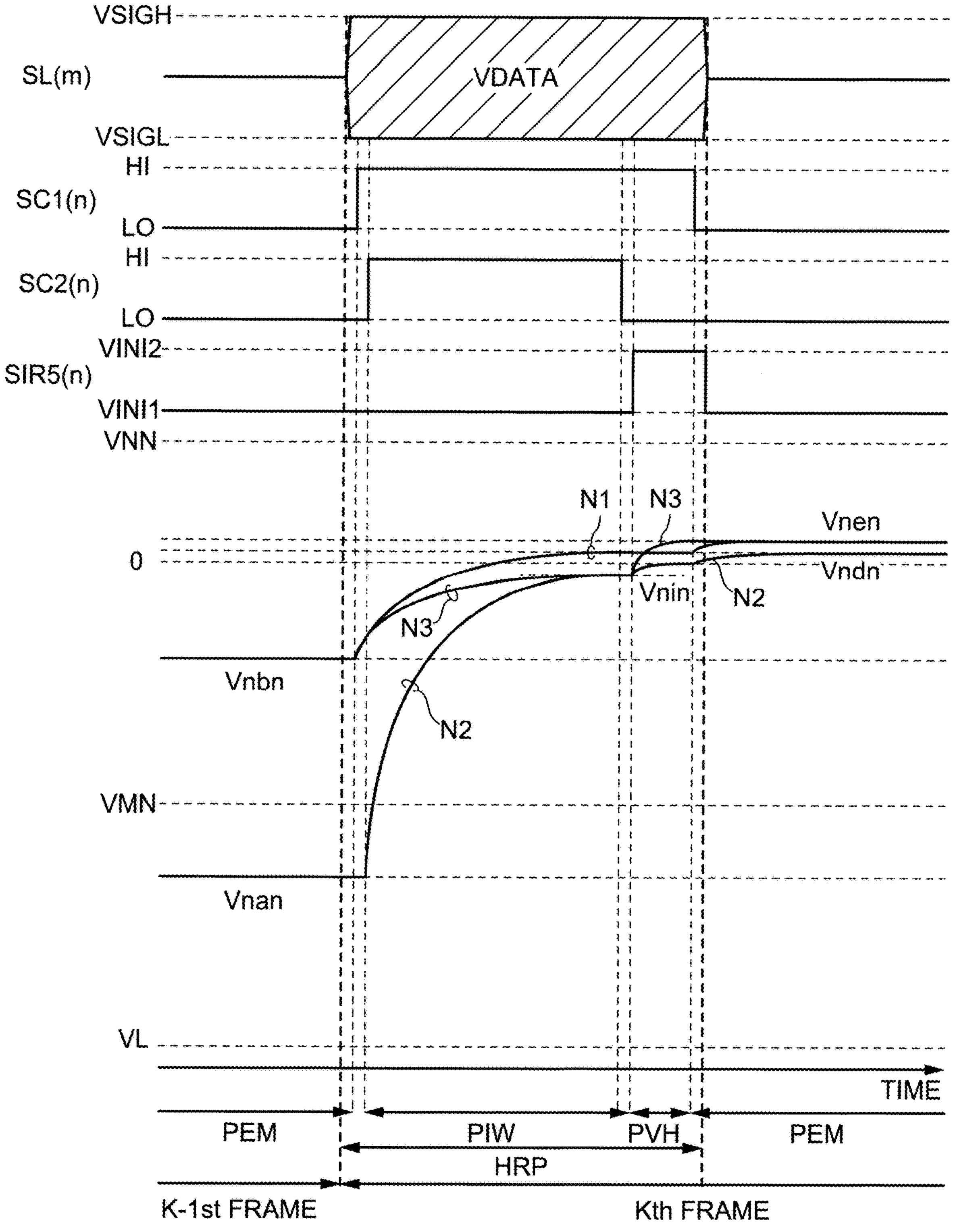
FIG. 55 is a timing chart of a self-luminous display device according to the seventh embodiment of the present invention.

A first example of a driving method for the pixel circuit 181F will be described with reference to FIG. 55. Similar to the configuration described in "6-2-1. First Example of Driving Method for Pixel Circuit 181E", the first example of the driving method for the pixel circuit 181F includes displaying images of different colors in consecutive frames.

The timings at which the first scan signal SC1(*n*) and the second scan signal SC2(*n*) in the light emission period PEM of the K−1stFRAME, the one horizontal period HRP and the light emission period PEM of the KthFRAME are supplied to the pixel circuit 181F are similar to the configuration described in "6-2-1. First Example of Driving Method for Pixel Circuit 181E".

In the scan voltage power supply SIR5(*n*), the initialization voltage VINI1 is supplied in the light emission period PEM of the K−1stFRAME, the first period and the period PIW of the one horizontal period HRP of the KthFRAME and the initialization voltage VINI2 is supplied in the period PVH of the KthFRAME. The scan voltage power supply SIR5(*n*) is supplied with the initialization voltage VINI1 during the first period of the light emission period PEM. When the first scan signal SC1(*n*) changes from the state in which HI is supplied to the state in which LO is supplied, the scan voltage power supply SIR5(*n*) changes from the state in which the initialization voltage VINI2 is supplied to the state in which the initialization voltage VINI1 is supplied. When the second scan signal SC2(*n*) changes from the state in which HI is supplied to the state in which LO is supplied, the scan voltage power supply SIR5(*n*) changes from the state in which the initialization voltage VINI1 is supplied to the state in which the initialization voltage VINI2 is supplied.

For example, the voltage Vnan, the voltage Vnbn, the voltage Vndn, the voltage Vnen, the voltage Vnin, and a voltage Vnjn are voltages (potentials) obtained by inverting the polarities of the voltage Vna, the voltage Vnb, the voltage Vnd, the voltage Vne, the voltage Vni, and the voltage Vnj in the driving method according to the sixth embodiment. Referring to the voltages (potentials) in the driving method according to the sixth embodiment, the voltage Vnan is −7 V, the voltage Vnbn is −2.5 V, the voltage Vndn is 0.5 V, the voltage Vnen is 1 V, the voltage Vnin is −0.5 V, and the voltage Vnjn is 4.5 V.

In the light emission period PEM of the K−1stFRAME, the conductive state and the non-conductive state other than the second transistor T2 are similar to the conductive state and the non-conductive state described in "6-2-1. First Example of Driving Method for Pixel Circuit 181E". For example, the voltage Vnan supplied to the second node N2 is −7 V, the voltage Vnbn supplied to the first node N1 and the third node N3 is −2.5 V, and the potential difference Vgs is −4.5 V. Therefore, the second transistor T2 can flow the current Ion based on the potential difference Vgs and the potential difference Vds corresponding to the voltage VSIGH input in the one horizontal period HRP of the K−1stFRAME. The seventh transistor T7 is in the conductive state, the current Ion flows from the reference voltage line PVSS to the light-emitting element OLED and the drive power line PVDD, and the light-emitting element OLED emits light. For example, similar to the configuration described in "6-2-1. First Example of Driving Method for Pixel Circuit 181E", white light is emitted by three pixels.

In the first period of the one horizontal period HRP of the KthFRAME following the light emission period PEM of the K−1stFRAME, the image data signal SL(m), including the data signal VDATA, including the voltage VSIGL (0.5 V) corresponding to the non-light-emitting black is input to the pixel 180F (the pixel circuit 181F). The conductive state and the non-conductive state of the respective transistors are similar to the conductive state and the non-conductive state described in "6-2-1. First Example of Driving Method for Pixel Circuit 181E". The voltage supplied to the first node N1 and the voltage supplied to the third node N3 rise from the voltage Vnbn.

In the period PIW, the image data signal SL(m) maintains the state in which the data signal VDATA including the voltage VSIGL is supplied. The conductive state and the non-conductive state of the respective transistors are similar to the conductive state and the non-conductive state described in "6-2-1. First Example of Driving Method for Pixel Circuit 181E". The voltage supplied to the first node N1 gradually rises from the voltage Vnbn toward the voltage VSIGL (the voltage Vndn, 0.5 V) and becomes the voltage Vndn (0.5 V). The voltage supplied to the second node N2 gradually rises from the voltage Vnan toward the initialization voltage VINI1 (the voltage Vnin, −0.5 V) and becomes the voltage Vnin (−0.5 V). Furthermore, the voltage supplied to the third node N3 gradually rises from the voltage Vnbn toward the initialization voltage VINI1 (the voltage Vnin, −0.5 V) and becomes the voltage Vnin (−0.5 V). Since the potential difference Vgs and the potential difference Vds are 0 V and the potential difference Vgs is greater than the threshold voltage VTHP (−1 V), the second transistor T2 is in the non-conductive state. Therefore, the drain current Ion does not flow from the first electrode 724 to the second electrode 726 of the second transistor T2.

As described above, the data signal VDATA including the voltage VSIGL is supplied (written) to the first node N1, and the second node N2 and the third node N3 are initialized by the initialization voltage VINI1.

In the period PVH, the image data signal SL(m) maintains the state in which the data signal VDATA including the voltage VSIGL is supplied. The conductive state and the non-conductive state of the respective transistors are similar to the conductive state and the non-conductive state described in "6-2-1. First Example of Driving Method for Pixel Circuit 181E". The voltage supplied to the first node N1 maintains the voltage Vndn (0.5 V). Since the fourth transistor T4 maintains the conductive state, the voltage supplied to the third node N3 gradually rises from the voltage Vnin (−0.5 V) toward the initialization voltage VINI2 (1 V) and becomes the initialization voltage VINI2 (1 V). In this case, although the fifth transistor T5 is in the non-conductive state, since the Vgs of the second transistor T2 towards −0.5 V (−0.5 V (N2 node)−(1 V) (N3 node)) which is smaller (lower) than the threshold voltage VTHP (−1 V), the drain current Ion of the second transistor T2 starts to flow, and the voltage supplied to the second node N2 gradually rises from the voltage Vnin (−0.5 V). Since the initialization voltage VINI2 (the voltage Vnen, 1 V) continues to be supplied to the third node N3, when the voltage supplied to the second node N2 becomes 0 V, the potential difference Vgs becomes the threshold voltage VTHP. As a result, the second transistor T2 is in the non-conductive state. Therefore, the drain current Ion does not flow from the first electrode 724 to the second electrode 726 of the second transistor T2.

As described above, in the period PVH, the threshold voltage VTHP of the second transistor T2 is obtained by the operation in which the potential difference Vgs becomes the same as the threshold voltage VTHP. In addition, the charge equivalent to the threshold voltage VTHP is held in the second node N2 (the gate electrode 722 of the second transistor T2).

In the light emission period PEM of the KthFRAME following the horizontal period HRP of the KthFRAME, data is not selected using the selection signal, and the data signal VDATA is maintained at a voltage equal to or higher than the voltage VSIGL and equal to or lower than the voltage VSIGH. The conductive state and the non-conductive state of the respective transistors are similar to the conductive state and the non-conductive state described in "6-2-1. First Example of Driving Method for Pixel Circuit 181E". When the third transistor T3 is in the conductive state, the first node N1 and the third node N3 are conductive, and the voltage supplied to the first node N1 becomes the voltage Vnen (1 V). Since the first node N1 and the third node N3 are conductive and then the voltage supplied to the first node N1 gradually rises, the voltage supplied to the second node N2 gradually rises from the voltage Vnin (0 V) due to the capacitive coupling between the second node N2 (the gate electrode 722 of the second transistor T2, the first electrode 724 of the capacitive element CS) and the third node N3. For example, the voltage supplied to the second node N2 becomes the voltage Vndn (0.5 V).

Therefore, in the light emission period PEM of the KthFRAME, the potential difference Vgs (−0.5) is greater than the threshold voltage VTHP. Therefore, since the second transistor T2 is in the non-conductive state and no current flows from the reference voltage line PVSS to the drive power line PVDD, the light-emitting element OLED does not emit light. As a result, for example, similar to the configuration described in "6-2-1. First Example of Driving Method for Pixel Circuit 181E", the pixel 180F does not emit light and becomes black.

[7-2-2. Second Example of Driving Method for Pixel Circuit 181F]

Figure 56:
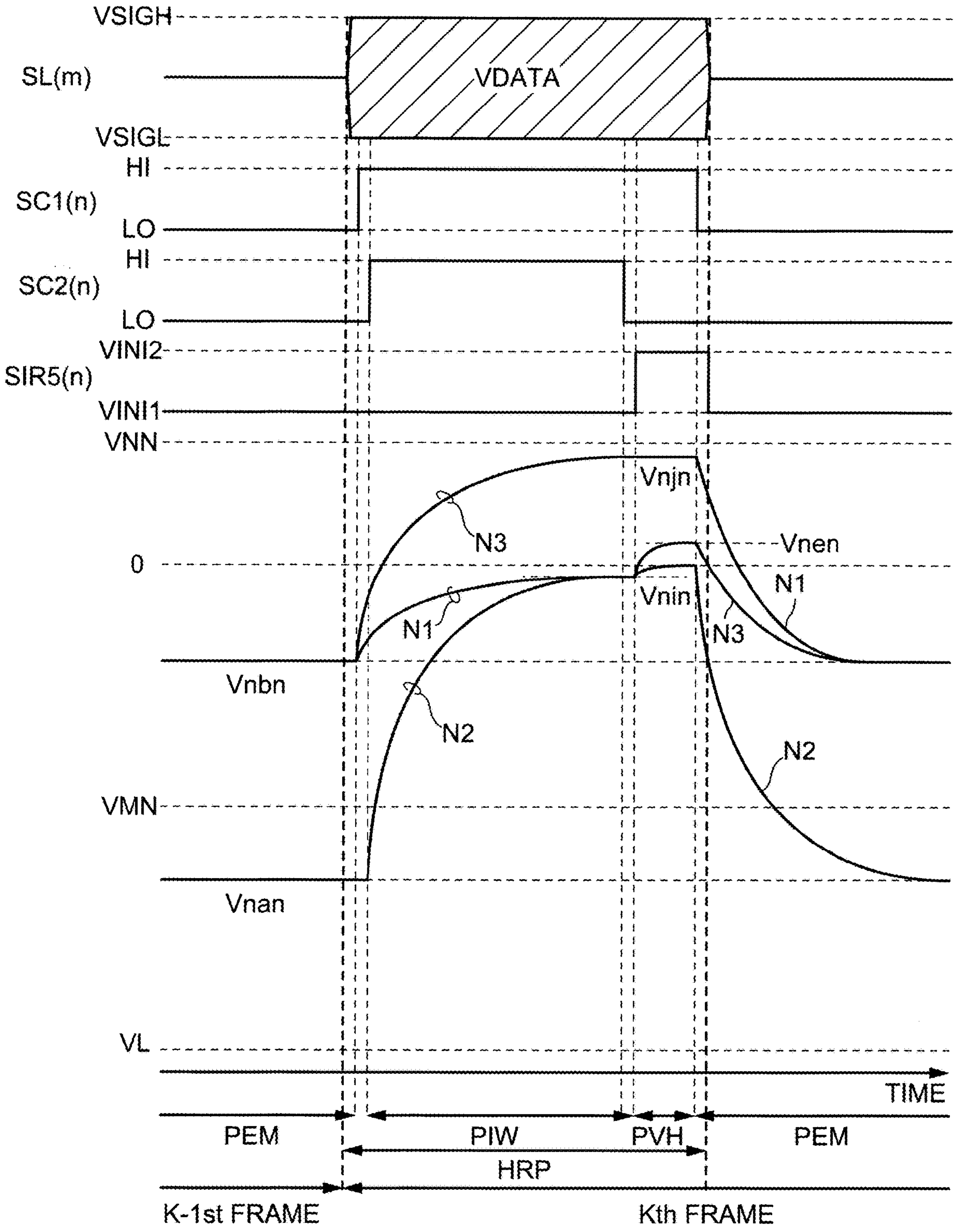
FIG. 56 is a timing chart of a self-luminous display device according to the seventh embodiment of the present invention.

A second example of a driving method for the pixel circuit 181F will be described with reference to FIG. 56. The driving method shown in the second example of the pixel circuit 181F includes displaying images of the same color (white) in consecutive frames similar to the configuration described in "6-2-2. Second Example of Driving Method for Pixel Circuit 181E". Configurations that are the same as or similar to those in FIG. 1 to FIG. 55 will be described as necessary.

The timings at which the image data signal SL(m), the scan voltage power supply SIR5(*n*), the first scan signal SC1(*n*), and the second scan signal SC2(*n*) are supplied to the pixel circuit 181F in the light emission period PEM of the K−1stFRAME, the one horizontal period HRP and the light emission period PEM of the KthFRAME are similar to the configuration described in "7-2-1. First Example of Driving Method for Pixel Circuit 181F". In addition, the voltage (potential) of the first node N1 in the light emission period PEM of the K−1stFRAME, the voltages (potentials) of the second node N2 and the third node N3 in the light emission period PEM of the K−1stFRAME, the one horizontal period HRP of the KthFRAME, and the operation of the respective transistors, and the like are similar to those described in "7-2-1. First Example of Driving Method for Pixel Circuit 181F".

In the first period of the one horizontal period HRP of the KthFRAME, the image data signal SL(m) including the data signal VDATA including the voltage VSIGH (4.5 V) corresponding to white is input to the pixel 180F (the pixel circuit 181F). The voltage supplied to the first node N1 gradually rises from the voltage Vnbn toward the voltage VSIGH (voltage Vnjn, 4.5 V).

In the period PIW, the voltage supplied to the first node N1 gradually rises from the voltage Vnbn toward the voltage Vnjn and becomes the voltage Vnjn (4.5 V). The voltage supplied to the second node N2, the voltage supplied to the third node N3, the potential difference Vgs, and the potential difference Vds are similar to those described in "7-2-1. First Example of Driving Method for Pixel Circuit 181F".

As described above, similar to that described in "7-2-1. First Example of Driving Method for Pixel Circuit 181F", in the period PIW, the data signal VDATA including the voltage VSIGL is supplied (written) to the first node N1, and the second node N2 and the third node N3 are initialized by the initialization voltage VINI1.

In the period PVH following the period PIW, the image data signal SL(m) maintains the state in which the data signal VDATA including the voltage VSIGH is supplied. The first node N1 maintains the state in which the voltage Vnjn is supplied. The voltage supplied to the second node N2, the voltage supplied to the third node N3, the potential difference Vgs, and the potential difference Vds are similar to those described in "7-2-1. First Example of Driving Method for Pixel Circuit 181F".

As described above, similar to that described in "7-2-1. First Example of Driving Method for Pixel Circuit 181F", in the period PVH, the threshold voltage VTHP of the second transistor T2 is obtained by the operation in which the potential difference Vgs of the second transistor T2 becomes the same as the threshold voltage VTHP. In addition, the charge equivalent to the threshold voltage VTHP is held in the second node N2 (the gate electrode 722 of the second transistor T2).

In the light emission period PEM of the KthFRAME following the one horizontal period HRP of the KthFRAME, the first node N1 is electrically connected to the third node N3 similar to that described in "7-2-1. First Example of Driving Method for Pixel Circuit 181F". Although the fourth transistor T4 and the sixth transistor T6 are in the non-conductive state, since the voltage of the third node N3 gradually drops, the voltage supplied to the second node N2 gradually drops from the voltage Vnin (0 V) due to the capacitive coupling between the second node N2 (the gate electrode 722 of the second transistor T2, the first electrode 724 of the capacitive element CS) and the third node N3. When the voltage of the second node N2 gradually drops from the voltage Vnin (0 V) and the potential difference Vgs falls below the threshold voltage VTHP, the second transistor T2 is turned from the non-conductive state to the conductive state. Since the seventh transistor T7 is in the conductive state, when the second transistor T2 is in the conductive state, the drain current Ion flows from the reference voltage line PVSS to the drive power line PVDD, and the voltage supplied to the first node N1 drops to follow the drop in the voltage supplied to the first node N1 and the voltage supplied to the second node N2. In this case, the potential difference between the first electrode 792 and the second electrode 794 in the period PVH is −4.5 V (the potential difference between the voltage supplied to the second node N2 and the voltage supplied to the third node N3), and the capacitive element CS holds the charge equivalent to −4.5 V. For example, since the capacitive element CS holds the charge equivalent to −4.5 V, as shown in FIG. 56, when the voltage supplied to the first node N1 and the voltage supplied to the third node N3 drop to the voltage Vnbn (−2.5 V), the voltage supplied to the second node N2 drops to the voltage Vnan (−7 V).

The potential difference Vgs (−4.5 V) is smaller than the threshold voltage VTHP. Therefore, the second transistor T2 is in the conductive state, and the drain current Ion flows from the reference voltage line PVSS to the drive power line PVDD. As a result, for example, the pixel 180F emits light similar to the configuration described in "6-2-2. Second Example of Driving Method for Pixel Circuit 181E". For example, three pixels 180F that emit red, blue, and green light emit white light.

[7-2-3. Third Example of Driving Method for Pixel Circuit 181F]

Figure 57:
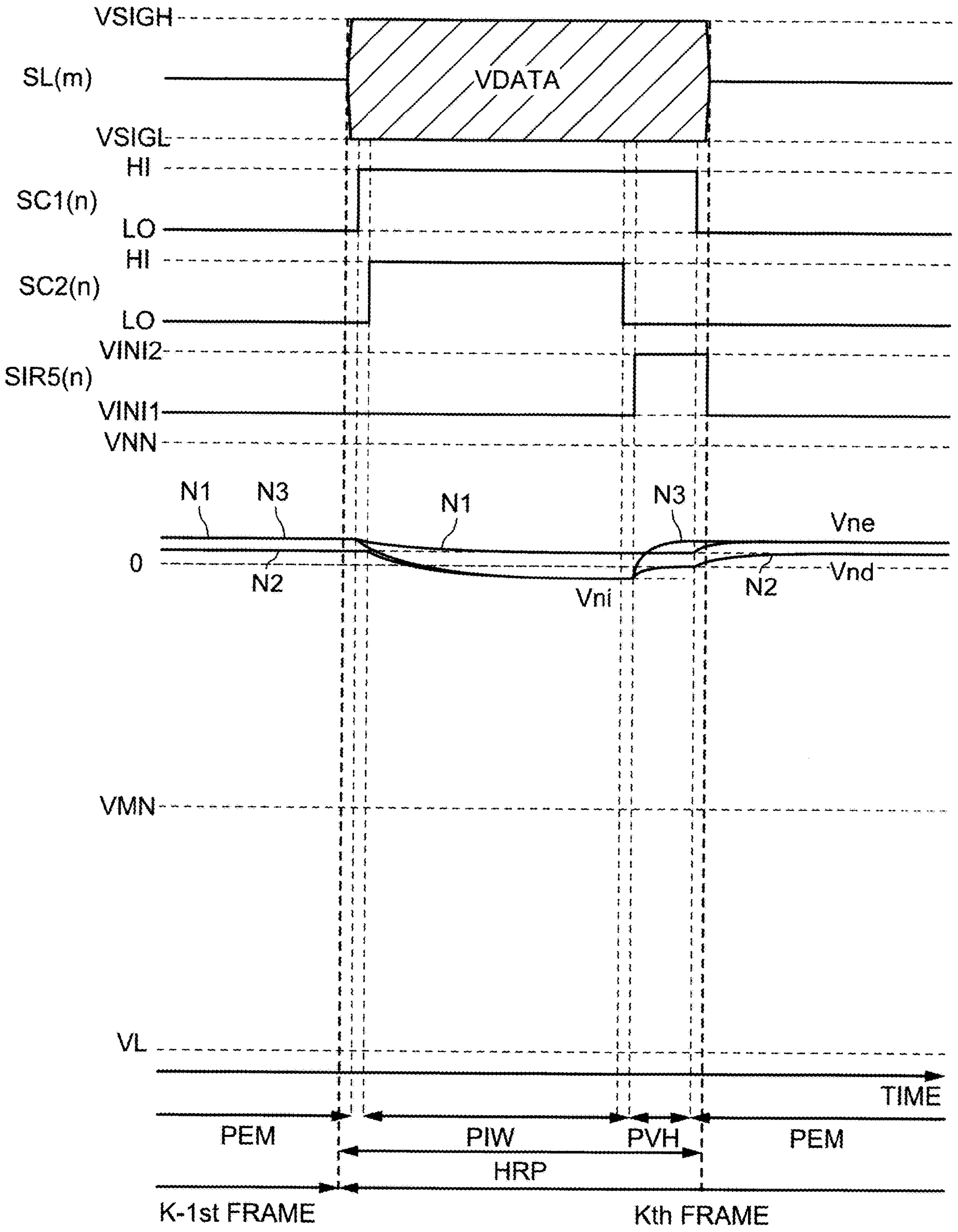
FIG. 57 is a timing chart of a self-luminous display device according to the seventh embodiment of the present invention.

A third example of a driving method for the pixel circuit 181F will be described with reference to FIG. 57. The driving method shown in the third example of the driving method for the pixel circuit 181F includes displaying images of the same color (black) in consecutive frames as in "6-2-3. Third Example of Driving Method for Pixel Circuit 181E". Configurations that are the same as or similar to those in FIG. 1 to FIG. 56 will be described as necessary.

The timings at which the image data signal SL(m), the scan voltage power supply SIR5(*n*), the first scan signal SC1(*n*), and the second scan signal SC2(*n*) are supplied to the pixel circuit 181F and the conductive state and the non-conductive state of the transistors in the light emission period PEM of the K−1stFRAME, the one horizontal period HRP and the light emission period PEM of the KthFRAME are similar to the configuration described in "7-2-1. First Example of Driving Method for Pixel Circuit 181F".

For example, in the light emission period PEM of the K−1stFRAME, the potential difference Vgs (−0.5 V) is greater than the threshold voltage VTHP of the second transistor T2. Since the second transistor T2 is in the non-conductive state and no current flows from the reference voltage line PVSS to the drive power line PVDD, the light-emitting element OLED does not emit light. As a result, for example, similar to the pixel 180F described in the light emission period PEM of the KthFRAME in "7-2-1. First Example of Driving Method for Pixel Circuit 181F", the pixel 180F does not emit light and becomes black.

In the first period of the one horizontal period HRP of the KthFRAME following the light emission period PEM of the K−1stFRAME, the image data signal SL(m), including the data signal VDATA, including the voltage VSIGL (0.5 V) corresponding to the non-light-emitting black, is input to the pixel 180F. The voltage supplied to the first node N1 gradually drops from the voltage Vnen (1 V) to the voltage Vndn (0.5 V), the voltage supplied to the second node N2 gradually drops from the voltage Vndn (0.5 V) to the voltage Vnin (−0.5 V), and the voltage supplied to the third node N3 gradually drops from the voltage Vnen (1 V) to the voltage Vnin (−0.5 V).

In the period PIW, the image data signal SL(m) maintains the state in which the data signal VDATA including the voltage VSIGL is supplied. The first node N1 is supplied with 0.5 V, and the second node N2 and the third node N3 are supplied with the voltage Vnin (−0.5 V).

As described above, in the period PIW, the data signal VDATA including the voltage VSIGL (0.5 V) is supplied (written) to the first node N1, and the second node N2 and the third node N3 are initialized by the initialization voltage VINI1.

In the period PVH following the period PIW, similar to that described in "7-2-1. First Example of Driving Method for Pixel Circuit 181F", the threshold voltage VTHP of the second transistor T2 is obtained by the operation in which the potential difference Vgs of the second transistor T2 becomes the same as the threshold voltage VTHP. In addition, the charge equivalent to the threshold voltage VTHP is held in the second node N2 (the gate electrode 722 of the second transistor T2).

In the light emission period PEM of the KthFRAME following the one horizontal period HRP of the KthFRAME, similar to that described in "7-2-1. First Example of Driving Method for Pixel Circuit 181F", the pixel 180F does not emit light and becomes black.

[7-2-4. Fourth Example of Driving Method for Pixel Circuit 181F]

Figure 58:
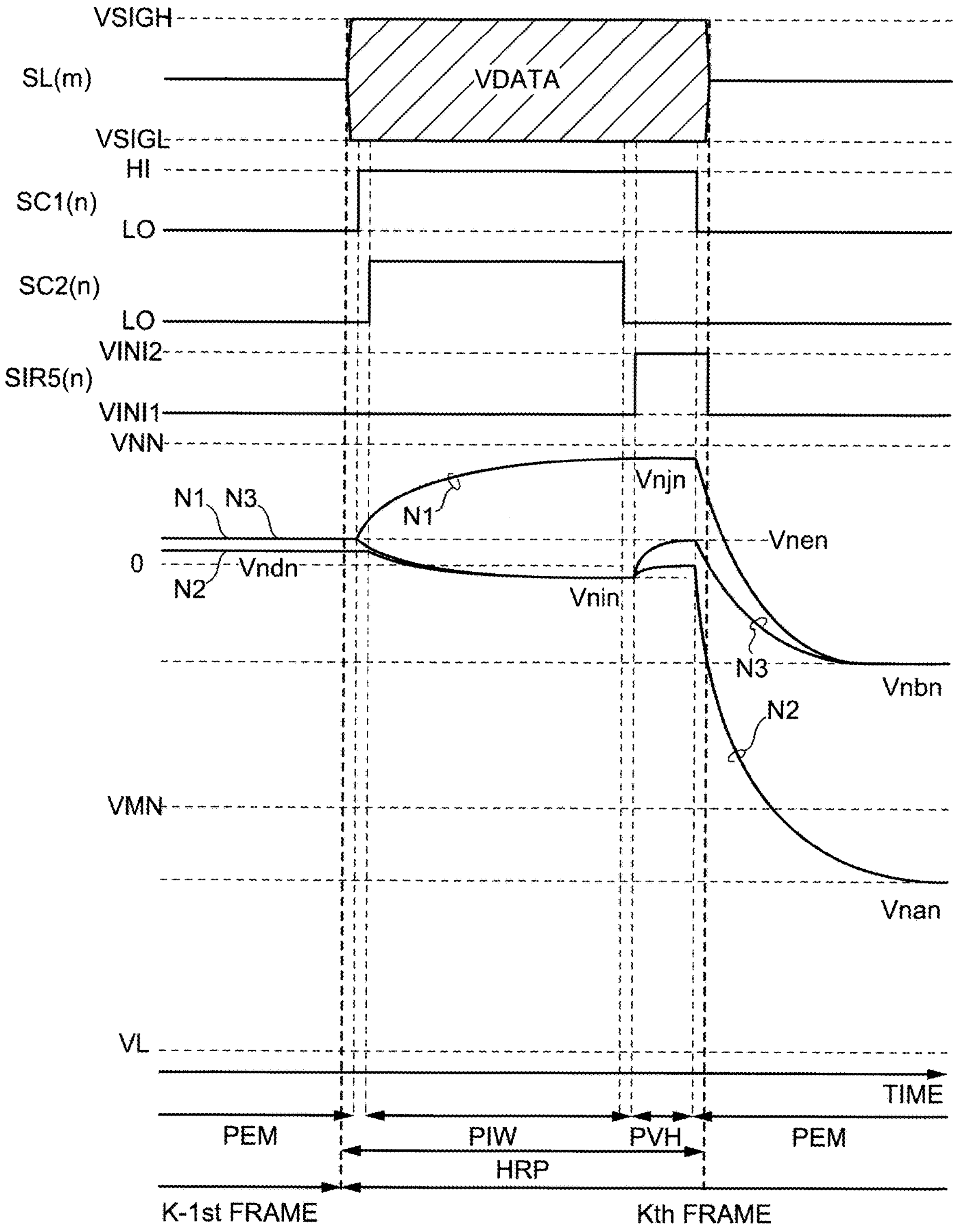
FIG. 58 is a timing chart of a self-luminous display device according to the seventh embodiment of the present invention.

A fourth example of a driving method for the pixel circuit 181F will be described with reference to FIG. 58. The driving method shown in the fourth example of the driving method for the pixel circuit 181F includes displaying images of different colors in consecutive frames similar to "6-2-4. Fourth Example of Driving Method for Pixel Circuit 181E". Configurations that are the same as or similar to those in FIG. 1 to FIG. 57 will be described as necessary.

The timings at which the image data signal SL(m), the scan voltage power supply SIR5(*n*), the first scan signal SC1(*n*), and the second scan signal SC2(*n*) are supplied to the pixel circuit 181F and the conductive state and the non-conductive state of the transistors in the light emission period PEM of the K−1stFRAME, the one horizontal period HRP and the light emission period PEM of the KthFRAME are similar to the configuration described in "7-2-1. First Example of Driving Method for Pixel Circuit 181F".

The voltages (potentials) of the first node N1, the second node N2, and the third node N3 in the light emission period PEM of the K−1stFRAME, the operation of the respective transistors, and the like are similar to those described in "7-2-3. Third Example of Driving Method for Pixel Circuit 181F".

In the first period of the one horizontal period HRP of the KthFRAME, the image data signal SL(m), including the data signal VDATA, including the voltage VSIGH (4.5 V) corresponding to white, is input to the pixel 180F. The voltage supplied to the first node N1 gradually rises from the voltage Vnen (1 V) toward the voltage VSIGH (voltage Vnjn, 4.5 V). The voltage supplied to the second node N2 gradually drops from the voltage Vndn (0.5 V) toward the voltage Vnin (initialization voltage VINI1, −0.5 V). The voltage supplied to the third node N3 gradually drops from the voltage Vnen (1 V) towards the voltage Vnin (−0.5 V).

As a result, in the period PIW, the image data signal SL(m) maintains the state in which the data signal VDATA including the voltage VSIGH is supplied. The first node N1 is supplied with the voltage Vnjn (4.5 V) and the second node N2 and the third node N3 are supplied with the voltage Vnin (−0.5 V).

As described above, in the period PIW, the data signal VDATA including the voltage VSIGH is supplied (written) to the first node N1, and the second node N2 and the third node N3 are initialized by the initialization voltage VINI1.

The voltages (potentials) of the first node N1, the second node N2, and the third node N3 in the period PVH and the light emission period PEM of the KthFRAME, the operation of the respective transistors, and the like are similar to those described in "7-2-3. Third Example of Driving Method for Pixel Circuit 181F".

As described above, in the period PVH, the threshold voltage VTHP of the second transistor T2 is obtained by the operation in which the potential difference Vgs of the second transistor T2 becomes the same as the threshold voltage VTHP. In addition, the charge equivalent to the threshold voltage VTHP is held in the second node N2 (the gate electrode 722 of the second transistor T2). Furthermore, in the light emission period PEM of the KthFRAME following the one horizontal period HRP of the KthFRAME, for example, the pixel 180F emits light, and three pixels 180F emitting red, blue, and green emit light and exhibit white.

As described above, similar to the driving method for the display device 10 according to the first embodiment and the driving method for the display device 10 according to the second embodiment, the driving method for the display device 10 according to the seventh embodiment (the driving method for the pixel circuit 181F) includes executing the process (driving) executed in the writing period and the process (driving) executed in the initialization period at the same timing. Therefore, the driving method for the display device 10 according to the seventh embodiment (the driving method for the pixel-circuit 181F) has effects similar to those of the driving method for the display device 10 according to the first embodiment and the driving method for the display device 10 according to the second embodiment.

Furthermore, each of the embodiments described above as an embodiment of the present invention can be appropriately combined and implemented as long as no contradiction is caused.

It is understood that, even if the effect is different from those provided by each of the above-described embodiments, the effect obvious from the description in the specification or easily predicted by persons ordinarily skilled in the art is apparently derived from the present invention.

What is claimed is:

1. A display device comprising:

a first transistor, the switching of which is controlled by a first control signal, electrically connected between an image data signal line to which a data voltage is supplied and a first node;

a third transistor, the switching of which is controlled by the first control signal, electrically connected between the first node and a second node;

a second transistor, a gate electrode of which is electrically connected to the second node, electrically connected between a power line to which a constant voltage is supplied and a third node;

a fourth transistor, the switching of which is controlled by the first control signal, electrically connected between a reference voltage power line to which a reference voltage is supplied and the second node;

a fifth transistor, the switching of which is controlled by a second control signal different from the first control signal, electrically connected between an initialization voltage power line to which an initialization voltage is supplied and the third node;

a light-emitting element electrically connected to the third node; and a capacitive element electrically connected between the first node and the third node.

2. The display device according to claim 1, further comprising:

a third control signal line, wherein the third control signal line serves as both the reference voltage power line and the initialization voltage power line.

3. The display device according to claim 1, further comprising:

a third control signal line, wherein the third control signal line serves as both a second control signal line to which the second control signal is supplied, the reference voltage power line, and the initialization voltage power line.

4. The display device according to claim 1, further comprising:

a first control circuit outputting the first control signal; and a second control circuit outputting the second control signal.

5. The display device according to claim 4, wherein the first control circuit supplies a high-level voltage to the first control signal, and turns on the first transistor and the fourth transistor, the second control circuit supplies a high-level voltage to the second control signal, and turns on the fifth transistor, the first control circuit and the second control circuit perform control so that a period during which the first transistor supplies the data voltage to the first node and a period during which the fourth transistor supplies the reference voltage to the second node are the same, and the period during which the first transistor supplies the data voltage to the first node is shorter than a period during which the fifth transistor supplies the initialization voltage to the third node.

6. The display device according to claim 1, wherein the first transistor, the second transistor, and the fourth transistor are n-channel field effect transistors, and the third transistor is a p-channel field effect transistor.

7. The display device according to claim 6, wherein a deep level of a channel region of the third transistor has a state density of $1\times10^{17}$ $eV^{-1}$ $cm^{-3}$ or less.

8. The display device according to claim 6, further comprising:

a first semiconductor layer;

a second semiconductor layer; and a third semiconductor layer, wherein the first semiconductor layer includes a channel region of the second transistor and a channel region of the fifth transistor, the second semiconductor layer includes a channel region of the first transistor and a channel region of the third transistor, and the third semiconductor layer includes a channel region of the fourth transistor.

9. The display device according to claim 1, wherein the first transistor, the fourth transistor, and the fifth transistor are n-channel type field effect transistors, and the second transistor and the third transistor are p-channel type field effect transistors.

10. The display device according to claim 1, wherein a channel length of the second transistor is longer than a channel length of the first transistor, a channel length of the third transistor, a channel length of the fourth transistor, and a channel length of the fifth transistor.

11. The display device according to claim 1, wherein
a channel region of each of the second transistor, the third transistor, the fourth transistor, and the fifth transistor has crystalline silicon, and
a channel region of each of the first transistor and the fourth transistor has an oxide semiconductor.

12. The display device according to claim 1, further comprising:
a first conductive layer; and
a second conductive layer different from the first conductive layer,
wherein
each of the reference voltage power line and the initialization voltage power line includes the first conductive layer and the second conductive layer different from each other,
the first conductive layer and the second conductive layer included in the reference voltage power line overlap in a plan view, and
the first conductive layer and the second conductive layer included in the initialization voltage power line overlap in a plan view.

13. The display device according to claim 1, wherein
the gate electrode overlaps the capacitive element in a plan view.

14. A display device comprising:
a first transistor, the switching of which is controlled by a first control signal, electrically connected between an image data signal line to which a data voltage is supplied and a first node;
a third transistor, the switching of which is controlled by the first control signal, electrically connected between the first node and a third node;
a second transistor, a gate electrode of which is electrically connected to a second node, electrically connected between the third node and a fourth node;
a fourth transistor, the switching of which is controlled by the first control signal, electrically connected between the third node and a third control signal line to which a first initialization voltage and a second initialization voltage different from the first initialization voltage are supplied;
a fifth transistor, the switching of which is controlled by a second control signal different from the first control signal, electrically connected between a third control signal line and the fourth node;
a sixth transistor, the switching of which is controlled by the first control signal, electrically connected between the second node and the fourth node;
a seventh transistor, the switching of which is controlled by the first control signal, electrically connected between a voltage line to which a constant voltage is supplied and the fourth node;
a light-emitting element electrically connected to the third node; and
a capacitive element electrically connected between the first node and the second node.

15. The display device according to claim 14, further comprising:
a first control circuit outputting the first control signal; and
a second control circuit outputting the second control signal.

16. The display device according to claim 15, wherein
the first control circuit supplies a high-level voltage as the first control signal, and turns on the first transistor, the fourth transistor, and the sixth transistor,
the second control circuit supplies a high-level voltage as the second control signal, and turns on the fifth transistor,
the first control circuit performs control so that a period during which the first transistor supplies the data voltage to the first node, a period during which the fourth transistor supplies the first initialization voltage to the third node, and a period during which the sixth transistor supplies the first and second initialization voltages to the second node are the same.

17. The display device according to claim 14, wherein
the first transistor, the second transistor, the fourth transistor, the fifth transistor, and the sixth transistor are n-channel type field effect transistors, and
the third transistor and the seventh transistor are p-channel type field effect transistors.

18. The display device according to claim 14, wherein
the first transistor, the fourth transistor, the fifth transistor, and the sixth transistor are n-channel type field effect transistors, and
the second transistor, the third transistor, and the seventh transistor are p-channel type field effect transistors.

19. The display device according to claim 18, wherein
a deep level of a channel region of the third transistor has a state density of $1\times10^{17}$ $eV^{-1}$ $cm^{-3}$ or less.

20. The display device according to claim 14, wherein
a channel region of each of the first transistor, the second transistor, the third transistor, the fourth transistor, the fifth transistor, and the seventh transistor has crystalline silicon, and
a channel region of the sixth transistor has an oxide semiconductor.

* * * * *